(12) United States Patent
Kimura et al.

(10) Patent No.: US 11,387,052 B2
(45) Date of Patent: Jul. 12, 2022

(54) NONAQUEOUS LITHIUM-TYPE POWER STORAGE ELEMENT

(71) Applicant: Asahi Kasei Kabushiki Kaisha, Tokyo (JP)

(72) Inventors: Yuima Kimura, Tokyo (JP); Kazuteru Umetsu, Tokyo (JP); Hitoshi Morita, Tokyo (JP); Nobuhiro Okada, Tokyo (JP); Yuichiro Hirakawa, Tokyo (JP); Yusuke Yamahata, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 129 days.

(21) Appl. No.: 16/819,383

(22) Filed: Mar. 16, 2020

(65) Prior Publication Data

US 2020/0219665 A1 Jul. 9, 2020

Related U.S. Application Data

(63) Continuation of application No. 16/070,333, filed as application No. PCT/JP2017/002015 on Jan. 20, 2017, now Pat. No. 10,636,582.

(30) Foreign Application Priority Data

Jan. 22, 2016 (JP) ............................. JP2016-010895
Aug. 8, 2016 (JP) ............................. JP2016-155861
(Continued)

(51) Int. Cl.
*H01M 10/052* (2010.01)
*H01G 11/06* (2013.01)
(Continued)

(52) U.S. Cl.
CPC ............. *H01G 11/06* (2013.01); *H01G 11/24* (2013.01); *H01G 11/28* (2013.01); *H01G 11/34* (2013.01);
(Continued)

(58) Field of Classification Search
CPC ........ H01G 11/06; H01G 11/24; H01G 11/28; H01G 11/34; H01G 11/50; H01G 11/70;
(Continued)

(56) References Cited

U.S. PATENT DOCUMENTS 5,702,843 A 12/1997 Mitate et al.
5,928,812 A 7/1999 Xue
(Continued)

FOREIGN PATENT DOCUMENTS

CN 1954397 A 4/2007
CN 101641811 A 2/2010
(Continued)

OTHER PUBLICATIONS

JP2004259680MT (Year: 2004).*
(Continued)

*Primary Examiner* — Alexander Usyatinsky
(74) *Attorney, Agent, or Firm* — Morgan, Lewis & Bockius LLP

(57) ABSTRACT

A nonaqueous lithium-type power storage element comprising a positive electrode, a negative electrode, a separator, and a nonaqueous electrolytic solution containing lithium ions. The negative electrode has: a negative electrode collector; and a negative electrode active material layer containing a negative electrode active material, said negative electrode active material layer being provided on one surface or both surfaces of the negative electrode collector. The negative electrode active material contains a carbonaceous material capable of storing or releasing lithium ions. Fur-
(Continued)

thermore, the positive electrode has: a positive electrode collector; and a positive electrode active material layer containing a cathode active material, said positive electrode active material layer being provided on one surface or both surfaces of the positive electrode collector. The positive electrode active material contains activated carbon. Also, the positive electrode active material layer contains one or more compounds selected from formulas (1) to (3) in an amount of $1.60 \times 10^{-4}$ to $300 \times 10^{-4}$ mol/g per unit mass of the positive electrode active material layer. $LiX^1$—$OR^1O$—$X^2Li$ (1) $LiX^1$—$OR^1O$—$X^2R^2$ (2) $R^2X^1$—$OR^1O$—$X^2R^3$ (3) (In the formulas, $R^1R^2$, $R^3X^1$, and $X^2$ represent groups defined in the specification of the application.)

31 Claims, 1 Drawing Sheet

(30) Foreign Application Priority Data

| | | |
|---|---|---|
| Aug. 8, 2016 | (JP) | JP2016-155935 |
| Sep. 30, 2016 | (JP) | JP2016-192461 |
| Sep. 30, 2016 | (JP) | JP2016-192536 |
| Sep. 30, 2016 | (JP) | JP2016-192542 |

(51) Int. Cl.

| | |
|---|---|
| *H01G 11/24* | (2013.01) |
| *H01G 11/50* | (2013.01) |
| *H01M 4/1393* | (2010.01) |
| *H01M 10/0567* | (2010.01) |
| *H01M 10/0585* | (2010.01) |
| *H01G 11/28* | (2013.01) |
| *H01G 11/34* | (2013.01) |
| *H01G 11/70* | (2013.01) |
| *H01M 10/0525* | (2010.01) |

(52) U.S. Cl.
CPC ............ *H01G 11/50* (2013.01); *H01G 11/70* (2013.01); *H01M 4/1393* (2013.01); *H01M 10/052* (2013.01); *H01M 10/0525* (2013.01); *H01M 10/0567* (2013.01); *H01M 10/0585* (2013.01); *Y02E 60/13* (2013.01); *Y02T 10/70* (2013.01)

(58) Field of Classification Search
CPC ............ H01M 4/1393; H01M 10/052; H01M 10/0525; H01M 10/0585; Y02E 60/13; Y02T 10/70
See application file for complete search history.

(56) References Cited

U.S. PATENT DOCUMENTS

| | | | |
|---|---|---|---|
| 6,294,292 B1 | 9/2001 | Tsushima et al. | |
| 10,396,361 B2 | 8/2019 | Kamijo et al. | |
| 10,403,447 B2 | 9/2019 | Umetsu et al. | |
| 2004/0126659 A1 | 7/2004 | Graetz et al. | |
| 2005/0233218 A1 | 10/2005 | Ogawa et al. | |
| 2005/0271944 A1 | 12/2005 | Suhara et al. | |
| 2006/0105242 A1 | 5/2006 | Sato et al. | |
| 2006/0194114 A1 | 8/2006 | Saito | |
| 2006/0209493 A1* | 9/2006 | Fujino | H01G 11/38 361/306.3 |
| 2007/0020385 A1 | 1/2007 | Naoi et al. | |
| 2007/0281216 A1 | 12/2007 | Petrat et al. | |
| 2008/0055819 A1 | 3/2008 | Taguchi et al. | |
| 2008/0254368 A1 | 10/2008 | Ooyama et al. | |
| 2009/0174986 A1 | 7/2009 | Matsui et al. | |
| 2010/0117031 A1 | 5/2010 | Akagi et al. | |
| 2010/0255377 A1 | 10/2010 | Tsubata et al. | |
| 2011/0039160 A1 | 2/2011 | Takahata et al. | |
| 2011/0159382 A1 | 6/2011 | Matsui et al. | |
| 2012/0081838 A1 | 4/2012 | Costantino et al. | |
| 2012/0094177 A1 | 4/2012 | Honoki et al. | |
| 2013/0155577 A1 | 6/2013 | Yang et al. | |
| 2013/0183580 A1 | 7/2013 | Kako et al. | |
| 2013/0208405 A1 | 8/2013 | Okada et al. | |
| 2013/0224608 A1 | 8/2013 | Sasaki et al. | |
| 2013/0288125 A1* | 10/2013 | Sheem | H01M 10/0431 429/212 |
| 2014/0295274 A1* | 10/2014 | Kim | B82Y 30/00 429/220 |
| 2015/0115206 A1* | 4/2015 | Fujii | H01M 4/622 252/506 |
| 2015/0162598 A1 | 6/2015 | Kim et al. | |
| 2015/0255781 A1 | 9/2015 | Hashimoto | |
| 2015/0303519 A1 | 10/2015 | Hanazaki | |
| 2017/0200943 A1 | 7/2017 | Kawakami | |
| 2017/0207459 A1 | 7/2017 | Okada et al. | |

FOREIGN PATENT DOCUMENTS

| | | |
|---|---|---|
| CN | 101847516 A | 9/2010 |
| CN | 103000880 A | 3/2013 |
| CN | 103700860 A | 4/2014 |
| CN | 104037418 A | 9/2014 |
| EP | 2219247 A1 | 8/2010 |
| EP | 2485303 A1 | 8/2012 |
| EP | 2284934 B1 | 10/2012 |
| JP | H05-343066 A | 12/1993 |
| JP | 2001-167767 A | 6/2001 |
| JP | 2002-252028 A | 9/2002 |
| JP | 2003-297424 A | 10/2003 |
| JP | 2004-095188 A | 3/2004 |
| JP | 2004259680 * | 9/2004 |
| JP | 2007-035770 A | 2/2007 |
| JP | 2008-171593 A | 7/2008 |
| JP | 2008-177263 A | 7/2008 |
| JP | 2008-181830 A | 8/2008 |
| JP | 2008-251434 A | 10/2008 |
| JP | 2010-205827 A | 9/2010 |
| JP | 2010-225291 A | 10/2010 |
| JP | 2011-249507 A | 12/2011 |
| JP | 2012-074467 A | 4/2012 |
| JP | 2013-206791 A | 10/2013 |
| JP | 2014-022334 A | 2/2014 |
| JP | 2014-027196 A | 2/2014 |
| JP | 2014-137861 A | 7/2014 |
| JP | 2014-143380 A | 8/2014 |
| JP | 2014-146448 A | 8/2014 |
| JP | 2014-199723 A | 10/2014 |
| JP | 2015-070032 A | 4/2015 |
| JP | 2015-072867 A | 4/2015 |
| JP | 2015-092478 A | 5/2015 |
| JP | 2015-207416 A | 11/2015 |
| JP | 2016-004708 A | 1/2016 |
| JP | 2016-012620 A | 1/2016 |
| WO | 2012/070397 A1 | 5/2012 |
| WO | 2012/081348 A1 | 6/2012 |
| WO | 2016/006632 A1 | 1/2016 |
| WO | 2016/010056 A1 | 1/2016 |

OTHER PUBLICATIONS

Extended European Search Report issued in corresponding European Patent Application No. 20181685.7 dated Oct. 14, 2020.
Barrett et al., "The Determination of Pore Volume and Area Distributions in Porous Substances: Computations from Nitrogen Isotherms," The Journal of the American Chemical Society, 73: 373-380 (1951).
Lippens et al., "Studies on Pore Systems in Catalysts: V. The t Method," Journal of Catalysis, 4: 319-323 (1965).
Mikhail et al., "Investigations of a Complete Pore Structure Analysis: I. Analysis of Micropores," Journal of Colloid and Interface Science, 26: 45-53 (1968).
International Search Report issued in corresponding International Patent Application No. PCT/JP2017/002015 dated Apr. 18, 2017.

(56) References Cited

OTHER PUBLICATIONS

International Preliminary Report on Patentability and Written Opinion issued in corresponding International Patent Application No. PCT/JP2017/002015 dated Aug. 2, 2018.
Decision to Grant issued in corresponding Japanese Patent Application No. 2017-509055 dated Sep. 12, 2017.
Supplementary European Search Report issued in related European Patent Application No. 17741568.4 dated Jan. 7, 2019.
Office Action issued in related U.S. Appl. No. 16/070,425 dated Jan. 24, 2020.
Supplemental European Search Report issued in related European Patent Application 17741564.3 dated Nov. 23, 2018.
Decision to Grant issued in European Patent Application No. 17741564.3 dated Oct. 17, 2019.
Decision to Grant issued in Japanese Patent Application No. 2017-509066 dated Jan. 5, 2018.

* cited by examiner

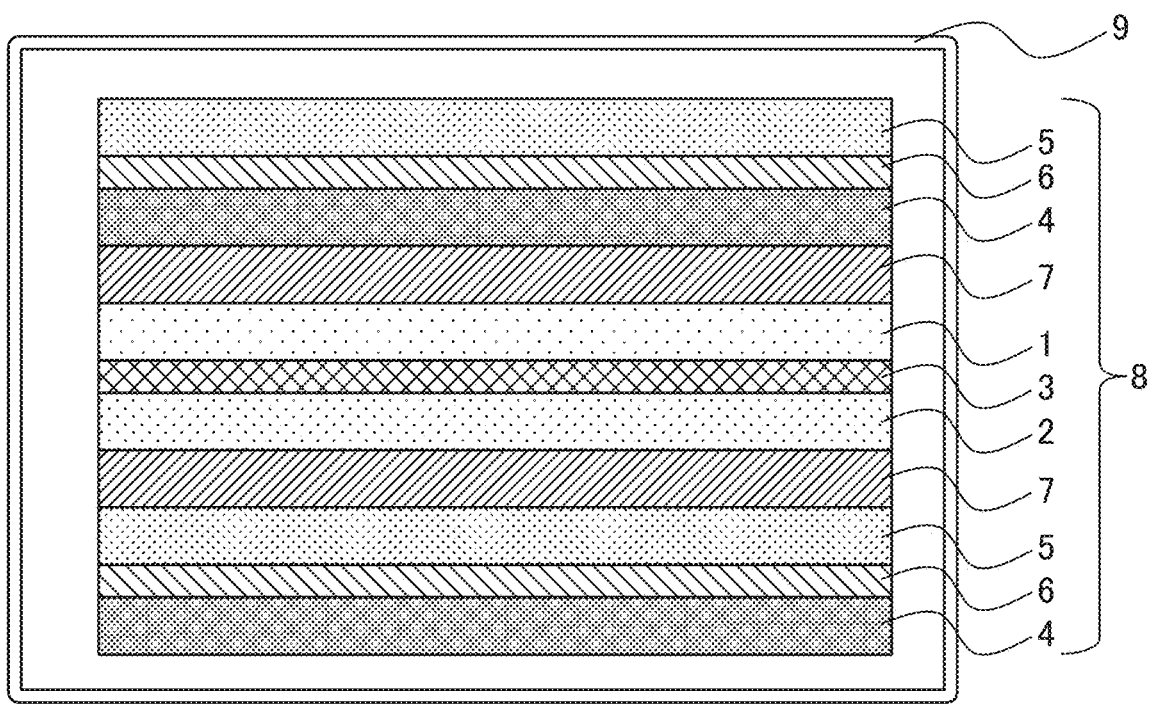

NONAQUEOUS LITHIUM-TYPE POWER STORAGE ELEMENT

RELATED APPLICATION DATA

This application is a continuation application of U.S. application Ser. No. 16/070,333, filed Jul. 16, 2018, which is a § 371 National Stage Application of PCT International Application No. PCT/JP2017/002015 filed Jan. 20, 2017, the entire contents of each are incorporated herein by reference. This application also claims priority to Japanese Application No. 2016-010895, filed Jan. 22, 2016; Japanese Application No. 2016-155861, filed Aug. 8, 2016; Japanese Application No. 2016-155935, filed Aug. 8, 2016; Japanese Application No. 2016-192461, filed Sep. 30, 2016; Japanese Application No. 2016-192536, filed Sep. 30, 2016, and Japanese Application No. 2016-192542, filed Sep. 30, 2016, the entire contents of each are incorporated herein by reference.

FIELD

The present invention relates to a nonaqueous lithium-type power storage element.

BACKGROUND

In recent years, systems such as power smoothing systems based on wind power generation, midnight power storage systems, household dispersive power storage systems based on solar power generation technologies, or power storage systems for electric vehicles have attracted attention from the viewpoint of effective utilization of energy aiming at protection of the global environment and conservation of resources.

The first requirement of a battery used in these power storage systems is high energy density. Research is actively proceeding on the development of lithium ion batteries as leading candidates for use as high energy density batteries capable of meeting such requirements.

The second requirement is high output characteristics. For example, when combining a highly efficient engine and a power storage system (as in, for example, a hybrid electric vehicle) or combining a fuel cell and a power storage system (as in, for example, a fuel cell electric vehicle), high output discharging characteristics are required by the power storage system during acceleration.

At present, devices such as electric double layer capacitors and nickel-metal hydride batteries are being developed for use as high output power storage devices.

Electric double layer capacitors using activated carbon for the electrodes have output characteristics of about 0.5 to 1 kW/L. These electric double layer capacitors also have high durability (cycle characteristics and storage characteristics at high temperatures) and have been considered to be the most suitable device in fields where high output is required. However, the energy density thereof is only about 1 Wh/L to 5 Wh/L. Consequently, further improvement of energy density is required.

On the other hand, nickel-metal hydride batteries, which are currently employed in hybrid electric vehicles, have a high output equivalent to that of electric double layer capacitors and have an energy density of about 160 Wh/L. However, research is actively proceeding in order to further enhance the energy density and output thereof together with enhancing durability (particularly with respect to stability at high temperatures).

In addition, research is also proceeding with the aim of increasing the output of lithium ion batteries. For example, a lithium ion battery has been developed that allows the obtaining of a high output of 3 kW/L at 50% depth of discharge (value indicating the state to which a power storage element has discharged as a percentage of the discharge capacity thereof). However, the energy density thereof is equal to or lower than 100 Wh/L, i.e., it is designed to intentionally suppress high energy density, which is the greatest characteristic of lithium ion batteries. In addition, the durability (cycle characteristics and storage characteristics at high temperatures) thereof is inferior to that of electric double layer capacitors. Consequently, these batteries are limited to use over a range of depth of discharge that is narrower than 0 to 100% in order to maintain practical durability. Since capacitance at which the battery is actually able to be used is even lower, research is actively proceeding to further improve durability.

As was previously described, there is a strong demand for the practical application of power storage elements provided with high energy density, high output characteristics and durability. However, each of these existing power storage elements has its merits and demerits. Consequently, a new type of power storage element is required that satisfies these technological requirements. Power storage elements referred to as lithium ion capacitors have attracted attention as a leading candidate for satisfying these requirements and are currently being actively developed.

Capacitor energy is expressed as $\frac{1}{2} \cdot C \cdot V^2$ (where, C represents capacitance and V represents voltage).

Lithium ion capacitors are a type of power storage element (nonaqueous lithium-type power storage element) that use a nonaqueous electrolytic solution containing a lithium salt, and carry out charging and discharging by a non-Faraday reaction based on adsorption/desorption of anions in the same manner as electric double layer capacitors at roughly equal to or higher than 3 V at the positive electrode, and by a Faraday reaction based on intercalation/release of lithium ions in the same manner as lithium ion batteries at the negative electrode.

In summarizing the aforementioned electrode materials and characteristics, although high output and high durability are realized in the case of carrying out charging and discharging by adsorption/desorption of ions on the surface of activated carbon (non-Faraday reaction) using a material such as activated carbon for the electrodes, energy density is low (such as being only one-fold). On the other hand, although energy density increases (such as increasing to 10-fold that of non-Faraday reactions using activated carbon) in the case of carrying out charging and discharging by a Faraday reaction using an oxide or carbon material for the electrodes, there are problems with durability and output characteristics.

Electric double layer capacitors are characterized in that they combine these electrode materials by using activated carbon for the positive electrode and negative electrode (one-fold energy density) and carrying out charging and discharging by a non-Faraday reaction at both the positive and negative electrodes, thereby demonstrating the characteristics of high output and high durability but low energy density (one-fold at the positive electrode×one-fold at the negative electrode=1).

Lithium ion secondary batteries use a lithium transition metal oxide for the positive electrode (10-fold energy density) and a carbon material for the negative electrode (10-fold energy density), and are characterized by carrying out charging and discharging according to a Faraday reaction at both the positive and negative electrodes, and although these batteries demonstrate high energy density (10-fold at the positive electrode×10-fold at the negative electrode=100), they have problems with respect to output characteristics and durability. Moreover, the depth of discharge must be restricted in order to satisfy the high durability required by applications such as hybrid electric vehicles, thereby resulting in lithium ion secondary batteries only being able to use 10% to 50% of the energy thereof.

Lithium ion capacitors are characterized by using activated carbon for the positive electrode (one-fold energy density) and using a carbon material for the negative electrode (10-fold energy density), and carrying out charging and discharging by a non-Faraday reaction at the positive electrode and by a Faraday reaction at the negative electrode, enabling these capacitors to function as novel asymmetrical capacitors provided with both the characteristics of electric double layer capacitors and lithium ion secondary batteries. These lithium ion capacitors have high energy density (1-fold at the positive electrode×10-fold at the negative electrode=10) while still retaining high output and high durability, and are characterized by not requiring restriction of depth of discharge in the manner of lithium ion secondary batteries.

Examples of applications that use lithium ion capacitors include power storage for railways, construction machinery and automobiles. In these applications, the capacitor used is required to have superior temperature characteristics due to the harsh operating environment. In particular, decreased performance caused by the generation of gas attributable to decomposition of the electrolytic solution at high temperatures is a problem. A counter technology for this problem consists of adding an additive to a nonaqueous electrolytic solution to form a coating film composed of decomposition products thereof on the surface of the negative electrode active material, thereby inhibiting reductive decomposition of the nonaqueous electrolytic solution accompanying subsequent charging and discharging and improving battery durability. Related technologies in PTL 1 and PTL 2 propose a power storage element containing two types of additives having different structures in an electrolytic solution. In addition, PTL 3 proposes a power storage element in which a fixed amount of a coating film is formed on the surface of the negative electrode active material by adding an additive.

In addition, there is the potential for decreases in performance and internal short-circuiting caused by precipitation of lithium dendrites at the negative electrode interface as a result of using in low temperature environments at 0° C. or lower, thereby resulting in significant problems in terms of safety and reliability of the power storage element.

PTL 4 proposes a means for solving such problems with a lithium ion capacitor having improved low temperature characteristics by containing a specific solvent in the electrolytic solution.

CITATION LIST

Patent Literature

PTL 1: Japanese Unexamined Patent Publication No. 2014-27196
PTL 2: Japanese Unexamined Patent Publication No. 2013-206791
PTL 3: Japanese Unexamined Patent Publication No. 2014-137861
PTL 4: Japanese Unexamined Patent Publication No. 2015-70032

Non-Patent Literature

NPL 1: E. P. Barrett, L. G. Joyner and P. Halenda, J. Am. Chem. Soc., 73, 373 (1951)
NPL 2: B. C. Lippens, J. H. de Boer, J. Catalysis, 4319 (1965)
NPL 3: R. S. Mikhail, S. Brunauer, E. E. Bodor, J. Colloid Interface Sci., 26, 45 (1968)

SUMMARY

Technical Problem

Although the art of PTL 1 and PTL 2 describes that the generation of gas and electrode deterioration are inhibited during storage at high temperatures, there is no mention of low-temperature characteristics. PTL 3 provides a capacitor having superior cycling characteristics at high temperatures. However, PTL 3 does not indicate results relating to changes in characteristics following a high-temperature cycling test. In addition, although PTL 4 is able to improve the characteristics of a power storage element at low temperatures, the effect of improving durability at high temperatures is not confirmed.

As has been described above, the quality of conventional lithium ion capacitors is merely evaluated by focusing either on low-temperature characteristics or high-temperature durability, and input-output characteristics and durability of power storage elements over a wide temperature range from high temperatures to low temperatures, which are important in terms of practical use, have not been taken into consideration.

Therefore, an object of the present invention is to provide a nonaqueous lithium-type power storage element that is capable of realizing both high input-output characteristics and superior high-temperature durability over a wide temperature range.

Solution to Problem

According to the present invention, a lithium ion capacitor uses activated carbon as a positive electrode active material and, as a result of containing a specific amount of an Li compound represented by the following structural formula, is able to realize both high input-output characteristics over a wide temperature range as well as inhibition of generation of gas caused by decomposition of electrolytic solution in a high-temperature environment along with the characteristic deterioration attributable thereto.

The present invention is composed of the following aspects and was completed based on the aforementioned findings.

Namely, the present invention is as indicated below.

[1] A nonaqueous lithium-type power storage element composed of a positive electrode, a negative electrode, a separator and a nonaqueous electrolytic solution containing lithium ions, wherein the negative electrode has a negative electrode power collector and a negative electrode active material layer containing a negative electrode active material provided on one side or both sides of the negative electrode power collector, and the negative electrode active material contains a carbon material capable of intercalating and releasing lithium ions, the positive electrode has a positive electrode power collector and a positive electrode active material layer containing a positive electrode active material provided on one side or both sides of the positive electrode power collector, and the positive electrode active material contains activated carbon, and the positive electrode active material layer contains $1.60 \times 10^{-4}$ mol/g to $300 \times 10^{-4}$ mol/g of one or more types of compounds selected from compounds represented by the following formulas (1) to (3) per unit weight of the positive electrode active material layer:

[Chem. 1]

$$LiX^1-OR^1O-X^2Li \quad (1)$$

(wherein, $R^1$ represents an alkylene group having 1 to 4 carbon atoms or a halogenated alkylene group having 1 to 4 carbon atoms, and $X^1$ and $X^2$ respectively and independently represent $-(COO)_n$ (wherein, n represents 0 or 1)),

[Chem. 2]

$$LiX^1-OR^1O-X^2R^2 \quad (2)$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $-(COO)_n$ (wherein, n represents 0 or 1)), and

[Chem. 3]

$$R^2X^1-OR^1O-X^2R^3 \quad (3)$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $-(COO)_n$ (wherein, n represents 0 or 1)).

[2] The nonaqueous lithium-type power storage element described in [1], wherein the positive electrode active material layer contains $0.30 \times 10^{-4}$ mol/g to $200 \times 10^{-4}$ mol/g of lithium fluoride per unit weight of the positive electrode active material layer.

[3] The nonaqueous lithium-type power storage element described in [1], wherein $0.20 \leq A/B \leq 20.0$ when the content of the compound selected from compounds represented by the formulas (1) to (3) per unit weight of the positive electrode active material layer is defined as A, and the content of the compound per unit weight of the negative electrode active material layer is defined as B.

[4] The nonaqueous lithium-type power storage element described in any of [1] to [3], wherein the positive electrode active material layer contains a lithium compound other than the active material, and an amount of lithium in the active material layer is calculated from the area of a peak appearing at −40 ppm to 40 ppm in a $^7$Li-solid state NMR spectrum, and the amount of lithium is $10.0 \times 10^{-4}$ mol/g to $300 \times 10^{-4}$ mol/g.

[5] The nonaqueous lithium-type power storage element described in [1], wherein the value obtained by dividing the percentage of fluorine atoms (atomic %) by the percentage of carbon atoms (atomic %), which is calculated from the relative element concentration of atoms obtained by XPS (X-ray photoelectron spectroscopy) measurement, on the surface of the separator is $5.0 \times 10^{-3}$ to $200 \times 10^{-3}$, and a particulate substance having a particle diameter of 50 nm to 500 nm is present at 1.0 particle/μm$^2$ to 30.0 particles/μm$^2$ on the separator surface during SEM observation of the separator surface.

[6] The nonaqueous lithium-type power storage element described in [5], wherein the value obtained by dividing the percentage of fluorine atoms (atomic %) by the percentage of carbon atoms (atomic %), which is calculated from the relative element concentration of atoms obtained by XPS (X-ray photoelectron spectroscopy) measurement, on the surface of the separator on the side opposing the negative electrode is $10 \times 10^{-3}$ to $100 \times 10^{-3}$, and a particulate substance having a particle diameter of 50 nm to 500 nm is present at 4.0 particles/μm$^2$ to 15.0 particles/μm$^2$ on the separator surface during SEM observation of the surface of the separator on the side opposing the negative electrode.

[7] The nonaqueous lithium-type power storage element described in any of [1] to [6], wherein the positive electrode contains a lithium compound, the lithium compound is one or more types of compounds selected from lithium carbonate, lithium oxide, lithium hydroxide, lithium chloride, lithium bromide, lithium iodide, lithium nitride, lithium oxalate and lithium acetate, 0.1 μm $\leq X_1 \leq$ 10.0 μm when the average particle diameter of the lithium compound is defined as $X_1$, 2.0 μm $\leq Y_1 \leq$ 20.0 μm when the average particle diameter of the positive electrode active material is defined as $Y_1$, $X_1 < Y_1$, and the amount of lithium compound contained in the positive electrode is 1% by weight to 50% by weight.

[8] The nonaqueous lithium-type power storage element described in any of [1], [2] or [7], wherein the positive electrode active material layer contains $2.70 \times 10^{-4}$ mol/g to $130 \times 10^{-4}$ mol/g of a compound represented by the following formula (4) per unit weight of the positive electrode active material layer.

[Chem. 4]

$$\underset{Li-OCO-Li}{\overset{O}{\parallel}} \quad (4)$$

[9] The nonaqueous lithium-type power storage element described in any of [1] to [3], wherein the positive electrode power collector and the negative electrode power collector are nonporous metal foils.

[10] The nonaqueous lithium-type power storage element described in [1] or [3], wherein the positive electrode contains at least one lithium compound other than the active material, and the active material is coated onto both sides of a nonporous positive electrode power collector of the positive electrode, a negative electrode active material capable of intercalating and releasing lithium ions is coated onto both sides of a nonporous negative electrode power collector of the negative electrode, $C_{x1}/C_{y1}$ is 1.02 to 1.35 when the basis weight of the positive electrode active material layer on one side ($C_x$ side) of the positive electrode is defined as $C_{x1}$ (g/m$^2$) and the basis weight of the positive electrode active material layer on the other side ($C_y$ side) is defined as $C_{y1}$ (g/m$^2$), and $A_{x1}/A_{y1}$ is 1.02 to 1.35 when the basis weight of the negative electrode active material layer on one side of the electrode opposing the $C_y$ side ($A_y$ side) is defined as $A_{y1}$ (g/m$^2$) and the basis weight of the negative electrode active material layer on the other side ($A_x$ side) is defined as $A_{x1}$ (g/m$^2$).

[11] The nonaqueous lithium-type power storage element described in [10], wherein $C_{x2}/C_{y2}$ is 1.02 to 2.00 when the amount of lithium compound per unit area of the $C_x$ side is defined as $C_{x2}$ (g/m$^2$) and the amount of lithium compound per unit area of the $C_y$ side is defined as $C_{y2}$ (g/m$^2$).

[12] The nonaqueous lithium-type power storage element described in [10] or [11], wherein the $C_x$ side opposes the $A_x$ side.

[13] The nonaqueous lithium-type power storage element described in any of [10] to [12], wherein $C_{y3}/A_{y3}$ is 0.2 to 20.0 when the content of the compound represented by the formulas (1) to (3) contained in the $C_y$ side is defined as $C_{y3}$ (mol/g) and the content of the compound represented by the formulas (1) to (3) contained in the $A_y$ side is defined as $A_{y3}$ (mol/g).

[14] The nonaqueous lithium-type power storage element described in any of [10] to [13], wherein the lithium compound is lithium carbonate, lithium oxide or lithium hydroxide.

[15] The nonaqueous lithium-type power storage element described in any of [10] to [14], wherein the lithium compound is lithium carbonate, and
when the area ratios of carbonate ion mapping in images obtained by Raman spectroscopy of the $C_x$ side and $C_y$ side are defined as $S_x$ % and $S_y$ %, then $S_x$ and $S_y$ are respectively 1 to 40 and $S_x/S_y$ is 1.00 to 2.00.

[16] The nonaqueous lithium-type power storage element described in any of [1] to [9], wherein the nonaqueous electrolytic solution contains at least one type of organic solvent selected from the group consisting of ethylene carbonate, propylene carbonate, butylene carbonate, vinylene carbonate and fluoroethylene carbonate.

[17] The nonaqueous lithium-type power storage element described in any of [1] to [9], wherein the nonaqueous electrolytic solution contains at least one type of $LiPF_6$ and $LiBF_4$.

[18] The nonaqueous lithium-type power storage element described in any of [1] to [9], wherein the concentration of $LiN(SO_2F)_2$ in the nonaqueous electrolytic solution is 0.3 mol/L to 1.5 mol/L based on the total amount of the nonaqueous electrolytic solution.

[19] The nonaqueous lithium-type power storage element described in any of [1] to [18], wherein the positive electrode active material contained in the positive electrode active material layer is activated carbon that satisfies the expressions $0.3<V1\leq0.8$ and $0.5\leq V2\leq1.0$ when mesopore volume derived from pores having a diameter of 20 Å to 500 Å as calculated by the BJH method is defined as V1 (cc/g) and micropore volume derived from pores having a diameter of less than 20 Å as calculated according to the MP method is defined as V2 (cc/g), and demonstrates a specific surface area as measured by the BET method of 1,500 m$^2$/g to 3,000 m$^2$/g.

[20] The nonaqueous lithium-type power storage element described in any of [1] to [18], wherein the positive electrode active material contained in the positive electrode active material layer is activated carbon in which the mesopore volume V1 (cc/g) derived from pores having a diameter of 20 Å to 500 Å as calculated by the BJH method satisfies the expression $0.8<V1\leq2.5$ and the micropore volume V2 (cc/g) derived from pores having a diameter of less than 20 Å as calculated according to the MP method satisfies the expression $0.8<V2\leq3.0$, and demonstrates a specific surface area as measured by the BET method of 2,300 m$^2$/g to 4,000 m$^2$/g.

[21] The nonaqueous lithium-type power storage element described in any of [1] to [20], wherein the negative electrode contains a negative electrode active material, and the doped amount of lithium ions of the negative electrode active material is 530 mAh/g to 2,500 mAh/g per unit weight.

[22] The nonaqueous lithium-type power storage element described in any of [1] to [21], wherein the BET specific surface area of the negative electrode active material is 100 m$^2$/g to 1,500 m$^2$/g.

[23] The nonaqueous lithium-type power storage element described in any of [1] to [20], wherein the negative electrode contains a negative electrode active material, and the doped amount of lithium ions of the negative electrode active material is 50 mAh/g to 700 mAh/g per unit weight.

[24] The nonaqueous lithium-type power storage element described in any of [1] to [20] and [23], wherein the BET specific surface area of the negative electrode active material is 1 m$^2$/g to 50 m$^2$/g.

[25] The nonaqueous lithium-type power storage element described in any of [1] to [20], [23] and [24], wherein the average particle diameter of the negative electrode active material is 1 μm to 10 μm.

[26] The nonaqueous lithium-type power storage element described in any of [1] to [9], which simultaneously satisfies the following requirements (a) and (b) when the initial internal resistance at a cell voltage of 4 V is defined as Ra (Ω), electrostatic capacitance is defined as F (F), electrical energy is defined as E (Wh) and the volume of the casing that houses the electrode laminated body is defined as V (L):
(a) the product Ra·F of Ra and F is 0.3 to 3.0; and
(b) E/V is 15 to 50.

[27] The nonaqueous lithium-type power storage element described in any of [1] to [9] and [26], which simultaneously satisfies the following requirements (c) and (d) when internal resistance at 25° C. at a cell voltage of 4 V after storing for 2 months at an ambient temperature of 60° C. is further defined as Rb (Ω):
(c) Rb/Ra is 0.3 to 3.0, and
(d) the amount of gas generated at 25° C. at a cell voltage of 4 V after storing for 2 months at an ambient temperature of 60° C. is $30\times10^{-3}$ cc/F or less.

[28] The nonaqueous lithium-type power storage element described in any of [1] to [3] and [26], which simultaneously satisfies all of the following requirements (c) to (e) when initial internal resistance at a cell voltage of 4 V is defined as Ra (Ω), internal resistance at 25° C. at a cell voltage of 4 V after storing for 2 months at an ambient temperature of 60° C. is defined as Rb (Ω), and internal resistance at an ambient temperature of −30° C. is defined as Rc (Ω):
(c) Rb/Ra is 0.3 to 3.0,
(d) the amount of gas generated at 25° C. at a cell voltage of 4 V after storing for 2 months at an ambient temperature of 60° C. is $30\times10^{-3}$ cc/F or less, and
(e) Rc/Ra is 30 or less.

[29] A power storage module using the nonaqueous lithium-type power storage element described in any of [1] to [28].

[30] A power regeneration system using the nonaqueous lithium-type power storage element described in any of [1] to [28] or the power storage module described in [29].

[31] A power load smoothing system using the nonaqueous lithium-type power storage element described in any of [1] to [28] or the power storage module described in [29].

[32] A non-service interruption power source system using the nonaqueous lithium-type power storage element described in any of [1] to [28] or the power storage module described in [29].

[33] A non-contact power supply system using the nonaqueous lithium-type power storage element described in any of [1] to [28] or the power storage module described in [29].

[34] An energy harvesting system using the nonaqueous lithium-type power storage element described in any of [1] to [28] or the power storage module described in [29].

[35] An energy storage system using the nonaqueous lithium-type power storage element described in any of [1] to [28] or the power storage module described in [29].

Advantageous Effects of Invention

According to the present invention, a lithium ion capacitor is capable of realizing both high input-output characteristics over a wide temperature range and inhibition of generation of gas caused by decomposition of electrolytic solution at high temperatures as well as decreased performance attributable thereto by using activated carbon for the positive electrode active material and containing a specific amount of a compound represented by the aforementioned structural formula in the positive electrode active material layer.

BRIEF DESCRIPTION OF DRAWINGS

FIG. 1 is a cross-sectional schematic diagram taken along the direction of thickness of a nonaqueous lithium power storage element according to an embodiment of the present invention.

DESCRIPTION OF EMBODIMENTS

Although the following provides a detailed explanation of an embodiment of the present invention (hereinafter to be referred to as the "present embodiment"), the present invention is not limited to the present embodiment. Lower limit values and upper limit values over each numerical range of the present embodiment can constitute an arbitrary numerical range by an arbitrary combination thereof.

The main constituents of a nonaqueous lithium-type power storage element typically consist of a positive electrode, a negative electrode, a separator, an electrolytic solution and a casing. An organic solvent having a lithium salt dissolved therein (hereinafter to be referred to as the "nonaqueous electrolytic solution") is used for the electrolytic solution.

The nonaqueous lithium power storage element of the present invention comprises the following first to fifth aspects, and each aspect can be arbitrarily combined.

[First Aspect]

[1] The first aspect of the present invention is a nonaqueous lithium-type power storage element in which the negative electrode has a negative electrode power collector and a negative electrode active material layer containing a negative electrode active material provided on one side or both sides of the negative electrode power collector, the negative electrode active material contains a carbon material capable of intercalating and releasing lithium ions, the positive electrode has a positive electrode power collector and a positive electrode active material layer containing the positive electrode active material provided on one side or both sides of the positive electrode power collector, the positive electrode active material contains activated carbon, and the positive electrode active material layer contains $1.60 \times 10^{-4}$ mol/g to $300 \times 10^{-4}$ mol/g of one or more types of compounds selected from compounds represented by the aforementioned formulas (1) to (3) per unit weight of the positive electrode active material layer.

[Second Aspect]

[2] The second aspect of the present invention is a nonaqueous lithium-type power storage element, wherein the positive electrode active material layer contains $0.30 \times 10^{-4}$ mol/g to $200 \times 10^{-4}$ mol/g of lithium fluoride per unit weight of the positive electrode active material layer.

[Third Aspect]

[3] The third aspect of the present invention is a nonaqueous lithium-type power storage element, wherein $0.20 \leq A/B \leq 20.0$ when the content of the compound selected from compounds represented by the aforementioned formulas (1) to (3) per unit weight of the positive electrode active material layer is defined as A and the content of the compound per unit weight of the negative electrode active material layer is defined as B.

[Fourth Aspect]

[5] The fourth aspect of the present invention is a nonaqueous lithium-type power storage element, wherein the value obtained by dividing the percentage of fluorine atoms (atomic %) by the percentage of carbon atoms (atomic %), which is calculated from the relative element concentration of atoms obtained by XPS (X-ray photoelectron spectroscopy) measurement, on the surface of the separator is $5.0 \times 10^{-3}$ to $200 \times 10^{-3}$, and a particulate substance having a particle diameter of 50 nm to 500 nm is present at 1.0 particle/$\mu m^2$ to 30.0 particles/$\mu m^2$ on the separator surface during SEM observation of the separator surface.

[Fifth Aspect]

[10] The fifth aspect of the present invention is a nonaqueous lithium-type power storage element, wherein the positive electrode contains at least one lithium compound other than the active material, the active material is coated onto both sides of a nonporous positive electrode power collector of the positive electrode, a negative electrode active material capable of intercalating and releasing lithium ions is coated onto both sides of a nonporous negative electrode power collector of the negative electrode in the nonaqueous lithium-type power storage device of the first or third aspect, $C_{x1}/C_{y1}$ is 1.02 to 1.35 when the basis weight of the positive electrode active material layer on one side ($C_x$ side) of the positive electrode is defined as $C_{x1}$ (g/m$^2$) and the basis weight of the positive electrode active material layer on the other side ($C_y$ side) is defined as $C_{y1}$ (g/m$^2$), and $A_{x1}/A_{y1}$ is 1.02 to 1.35 when the basis weight of the negative electrode active material layer on one side of the electrode opposing the $C_y$ side ($A_y$ side) is defined as $A_{y1}$ (g/m$^2$) and the basis weight of the negative electrode active material layer on the other side ($A_x$ side) is defined as $A_{x1}$ (g/m$^2$).

[Positive Electrode]

The positive electrode has a positive electrode power collector and a positive electrode active material layer present on one side or both sides thereof.

In addition, a positive electrode precursor of the positive electrode prior to assembly of the power storage element preferably contains a lithium compound. As is subsequently described, although the negative electrode is preferably pre-doped with lithium ions in the power storage element assembly step in the present embodiment, the pre-doping method preferably consists of applying a voltage between the positive electrode precursor and the negative electrode after having assembled the power storage element using the positive electrode precursor containing the aforementioned lithium compound, negative electrode, separator, casing and nonaqueous electrolytic solution. The aforementioned lithium compound is preferably contained in the positive electrode active material layer formed on the positive electrode power collector of the aforementioned positive electrode precursor.

In the present description, the state of the positive electrode prior to the lithium doping step is defined as the positive electrode precursor, while the state of the positive electrode after the lithium doping step is defined as the positive electrode.

In the fifth aspect of the present invention, a "nonporous positive electrode power collector" refers to a positive electrode power collector not having pores to a degree that lithium ions are able to equilibrate on the front and back of the positive electrode by passing through the positive electrode power collector at least in the coated region of the positive electrode active material layer. Thus, a positive electrode power collector having extremely small pores or micropores and a positive electrode power collector having pores in a region where the positive electrode active material layer is not coated are not excluded within a range over which the effects of the invention of the present application are demonstrated. In addition, in the present embodiment, at least the region of the positive electrode power collector where the positive electrode active material is coated is nonporous, while a surplus portion of the positive electrode power collector where the positive electrode active material layer is not coated may or may not have pores.

[Positive Electrode Active Material Layer]

The positive electrode active material layer contained in the aforementioned positive electrode contains a positive electrode active material containing activated carbon. The positive electrode active material layer may also contain an arbitrary component such as a conductive filler, binder or dispersion stabilizer as necessary in addition thereto.

In addition, a lithium compound other than the positive electrode active material is preferably contained in the positive electrode active material layer of the positive electrode precursor.

[Positive Electrode Active Material]

The positive electrode active material contains activated carbon. Only the activated carbon may be used for the positive electrode active material, or another carbon material to be subsequently described may be used in combination with the activated carbon. Carbon nanotubes, conductive polymers or porous carbon materials are more preferably used for this carbon material. One or more types of carbon materials including the activated carbon may be used as a mixture for the positive electrode active material, or a material other than a carbon material (such as a composite oxide or lithium and a transition metal) may be contained therein.

The content of the carbon material based on the total weight of the positive electrode active material is preferably 50% by weight or more and more preferably 70% by weight or more. Although the content of the carbon material can be 100% by weight, it is preferably, for example, 90% by weight or less and may be 80% by weight or less from the viewpoint of favorably obtaining effects attributable to combined use with another material.

There are no particular limitations on the type of activated carbon, or raw material thereof, used for the positive electrode active material. However, it is preferable to optimally control the pores of the activated carbon in order to realize both high input-output characteristics and high energy density. More specifically, in the first to fifth aspects of the present invention, when mesopore volume derived from pores having a diameter of 20 Å to 500 Å as calculated by the BJH method is defined as V1 (cc/g) and micropore volume derived from pores having a diameter of less than 20 Å as calculated according to the MP method is defined as V2 (cc/g), (1) activated carbon that satisfies the expressions $0.3<V1\leq0.8$ and $0.5\leq V2\leq1.0$, and in which specific surface area as measured by the BET method is 1,500 $m^2/g$ to 3,000 $m^2/g$, is preferable for obtaining high input-output characteristics (to also be referred to as Activated Carbon 1), and (2) activated carbon that satisfies the expressions $0.8<V1\leq2.5$ and $0.8\leq V2\leq3.0$, and in which specific surface area as measured by the BET method is 2,300 $m^2/g$ to 4,000 $m^2/g$, is preferable for obtaining high energy density (to also be referred to as Activated Carbon 2).

The following successively provides individual explanations of the aforementioned Activated Carbon 1 described in (1) and the aforementioned Activated Carbon 2 described in (2).

[Activated Carbon 1]

Mesopore volume V1 of Activated Carbon 1 is preferably a value that is greater than 0.3 cc/g from the viewpoint of increasing input-output characteristics when incorporating in a power storage element. On the other hand, mesopore volume V1 is preferably 0.8 cc/g or less from the viewpoint of suppressing decreases in bulk density of the positive electrode. The aforementioned V1 is more preferably 0.35 cc/g to 0.7 cc/g and even more preferably 0.4 cc/g to 0.6 cc/g.

Micropore volume V2 of Activated Carbon 1 is preferably 0.5 cc/g or more in order to increase the specific surface area of the activated carbon and increase capacitance. On the other hand, micropore volume V2 is preferably 1.0 cc/g or less from the viewpoints of suppressing bulk density of the activated carbon, increasing density as an electrode and increasing capacitance per unit volume. The aforementioned V2 is more preferably 0.6 cc/g to 1.0 cc/g and even more preferably 0.8 cc/g to 1.0 cc/g. Furthermore, upper limits and lower limits may be arbitrarily combined.

The ratio (V1/V2) of mesopore volume V1 to micropore volume V2 is preferably within the range of $0.3\leq V1/V2\leq0.9$. Namely, V1/V2 is preferably 0.3 or more from the viewpoint of increasing the ratio of mesopore volume to micropore volume to a degree allowing reduction in output characteristics to be suppressed while maintaining high capacitance. On the other hand, V1/V2 is preferably 0.9 or less from the viewpoint of increasing the ratio of micropore volume to mesopore volume to a degree that enables decreases in capacitance to be suppressed while maintaining high output characteristics. The range of V1/V2 is more preferably such that $0.4\leq V1/V2\leq0.7$ and even more preferably such that $0.55\leq V1/V2\leq0.7$. Furthermore, upper limits and lower limits may be arbitrarily combined.

The average pore diameter of Activated Carbon 1 is preferably 17 Å or more, more preferably 18 Å or more, and most preferably 20 Å or more from the viewpoint of maximizing output of the resulting power storage element.

In addition, from the viewpoint of maximizing capacitance, the average pore diameter of Activated Carbon 1 is preferably 25 Å or less.

BET specific surface area of Activated Carbon 1 is preferably 1,500 $m^2/g$ to 3,000 $m^2/g$ and more preferably 1,500 $m^2/g$ to 2,500 $m^2/g$. In the case BET specific surface area is 1,500 $m^2/g$ or more, favorable energy density is easily obtained, while on the other hand, in the case BET specific surface area is 3,000 $m^2/g$ or less, it is not necessary to add a large amount of binder to maintain electrode strength, thereby increasing performance per unit electrode volume. Furthermore, upper limits and lower limits may be arbitrarily combined.

The Activated Carbon 1 having the characteristics described above can be obtained, for example, using the raw materials and treatment methods explained below.

In the present embodiment, there are no particular limitations on the carbon source used as a raw material of Activated Carbon 1. Examples thereof include plant-based raw materials such as wood, wood flour, coconut shell, pulp production byproducts, bagasse or waste molasses, fossil-based raw materials such as peat, lignite, brown coal, bituminous coal, anthracite, petroleum distillation residue, petroleum pitch, coke or coal tar, various types of synthetic resins such as phenol resin, vinyl chloride resin, vinyl acetate resin, melamine resin, urea resin, resorcinol resin, celluloid, epoxy resin, polyurethane resin, polyester resin or polyamide resin, synthetic rubber such as polybutylene, polybutadiene or polychloroprene, other synthetic wood, synthetic pulp and carbides thereof. Among these raw materials, plant-based materials such as coconut shell, wood flour and carbides thereof are preferable from the viewpoint of mass productivity and cost, with coconut shell carbide being particularly preferable.

A known system such as a fixed bed system, moving bed system, fluid bed system, slurry system or rotary kiln system can be employed as carbonization and activation systems for converting these raw materials to Activated Carbon 1.

Examples of methods used to carbonize these raw materials include calcination at about 400° C. to 700° C. (preferably 450° to 600° C.) for about 30 minutes to 10 hours using an inert gas such as nitrogen, carbon dioxide, helium, argon, xenon, neon or carbon monoxide, combustion exhaust gas, or a mixed gas with another gas having these inert gases as a main component thereof.

A gas activation method consisting of calcination using an activation gas such as carbon dioxide or oxygen is preferably used as a method for activating the carbide obtained according to the aforementioned carbonization method. Among these, a method that uses steam or carbon dioxide for the activation gas is preferable.

In this activation method, the aforementioned carbide is preferably activated by heating to a temperature of 800° C. to 1,000° C. over the course of 3 to 12 hours (preferably 5 to 11 hours and more preferably 6 to 10 hours) while supplying activation gas at the rate of 0.5 kg/h to 3.0 kg/h (preferably 0.7 kg/h to 2.0 kg/h).

Moreover, the aforementioned carbide may be preliminarily subjected to primary activation prior to activation treatment thereof. In this primary activation, a gas activation method can be preferably employed by which a carbon material is calcined at a temperature below 900° C. usually using an activation gas such as steam, carbon dioxide or oxygen.

Activated Carbon 1 able to be used in the present embodiment and having the aforementioned characteristics can be produced by suitably combining the calcination temperature and calcination time in the aforementioned carbonization method, the amount of activation gas supplied in the aforementioned activation method, the rate of temperature increase, and the maximum activation temperature.

The average particle diameter of Activated Carbon 1 is preferably 2 μm to 20 μm.

If the average particle diameter is 2 μm or more, the capacitance per electrode volume tends to increase due to the high density of the active material layer. Here, although a small average particle diameter may induce the shortcoming of low durability, this shortcoming is unlikely to occur if the average particle diameter is 2 μm or more. On the other hand, if the average particle diameter is 20 μm or less, there is a tendency for greater compatibility with high-rate charging and discharging. The aforementioned average particle diameter is more preferably 2 μm to 15 μm and even more preferably 3 μm to 10 μm. Furthermore, upper limits and lower limits may be arbitrarily combined.

[Activated Carbon 2]

Mesopore volume V1 of Activated Carbon 2 is preferably a value larger than 0.8 cc/g from the viewpoint of enhancing output characteristics when incorporated in a power storage element. On the other hand, V1 is preferably 2.5 cc/g or less from the viewpoint of suppressing decreases in capacitance of the power storage element. The aforementioned V1 is more preferably 1.00 cc/g to 2.0 cc/g and even more preferably 1.2 cc/g to 1.8 cc/g.

On the other hand, micropore volume V2 of Activated Carbon 2 is preferably a value larger than 0.8 cc/g to increase specific surface area and increase capacitance of the activated carbon. On the other hand, V2 is preferably 3.0 cc/g or less, more preferably greater than 1.0 cc/g to 2.5 cc/g, and even more preferably 1.5 cc/g to 2.5 cc/g from the viewpoints of increasing density of an activated carbon electrode and increasing capacitance per unit volume.

Activated Carbon 2 having the aforementioned mesopore volume and micropore volume has higher BET specific surface area than the activated carbon used in a conventional electric double layer capacitor or lithium ion capacitor. A specific value of the BET specific surface area of Activated Carbon 2 is preferably 2,300 $m^2/g$ to 4,000 $m^2/g$. The lower limit of BET specific surface area is preferably 3,000 $m^2/g$ or more, and more preferably 3,200 $m^2/g$ or more. On the other hand, the upper limit of BET specific surface area is 3,800 $m^2/g$ or less. In the case BET specific surface area is 2,300 $m^2/g$ or more, favorable energy density is easily obtained, while in the case BET specific surface area is 4,000 $m^2/g$ or less, it is not necessary to incorporate a large amount of binder to maintain electrode strength, thereby enhancing performance per electrode volume.

Furthermore, upper limits and lower limits of the preferable ranges respectively explained above for the values of V1, V2 and BET specific surface area of Activated Carbon 2 can be arbitrarily combined.

The Activated Carbon 2 having the characteristics described above can be obtained, for example, using the raw materials and treatment methods explained below.

There are no particular limitations on the carbon source used as a raw material of Activated Carbon 2 provided it is a carbon source normally used as a raw material of activated carbon. Examples thereof include plant-based raw materials such as wood, wood flour or coconut shell, fossil-based raw materials such as petroleum pitch or coke, and various types of synthetic resins such as phenol resin, furan resin, vinyl chloride resin, vinyl acetate resin, melamine resin, urea resin or resorcinol resin. Among these raw materials, phenol resin and furan resin are suitable for fabricating activated carbon having a large specific surface area and are particularly preferable.

A known system such as a fixed bed system, moving bed system, fluid bed system, slurry system or rotary kiln system can be employed as the system for carbonizing these raw materials or as heating methods during activation treatment. An inert gas such as nitrogen, carbon dioxide, helium or argon, or a gas obtained by mixing with another gas having these inert gases as a main component thereof is used for the atmosphere during heating. The carbonization temperature is about 400° C. to 700° C. (lower limit preferably 450° C. or higher and more preferably 500° C. or higher, and upper limit preferably 650° C. or lower), and calcination is preferably carried out for about 30 minutes to 10 hours.

Although methods used to activate the carbide after the aforementioned carbonization treatment comprise a gas activation method consisting of calcination using an activation gas such as vapor water, carbon dioxide or oxygen, and an alkaline metal activation method consisting of carrying out heat treatment after mixing with an alkaline metal compound, the alkaline metal activation method is preferable for fabricating activated carbon having a large specific surface area.

In this activation method, after mixing the carbide with an alkaline metal compound such as KOH or NaOH so that the molar ratio thereof is 1:1 or more (amount of alkaline metal compound is equal or greater than amount of carbide), heating is carried out in an inert gas atmosphere over a range of 600° C. to 900° C. (and preferably 650° C. to 850° C.) for 30 minutes to 5 hours followed by washing the alkaline metal compound with acid and water and then drying.

Although the molar ratio of the carbide to the alkaline metal compound (=carbide:alkaline metal compound) was previously described as preferably being 1:1 or more, since, even though the mesopore volume increases the greater the amount of the alkaline metal compound, the pore volume tends to increase suddenly bordering on the vicinity of a weight ratio of 1:3.5, the weight ratio is preferably such that the amount of the alkaline metal compound increases beyond 1:3 and preferably 1:5.5 or less. Although pore diameter increases as the alkaline metal compound increases, the weight ratio is preferably within the aforementioned range in consideration of the efficiency of washing and other subsequent treatment.

Furthermore, it is recommended to mix a slightly larger amount of carbide with KOH during activation in order to increase micropore volume without increasing mesopore volume. A slightly larger amount of KOH is used to increase both micropore volume and mesopore volume. In addition, steam activation is preferably carried out after alkaline activation treatment in order to mainly increase mesopore volume.

The average particle diameter of Activated Carbon 2 is preferably 2 μm to 20 μm and more preferably 3 μm to 10 μm.

(Usage Aspect of Activated Carbon)

Activated Carbon 1 and 2 may consist of only one type of activated carbon or a mixture of two or more types of activated carbon, and may exhibit each of the aforementioned characteristics as a mixture.

One of the aforementioned Activated Carbon 1 and 2 may be used alone or both may be used as a mixture.

The positive electrode active material may contain a material other than Activated Carbon 1 and 2 (such as an activated carbon not having the aforementioned specific V1 and/or V2 or a material other than activated carbon (such as a composite oxide of lithium and a transition metal)). In an exemplified aspect, the content of Activated Carbon 1, the content of Activated Carbon 2 or the total content of Activated Carbon 1 and 2 is each preferably greater than 50% by weight or more, more preferably 70% by weight or more, even more preferably 90% by weight or more, and most preferably 100% by weight of the total weight of the positive electrode active material.

The content ratio of the positive electrode active material in the positive electrode active material layer is preferably 35% by weight to 95% by weight based on the total weight of the positive electrode active material layer in the positive electrode precursor. The lower limit of the content ratio of the positive electrode active material is more preferably 45% by weight or more and more preferably 55% by weight or more. On the other hand, the upper limit of the content ratio of the positive electrode active material is more preferably 90% by weight or less and even more preferably 80% by weight or less. Preferable charging and discharging characteristics are demonstrated by making the content ratio to be within these ranges.

[Lithium Compound]

The positive electrode active material layer of the positive electrode precursor of the present embodiment preferably contains a lithium compound other than the positive electrode active material. In addition, the positive electrode active material layer of the positive electrode of the present embodiment contains a lithium compound other than the positive electrode active material.

(Lithium Compound)

One or more types of lithium compounds selected from lithium carbonate, lithium oxide, lithium hydroxide, lithium fluoride, lithium chloride, lithium bromide, lithium iodide, lithium nitride, lithium oxalate and lithium acetate are preferably used for the lithium compound in the present embodiment. Among these, lithium carbonate, lithium oxide and lithium hydroxide are preferable, and lithium carbonate is used even more preferably from the viewpoints of being able to be handled in air and having low hygroscopicity. In addition to being decomposed by application of a voltage and functioning as a dopant source for doping the negative electrode with lithium, such lithium compounds form voids in the positive electrode active material layer, thereby enabling the formation of a positive electrode having superior retention of electrolytic solution and superior ion conductivity. One or more types of alkaline metal carbonates selected from sodium carbonate, potassium carbonate, rubidium carbonate and cesium carbonate can be used in addition to the aforementioned lithium compounds. In the case of using an electrolytic solution obtained by preliminarily dissolving a lithium salt such as $LiPF_6$ to be subsequently described as a nonaqueous electrolytic solution, the aforementioned alkaline metal carbonate can be used alone. One type or two or more types of lithium compounds may be contained in the positive electrode precursor, and a lithium compound may be used after mixing with another alkaline metal carbonate.

In addition, the positive electrode precursor of the present embodiment at least contains one type of lithium compound, and in addition to a lithium compound, may also contain one or more types of oxides such as those represented by $M_2O$, hydroxides such as those represented by MOH, halides such as those represented by MF or MCl, oxalates such as those represented by $M_2(CO_2)_2$ or carboxylates represented by RCOOM (wherein, R represents an alkyl group or aryl group), wherein M represents one or more types of alkaline metals selected from Na, K, Rb and Cs in the aforementioned formulas.

In addition, the positive electrode precursor may contain one or more types of alkaline earth metal carbonates selected from $BeCO_3$, $MgCO_3$, $CaCO_3$, $SrCO_3$ and $BaCO_3$, as well as alkaline earth metal oxides, alkaline earth metal hydroxides, alkaline earth metal halides, alkaline earth metal oxalates or alkaline earth metal carboxylates.

Among the aforementioned lithium compounds, lithium carbonate, lithium oxide or lithium hydroxide is used particularly preferably in the fifth aspect of the present invention to be subsequently described.

[Lithium Compound of Positive Electrode Precursor]

The lithium compound is preferably in particulate form. The average particle diameter of the lithium compound contained in the positive electrode precursor is preferably 0.1 μm to 100 μm. The upper limit of average particle diameter of the lithium compound contained in the positive electrode precursor is more preferably 50 μm or less, even more preferably 20 μm or less and most preferably 10 μm or less. On the other hand, the lower limit of average particle diameter of the lithium compound contained in the positive electrode precursor is preferably 0.3 μm or more, and more preferably 0.5 μm or more. If the average particle diameter of the lithium compound is 0.1 μm or more, voids remaining following an oxidation reaction of the lithium compound in the positive electrode have sufficient volume for retaining electrolytic solution, thereby improving high-load charging and discharging characteristics. If the average particle diameter of the lithium compound is 100 μm or less, the rate of the oxidation reaction of the lithium compound can be ensured since the surface area of the lithium compound does not become excessively small. The upper limit and lower limit of the range of average particle diameter of the lithium compound can be arbitrarily combined.

Various methods can be used to reduce the particle diameter of the lithium compound. Examples of methods that can be used include methods using a ball mill, bead mill, ring mill, jet mill or rod mill.

The content ratio of the lithium compound in the positive electrode active material layer of the positive electrode precursor is preferably 5% by weight to 60% by weight, and more preferably 10% by weight to 50% by weight, based on the total weight of the positive electrode active material layer in the positive electrode precursor. In addition to demonstrating the preferable function of a dopant source for doping the negative electrode, containing the lithium compound within the aforementioned content ratio range enables the lithium compound to impart a suitable degree of porosity to the positive electrode and both are able to work in conjunction to yield a power storage element having superior high-load charging and discharging characteristics, thereby making this preferable. The upper limit and lower limit of the range of the content ratio can be arbitrarily combined.

[Lithium Compound of Positive Electrode]

The positive electrode preferably contains a lithium compound other than the positive electrode active material. In the first to fourth aspects of the present invention, 0.1 μm≤$X_1$≤10.0 m when the average particle diameter of the lithium compound other than the positive electrode active material contained in the positive electrode is defined as $X_1$. A more preferable range of the average particle diameter of the lithium compound is 0.5≤μm $X_1$≤5.0 μm. In the case $X_1$ is 0.1 μm or more, fluorine ions generated in high-load charging and discharging cycles are adsorbed and high-load charging and discharging cycle characteristics improve. In the case $X_1$ is 10.0 μm or less, adsorption of fluorine ions can be carried out efficiently due to an increase in the reaction area with fluorine ions generated in high-load charging and discharging cycles.

The lithium compound other than the positive electrode active material contained in the positive electrode is characterized by being 1% by weight to 50% by weight, and more preferably 2.5% by weight to 25% by weight, based on the total weight of the positive electrode active material layer in the positive electrode. If the content of the lithium compound is 1% by weight or more, a decomposition reaction of electrolytic solution solvent on the positive electrode in a high-temperature environment is inhibited by lithium carbonate, thereby improving high-temperature durability, and this effect is remarkable at a lithium compound content of 2.5% by weight or more. In addition, if the content of the lithium compound is 50% by weight or less, since inhibition of electron conductivity between the positive electrode active materials by the lithium compound is comparatively low, high input-output characteristics are demonstrated, and a lithium content of 25% by weight or less is particularly preferable from the viewpoint of input-output characteristics. Furthermore, upper limit and lower limits can be arbitrarily combined.

<Method for Identifying Lithium Compound in Positive Electrode>

There are no particular limitations on the method used to identify the lithium compound contained in the positive electrode, and for example, the method indicated below can be used. The lithium compound is preferably identified by combining a plurality of the analytical techniques described below.

When measuring by SEM-EDX, Raman spectroscopy or XPS, the nonaqueous lithium power storage element is disassembled in an argon glove box and the positive electrode is removed followed by preferably carrying out measurements after having washed off any electrolyte adhered to the surface of the positive electrode. Since it is only required to rinse off electrolyte adhered to the positive electrode surface, a carbonate solvent such as dimethyl carbonate, ethyl methyl carbonate or diethyl carbonate can be preferably used for the washing method. The washing method consists of, for example, immersing the electrode for 10 minutes or more in an amount of diethyl carbonate equal to 50 to 100 times the weight of the positive electrode followed by replacing the solvent and again immersing the positive electrode. Subsequently, the positive electrode is removed from the diethyl carbonate and vacuum-dried followed by subjecting to SEM-EDX, Raman spectroscopy and XPX analysis. Vacuum drying conditions consist of drying at a temperature of 0° C. to 200° C. at a pressure of 0 kPa to 20 kPa over a drying time range of 1 hour to 40 hours until the residual amount of diethyl carbonate in the positive electrode is 1% by weight or less. The residual amount of diethyl carbonate can be quantified based on a preliminarily prepared calibration curve by measuring the GC/MS of the water following distilled water washing and adjusting the amount of liquid to be subsequently described.

In the ion chromatography to be subsequently described, anions can be identified by analyzing the water obtained after washing the positive electrode with distilled water.

In the case of having been unable to identify the lithium compound by an analytical technique, the lithium compound can be identified using another analytical technique such as $^7$Li-solid state NMR, XRD (X-ray diffraction), TOF-SIMS (Time of Flight-Secondary Ion Mass Spectrometry), AES (Auger Electron Spectroscopy), TPD/MS (Thermally Programmed Desorption/Mass Spectrometry) or DSC (Differential Scanning Calorimetry).

[Scanning Electron Microscope-Energy-Dispersive X-Ray Spectroscopy (SEM-EDX)]

The lithium compound and the positive electrode active material can be distinguished by oxygen mapping using an SEM-EDX image of the surface of the positive electrode as measured by setting the observation magnification factor to 1000× to 4000×. The SEM-EDX image can be measured by, for example, setting the acceleration voltage to 10 kV, the emission current to 1 µA, the number of measurement pixels to 256×256 pixels, and the number of integrations to 50. In order to prevent electrification of the sample, the surface can be treated by a method such as vacuum deposition or sputtering of gold, platinum or osmium. The method used to measure the SEM-EDX image preferably consists of adjusting brightness and contrast so that there are no pixels reaching maximum brightness and the average value of brightness falls within the range of 40% to 60%. Particles containing a bright portion equal to 50% or more of the area thereof when binarized based on the average value of brightness with respect to the resulting oxygen mapping are taken to constitute the lithium compound.

[Microscopic Raman Spectroscopy]

The lithium compound and the positive electrode active material can be distinguished by Raman imaging of carbonate ions at the surface of the positive electrode precursor as measured by setting the observation magnification factor to 1000× to 4000×. Measurement can be carried out under measurement conditions consisting of, for example, excitation light of 532 nm, excitation light intensity of 1%, objective lens long operation of 50 times, diffraction lattice of 1800 gr/mm, a mapping system using point scanning (slit: 65 mm, binning: 5 pix) in 1 mm steps at an exposure time of 3 seconds per point, and number of integrations of one with a noise filter present. Although a straight baseline is set over a range of 1071 $cm^{-1}$ to 1104 $cm^{-1}$ for the measured Raman spectrum, and values that are positive from the baseline are calculated as the area of the peak of carbonate ions followed by integration of the frequency thereof, the frequency of the noise component at this time relative to the peak area of carbonate ions approximated with a Gaussian function is subtracted from the frequency distribution of the carbonate ions.

[X-Ray Photoelectron Spectroscopy (XPS)]

The bonding state of the lithium compound can be distinguished by analyzing the electron state by XPS. Measurements can be carried out under measurement conditions consisting of using a monochromatic AlKα X-ray beam having a diameter of 100 µm (25 W, 15 kV) for the X-ray source, using a narrow scan of 58.70 eV for the path energy, neutralizing electrification, using 10 narrow scans (carbon, oxygen), 20 narrow scans (fluorine), 30 narrow scans (phosphorous), 40 narrow scans (lithium) or 50 narrow scans (silicon) for the number of sweeps, and using a narrow scan of 0.25 eV for the energy step. The surface of the positive electrode prior to XPS measurement is preferably cleaned by sputtering. For example, the surface of the positive electrode can be cleaned by sputtering under conditions of an acceleration voltage of 1.0 kV and cleaning for 1 minute over a range of 2 mm×2 mm (1.25 nm/min as $SiO_2$).

In the resulting XPS spectrum:

a peak having Li1s bonding energy of 50 eV to 54 eV can be assigned to $LiO_2$ or Li—C bond, and a peak having Li1s bonding energy of 55 eV to 60 eV can be assigned to LiF, $Li_2CO_3$ or $Li_xPO_yF_z$ (wherein, x, y and z respectively represent an integer of 1 to 6);

a peak having C1s bonding energy of 285 eV can be assigned to a C—C bond, a peak having C1s bonding energy of 286 eV can be assigned to a C—O bond, a peak having C1s bonding energy of 288 eV can be assigned to COO, and a peak having C1s bonding energy of 290 eV to 292 eV can be assigned to $CO_3^{2-}$ or a C—F bond;

a peak having O1s bonding energy of 527 eV to 530 eV can be assigned to $O^{2-}$ ($Li_2O$), a peak having O1s bonding energy of 531 eV to 532 eV can be assigned to CO, $CO_3$, OH, $PO_x$ (wherein, x represents an integer of 1 to 4) or $SiO_x$ (wherein, x represents an integer of 1 to 4), and a peak having O1s bonding energy of 533 eV can be assigned to C—O or $SiO_x$ (wherein, x represents an integer of 1 to 4);

a peak having F1s bonding energy of 685 eV can be assigned to LiF, and a peak having F1s bonding energy of 687 eV can be assigned to a C—F bond, $Li_xPO_yF_z$ (wherein, x, y and z respectively represent an integer of 1 to 6) or $PF_6^-$;

a peak having P2p bonding energy of 133 eV can be assigned to $PO_x$ (wherein, x represents an integer of 1 to 4), and a peak having P2p bonding energy of 134 eV to 136 eV can be assigned to $PF_x$ (wherein X represents an integer of 1 to 6); and, a peak having Si2p bonding energy of 99 eV can be assigned to Si or a silicide, and a peak having Si2p bonding energy of 101 eV to 107 eV can be assigned to $Si_xO_y$ (wherein, x and y respectively represent arbitrary integers).

In the case peaks of the resulting spectrum overlap, the spectrum is preferably assigned by separating the peaks by assuming a Gaussian function or Lorentz function. The lithium compound present can be identified based on the results of measuring the resulting electronic state and the results of the ratios of elements present.

[Ion Chromatography]

Carbonate ions that have eluted into distilled water can be identified by washing the positive electrode precursor with distilled water and analyzing the distilled water by ion chromatography after washing. An ion exchange column, ion exclusion column or reversed phase ion pair column can be used for the column. An electrical conductivity detector, UV-visible absorption detector or electrochemical detector and the like can be used for the detector, and a suppressor system installed with a suppressor can be used in front of the detector, or a non-suppressor system using a solution having low electrical conductivity for the eluent can be used without installing a suppressor. In addition, measurements can also be carried out by combining a mass spectrometer with a charged particle detector.

Sample retention time is constant for each ion species component provided conditions such as the column used or eluent are set, and although the size of the peak response differs for each ion species, it is proportional to the concentration of the ion species. Ion species components can be qualified and quantified by preliminarily measuring a standard having a known concentration for which traceability has been ensured.

In the case the lithium compound is unable to be identified with the aforementioned methods, the lithium compound can be identified by using other analytical techniques such as $^7$Li-solid state NMR, XRD (X-ray diffraction), TOF-SIMS (Time of Flight-Secondary Ion Mass Spectrometry), AES (Auger Electron Spectroscopy), TPD/MS (Thermally Programmed Desorption/Mass Spectrometry) or DSC (Differential Scanning Calorimetry).

(Lithium Compound Average Particle Diameter) The positive electrode contains a lithium compound other than the positive electrode active material. When the average particle diameter of the lithium compound other than positive electrode active material contained in the positive electrode is defined as $X_1$, then 0.1 µm≤$X_1$≤10.0 µm, when the average particle diameter of the positive electrode active material is defined as $Y_1$, then 2.0 µm≤$Y_1$≤20.0 µm, and preferably $X_1<Y_1$. A more preferable range of the average particle diameter of the lithium compound is such that 0.5 µm≤$X_1$≤5.0 µm. In the case $X_1$ is 0.1 µm or more, high-load charging and discharging cycle characteristics are improved due to adsorption of fluorine ions generated during high-load charging and discharging cycles. In the case $X_1$ is 10.0 µm or less, adsorption of fluorine ions can be carried out efficiently since the reaction area with fluorine ions generated during high-load charging and discharging cycles increases. In the case $Y_1$ is 2.0 µm or more, electron conductivity can be ensured between positive electrode active materials. In the case $Y_1$ is 20.0 µm or less, high output characteristics can be realized due to an increase in the reaction area with electrolyte ions. In the case $X_1<Y_1$, lithium carbonate is filled into the gaps formed between positive electrode active materials, thereby making it possible to enhance energy density while ensuring electron conductivity between positive electrode active materials while enhancing energy density.

Although there are no particular limitations on the method used to measure $X_1$ and $Y_1$, $X_1$ and $Y_1$ can be determined from SEM images and SEM-EDX images of positive electrode cross-sections as indicated below. The method used to form a positive electrode cross-section can employ BIB processing consisting of irradiating the upper portion of the positive electrode with an Ar beam and fabricating a smooth cross-section along the end of a shielding plate installed directly above the sample. In the case the positive electrode contains lithium carbonate, the distribution of carbonate ions can be determined by measuring a Raman image of a cross-section of the positive electrode.

[Method for Calculating $X_1$ and $Y_1$]

$X_1$ and $Y_1$ can be determined by analyzing images obtained from SEM-EDX of a positive electrode cross-section measured in the same field as the aforementioned SEM cross-section of the positive electrode. When particles of the lithium compound identified by the aforementioned SEM cross-sectional images of the positive electrode are defined as X and other particles are defined as Y of the positive electrode active material, cross-sectional area S is determined for each of the particles X and Y observed in the SEM cross-sections images followed by determining particle diameter d as calculated according to the following Equation 1 (wherein π represents the ratio of circumference to diameter).

[Math. 1]

$$d=2\times(S/\pi)^{1/2} \quad (1)$$

Volume average particle diameter $X_0$ and $Y_0$ shown in the following Equation 2 are then determined using the resulting diameter d.

[Math. 2]

$$X_0(Y_0)=\Sigma[4/3\pi\times(d/2)^3\times d]/\Sigma[4/3\pi\times(d/2)^3] \quad (2)$$

Average particle diameter $X_1$ and $Y_1$ are then respectively obtained as the average values of $X_0$ and $Y_0$ by measuring at least five locations in the positive electrode cross-section while changing the field of view.

The lithium compound contained in the positive electrode gradually ends up decomposing and generates gas when exposed to a high potential of about 4.0 V or more, and this generated gas ends up causing an increase in resistance as a result of inhibiting the diffusion of ions in the electrolytic solution. Consequently, a coating film composed of a fluorine-containing compound is preferably formed on the surface of the lithium compound to inhibit the aforementioned reaction of the lithium compound.

[Method for Quantifying Lithium Compound]

The following provides a description of a method used to quantify the lithium compound contained in the positive electrode.

The lithium compound can be quantified based on changes in the weight of the positive electrode before and after washing the positive electrode with an organic solvent followed by washing with distilled water. Although there are no particular limitations on the area of the positive electrode measured, the area is preferably 5 $cm^2$ to 200 $cm^2$ and more preferably 25 $cm^2$ to 150 $cm^2$ from the viewpoint of reducing measurement variation. Measurement reproducibility is ensured if the area is 5 $cm^2$ or more. Sample handling ease is superior if the area is 200 $cm^2$ or less. Although there are no particular limitations on the organic solvent used to wash the positive electrode provided it is capable of removing nonaqueous electrolytic solution decomposition products that have accumulated on the surface of the positive electrode, the use of an organic solvent having a solubility of the lithium compound of 2% or less is preferable since elution of the lithium compound is inhibited. Examples of organic solvents used to wash the positive electrode include polar solvents such as methanol or acetone.

The method used to wash the positive electrode consists of adequately immersing the positive electrode for 3 days or longer in a methanol solution in an amount equal to 50 to 100 times the weight of the positive electrode. At this time, measures are preferably taken to prevent evaporation of the methanol such as by placing a cover over the container. Subsequently, the positive electrode is removed from the methanol, vacuum-dried, and the weight of the positive electrode after vacuum drying is defined as $M_0$ (g). Conditions for vacuum drying consist of a temperature of 100° C. to 200° C., pressure of 0 kPa to 10 kPa, time within the range of 5 hours to 20 hours, and vacuum drying until the residual amount of methanol in the positive electrode is 1% by weight or less. The residual amount of methanol can be quantified based on a preliminarily prepared calibration curve obtained by measuring the distilled water after washing with distilled water as subsequently described by GC/MS. After vacuum drying, the positive electrode is adequately immersed for 3 days or longer in distilled water in an amount equal to 100 times the weight of the positive electrode (100$M_0$ (g)). At this time, measures are preferably taken to prevent evaporation of the distilled water such as by placing a cover over the container. Furthermore, in the case of measuring by ion chromatography, the amount of liquid is adjusted to 100 $M_0$ (g). After immersing in distilled water for 3 days or more, the positive electrode is removed from the distilled water and vacuum-dried in the same manner as when washed with methanol as previously described. The weight of the positive electrode at this time is defined as $M_1$ (g), after which the positive electrode active material layer on the power collector is removed using a spatula or brush and the like to measure the weight of the power collector of the resulting positive electrode. When the weight of the resulting positive electrode power collector is defined as $M_2$ (g), the weight percentage Z of the lithium compound contained in the positive electrode can be calculated from the following Equation (3).

[Math. 3]

$$Z=100\times[1-(M_1-M_2)/(M_0-M_2)] \quad (3)$$

[Method for Distinguishing Between Lithium Compound and Positive Electrode Active Material]

The lithium compound and positive electrode active material containing oxygen can be distinguished by oxygen mapping using an SEM-EDX image of the surface of the positive electrode as measured by setting the observation magnification factor to 1000× to 4000×. The SEM-EDX image can be measured by, for example, by setting the acceleration voltage to 10 kV, the emission current to 1 μA, the number of measurement pixels to 256×256 pixels, and the number of integrations to 50. In order to prevent electrification of the sample, the surface can be treated by a method such as vacuum deposition or sputtering of gold, platinum or osmium. The method used to measure the SEM-EDX image preferably consists of adjusting brightness and contrast so that there are no pixels reaching maximum brightness and the average value of brightness falls within the range of 40% to 60%. The lithium compound is taken to constitute particles containing a bright portion equal to 50% or more of the area thereof when binarized based on the average value of brightness with respect to the resulting oxygen mapping.

[Optional Components of Positive Electrode Active Material Layer]

The positive electrode active material layer of the present embodiment may contain optional components such as a conductive filler, binder or dispersion stabilizer in addition to the positive electrode active material and lithium compound as necessary.

There are no particular limitations on the conductive filler, and examples of conductive fillers that can be used include acetylene black, Ketjen black, vapor-grown carbon fibers, graphite, carbon nanotubes and mixtures thereof. The amount of conductive filler used is preferably 0 parts by weight to 30 parts by weight based on 100 parts by weight of the positive electrode active material. The amount of conductive filler used is more preferably 0.01 parts by weight to 20 parts by weight and even more preferably 1 part by weight to 15 parts by weight. If the amount of conductive filler used exceeds 30 parts by weight, the content ratio of the positive electrode active material in the positive electrode active material layer decreases resulting in a decrease in energy density per unit volume of the positive electrode active material layer, thereby making this undesirable.

There are no particular limitations on the binder, and examples of binders that can be used include polyvinylidene fluoride (PVdF), polytetrafluoroethylene (PTFE), polyimide, latex, styrene-butadiene copolymer, fluororubber and acrylic copolymer. The amount of binder used is preferably 1 part by weight to 30 parts by weight, more preferably 3 parts by weight to 27 parts by weight, and even more preferably 5 parts by weight to 25 parts by weight based on 100 parts by weight of the positive electrode active material. If the amount of binder used is 1 part by weight or more, adequate electrode strength is demonstrated. On the other hand, if the amount of binder used is 30 parts by weight or less, high input-output characteristics are demonstrated without inhibiting migration and diffusion of ions to and from the positive electrode active material.

There are no particular limitations on the dispersion stabilizer and examples of dispersion stabilizers that can be used include polyvinylpyrrolidone (PVP), polyvinyl alcohol (PVA) and cellulose derivatives. The amount of dispersion stabilizer used is preferably 0 parts by weight or 0.1 parts by weight to 10 parts by weight based on 100 parts by weight of the positive electrode active material. If the amount of dispersion stabilizer used is 10 parts by weight or less, high input-output characteristics are demonstrated without inhibiting migration and diffusion of ions to and from the positive electrode active material.

[Positive Electrode Power Collector]

Although there are no particular limitations on the material that composes the positive electrode power collector of the present embodiment provided it is a material that has high electron conductivity and does not undergo deterioration due to elution into electrolytic solution or reaction with electrolyte or ions, and a metal foil is preferable. Aluminum foil is particularly preferable for the positive electrode powder collector in the nonaqueous lithium-type power storage element of the present embodiment.

The metal foil may be an ordinary metal foil not having surface ruggedness or through holes, may be a metal foil having surface ruggedeness formed by embossing, chemical etching, electrodeposition or blasting processing, or may be a metal foil having through holes such as expanded metal foil, punched metal foil or etched foil.

The positive electrode power collector in the first to fourth aspects of the present invention is preferably nonporous from the viewpoints of ease of electrode fabrication and high electron conductivity. In the present description, a nonporous positive electrode power collector refers to a positive electrode power collector not having pores to a degree that lithium ions are able to equilibrate on the front and back of the positive electrode by passing through the positive electrode power collector at least in the coated region of the positive electrode active material layer. Thus, a positive electrode power collector having extremely small pores or micropores and a positive electrode power collector having pores in a region where the positive electrode active material layer is not coated are not excluded within a range over which the effects of the invention of the present application are demonstrated. In addition, in the present embodiment, at least the region of the positive electrode power collector where the positive electrode active material is coated is nonporous, while a surplus portion of the positive electrode power collector where the positive electrode active material layer is not coated may or may not have pores.

Although there are no particular limitations on the thickness of the positive electrode power collector provided the shape and strength of the positive electrode are able to be adequately retained, the thickness is preferably, for example, 1 μm to 100 μm.

[Production of Positive Electrode Precursor]

In the present embodiment, the positive electrode precursor that becomes the positive electrode of the nonaqueous lithium-type power storage element of the present embodiment can be produced by a known electrode production technology such as that of a lithium ion battery or electric double layer capacitor. For example, a positive electrode active material, a lithium compound, and other optional components used as necessary, are dispersed or dissolved in water or an organic solvent to prepare a slurry-like coating solution followed by coating this coating solution onto one side or both sides of a positive electrode power collector to form a coated film and drying to obtain the positive electrode precursor. Moreover, film thickness or bulk density of the positive electrode active material layer may be adjusted by pressing the resulting positive electrode precursor. Alternatively, a method can also be employed in which the positive electrode active material, lithium compound, and other optional components used as necessary, are mixed using a dry method without using a solvent followed by press-molding the resulting mixture and attaching to a positive electrode power collector using a conductive adhesive.

The aforementioned positive electrode precursor coating solution may be prepared by dry-blending all or a portion of various types of material powders including a positive electrode active material followed by adding water or organic solvent and/or a liquid or slurry-like substance obtained by dissolving or dispersing a binder or dispersion stabilizer therein. In addition, a coating solution may also be prepared by adding various types of material powders including a positive electrode active material to a liquid or slurry-like substance obtained by dissolving or dispersing a binder or dispersion stabilizer in water or organic solvent. The method used for the aforementioned dry blending may consist of, for example, preliminarily mixing the positive electrode active material, lithium compound and conductive filler as necessary using a ball mill and the like to coat the conductive filler on the lithium compound having low conductivity. As a result, the lithium compound is easily decomposed in the positive electrode precursor in a lithium doping step to be subsequently described. In the case of using water for the solvent of the aforementioned coating solution, a pH modifier may be added as necessary since the addition of the lithium compound may cause the coating solution to become alkaline.

Although there are no particular limitations thereon, a dispersing machine such as a homo-disperser, multi-axis dispersing machine, planetary mixer or thin film spin system high-speed mixer can be preferably used to prepare the coating solution of the aforementioned positive electrode precursor. In order to obtain the coating solution in favorably dispersed state, the coating solution is preferably dispersed at a peripheral velocity of 1 μm/s to 50 μm/s. If the peripheral velocity is 1 μm/s or more, various types of materials are favorably dissolved or dispersed, thereby making this preferable. In addition, if the peripheral velocity is 50 μm/s or less, the various types of materials are not damaged by heat or shear force attributable to dispersion and there is no occurrence of re-aggregation, thereby making this preferable.

Dispersity of the aforementioned coating solution is preferably such that particle size as measured with a particle gauge is preferably 0.1 μm to 100 μm. The upper limit of dispersity is more preferably a particle size of 80 μm or less and even more preferably a particle size of 50 μm or less. If the particle size is less than 0.1 μm, the size becomes equal to or smaller than the particle diameter of the various types of material powders including a positive electrode active material and the material is crushed during preparation of the coating solution, thereby making this undesirable. In addition, if the particle size is 100 μm or less, there is no occurrence of clogging during discharge of the coating solution or formation of streaks in the coated film, thereby enabling stable coating.

The viscosity (ηb) of the coating solution of the aforementioned positive electrode precursor is preferably 1,000 mPa·s to 20,000 mPa·s, more preferably 1,500 mPa·s to 10,000 mPa·s, and even more preferably 1,700 mPa·s to 5,000 mPa·s. If the viscosity (ηb) is 1,000 mPa·s or more, running of liquid when forming the coated film is inhibited and coated film width and film thickness can be favorably controlled. In addition, if the viscosity (ηb) is 20,000 mPa·s or less, there is little pressure loss in the flow path of the coating solution when using a coating machine, thereby enabling the coating solution to be coated stably and coating thickness to be controlled to a desired thickness or less.

In addition, the thixotropic index (TI) value of the coating solution is preferably 1.1 or more, more preferably 1.2 or more, and even more preferably 1.5 or more. Coated film width and film thickness can be favorably controlled if the TI value is 1.1 or more.

Although there are no particular limitations thereon, a coating machine such as a die coater, comma coater, knife coater or gravure coating machine can be preferably used to form the coated film of the aforementioned positive electrode precursor. The coated film may be formed by single-layer coating or by multi-layer coating. In the case of multi-layer coating, the composition of the coating solution may be adjusted so that the content of the lithium compound is different in each layer of the coated film. In addition, the coating speed is preferably 0.1 m/min to 100 m/min, more preferably 0.5 m/min to 70 m/min, and even more preferably 1 m/min to 50 m/min. If the coating speed is 0.1 m/min or more, coating can be carried out stably. On the other hand, if the coating speed is 100 m/min or less, coating accuracy can be adequately secured.

There are no particular limitations on drying the coated film of the aforementioned electrode precursor, and a drying method such as hot air drying or infrared ray (IR) drying can be used preferably. The coated film may be dried at a single temperature or may be dried while changing the temperature in stages. In addition, the coated film may be dried by combining a plurality of drying methods. The drying temperature is preferably 25° C. to 200° C., more preferably 40° C. to 180° C. and even more preferably 50° C. to 160° C. Solvent in the coated film can be adequately evaporated if the drying temperature is 25° C. or higher. If the drying temperature is 200° C. or lower, cracks in the coated film caused by rapid evaporation of solvent, uneven distribution of binder caused by migration, and oxidation of the positive electrode power collector and positive electrode active material layer can be inhibited.

Although there are no particular limitations on pressing of the aforementioned positive electrode precursor, a pressing machine such as a hydraulic press or vacuum press can be used preferably. Film thickness and bulk density of the positive electrode active material layer as well as electrode strength can be adjusted according to pressing pressure, gap and surface temperature of the pressed portions to be subsequently described.

The pressing pressure is preferably 0.5 kN/cm to 20 kN/cm, more preferably 1 kN/cm to 10 kN/cm, and even more preferably 2 kN/cm to 7 kN/cm. Electrode strength can be adequately enhanced if the pressing pressure is 0.5 kN/cm or more. On the other hand, if the pressing pressure is 20 kN/cm or less, there is no occurrence of distortion or wrinkles in the positive electrode precursor, and the positive electrode precursor can be adjusted to a desired positive electrode active material layer film thickness and bulk density.

In addition, the gap between the press rolls can be set to an arbitrary value corresponding to the film thickness of the positive electrode precursor after drying so as to achieve a desired film thickness and bulk density of the positive electrode active material layer. Moreover, pressing speed can be set to an arbitrary speed at which warping and wrinkling do not occur in the positive electrode precursor.

In addition, the surface temperature of pressed portions may be room temperature and the pressed portions may be heated as necessary. The lower limit of the surface temperature of pressed portions in the case of heating is preferably not lower than the melting point of the binder used minus 60° C., more preferably not lower than the melting point minus 45° C., and even more preferably not lower than the melting point minus 30° C. On the other hand, the upper limit of the surface temperature of pressed portions in the case of heating is preferably not higher than the melting point of the binder used plus 50° C., more preferably the melting point plus 30° C., and even more preferably the melting point plus 20° C. For example, in the case of using polyvinylidene fluoride (PVdF: melting point, 150° C.) for the binder, the surface of the pressed portions is preferably heated to 90° C. to 200° C., more preferably to 105° C. to 180° C., and even more preferably to 120° C. to 170° C. In addition, in the case of using styrene-butadiene copolymer (melting point: 100° C.) for the binder, the surface of the pressed portions is preferably heated to 40° C. to 150° C., more preferably to 55° C. to 130° C., and even more preferably to 70° C. to 120° C.

The melting point of the binder can be determined by the location of an endothermic peak as determined by differential scanning calorimetry (DSC). For example, by using the DSC7 Differential Scanning Calorimeter manufactured by Perkin Elmer Co., Ltd., placing 10 mg of a sample resin in the measurement cell, and raising the temperature from 30° C. to 250° C. at the rate of 10° C./min in a nitrogen gas environment, the endothermic peak temperature during the course of raising the temperature becomes the melting point of the binder.

In addition, pressing may be carried out multiple times while changing conditions consisting of the pressing pressure, gap, speed and surface temperature of the pressed portions.

The film thickness of the aforementioned positive electrode active material layer is preferably 20 μm to 200 μm, more preferably 25 μm to 100 μm, and even more preferably 30 μm to 80 μm per side of the positive electrode power collector. If this film thickness is 20 μm or more, adequate charging and discharging capacity can be demonstrated. On the other hand, if this film thickness is 200 μm or less, ion diffusion resistance within the electrode can be maintained at a low level. Consequently, in addition to allowing the obtaining of adequate output characteristics, cell volume can be reduced, thereby making it possible to increase energy density. The upper limit and lower limit of film thickness of the aforementioned positive electrode active material layer can be arbitrarily combined. Furthermore, film thickness of the positive electrode active material layer in the case the power collector has through holes or surface ruggedness refers to the average value of film thickness per side of the portion of power collector that does not have through holes or surface ruggedness.

[Positive Electrode]

The bulk density of the positive electrode active material layer in the positive electrode following a lithium doping step to be subsequently described is preferably 0.25 g/cm³ or more, and more preferably within the range of 0.30 g/cm³ to 1.3 g/cm³. If the bulk density of the positive electrode active material layer is 0.25 g/cm³ or more, high energy density can be demonstrated and reduced size of the power storage device can be achieved. On the other hand, if the bulk density is 1.3 g/cm³ or less, diffusion of electrolytic solution in voids within the positive electrode active material layer is adequate and high output characteristics are obtained.

[Compounds in Positive Electrode Active Material Layer]

The positive electrode active material layer according to the present embodiment contains $1.60 \times 10^{-4}$ mol/g to $300 \times 10^{-4}$ mol/g of one or more types of compounds selected from the following formulas (1) to (3) per unit weight of the positive electrode active material layer, and this characteristic is common to the first to fifth aspects of the present invention.

[Chem. 5]

$$LiX^1-OR^1O-X^2Li \quad (1)$$

(wherein, $R^1$ represents an alkylene group having 1 to 4 carbon atoms or a halogenated alkylene group having 1 to 4 carbon atoms, and $X^1$ and $X^2$ respectively and independently represent $-(COO)_n$ (wherein, n represents 0 or 1)),

[Chem. 6]

$$LiX^1-OR^1O-X^2R^2 \quad (2)$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $-(COO)_n$ (wherein, n represents 0 or 1)), and

[Chem. 7]

$$R^2X^1-OR^1O-X^2R^3 \quad (3)$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $-(COO)_n$ (wherein, n represents 0 or 1)).

In formula (1), $R^1$ represents an alkylene group having 1 to 4 carbon atoms or a halogenated alkylene group having 1 to 4 carbon atoms, and $X^1$ and $X^2$ respectively and independently represent $-(COO)_n$ (wherein, n represents 0 or 1).

Particularly preferable compounds consist of compounds represented by $LiOC_2H_4OLi$, $LiOC_3H_6OLi$, $LiOC_2H_4OCOOLi$, $LiOCOOC_3H_6OLi$, $LiOCOOC_2H_4OCOOLi$ and $LiOCOOC_3H_6OCOOLi$.

In formula (2), $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $-(COO)_n$ (wherein, n represents 0 or 1)).

Particularly preferable compounds consist of compounds represented by $LiOC_2H_4OH$, $LiOC_3H_6OH$, $LiOC_2H_4OCOOH$, $LiOC_3H_6OCOOH$, $LiOCOOC_2H_4$ OCOOH, LiOCOOC$_3$H$_6$OCOOH, LiOC$_2$H$_4$OCH$_3$, LiOC$_3$H$_6$OCH$_3$, LiOC$_2$H$_4$OCOOCH$_3$, LiOC$_3$H$_6$OCOOCH$_3$, LiOC$_2$H$_4$OC$_2$H$_5$, LiOC$_3$H$_6$OC$_2$H$_5$, LiOC$_2$H$_4$OCOOC$_2$H$_5$, LiOC$_3$H$_6$OCOOC$_2$H$_5$, LiOCOOC$_2$H$_4$OCOOC$_2$H$_5$ and LiOCOOC$_3$H$_6$OCOOC$_2$H$_5$.

In formula (3), $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent —(COO)$_n$ (wherein, n represents 0 or 1)).

Particularly preferable compounds consist of compounds represented by HOC$_2$H$_4$OH, HOC$_3$H$_6$OH, HOC$_2$H$_4$OCOOH, HOC$_3$H$_6$OCOOH, HOCOOC$_2$H$_4$OCOOH, HOCOOC$_3$H$_6$OCOOH, HOC$_2$H$_4$OCH$_3$, HOC$_3$H$_6$OCH$_3$, HOC$_2$H$_4$OCOOCH$_3$, HOC$_3$H$_6$OCOOCH$_3$, HOCOOC$_2$H$_4$OCOOCH$_3$, HOCOOC$_3$H$_6$OCOOCH$_3$, HOC$_2$H$_4$OC$_2$H$_5$, HOC$_3$H$_6$OC$_2$H$_5$, HOC$_2$H$_4$OCOOC$_2$H$_5$, HOC$_3$H$_6$OCOOC$_2$H$_5$, HOCOOC$_2$H$_4$OCOOC$_2$H$_5$, HOCOOC$_3$H$_6$OCOOC$_2$H$_5$, CH$_3$OC$_2$H$_4$OCH$_3$, CH$_3$OC$_3$H$_6$OCH$_3$, CH$_3$OC$_2$H$_4$OCOOCH$_3$, CH$_3$OC$_3$H$_6$OCOOCH$_3$, CH$_3$OCOOC$_2$H$_4$OCOOCH$_3$, CH$_3$OCOOC$_3$H$_6$OCOOCH$_3$, CH$_3$OC$_2$H$_4$OC$_2$H$_5$, CH$_3$OC$_3$H$_6$OC$_2$H$_5$, CH$_3$OC$_2$H$_4$OCOOC$_2$H$_5$, CH$_3$OC$_3$H$_6$OCOOC$_2$H$_5$, CH$_3$OCOOC$_2$H$_4$OCOOC$_2$H$_5$, CH$_3$OCOOC$_3$H$_6$OCOOC$_2$H$_5$, C$_2$H$_5$OC$_2$H$_4$OC$_2$H$_5$, C$_2$H$_5$OC$_3$H$_6$OC$_2$H$_5$, C$_2$H$_5$OC$_2$H$_4$OCOOC$_2$H$_5$, C$_2$H$_5$OC$_3$H$_6$OCOOC$_2$H$_5$, C$_2$H$_5$OCOOC$_2$H$_4$OCOOC$_2$H$_5$ and C$_2$H$_5$OCOOC$_3$H$_6$OCOOC$_2$H$_5$.

Examples of methods for containing the aforementioned compounds of the present invention in the positive electrode active material layer include:

a method consisting of mixing the aforementioned compounds into the positive electrode active material layer;

a method consisting of adsorbing the aforementioned compounds onto the positive electrode active material layer; and, a method consisting of electrochemically depositing the aforementioned compounds on the positive electrode active material layer.

Among these, the aforementioned compounds are preferably deposited in the positive electrode active material layer by containing a precursor capable of forming the aforementioned compounds by dissolving in a nonaqueous electrolytic solution and utilizing a decomposition reaction of the aforementioned precursor in a step for fabricating a power storage device.

At least one type of organic solvent selected from ethylene carbonate, propylene carbonate, butylene carbonate, vinylene carbonate and fluoroethylene carbonate is preferably used for the precursor that forms the aforementioned compounds, and ethylene carbonate and propylene carbonate are used more preferably.

Here, the total amount of the aforementioned compounds in the first to fifth aspects of the present invention is preferably $1.60\times10^{-4}$ mol/g or more and more preferably $5.0\times10^{-4}$ mol/g or more per unit weight of the aforementioned positive electrode active material layer. If the total amount of the aforementioned compounds per unit weight of the positive electrode active material layer is $1.60\times10^{-4}$ mol/g or more, the nonaqueous electrolytic solution does not contact the positive electrode active material and generation of gas due to oxidative decomposition of the nonaqueous electrolytic solution can be inhibited.

In addition, the total amount of the aforementioned compounds per unit weight of the aforementioned positive electrode active material layer is preferably $300\times10^{-4}$ mol/g or less, more preferably $150\times10^{-4}$ mol/g or less, and even more preferably $100\times10^{-4}$ mol/g or less. If the total amount of the aforementioned compounds is $300\times10^{-4}$ mol/g or less per unit weight of the positive electrode active material layer, diffusion of Li ions is not inhibited and high input-output characteristics can be demonstrated.

In addition, a compound represented by the following formula (4) in the first to fourth embodiments is preferably contained at $2.70\times10^{-4}$ mol/g to $130\times10^{-4}$ mol/g per unit weight of the positive electrode active material layer.

[Chem. 8]

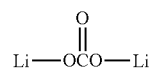

(4)

Examples of methods used to contain the compound represented by the aforementioned formula (4) of the present invention in the positive electrode active material layer include:

a method consisting of mixing the aforementioned compound into the positive electrode active material layer;

a method consisting of adsorbing the aforementioned compound onto the positive electrode active material layer; and, a method consisting of electrochemically depositing the aforementioned compound on the positive electrode active material layer.

Among these, a method consisting of producing a positive electrode precursor by preliminarily mixing the aforementioned compound with the positive electrode active material is preferable.

Here, the total weight of the aforementioned compound per unit weight of the aforementioned positive electrode active material layer is preferably $2.70\times10^{-4}$ mol/g or more and most preferably $3.50\times10^{-4}$ mol/g or more. If the total amount of the aforementioned compound per unit weight of the positive electrode active material layer is $2.70\times10^{-4}$ mol/g or more, the nonaqueous electrolytic solution does not contact the positive electrode active material and generation gas due to oxidative decomposition of the nonaqueous electrolytic solution can be inhibited. In addition, the total amount of the aforementioned compound per unit weight of the aforementioned positive electrode active material layer is preferably $130\times10^{-4}$ mol/g or less, more preferably $100\times10^{-4}$ mol/g or less and most preferably $80\times10^{-4}$ mol/g or less. If the total amount of the aforementioned compound per unit weight of the positive electrode active material layer is $130\times10^{-4}$ mol/g or less, diffusion of Li ions is not inhibited and high input-output characteristics can be demonstrated.

The positive electrode active material layer of the second aspect of the present invention preferably contains $0.30\times10^{-4}$ mol/g to $200\times10^{-4}$ mol/g of lithium fluoride per unit weight of the positive electrode active material layer.

Examples of methods used to contain the aforementioned compound of the present invention in the positive electrode active material layer include:

a method consisting of mixing the aforementioned compound into the positive electrode active material layer;

a method consisting of adsorbing the aforementioned compound onto the positive electrode active material layer; and, a method consisting of electrochemically depositing the aforementioned compound on the positive electrode active material layer.

Among these, a method consisting of depositing the aforementioned compound in the positive electrode active material layer by containing a precursor capable of forming lithium fluoride by dissolving in a nonaqueous electrolytic solution and utilizing a decomposition reaction of the aforementioned precursor in a step for fabricating a power storage device is preferable.

Examples of the precursor that forms the aforementioned compound include fluorine-containing compounds. Among these, a fluorine-containing electrolyte salt, such as LiN$(SO_2F)_2$, LiN$(SO_2CF_3)_2$, LiN$(SO_2C_2F_5)_2$, LiN$(SO_2CF_3)$ $(SO_2C_2F_5)$, LiN$(SO_2CF_3)(SO_2C_2F_4H)$, LiC$(SO_2F)_3$, LiC$(SO_2CF_3)_3$, LiC$(SO_2C_2F_5)_3$, LiCF$_3$SO$_3$, LiC$_4$F$_9$SO$_3$, LiPF$_6$ or LiBF$_4$, is used preferably from the viewpoint of being able to form lithium fluoride by efficiently dissolving without causing deterioration of characteristics, and among these, LiPF$_6$ and LiBF$_4$ in particular are used more preferably.

Among these, at least one type of LiPF$_6$ or LiBF$_4$ is preferably contained in the first to fourth aspects of the present invention.

Here, the total amount of the aforementioned compound per unit weight of the aforementioned positive electrode active material layer is preferably $0.30 \times 10^{-4}$ mol/g or more and more preferably $0.60 \times 10^{-4}$ mol/g or more. If the total amount of the aforementioned compound per unit weight of the positive electrode active material layer is $0.30 \times 10^{-4}$ mol/g or more, the nonaqueous electrolytic solution does not contact the positive electrode active material and generation of gas due to oxidative decomposition of the nonaqueous electrolytic solution can be inhibited.

In addition, the total amount of the aforementioned compound per unit weight of the aforementioned positive electrode active material layer is preferably $200 \times 10^{-4}$ mol/g or less, more preferably $150 \times 10^{-4}$ mol/g or less and even more preferably $100 \times 10^{-4}$ mol/g or less. If the total amount of the aforementioned compound per unit weight of the positive electrode active material layer is $200 \times 10^{-4}$ mol/g or less, diffusion of Li ions is not inhibited and high input-output characteristics can be demonstrated.

In the first to third aspects of the present invention, the amount of lithium of the aforementioned positive electrode active material layer is calculated from the areas of peaks observed at −40 ppm to 40 ppm in a $^7$Li-solid state NMR spectrum, and the amount of lithium is preferably $10.0 \times 10^{-4}$ mol/g to $300 \times 10^{-4}$ mol/g. The aforementioned amount of lithium is preferably $12.0 \times 10^{-4}$ mol/g to $280 \times 10^{-4}$ mol/g, more preferably $15.0 \times 10^{-4}$ mol/g to $260 \times 10^{-4}$ mol/g, even more preferably $17.0 \times 10^{-4}$ mol/g to $240 \times 10^{-4}$ mol/g, and particularly preferably $20.0 \times 10^{-4}$ mol/g to $220 \times 10^{-4}$ mol/g.

Although the principle of being able to improve high-load charging and discharging cycle durability while maintaining high input-output characteristics by adjusting the aforementioned amount of lithium to be within a specific range is not clear, it is presumed to be as indicated below. The amount of lithium is thought to mainly be derived from a lithium-containing coating film on the positive electrode active material layer. This lithium-containing coating film has high ion conductivity as a result of being internally polarized. In addition, oxidative decomposition of the nonaqueous electrolytic solution can be inhibited by this lithium-containing coating film. Moreover, since the lithium-containing coating film is able to remain stable during the course of charging and discharging in comparison with organic and inorganic coating film components not containing lithium ions, there is little damage to the coating film even the charging and discharging cycle is repeated an extremely large number of times and there is no occurrence of additional oxidative decomposition of the nonaqueous electrolytic solution. Consequently, high high-load charging and discharging cycle characteristics can be demonstrated.

If the aforementioned amount of lithium is $10 \times 10^{-4}$ mol/g or more, since the amount of the lithium-containing coating film formed on the positive electrode active material layer is sufficient, oxidative decomposition of nonaqueous electrolytic solution during charging and discharging cycles is inhibited, enabling the demonstration of high high-load charging and discharging cycle characteristics. On the other hand, if this amount of lithium is $300 \times 10^{-4}$ mol/g or less, high input-output characteristics can be demonstrated since there are no increases in resistance caused by the lithium-containing coating film.

In the present description, the amount of lithium contained in the positive electrode active material layer can be determined from the $^7$Li-solid state NMR spectrum according to the method indicated below.

A commercially available apparatus can be used for the $^7$Li-solid state NMR measurement apparatus. Measurement is carried out in a room temperature environment according to the single pulse method using a magnetic angle spinning speed of 14.5 kHz and an irradiation pulse width of 45°. During measurement, conditions are set to ensure an adequate repetitive wait time between measurements.

A 1 mol/L aqueous lithium chloride solution is used for the shift reference, and a separately measured shift location is set to 0 ppm for use as an external standard. The sample is not spun during measurement of the aqueous lithium chloride solution, and measurements are carried out according to the single pulse method using a 45° pulse for the irradiation pulse width. The peak areas of components observed within the range of −40 ppm to 40 ppm is determined from the $^7$Li-solid state NMR spectrum of the positive electrode active material layer obtained under the conditions described above. These peak areas can be used to determine the aforementioned amount of lithium by dividing the sample height in a measurement rotor by the peak area of the 1 mol/L aqueous lithium chloride solution measured at the same time as measurement of the positive electrode active material layer, followed by dividing by the weight of the positive electrode active material layer used in measurement.

Furthermore, this amount of lithium is the total amount of lithium that includes the aforementioned lithium compound, lithium-containing compounds represented by the aforementioned formulas (1) and (2), the aforementioned lithium fluoride and other lithium-containing compounds.

[Negative Electrode]

The negative electrode has a negative electrode power collector and a negative electrode active material layer present on one side or both sides thereof.

[Negative Electrode Active Material Layer]

The negative electrode active material layer contains a negative electrode active material capable of intecalating and releasing lithium ions. In addition, the negative electrode active material layer may also contain optional components such as a conductive filler, binder or dispersion stabilizer as necessary.

In the description of the present application, a "nonporous negative electrode power collector" refers to a negative electrode power collector not having pores to a degree that lithium ions are able to equilibrate on the front and back of the negative electrode by passing through the negative electrode power collector at least in the coated region of the negative electrode active material layer. Thus, a negative electrode power collector having extremely small pores or micropores and a negative electrode power collector having pores in a region where the negative electrode active material layer is not coated are not excluded within a range over which the effects of the invention of the present application are demonstrated. In addition, in the present embodiment, at least the region of the negative electrode power collector where the negative electrode active material is coated is nonporous, while a surplus portion of the negative electrode power collector where the negative electrode active material layer is not coated may or may not have pores.

[Negative Electrode Active Material]

A substance capable of intecalating and releasing lithium ions can be used for the aforementioned negative electrode active material. Specific examples thereof include carbon materials, titanium oxide, silicon, silicon oxide, silicon alloys, silicon compounds, tin and tin compounds. The content of the carbon material based on the total amount of the negative electrode active material is preferably 50% by weight or more and more preferably 70% by weight or more. Although the content of the carbon material may be 100% by weight, from the viewpoint of favorably obtaining effects resulting from the combined use of other materials, the content of the carbon material is, for example, preferably 90% by weight or less and more preferably 80% by weight or less.

The negative electrode active material is preferably doped with lithium ions. In the present description, lithium ions used to dope the negative electrode active material mainly consist of three forms.

The first form consists of lithium ions that have been preliminarily intercalated as a design value of the negative electrode active material prior to fabricating the nonaqueous lithium-type power storage element.

The second form consists of lithium ions that are intercalated in the negative electrode active material at the time of fabrication and shipment of the nonaqueous lithium-type power storage element.

The third form consists of lithium ions that have been intercalated in the negative electrode active material after having used the nonaqueous lithium-type power storage element as a device.

Doping the negative electrode active material with lithium ions makes it possible to favorably control the capacitance and operating voltage of the resulting nonaqueous lithium-type power storage element.

Examples of the aforementioned carbon materials include hardly graphitizable carbon materials, easily graphitizable carbon materials, carbon black, carbon nanoparticles, activated carbon, artificial graphite, natural graphite, graphitized mesophase carbon microspheres, graphite whiskers, amorphous carbonaceous materials such as polyacene-based materials, carbonaceous materials obtained by heat treatment of carbonaceous material precursors such as petroleum-based pitch, coal-based pitch, mesocarbon microspheres, coke or synthetic resins (such as phenol resin), thermal decomposition products of furfuryl alcohol resin or novolac resin, fullerene, carbon nanohorn, and composite carbon materials thereof.

Among these, a composite carbon material, obtained by subjecting one or more types of the aforementioned carbon materials (to also be referred to as the "base material") and the aforementioned carbonaceous material precursor to heat treatment while in a state in which both are present, followed by compounding the base material with a carbonaceous material derived from the carbonaceous material precursor, is preferable from the viewpoint of lowering resistance of the negative electrode. Although there are no particular limitations on the carbonaceous material precursor provided it is a material that is converted to the carbonaceous material by heat treatment, petroleum-based pitch or coal-based pitch is particularly preferable. The base material and the carbonaceous material precursor may be mixed prior to heat treatment at a temperature higher than the melting point of the carbonaceous material precursor. Although the heat treatment temperature is only required to be a temperature at which a component formed by volatilization or thermal decomposition of the carbonaceous material precursor used becomes the carbonaceous material, the heat treatment temperature is preferably 400° C. to 2500° C., more preferably 500° C. to 2000° C., and even more preferably 550° C. to 1500° C. Although there are no particular limitations on the environment in which heat treatment is carried out, a non-oxidizing atmosphere is preferable.

Preferable examples of the aforementioned composite carbon material include Composite Carbon Materials 1 and 2 to be subsequently described. Either one of these may be selected for use or both may be used in combination.

[Composite Carbon Material 1]

Composite Carbon Material 1 is the composite carbon material that uses one or more types of carbon materials having a BET specific surface area of 100 $m^2/g$ to 3000 $m^2/g$ as the base material. Although there are no particular limitations thereon, a material such as an activated carbon, carbon black, cast porous carbon, high specific surface area graphite or carbon nanoparticles can be preferably used for the base material.

The BET specific surface area of the Composite Carbon Material 1 is preferably 100 $m^2/g$ to 1,500 $m^2/g$, more preferably 150 $m^2/g$ to 1,100 $m^2/g$, and even more preferably 180 $m^2/g$ to 550 $m^2/g$. If this BET specific surface area is 100 $m^2/g$ or more, pores can be suitably retained and lithium ions diffuse favorably, thereby making it possible to demonstrate high input-output characteristics. On the other hand, as a result of making BET specific surface area to be 1,500 $m^2/g$ or less, lithium ion charging and discharging efficiency improves, thereby preventing any impairment of cycle durability.

The weight ratio of the carbonaceous material to the base material in the Composite Carbon Material 1 is preferably 10% by weight to 200% by weight. This weight ratio is preferably 12% by weight to 180% by weight, more preferably 15% by weight to 160% by weight, and particularly preferably 18% by weight to 150% by weight. If the weight ratio of the carbonaceous material is 10% by weight or more, micropores present in the base material can be suitably filled by the carbonaceous material and lithium ion charging and discharging efficiency improves, thereby making it possible to demonstrate favorable cycle durability. In addition, if the weight ratio of the carbonaceous material is 200% by weight or less, pores can be favorably retained and diffusion of lithium ions is favorable, thereby making it possible to demonstrate high input-output characteristics.

The doped amount of lithium ions per unit weight of the Composite Carbon Material 1 in the first to fifth aspects of the present invention is preferably 530 mAh/g to 2,500 mAh/g, more preferably 620 mAh/g to 2,100 mAh/g, even more preferably 760 mAh/g to 1,700 mAh/g, and particularly preferably 840 mAh/g to 1,500 mAh/g.

Negative electrode potential decreases as a result of doping with lithium ions. Thus, in the case of combining a negative electrode containing the Composite Carbon Material 1 doped with lithium ions with a positive electrode, the available capacitance of the positive electrode increases as the voltage of the nonaqueous lithium-type power storage element becomes higher. Consequently, the capacitance and energy density of the resulting nonaqueous lithium-type power storage element increase.

If the doped amount is 530 mAh/g or more, even irreversible sites in the Composite Carbon Material 1 where lithium ions are unable to be released once they have been inserted are favorably doped with lithium ions, and the amount of the Composite Carbon Material 1 relative to a desired amount of lithium can be reduced. Consequently, the film thickness of the negative electrode can be reduced and high energy density is obtained. The larger the doped amount, the greater the decrease in negative electrode potential and the greater the improvement in input-output characteristics, energy density and durability.

On the other hand, if the doped amount is 2500 mAh/g or less, there is no risk of the occurrence of side effects such as deposition of lithium metal.

The following provides an explanation of a Composite Carbon Material 1a that uses activated carbon for the base material as a preferable example of the Composite Carbon Material 1. When mesopore volume derived from pores having a diameter of 20 Å to 500 Å as calculated according to the BJH method is defined as Vm1 (cc/g) and micropore volume derived from pores having a diameter of less than 20 Å as calculated according to the MP method is defined as Vm2 (cc/g), then the Composite Carbon Material 1a is preferably such that $0.010 \leq Vm1 \leq 0.300$ and $0.001 \leq Vm2 \leq 0.650$.

Mesopore volume Vm1 is more preferably such that $0.010 \leq Vm1 \leq 0.225$ and even more preferably such that $0.010 \leq Vm1 \leq 0.200$. Micropore volume V2 is more preferably such that $0.001 \leq Vm2 \leq 0.200$, even more preferably such that $0.001 \leq Vm2 \leq 0.150$ and particularly preferably such that $0.001 \leq Vm2 \leq 0.100$.

If the mesopore volume Vm1 is 0.300 cc/g or less, in addition to being able to increase BET specific surface area and increase the doped amount of lithium ions, bulk density of the negative electrode can be increased. As a result, the film thickness of the negative electrode can be reduced. In addition, if the micropore volume Vm2 is 0.650 cc/g or less, high charging and discharging efficiency can be maintained relative to the lithium ions. On the other hand, if the mesopore volume Vm1 and micropore volume Vm2 are equal to or less than the lower limit ($0.010 \leq Vm1$, $0.001 \leq Vm2$), high input-output characteristics are obtained.

BET specific surface area of the Composite Carbon Material 1a in the first to fifth aspects of the present invention is preferably 100 m$^2$/g to 1,500 m$^2$/g, more preferably 150 m$^2$/g to 1,100 m$^2$/g, and even more preferably 180 m$^2$/g to 550 m$^2$/g. If this BET specific surface area is 100 m$^2$/g or more, pores can be suitably retained and diffusion of lithium ions is favorable, thereby making it possible to demonstrate high input-output characteristics. In addition, since the doped amount of lithium ions can be increased, the film thickness of the negative electrode can be reduced. On the other hand, if the BET specific surface area is 1,500 m$^2$/g or less, cycle durability is not impaired since lithium ion charging and discharging efficiency improves.

The average pore diameter of the Composite Carbon Material 1a is preferably 20 Å or more, more preferably 25 Å or more and even more preferably 30 Å or more from the viewpoint of high input-output characteristics. On the other hand, average pore diameter is preferably 65 Å or less and more preferably 60 Å or less from the viewpoint of high energy density.

The average particle diameter of the Composite Carbon Material 1a is preferably 1 μm to 10 μm. The lower limit is more preferably 2 μm or more and even more preferably 2.5 μm or more. The upper limit of average particle diameter of the Composite Carbon Material 1a is more preferably 6 μm or less and even more preferably 4 μm or less. Favorable durability is retained if the average particle diameter of the Composite Carbon Material 1a is 1 μm to 10 μm.

The atomic ratio of hydrogen atoms to carbon atoms (H/C) of the Composite Carbon Material 1a is preferably 0.05 to 0.35 and even more preferably 0.05 to 0.15. In the case the H/C ratio is 0.35 or less, the structure of the carbon material adhered to the surface of the activated carbon (and typically a polycyclic aromatic-based co-conjugated structure) develops favorably and both capacitance (energy density) and charging and discharging efficiency increase. On the other hand, in the case the H/C ratio is 0.05 or more, favorable energy density is obtained since carbonization does not proceed excessively. Furthermore, the H/C ratio is measured with an elemental analyzer.

Although Composite Carbon Material 1a has an amorphous structure derived from the activated carbon of the aforementioned base material, it simultaneously has a crystal structure derived mainly from the deposited carbonaceous material. According to the results of wide-angle X-ray diffraction, spacing d002 of the (002) plane in the Composite Carbon Material 1a is 3.60 Å to 4.00 Å, and crystallite size Lc in the direction of the c axis obtained from the half width of this peak is preferably 8.0 Å to 20.0 Å, d002 is more preferably 3.60 Å to 3.75 Å, and crystallite size Lc in the axial direction obtained from the half width of this peak is more preferably 11.0 Å to 16.0 Å.

There are no particular limitations on the aforementioned activated carbon used as the base material of the aforementioned Composite Carbon Material 1a provided the resulting Composite Carbon Material 1a demonstrates desired characteristics. For example, commercially available products obtained from various types of raw materials such as petroleum-based, coal-based, plant-based or polymer-based raw materials can be used. Activated carbon powder having an average particle diameter of 1 μm to 15 μm in particular is used preferably. The average particle diameter thereof is more preferably 2 μm to 10 μm.

The pore size distribution of the activated carbon used for the base material is important in order to obtain the Composite Carbon Material 1a having the pore size distribution range specified in the present embodiment.

When mesopore volume derived from pores having a diameter of 20 Å to 500 Å as determined according to the BJH method is defined as V1 (cc/g), and micropore volume derived from pores having a diameter of less than 20 Å as determined according to the MP method is defined as V2 (cc/g), then the activated carbon is preferably such that $0.050 \leq V1 \leq 0.500$, $0.005 \leq V2 \leq 1.000$, and $0.2 \leq V1/V2 \leq 20.0$.

Mesopore volume V1 is more preferably such that $0.050 \leq V1 \leq 0.350$ and even more preferably such that $0.100 \leq V1 \leq 0.300$. Micropore volume V2 is more preferably such that 0.005≤V2≤0.850 and even more preferably such that 0.100≤V2≤0.800. The ratio of mesopore volume/micropore volume is more preferably such that 0.22≤V1/V2≤15.0 and even more preferably such that 0.25≤V1/V2≤10.0. In the case the mesopore volume V1 of the activated carbon is 0.500 or less and in the case the micropore volume V2 is 1.000 or less, the ratio of V1/V2 is sufficient for depositing a suitable amount of carbonaceous material for obtaining the pore structure of the Composite Carbon Material 1a in the aforementioned present embodiment, thereby facilitating control of pore structure. On the other hand, in the case the mesopore volume V1 of the activated carbon is 0.050 or more and in the case the micropore volume V2 is 0.005 or more, the structure is easily obtained in the case the ratio of V1/V2 is 0.2 or more and in the case the ratio of V1/V2 is 20.0 or less.

The carbonaceous material precursor used as a raw material of the aforementioned Composite Carbon Material 1a refers to a solid, liquid or organic material capable of dissolving in a solvent that allows the carbonaceous material to be deposited on the activated carbon by heat treatment. Examples of this carbonaceous material precursor include pitch, mesocarbon microbeads, coke and synthetic resins (such as phenol resin and the like). Among these carbonaceous material precursors, inexpensive pitch is used preferably in terms of production cost. Pitch is broadly categorized into petroleum-based pitch and coal-based pitch. Examples of petroleum-based pitch include crude oil distillation residues, fluid catalytic cracking residues (such as decanted oil and the like), bottom oil derived from a thermal cracker and ethylene tar obtained during naphtha cracking.

In the case of using the aforementioned pitch, the Composite Carbon Material 1a is obtained by heat-treating the pitch in the presence of activated carbon to deposit carbonaceous material on the activated carbon by allowing volatile components or thermal decomposition components of the pitch to thermally react on the surface of the activated carbon. In this case, deposition of volatile components or thermal decomposition components of the pitch in pores of the activated carbon proceeds at a temperature of 200° C. to 500° C., and the reaction by which the deposited components are converted to a carbonaceous material proceeds at a temperature of 400° C. or higher. Although the peak temperature during heat treatment (maximum attainable temperature) is suitably determined according to such factors as the properties of the resulting Composite Carbon Material 1a, the thermal reaction pattern or the thermal reaction atmosphere, it is preferably 400° C. or higher, more preferably 450° C. to 1000° C., and even more preferably 500° C. to 800° C. In addition, the amount of time during which the peak temperature of heat treatment is maintained is preferably 30 minutes to 10 hours, more preferably 1 hour to 7 hours, and even more preferably 2 hours to 5 hours. For example, in the case of heat treating over the course of 2 hours to 5 hours at a peak temperature of about 500° C. to 800° C., the carbonaceous material deposited on the surface of the activated carbon is thought to consist of polycyclic aromatic hydrocarbons.

In addition, the softening point of the pitch used is preferably 30° C. to 250° C. and more preferably 60° C. to 130° C. Pitch having a softening point of 30° C. or higher does not impair handling and can be charged accurately. Pitch having a softening point of 250° C. or lower contains a large amount of comparatively low molecular weight compounds, and as a result of using this pitch, carbonaceous material can be deposited even into fine pores of the activated carbon.

A specific example of a method for producing the aforementioned Composite Carbon Material 1a consists of heat treated activated carbon in an inert atmosphere containing hydrocarbon gas volatilized from the carbonaceous material precursor followed by depositing the carbonaceous material in the vapor phase. In addition, a method consisting of preliminarily mixing the activated carbon and carbonaceous material precursor followed by subjecting to heat treatment, or a method consisting of coating the carbonaceous material precursor dissolved in a solvent onto the activated carbon followed by drying and subjecting to heat treatment, can also be employed.

The weight ratio of the carbonaceous material to the activated carbon in the Composite Carbon Material 1a is preferably 10% by weight to 100% by weight. This weight ratio is more preferably 15% by weight to 80% by weight. If the weight ratio of the carbonaceous material is 10% by weight or more, micropores present in the activated carbon can be suitably filled with the carbonaceous material and cycle durability is not impaired since charging and discharging efficiency of lithium ions improves. In addition, if the weight ratio of the carbonaceous material is 100% by weight or less, pores of the Composite Carbon Material 1a are suitably retained and specific surface area is maintained at a high level. Consequently, as a result of being able to increase the doped amount of lithium ions, high output density and high durability can be maintained even if the film thickness of the negative electrode is reduced.

[Composite Carbon Material 2]

The Composite Carbon Material 2 is the aforementioned composite carbon material that uses one or more types of carbon materials having a BET specific surface area of 0.5 m$^2$/g to 80 m$^2$/g as a base material. Although there are no particular limitations thereon, natural graphite, artificial graphite, low crystalline graphite, hard carbon, soft carbon or carbon black and the like can be used preferably for the base material.

The BET specific surface area of the Composite Carbon Material 2 is preferably 1 m$^2$/g to 50 m$^2$/g, more preferably 1.5 m$^2$/g to 40 m$^2$/g, and even more preferably 2 m$^2$/g to 25 m$^2$/g. If this BET specific surface area is 1 m$^2$/g or more, a reaction field with lithium ions can be adequately secured, thereby making it possible to demonstrate high input-output characteristics. On the other hand, if the BET specific surface area is 50 m$^2$/g or less, lithium ion charging and discharging efficiency improves and a decomposition reaction of the nonaqueous electrolytic solution during charging and discharging is inhibited, thereby making it possible to demonstrate high cycle durability.

The average particle diameter of the Composite Carbon Material 2 is preferably 1 µm to 10 m, more preferably 2 µm to 8 µm, and even more preferably 3 µm to 6 µm. If the average particle diameter is 1 µm or more, lithium ion charging and discharging efficiency can be improved, thereby making it possible to demonstrate high cycle durability. On the other hand, if the average particle diameter is 10 µm or less, reaction area between the Composite Carbon Material 2 and the nonaqueous electrolytic solution increases, thereby making it possible to demonstrate high input-output characteristics.

The weight ratio of the carbonaceous material to the base material in the Composite Carbon Material 2 is preferably 1% by weight to 30% by weight. This weight ratio is more preferably 1.2% by weight to 25% by weight and even more preferably 1.5% by weight to 20% by weight. If the weight ratio of the carbonaceous material is 1% by weight or more, reaction sites of the carbonaceous material with lithium ions can be adequately increased and desolvation of lithium ions becomes easy, thereby making it possible to demonstrate high input-output characteristics. On the other hand, if the weight ratio of the carbonaceous material is 20% by weight or less, in-solid diffusion of lithium ions between the carbonaceous material and the base material can be favorably retained, thereby making it possible to demonstrate high input-output characteristics. In addition, high cycle durability can be demonstrated since lithium ion charging and discharging efficiency improves.

The doped amount of lithium ions per unit weight of the Composite Carbon Material 2 in the first to fifth aspects of the present invention is preferably 50 mAh/g to 700 mAh/g. The doped amount of lithium ions is more preferably 70 mAh/g to 650 mAh/g, even more preferably 90 mAh/g to 600 mAh/g, and particularly preferably 100 mAh/g to 550 mAh/g.

Doping with lithium ions lowers the negative electrode potential. Thus, in the case of combining a negative electrode containing the Composite Carbon Material 2 doped with lithium ions with a positive electrode, the available capacitance of the positive electrode increases together with an increase in the voltage of the nonaqueous lithium-type power storage element. Consequently, capacitance and energy density of the resulting nonaqueous lithium-type power storage element increase.

If the doped amount is 50 mAh/g or more, even irreversible sites in the Composite Carbon Material 2 where lithium ions are unable to be released once they have been inserted are favorably doped with lithium ions, thereby allowing the obtaining of high energy density. The negative electrode potential decreases the larger the doped amount of lithium ions, and input-output characteristics, energy density and durability improve.

On the other hand, if the doped amount is 700 mAh/g or less, there is no risk of the occurrence of side effects such as deposition of lithium metal.

The following provides an explanation of a Composite Carbon Material 2a that uses a graphite material for the base material as a preferable example of the Composite Carbon Material 2.

The average particle diameter of the Composite Carbon Material 2a is preferably 1 μm to 10 μm. This average particle diameter is more preferably 2 μm to 8 μm and even more preferably 3 μm to 6 μm. If the average particle diameter is 1 μm or more, lithium ion charging and discharging efficiency improves, thereby making it possible to demonstrate high cycle durability. On the other hand, if the average particle diameter is 10 μm or less, reaction area between the Composite Carbon Material 2a and the nonaqueous electrolytic solution increases, thereby making it possible to demonstrate high input-output characteristics.

BET specific surface area of the Composite Carbon Material 2a in the first to fifth aspects of the present invention is preferably 1 $m^2/g$ to 20 $m^2/g$ and more preferably 1 $m^2/g$ to 15 $m^2/g$. If this BET specific surface area is 1 $m^2/g$ or more, reaction sites with lithium ions can be adequately secured, thereby making it possible to demonstrate high input-output characteristics. On the other hand, if the BET specific surface area of the Composite Carbon Material 2a is 20 $m^2/g$ or less, lithium ion charging and discharging efficiency improves and the decomposition reaction of the nonaqueous electrolytic solution during charging and discharging is inhibited, thereby making it possible to demonstrate high cycle durability.

There are no particular limitations on the aforementioned graphite material used for the base material provided the resulting Composite Carbon Material 2a demonstrates the desired characteristics. For example, artificial graphite, natural graphite, graphitized mesophase carbon microspheres or graphite whiskers can be used. The average particle diameter of the graphite material is preferably 1 μm to 10 μm and more preferably 2 μm to 8 μm.

The carbonaceous material precursor used as raw material of the aforementioned Composite Carbon Material 2a refers to a solid, liquid or organic material capable of dissolving in a solvent that allows the carbonaceous material to be compounded in the graphite material. Examples of this carbonaceous material precursor include pitch, mesocarbon microspheres, coke and synthetic resins (such as phenol resin). Among these carbonaceous material precursors, the use of inexpensive pitch is preferable in terms of production cost. Pitch is broadly categorized into petroleum-based pitch and coal-based pitch. Examples of petroleum-based pitch include crude oil distillation residues, fluid catalytic cracking residues (such as decanted oil), bottom oil derived from a thermal cracker and ethylene tar obtained during naphtha cracking.

The weight ratio of the carbonaceous material to the graphite material in the Composite Carbon Material 2a is preferably 1% by weight to 10% by weight. This weight ratio is more preferably 1.2% by weight to 8% by weight, even more preferably 1.5% by weight to 6% by weight, and particularly preferably 2% by weight to 5% by weight. If the weight ratio of the carbonaceous material is 1% by weight or more, reaction sites of the carbonaceous material with lithium ions can be adequately increased, and since this facilitates desolvation of lithium ions, high input-output characteristics can be demonstrated. On the other hand, if the weight ratio of the carbonaceous material is 20% by weight or less, in-solid diffusion of lithium ions between the carbonaceous material and the graphite material can be favorably retained, thereby making it possible to demonstrate high input-output characteristics. In addition, high cycle durability can be demonstrated since lithium ion charging and discharging efficiency improves.

The negative electrode active material layer in the present invention may contain optional components such as a conductive filler, binder or dispersion stabilizer in addition to the negative electrode active material and lithium compound as necessary.

There are no particular limitations on the conductive filler, and examples thereof include acetylene black, Ketjen black and vapor-grown carbon fibers. The amount of conductive filler used is preferably 0 parts by weight to 30 parts by weight based on 100 parts by weight of the negative electrode active material. The amount of conductive filler used is more preferably 0 parts by weight to 20 parts by weight and even more preferably 0 parts by weight to 15 parts by weight.

There are no particular limitations on the binder, and examples of binders that can be used include polyvinylidene fluoride (PVdF), polytetrafluoroethylene (PTFE), polyimide, latex, styrene-butadiene copolymer, fluororubber and acrylic copolymer. The amount of binder used is preferably 1 part by weight to 30 parts by weight. The amount of binder used is more preferably 2 parts by weight to 27 parts by weight and even more preferably 3 parts by weight to 25 parts by weight based on 100 parts. If the amount of binder used is 1 part by weight or more, adequate electrode strength is demonstrated. On the other hand, if the amount of binder used is 30 parts by weight or less, high input-output characteristics are demonstrated without inhibiting movement of lithium ions to and from the negative electrode active material.

There are no particular limitations on the dispersion stabilizer and examples of dispersion stabilizers that can be used include polyvinylpyrrolidone (PVP), polyvinyl alcohol (PVA) and cellulose derivatives. The amount of dispersion stabilizer used is preferably 0 parts by weight to 10 parts by weight based on 100 parts by weight of the negative electrode active material. If the amount of dispersion stabilizer used is 10 parts by weight or less, high input-output characteristics are demonstrated without inhibiting movement of lithium ions to and from the negative electrode active material.

[Negative Electrode Power Collector]

The material that composes the negative electrode power collector in the present invention is preferably a metal foil that has high electron conductivity and does not undergo deterioration due to elution into the nonaqueous electrolytic solution or reaction with electrolyte or ions. There are no particular limitations on this metal foil and examples thereof include aluminum foil, copper foil, nickel foil and stainless steel foil. Copper foil is preferable for the negative electrode powder collector in the nonaqueous lithium-type power storage element of the present embodiment.

The metal foil may be an ordinary metal foil not having surface ruggedness or through holes, may be a metal foil having surface ruggedness formed by embossing, chemical etching, electrodeposition or blasting processing, or may be a metal foil having through holes such as expanded metal foil, punched metal foil or etched foil.

The negative electrode power collector of the present embodiment is preferably nonporous from the viewpoints of ease of electrode fabrication and high electron conductivity. In the description of the present application, a "nonporous negative electrode power collector" refers to a negative electrode power collector not having pores to a degree that lithium ions are able to equilibrate on the front and back of the negative electrode by passing through the negative electrode power collector at least in the coated region of the negative electrode active material layer. Thus, a negative electrode power collector having extremely small pores or micropores and a negative electrode power collector having pores in a region where the negative electrode active material layer is not coated are not excluded within a range over which the effects of the invention of the present application are demonstrated. In addition, in the present embodiment, at least the region of the negative electrode power collector where the negative electrode active material is coated is nonporous, while a surplus portion of the negative electrode power collector where the negative electrode active material layer is not coated may or may not have pores.

Although there are no particular limitations on the thickness of the negative electrode power collector provided the shape and strength of the negative electrode are able to be adequately retained, the thickness is preferably, for example, 1 μm to 100 μm. Furthermore, when the negative electrode power collector has pores or surface ruggedness, the thickness of the negative electrode power collector is measured based on a portion in which pores or surface ruggedness are not present.

[Production of Negative Electrode]

The negative electrode has a negative electrode active material layer on one side or both sides of the negative electrode power collector. In a typical aspect thereof, the negative electrode active material is firmly adhered to the negative electrode power collector.

The negative electrode can be produced by a known electrode production technology such as that of a lithium ion battery or electric double layer capacitor. For example, various types of materials containing a negative electrode active material are dispersed or dissolved in water or an organic solvent to prepare a slurry-like coating solution followed by coating this coating solution onto one side or both sides of a negative electrode power collector to form a coated film and drying to obtain the negative electrode. Moreover, film thickness and bulk density of the negative electrode active material layer may be adjusted by pressing the resulting negative electrode. Alternatively, a method can also be employed in which various materials including the negative electrode active material are mixed using a dry method without using a solvent followed by press-molding the resulting mixture and attaching to the negative electrode power collector using a conductive adhesive.

The coating solution may be prepared by dry-blending all or a portion of various types of material powders including the negative electrode active material followed by adding water or organic solvent and/or a liquid or slurry-like substance obtained by dissolving or dispersing a binder or dispersion stabilizer therein. In addition, a coating solution may also be prepared by adding various types of material powders including the negative electrode active material to a liquid or slurry-like substance obtained by dissolving or dispersing a binder or dispersion stabilizer in water or organic solvent. Although there are no particular limitations thereon, a dispersing machine such as a homo-disperser, multi-axis dispersing machine, planetary mixer or thin film rotating-type high-speed mixer can be preferably used to prepare the aforementioned coating solution. In order to obtain the coating solution in a favorably dispersed state, the coating solution is preferably dispersed at a peripheral velocity of 1 μm/s to 50 μm/s. If the peripheral velocity is 1 μm/s or more, the various types of materials are favorably dissolved or dispersed, thereby making this preferable. In addition, if the peripheral velocity is 50 μm/s or less, the various types of materials are not damaged by heat or shear force attributable to dispersion and there is no occurrence of re-aggregation, thereby making this preferable.

The viscosity (ηb) of the coating solution is preferably 1,000 mPa·s to 20,000 mPa·s, more preferably 1,500 mPa·s to 10,000 mPa·s, and even more preferably 1,700 mPa·s to 5,000 mPa·s. If the viscosity (ηb) is 1,000 mPa·s or more, running of liquid when forming the coated film is inhibited and coated film width and film thickness can be favorably controlled. In addition, if the viscosity (ηb) is 20,000 mPa·s or less, there is little pressure loss in the flow path of the coating solution when using a coating machine, thereby enabling the coating solution to be coated stably and coating thickness to be controlled to a desired coated film thickness or less.

In addition, the thixotropic index (TI) value of the coating solution is preferably 1.1 or more, more preferably 1.2 or more, and even more preferably 1.5 or more. Coated film width and film thickness can be favorably controlled if the TI value is 1.1 or more.

Although there are no particular limitations thereon, a coating machine such as a die coater, comma coater, knife coater or gravure coating machine can be preferably used to form the aforementioned coated film. The coated film may be formed by single-layer coating or by multi-layer coating. In addition, the coating speed is preferably 0.1 m/min to 100 m/min, more preferably 0.5 m/min to 70 m/min, and even more preferably 1 m/min to 50 m/min. If the coating speed is 0.1 m/min or more, coating can be carried out stably. On the other hand, if the coating speed is 100 m/min or less, coating accuracy can be adequately secured.

There are no particular limitations on drying the aforementioned coated film, and a drying method such as hot air drying or infrared ray (IR) drying can be used preferably. The coated film may be dried at a single temperature or may be dried while changing the temperature in stages. In addition, the coated film may be dried by combining a plurality of drying methods. The drying temperature is preferably 25° C. to 200° C., more preferably 40° C. to 180° C. and even more preferably 50° C. to 160° C. Solvent in the coated film can be adequately volatilized if the drying temperature is 25° C. or higher. On the other hand, if the drying temperature is 200° C. or lower, cracks in the coated film caused by rapid volatilization of solvent, uneven distribution of binder caused by migration, and oxidation of the negative electrode power collector and negative electrode active material layer can be inhibited.

Although there are no particular limitations on pressing of the aforementioned negative electrode, a pressing machine such as a hydraulic press or vacuum press can be used preferably. Film thickness and bulk density of the negative electrode active material layer as well as electrode strength can be adjusted according to the pressing pressure, the gap and surface temperature of the pressed portions to be subsequently described. The pressing pressure is preferably 0.5 kN/cm to 20 kN/cm, more preferably 1 kN/cm to 10 kN/cm, and even more preferably 2 kN/cm to 7 kN/cm. Electrode strength can be adequately enhanced if the pressing pressure is 0.5 kN/cm or more. On the other hand, if the pressing pressure is 20 kN/cm or less, there is no occurrence of distortion or wrinkles in the negative electrode, and the negative electrode can be adjusted to a desired negative electrode active material layer film thickness and bulk density. In addition, the gap between the press rolls can be set to an arbitrary value corresponding to the film thickness of the negative electrode after drying so as to achieve a desired film thickness and bulk density of the negative electrode active material layer. Moreover, pressing speed can be set to an arbitrary speed at which distortion and wrinkling do not occur in the negative electrode. In addition, the surface temperature of pressed portions may be room temperature and the pressed portions may be heated as necessary. The lower limit of the surface temperature of pressed portions in the case of heating is preferably not lower than the melting point of the binder used minus 60° C., more preferably not lower than the melting point minus 45° C., and even more preferably not lower than the melting point minus 30° C. On the other hand, the upper limit of the surface temperature of pressed portions in the case of heating is preferably not higher than the melting point of the binder used plus 50° C., more preferably the melting point plus 30° C., and even more preferably the melting point plus 20° C. For example, in the case of using polyvinylidene fluoride (PVdF: melting point, 150° C.) for the binder, the surface of the pressed portions is preferably heated to 90° C. to 200° C., more preferably to 105° C. to 180° C., and even more preferably to 120° C. to 170° C. In addition, in the case of using a styrene-butadiene copolymer (melting point: 100° C.) for the binder, the surface of the pressed portions is preferably heated to 40° C. to 150° C., more preferably to 55° C. to 130° C., and even more preferably to 70° C. to 120° C.

The melting point of the binder can be determined by the location of an endothermic peak as determined by differential scanning calorimetry (DSC). For example, by using the DSC7 Differential Scanning Calorimeter manufactured by Perkin Elmer Co., Ltd., placing 10 mg of a sample resin in the measurement cell, and raising the temperature from 30° C. to 250° C. at the rate of 10° C./min in a nitrogen gas environment, the endothermic peak temperature during the course of raising the temperature becomes the melting point of the binder.

In addition, pressing may be carried out multiple times while changing conditions consisting of the pressing pressure, gap, speed and surface temperature of the pressed portions.

[Measured Parameters]

The BET specific surface area, average particle diameter, mesopore volume and micropore volume in the present invention are values respectively determined according to the methods indicated below. An isothermal line of adsorption and desorption of a sample is measured after vacuum-drying overnight at 200° C. BET specific surface area is determined according to the BET multi-point method or BET one-point method, average particle diameter is determined by dividing total pore volume per unit weight by BET specific surface area, mesopore volume is determined according to the BJH method, and micropore volume is determined according to the MP method.

The BJH method is a calculation method generally used for analyzing mesopores that was proposed by Barret, Joyner and Halenda, et al (NPL 1).

In addition, the MP method refers to a method for determining micropore volume, micropore area and micropore distribution by utilizing the "t-plot method" (NPL 2) devised by R. S. Mihail, Brunauer and Bodor (NPL 3).

Average particle diameter in the present invention indicates particle diameter at the point a cumulative curve based on a total volume of 100% reaches 50% when determined during measurement of particle size distribution using a particle size distribution measuring apparatus (namely, the 50% diameter (or median diameter)). This average particle diameter can be measured using a commercially available laser diffraction particle size analyzer.

The doped amount of lithium ions in the negative electrode active material of a nonaqueous lithium-type power storage element of the present invention after having been shipped or used can be determined, for example, in the manner indicated below.

First, the negative electrode active material layer of the present embodiment is washed with ethyl methyl carbonate or dimethyl carbonate and dried followed by extracting with a mixed solvent composed of methanol and isopropanol to obtain an extract and the negative electrode active material layer following extraction. This extraction is typically carried out in an Ar glovebox at an ambient temperature of 23° C.

The amounts of lithium in the extract and negative electrode active material layer following extraction obtained in the manner described above are respectively quantified using, for example, inductively coupled plasma mass spectrometry (ICP-MS), and the doped amount of lithium ions in the negative electrode active material layer can then be determined by determining the total thereof. Values of the aforementioned units are determined by dividing the resulting values by the amount of negative electrode active material used in the extraction.

Primary particle diameter in the present invention can be obtained by a method consisting of capturing images of a powder in multiple fields with an electron microscope, calculating the particle diameter of 2,000 to 3,000 of the particles in these fields using a fully-automated image processor, and taking the arithmetic average thereof to be the primary particle diameter.

In the present description, dispersity is the value determined by a dispersity evaluation test using a particle gauge as specified in JIS K5600. Namely, an adequate amount of sample is allowed to flow onto the deeper end of the groove of a particle gauge having a groove of a desired depth followed by allowing the sample to slightly overflow from the groove. Next, a scraper is placed so that the long side thereof is parallel to the direction of width of the gauge and the blade tip contacts the deep end of the groove of the particle gauge, and the surface of the gauge is drawn for 1 to 2 seconds to the 0 depth of the gauge at a uniform speed and at a right angle to the lengthwise direction of the groove, followed by observing by radiating light at an angle of 20° to 300 within 3 seconds after having finished drawing the gauge, and reading the depth at which the particles appear in the groove of the particle gauge.

Viscosity ($\eta b$) and TI values in the present invention are values respectively determined according to the methods indicated below. First, stabilized viscosity ($\eta a$) is acquired after measuring for 2 minutes or more under conditions of a temperature of 25° C. and shear rate of 2 $s^{-1}$ using an E-type viscometer. Next, viscosity ($\eta b$) is acquired under the same conditions as those described above with the exception of changing the shear rate to 20 $s^{-1}$. TI value is then calculated according to the equation $\eta a/\eta b$ using the viscosity values obtained in the manner described above. When increasing the shear rate from $2s^{-1}$ to 20 $s^{-1}$, the shear rate may be increased in a single step, shear rate may be determined in multiple steps over the aforementioned range, or shear rate may be increased while suitably acquiring the viscosity at that shear rate.

Film thickness of the negative electrode active material layer is preferably 5 μm to 100 μm per side. The lower limit of film thickness of the negative electrode active material layer is more preferably 7 μm or more and even more preferably 10 μm or more. The upper limit of film thickness of the negative electrode active material layer is more preferably 80 μm or less and even more preferably 60 μm or less. If this film thickness if 5 μm or more, streaks are not formed when coating the negative electrode active material layer and coatability is superior. On the other hand, if this film thickness if 100 μm or less, high energy density can be demonstrated by reducing cell volume. Furthermore, film thickness of the negative electrode active material layer in the case the power collector has through holes or surface ruggedness refers to the average value of film thickness per side of the portion of the power collector not having through holes or surface ruggedness.

Bulk density of the negative electrode active material layer is preferably 0.30 g/cm$^3$ to 1.8 g/cm$^3$, more preferably 0.40 g/cm$^3$ to 1.5 g/cm$^3$, and even more preferably 0.45 g/cm$^3$ to 1.3 g/cm$^3$. If the bulk density is 0.30 g/cm$^3$ or more, in addition to being able to ensure adequate strength, adequate conductivity can be demonstrated between the negative electrode active materials. In addition, if bulk density is 1.8 g/cm$^3$ or less, voids can be secured that enable ions to adequately diffuse within the negative electrode active material layer.

[Compounds in Negative Electrode Active Material Layer]

The negative electrode active material layer according to the present invention preferably contains $0.50 \times 10^{-4}$ mol/g to $120 \times 10^{-4}$ mol/g of one or more types of compounds selected from the aforementioned formulas (1) to (3) per unit weight of the negative electrode active material layer.

Examples of methods for containing the aforementioned compounds of the present invention in the negative electrode active material layer include:

a method consisting of mixing the aforementioned compounds into the negative electrode active material layer;

a method consisting of adsorbing the aforementioned compounds onto the negative electrode active material layer; and, a method consisting of electrochemically depositing the aforementioned compounds on the negative electrode active material layer.

Among these, a method in which the aforementioned compounds are preferably deposited in the negative electrode active material layer by containing a precursor, which is capable of forming the aforementioned compounds by dissolving in a nonaqueous electrolytic solution, and utilizing a decomposition reaction of the aforementioned precursor in a step for fabricating a power storage element, is preferable.

At least one type of organic solvent selected from ethylene carbonate, propylene carbonate, butylene carbonate, vinylene carbonate and fluoroethylene carbonate is preferably used for the precursor that forms the aforementioned compounds, and ethylene carbonate and propylene carbonate are used more preferably.

Here, the total amount of the aforementioned compounds is preferably $0.50 \times 10^{-4}$ mol/g or more and more preferably $1.0 \times 10^{-4}$ mol/g or more per unit weight of the aforementioned negative electrode active material layer. If the total amount of the aforementioned compounds per unit weight of the negative electrode active material layer is $0.50 \times 10^{-4}$ mol/g or more, the nonaqueous electrolytic solution does not contact the negative electrode active material and generation of gas due to reductive decomposition of the nonaqueous electrolytic solution can be inhibited.

In addition, the total amount of the aforementioned compounds per unit weight of the aforementioned negative electrode active material layer is preferably $120 \times 10^{-4}$ mol/g or less, more preferably $100 \times 10^{-4}$ mol/g or less, and even more preferably $80 \times 10^{-4}$ mol/g or less. If the total amount of the aforementioned compounds is $120 \times 10^{-4}$ mol/g or less per unit weight of the negative electrode active material layer, diffusion of Li ions at the negative electrode interface is not inhibited and high input-output characteristics can be demonstrated.

When the content of the aforementioned compounds per unit weight of the positive electrode active material layer in the first or second aspect of the present invention is defined as A, and the content per unit weight of the negative electrode active material layer is defined as B, then A/B is preferably 0.20 to 20.0. The ratio A/B is more preferably 0.80 to 15.0 and even more preferably 1.20 to 12.0. As a result of making the ratio A/B to be 0.20 or more, there is no generation of gas due to oxidative decomposition of the nonaqueous electrolytic solution at the positive electrode interface and diffusion of Li ions at the negative electrode interface is not inhibited. In addition, by making the ratio A/B to be 20.0 or less, there is no generation of gas due to reductive decomposition of the nonaqueous electrolytic solution at the negative electrode interface and diffusion of Li ions at the positive electrode interface is not inhibited. Consequently, both adequate high-temperature durability and high input-output characteristics over a wide temperature range can be realized by making the ratio A/B to be 0.20 to 20.0.

[Electrolytic Solution]

The electrolytic solution of the present embodiment is a nonaqueous electrolytic solution. Namely, this electrolytic solution contains a nonaqueous solvent to be subsequently described. The nonaqueous electrolytic solution contains 0.5 mol/L or more of a lithium salt based on the total amount of the nonaqueous electrolytic solution. Namely, the nonaqueous electrolytic solution contains lithium ions as electrolyte.

[Lithium Salt]

The nonaqueous electrolytic solution of the present embodiment can use, for example, $LiN(SO_2F)_2$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$ or $LiBF_4$ alone as a lithium salt, and two or more types may be used as a mixture. $LiPF_6$ and/or $LiN(SO_2F)_2$ is preferably contained since high conductivity is able to be demonstrated. The lithium salt concentration in the nonaqueous electrolytic solution based on the total amount of the nonaqueous electrolytic solution is preferably 0.5 mol/L or more and more preferably within the range of 0.5 mol/L to 2.0 mol/L. If the lithium salt concentration is 0.5 mol/L or more, capacitance of the power storage element can be made to be sufficiently high since anions are present in a sufficient amount. In addition, in the case the lithium salt concentration is 2.0 mol/L or less, precipitation of undissolved lithium salt in the nonaqueous electrolytic solution and excessively high viscosity of the electrolytic solution can be prevented, conductivity is not lowered, and output characteristics are not reduced, thereby making this preferable.

In the first to fourth aspects of the present invention, the nonaqueous electrolytic solution of the present embodiment preferably contains $LiN(SO_2F)_2$ at a concentration of 0.3 mol/L to 1.5 mol/L, and more preferably at a concentration of 0.4 mol/L to 1.2 mol/L, based on the total amount of the nonaqueous electrolytic solution. If the concentration of $LiN(SO_2F)_2$ is 0.3 mol/L or more, in addition to enhancing ion conductivity of the electrolytic solution, a suitable amount of electrolyte coating film can be deposited at the negative electrode interface and generation of gas caused by decomposition of the electrolytic solution as a result thereof can be reduced. On the other hand, if the concentration of $LiN(SO_2F)_2$ is 1.5 mol/L or less, there is no occurrence of precipitation of the electrolyte salt during charging and discharging, and there are no increases in viscosity of the electrolytic solution even after the passage of a long period of time.

[Nonaqueous Solvent]

The nonaqueous electrolytic solution of the present embodiment preferably contains a cyclic carbonate as a nonaqueous solvent. The containing of a cyclic carbonate in the nonaqueous electrolytic solution is advantageous in terms of dissolving a desired concentration of lithium salt and depositing a suitable amount of a lithium compound on the positive electrode active material layer. Examples of cyclic carbonates include ethylene carbonate, propylene carbonate, butylene carbonate, vinylene carbonate and fluoroethylene carbonate, and are used particularly preferably in the first to fourth aspects of the present invention.

The total content of the cyclic carbonate based on the total amount of the nonaqueous electrolytic solution is preferably 15% by weight or more and more preferably 20% by weight or more. If the aforementioned total content is 15% by weight or more, a desired concentration of lithium salt can be dissolved, thereby making it possible to demonstrate high lithium ion conductivity. Moreover, a suitable amount of a lithium compound can be deposited on the positive electrode active material layer, thereby making it possible to inhibit oxidative decomposition of the electrolytic solution.

The nonaqueous electrolytic solution of the present embodiment preferably contains linear carbonate as a nonaqueous solvent. The containing of a linear carbonate in the nonaqueous electrolytic solution is advantageous in terms of demonstrating high lithium ion conductivity. Examples of linear carbonates include dialkyl carbonates typically represented by dimethyl carbonate, diethyl carbonate, methyl ethyl carbonate, dipropyl carbonate or dibutyl carbonate. The dialkyl carbonate compound is typically not substituted.

The total content of linear carbonate based on the total amount of the nonaqueous electrolytic solution is preferably 30% by weight or more, more preferably 35% by weight or more, preferably 95% by weight or less and more preferably 90% by weight or less. If the content of the aforementioned linear carbonate is 30% by weight or more, viscosity of the electrolytic solution can be lowered and high lithium ion conductivity can be demonstrated. If the aforementioned total content is 95% by weight or less, the electrolytic solution can further contain an additive to be subsequently described.

[Additive]

The nonaqueous electrolytic solution of the present embodiment may further contain an additive. Although there are no particular limitations thereon, sultone compounds, cyclic phosphazenes, acyclic fluorine-containing ethers, fluorine-containing cyclic carbonates, cyclic carbonic acid esters, cyclic carboxylic acid esters and cyclic acid anhydrides, for example, can be used alone as additives or two or more types may be used as a mixture.

Examples of the aforementioned sultone compounds include sultone compounds respectively represented by the following general formulas (5) to (7). These sultone compounds may be used alone or two or more types may be used as a mixture:

[Chem. 9]

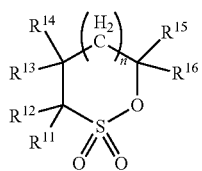

(5)

(wherein, $R^{11}$ to $R^{16}$ represent hydrogen atoms, halogen atoms, alkyl groups having 1 to 12 carbon atoms or halogenated alkyl groups having 1 to 12 carbon atoms and may mutually be the same or different, and n represents an integer of 0 to 3);

[Chem. 10]

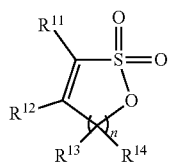

(6)

(wherein, $R^{11}$ to $R^{14}$ represent hydrogen atoms, halogen atoms, alkyl groups having 1 to 12 carbon atoms or halogenated alkyl groups having 1 to 12 carbon atoms and may mutually be the same or different, and n represents an integer of 0 to 3); and,

[Chem. 11]

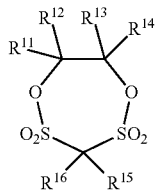

(7)

(wherein, $R^{11}$ to $R^{16}$ represent hydrogen atoms, halogen atoms, alkyl groups having 1 to 12 carbon atoms or halogenated alkyl groups having 1 to 12 carbon atoms and may be mutually the same or different).

In the present embodiment, from the viewpoints of minimizing the detrimental effect on resistance and inhibiting generation of gas due to decomposition of the nonaqueous electrolytic solution at high temperatures, the sultone compound represented by formula (5) is preferably 1,3-propanesultone, 2,4-butanesultone, 1,4-butanesultone, 1,3-butanesultone or 2,4-pentanesultone, the sultone compound represented by formula (6) is preferably 1,3-propanesultone or 1,4-butanesultone, and the sultone compound represented by formula (7) is preferably 1,5,2,4-dioxadithiane 2,4,4-tetraoxide, while examples of other sultone compounds include methylenebis(benzenesulfonic acid), methylenebis(phenylmethanesulfonic acid), methylenebis(ethanesulfonic acid), methylenebis(2,4,6-trimethylbenzenesulfonic acid) and methylenebis(2-trifluoromethylsulfonic acid), and at least one type of these sultone compounds is preferably selected.

The total content of the sultone compound in the nonaqueous electrolytic solution of the nonaqueous lithium-type power storage element in the present embodiment based on the total amount of the nonaqueous electrolytic solution is preferably 0.5% by weight to 15% by weight. If the total content of the sultone compound in the nonaqueous electrolytic solution is 0.5% by weight or more, decomposition of the electrolytic solution at high temperatures can be inhibited and the generation of gas can be suppressed. On the other hand, if the total content of the sultone compound is 15% by weight or less, decreases in ion conductivity of the electrolytic solution can be inhibited and high input-output characteristics can be retained. In addition, the total content of the sultone compound present in the nonaqueous electrolytic solution of the nonaqueous lithium-type power storage element is preferably 1% by weight to 10% by weight and more preferably 3% by weight to 8% by weight.

[Cyclic Phosphazene]

Examples of cyclic phosphazenes include ethoxy(pentafluoro)cyclotriphosphazene, diethoxy(tetrafluoro)cyclotriphosphazene and phenoxy(pentafluoro)cyclotriphosphazene, and one or more types selected therefrom is preferable.

The content of the cyclic phosphazene in the nonaqueous electrolytic solution based on the total amount of the nonaqueous electrolytic solution is preferably 0.5% by weight to 20% by weight. If this value is 0.5% by weight or more, decomposition of the electrolytic solution at high temperatures can be inhibited and the generation of gas can be suppressed. On the other hand, if the total content of the sultone compound is 20% by weight or less, decreases in ion conductivity of the electrolytic solution can be inhibited and high input-output characteristics can be retained. The content of cyclic phosphazene is more preferably 2% by weight to 15% by weight and even more preferably 4% by weight to 12% by weight.

Furthermore, these cyclic phosphazenes may be used alone or two or more types may be used as a mixture.

[Acyclic Fluorine-Containing Ether]

Examples of acyclic fluorine-containing ethers include $HCF_2CF_2OCH_2CF_2CF_2H$, $CF_3CFHCF_2OCH_2CF_2CF_2H$, $HCF_2CF_2CH_2OCH_2CF_2CF_2H$ and $CF_3CFHCF_2OCH_2CF_2CFHCF_3$, and among these, $HCF_2CF_2OCH_2CF_2CF_2H$ is preferable from the viewpoint of electrochemical stability.

The content of acyclic fluorine-containing ether based on the total amount of the nonaqueous electrolytic solution is preferably 0.5% by weight to 15% by weight and more preferably 1% by weight to 10% by weight. If the content of acyclic fluorine-containing ether is 0.5% by weight or more, stability of the nonaqueous electrolytic solution to oxidative decomposition increases and a power storage element is obtained that has high durability at high temperatures. On the other hand, if the content of acyclic fluorine-containing ether is 15% by weight or less, solubility of the electrolyte salt is favorably retained and ion conductivity of the nonaqueous electrolytic solution can be maintained at a high level, thereby making it possible to demonstrate high input-output characteristics. Furthermore, the acyclic fluorine-containing ether may be used alone or two or more types may be used as a mixture.

[Fluorine-Containing Cyclic Carbonate]

The fluorine-containing cyclic carbonate is preferably used by selecting from fluoroethylene carbonate (FEC) and difluoroethylene carbonate (dFEC) from the viewpoint of compatibility with other nonaqueous solvents.

The content of fluorine-containing cyclic carbonate based on the total amount of the nonaqueous electrolytic solution is preferably 0.5% by weight to 10% by weight and more preferably 1% by weight to 5% by weight. If the content of cyclic carbonate containing fluorine atoms is 0.5% by weight or more, a favorable coating film can be formed on the negative electrode and a power storage element having high durability at high temperatures is obtained as a result of inhibiting reductive decomposition of the electrolytic solution on the negative electrode. On the other hand, if the content of cyclic carbonate containing fluorine atoms is 10% by weight or less, solubility of the electrolyte salt is favorably retained and ion conductivity of the of the nonaqueous electrolytic solution can be maintained at a high level, thereby making it possible to demonstrate high input-output characteristics. Furthermore, the aforementioned cyclic carbonate containing fluorine atoms may be used alone or two or more types may be used as a mixture.

[Cyclic Carbonic Acid Ester]

The cyclic carbonic acid ester is preferably vinylene carbonate.

The content of cyclic carbonic acid ester based on the total amount of the nonaqueous electrolytic solution is preferably 0.5% by weight to 10% by weight and more preferably 1% by weight to 5% by weight. If the content of the cyclic carbonic acid ester is 0.5% by weight or more, a favorable coating film can be formed on the negative electrode and a power storage element having high durability at high temperatures is obtained as a result of inhibiting reductive decomposition of the electrolytic solution on the negative electrode. On the other hand, if the content of cyclic carbonic acid ester is 10% by weight or less, solubility of the electrolyte salt is favorably retained and ion conductivity of the of the nonaqueous electrolytic solution can be maintained at a high level, thereby making it possible to demonstrate high input-output characteristics.

[Cyclic Carboxylic Acid Ester]

Examples of cyclic carboxylic acid esters include γ-butyrolactone, γ-valerolactone, γ-caprolactone and ε-caprolactone, and one or more types selected therefrom are used preferably. Among these, γ-butyrolactone is particularly preferable from the viewpoint of improving battery characteristics attributable to improved lithium ion dissociation.

The content of cyclic carboxylic acid ester based on the total amount of the nonaqueous electrolytic solution is preferably 0.5% by weight to 15% by weight and more preferably 1% by weight to 5% by weight. If the content of cyclic carboxylic acid ester is 0.5% by weight or more, a favorable coating film can be formed on the negative electrode and a power storage element having high durability at high temperatures is obtained as a result of inhibiting reductive decomposition of the electrolytic solution on the negative electrode. On the other hand, if the content of cyclic carboxylic acid ester is 5% by weight or less, solubility of the electrolyte salt is favorably retained and ion conductivity of the of the nonaqueous electrolytic solution can be maintained at a high level, thereby making it possible to demonstrate high input-output characteristics. Furthermore, the aforementioned cyclic carboxylic acid ester may be used alone or two or more types may be used as a mixture.

[Cyclic Acid Anhydride]

One or more types of cyclic acid anhydrides selected from succinic anhydride, maleic anhydride, citraconic anhydride and itaconic anhydride are preferable for the cyclic acid anhydride. Among these, the cyclic acid anhydride is preferably selected from succinic anhydride and maleic anhydride from the viewpoints of industrial availability and reducing electrolytic solution production cost.

The content of cyclic acid anhydride based on the total amount of the nonaqueous electrolytic solution is preferably 0.5% by weight to 15% by weight and more preferably 1% by weight to 10% by weight. If the content of cyclic acid anhydride is 0.5% by weight or more, a favorable coating film can be formed on the negative electrode and a power storage element having high durability at high temperatures is obtained as a result of inhibiting reductive decomposition of the electrolytic solution on the negative electrode. On the other hand, if the content of cyclic acid anhydride is 10% by weight or less, solubility of the electrolyte salt is favorably retained and ion conductivity of the of the nonaqueous electrolytic solution can be maintained at a high level, thereby making it possible to demonstrate high input-output characteristics. Furthermore, the aforementioned cyclic acid anhydride may be used alone or two or more types may be used as a mixture.

[Separator]

The positive electrode precursor and the negative electrode are laminated or wound with the separator interposed there between to form an electrode laminated body or electrode wound body having the positive electrode precursor, negative electrode and separator.

A polyethylene microporous film or polypropylene microporous film used in lithium ion secondary batteries, or a cellulose nonwoven paper used in electric double layer capacitors, can be used for the aforementioned separator. A film composed of organic or inorganic fine particles may be laminated on one side or both sides of these separators. In addition, organic or inorganic fine particles may be contained within the separator.

The thickness of the separator is preferably 5 μm to 35 μm. As a result of making the thickness to be 5 μm or more, self-discharging caused by internal micro-short-circuiting tends to decrease, thereby making this preferable. On the other hand, by making the thickness to be 35 μm or less, input-output characteristics of the nonaqueous lithium-type power storage element tend to be high, thereby making this preferable.

In addition, the thickness a film composed of organic or inorganic fine particles is preferably 1 μn to 10 μm. By making the thickness of a film composed or organic or inorganic fine particles to be 1 μm or more, self-discharging caused by internal micro-short-circuiting tends to decrease, thereby making this preferable. On the other hand, by making the thickness to be 10 μm or less, input-output characteristics of the nonaqueous lithium-type power storage element tend to increase, thereby making this preferable.

[Nonaqueous Lithium-Type Power Storage Element]

The nonaqueous lithium-type power storage element of the present embodiment is composed by having an electrode laminated body or electrode wound body housed within the aforementioned casing together with the aforementioned nonaqueous electrolytic solution.

[Assembly]

The electrode laminated body obtained in an assembly step has a positive electrode terminal and a negative electrode terminal connected to a laminated body obtained by laminating a positive electrode precursor and negative electrode cut into the form of sheets with a separator interposed there between. In addition, an electrode wound body has a positive electrode terminal and a negative electrode terminal connected to a wound body obtained by winding a positive electrode precursor and negative electrode with a separator interposed there between. The shape of the electrode wound body may be cylindrical or flat.

There are no particular limitations on the method used to connect the positive electrode terminal and negative electrode terminal, and are connected by a method such as resistance welding or ultrasonic welding.

[Casing]

A metal can or laminated film and the like can be used for the casing.

The metal can is preferably an aluminum can.

A film obtained by laminating a metal foil and resin film is preferable for the laminated film, and an example thereof is that having a three-layer configuration consisting of an outer layer resin film, metal foil and inner resin film. The outer layer resin film serves to prevent the metal foil from being damaged by contact and the like, and a resin such as nylon or polyester can be used preferably. The metal foil is for preventing permeation of moisture and gas, and aluminum foil or stainless steel foil and the like can be used preferably. In addition, the inner resin film protects the metal foil from the nonaqueous electrolytic solution housed therein while also serving to seal the casing during heat-sealing, and polyolefin or acid-modified polyolefin and the like can be used preferably.

[Housing in Casing]

The dried electrode laminated body or electrode wound body is preferably housed in a casing typically represented by a metal can or laminated film and then sealed while leaving only one opening. There are no particular limitations on the method used to seal the casing, and a method such as heat sealing or impulse sealing is used in the case of using a laminated film.

[Drying]

The electrode laminated body or electrode wound body housed in the casing is preferably removed of residual solvent by drying. There are no particular limitations on the drying method and drying is carried out by vacuum drying and the like. The amount of residual solvent per weight of the positive electrode active material layer or negative electrode active material layer is preferably 1.5% by weight or less. If the amount of residual solvent exceeds 1.5% by weight, solvent remains within the system causing exacerbation of self-discharging characteristics and cycle characteristics, thereby making this undesirable.

[Solution Injection, Impregnation and Sealing Steps]

Following completion of the assembly step, nonaqueous electrolytic solution is injected into the electrode laminated body or electrode wound body housed in the casing. Following completion of this solution injection step, impregnation is preferably carried out to adequately immerse the positive electrode, negative electrode and separator in the nonaqueous electrolytic solution. In the state in which at least a portion of the positive electrode, negative electrode and separator are immersed in the nonaqueous electrolytic solution, doping proceeds unevenly in a lithium doping step to be subsequently described, and resistance of the resulting nonaqueous lithium-type power storage element increases or durability decreases. There are no particular limitations on the method used for the aforementioned impregnation, and an example of a method that can be used consists of installing the electrode laminated body or electrode wound body in pressure reduction chamber following injection of electrolytic solution with the casing left open, reducing pressure inside the chamber using a vacuum pump, and then returning the pressure inside the chamber to atmospheric pressure. Following completion of the impregnation step, the electrode laminated body or electrode wound body is sealed with the casing open while reducing pressure to seal inside the casing.

[Lithium Doping Step]

In the lithium doping step, the negative electrode active material layer is preferably pre-doped with lithium ions by decomposing the aforementioned lithium compound by applying a voltage between the aforementioned positive electrode precursor and negative electrode to decompose the lithium compound in the positive electrode precursor and release lithium ions followed by reducing lithium ions at the negative electrode.

In this lithium doping step, gas such as $CO_2$ is generated accompanying oxidative decomposition of the lithium compound in the positive electrode precursor. Consequently, when applying a voltage, it is preferable to devise a means for releasing the generated gas outside the casing. Examples of such means include a method consisting of applying voltage with a portion of the casing open, and a method consisting of applying voltage with a suitable gas release means such as a gas venting valve or gas-permeable film installed in a portion of the aforementioned casing.

[Aging Step]

Aging is preferably carried out on the electrode laminated body or electrode wound body following completion of the lithium doping step. Solvent present in the nonaqueous electrolytic solution is decomposed at the negative electrode in the aging step, and a solid polymer coating film that is permeable to lithium ions is formed on the surface of the negative electrode.

There are no particular limitations on the aforementioned aging method, and for example, a method consisting of allowing the solvent present in the nonaqueous electrolytic solution to react in a high-temperature environment can be used.

<Additional Charging>

Additional charging is preferably carried out on the electrode laminated body or electrode wound body after aging. In addition to fluoride ion sources being released and adhering to the surface of the separator, a particular substance is formed due to decomposition of electrolyte in the aqueous electrolytic solution at the positive electrode during additional charging. As a result, a nonaqueous lithium-type power storage element having low resistance is obtained due to improved permeability and retention of electrolytic solution in the separator, while also allowing the obtaining of a nonaqueous lithium-type power storage element having superior durability during high-temperature storage due to an increase in mechanical and electrochemical durability of the separator at high temperatures.

[Gas Venting Step]

Following completion of the aging step, gas venting is preferably carried out to reliably remove gas remaining in the nonaqueous electrolytic solution, positive electrode and negative electrode. In a state in which gas remains in at least a portion of the nonaqueous electrolytic solution, positive electrode and negative electrode, resistance of the resulting nonaqueous lithium-type power storage element ends up increasing due to inhibition of ion conduction.

There are no particular limitations on the method used to carry out the aforementioned gas venting, and an example of a method that can be used consists of installing the electrode laminated body or electrode wound body in a pressure reduction chamber with the casing left open and then reducing pressure inside the chamber using a vacuum pump.

<Positive Electrode and Negative Electrode Design>

FIG. 1 is a cross-sectional schematic diagram in the direction of thickness of a nonaqueous lithium power storage element in a fifth aspect of the present invention. An electrode laminated body (8), obtained by laminating a positive electrode and a negative electrode with a separator (7) interposed there between, is housed in a casing (9) of a nonaqueous lithium power storage element according to the present embodiment of the present invention.

In the electrode laminated body (8), at least one positive electrode contains a nonporous positive electrode power collector (3), and a positive electrode active material layer having a $C_x$ side positive electrode active material layer (1) and a positive electrode active material layer having a $C_y$ side positive electrode active material layer (2) are respectively arranged thereon by coating an active material onto both sides of the nonporous positive electrode power collector (3).

In the electrode laminated body (8), at least one negative electrode contains a nonporous negative electrode power collector (6), and a negative electrode active material layer having an $A_x$ side negative electrode active material layer (4) and a negative electrode active material layer having a $C_y$ side negative electrode active material layer (5) are respectively arranged thereon by coating a negative electrode active material capable of intercalating and releasing lithium ions onto both sides of the nonporous negative electrode power collector (6).

As shown in FIG. 1, the $C_x$ side positive electrode active material layer (1) and the $A_x$ side negative electrode active material layer (4) are mutually opposed with the separator (7) interposed there between, and/or the $C_y$ side positive electrode active material layer (2) and the $A_y$ side negative electrode active material layer (5) are mutually opposed with the separator (7) interposed there between.

Although not shown in FIG. 1, a single-sided positive electrode, in which the positive electrode active material layer is only formed on one side of the positive electrode power collector, or a double-sided positive electrode, in which the positive electrode active material layer is formed on both sides of the positive electrode power collector, may be arranged on the outermost side of the electrode laminated body, or a single-sided negative electrode, in which the negative electrode active material layer is only formed on one side of the negative electrode power collector, or a double-sided negative electrode, in which the negative electrode active material layer is formed on both sides of the negative electrode power collector, may be arranged on the outermost side of the electrode laminated body.

In the case a lithium compound is contained in the positive electrode active material layer, the aforementioned lithium compound gradually decomposes at a potential lower than the decomposition potential of the nonaqueous electrolytic solution resulting in the generation of gas. In other words, due to the effect of inhibiting an increase in the potential of the positive electrode attributable to a decomposition reaction of the lithium compound, and the effect of gradually increasing the internal pressure of the nonaqueous lithium power storage element due to gradual generation of gas, thermal runaway of the nonaqueous lithium power storage element can be inhibited since the casing, or gas venting holes provided in the casing, can be unsealed under mild conditions.

On the other hand, in the case the aforementioned lithium compound is not contained in the positive electrode active material layer, oxidative decomposition of the nonaqueous electrolytic solution proceeds rapidly when the nonaqueous lithium power storage element is exposed to an overvoltage environment, rapid generation of gas and considerable heat of reaction occur, and the nonaqueous lithium power storage element may end up undergoing thermal runaway depending on the case.

In consideration of the above, when a lithium compound other than the active material is contained in the positive electrode active material layer, the basis weight of the positive electrode active material layer on one side ($C_x$ side) of the aforementioned positive electrode is defined as $C_{x1}$ (g/m$^2$), and the basis weight of the positive electrode active material layer the other side ($C_y$ side) of the aforementioned positive electrode is defined as $C_{y1}$ (g/m$^2$), then in the fifth aspect of the present invention, $C_{x1}/C_{y1}$ is preferably 1.02 to 1.35, and when the basis weight of the negative electrode active material layer on one side ($A_y$ side) of the aforementioned negative electrode opposing the $C_y$ side is defined as $A_{y1}$ (g/m$^2$), and the basis weight of the negative electrode active material layer on the other side ($A_x$ side) is defined as $A_{x1}$ (g/m$^2$), then $A_{x1}/A_{y1}$ is preferably 1.02 to 1.35.

In the fifth aspect of the present invention, in the case the electrode laminated body is composed of a plurality of positive electrodes and negative electrodes, at least one combination of positive electrodes and negative electrodes in the electrode laminated body satisfies the requirement of $C_{x1}/C_{y1}$ being 1.02 to 1.35 and $A_{x1}/A_{y1}$ being 1.02 to 1.35. Potential changes during overcharging of the $C_y$ side can be increased by having the $C_y$ side, having a small basis weight of the positive electrode active material layer, and the $A_y$ side, having a small basis weight of the negative electrode active material layer, in mutual opposition. Consequently, decomposition of the lithium compound in the positive electrode active material layer in an overcharged state can be carried out during initial overcharging, thereby allowing the casing open safely due to generation of gas prior to thermal runaway of the nonaqueous lithium power storage element.

Thermal runaway during overcharging can be inhibited if $C_{x1}/C_{y1}$ is 1.02 or more and $A_{x1}/A_{y1}$ is 1.02 or more.

Capacitance can be increased due to reduced variations in potential of the positive electrode and negative electrode if $C_{x1}/C_{y1}$ is 1.35 or less and $A_{x1}/A_{y1}$ is 1.35 or less. Furthermore, $C_{x1}$ and $C_{y1}$ are each preferably 5 to 100 and more preferably 10 to 50. If $C_{x1}$ and $C_{y1}$ are 5 or more, energy density can be enhanced. Output characteristics are superior if $C_{x1}$ and $C_{y1}$ are 100 or less.

In addition, $A_{x1}$ and $A_{y1}$ are each preferably 5 to 100 and more preferably 10 to 50. If $A_{x1}$ and $A_{y1}$ are 5 or more, energy density can be enhanced. Output characteristics are superior if $A_{x1}$ and $A_{y1}$ are 100 or less.

In addition, when the amount of lithium compound contained per unit area of the positive electrode on the $C_x$ side is defined as $C_{x2}$ (g/m$^2$), and the amount of lithium compound contained per unit area of the positive electrode on the $C_y$ side is defined as $C_{y2}$ (g/m$^2$), then $C_{x2}/C_{y2}$ is preferably 1.02 to 2.00.

Although the active lithium compound contained in the positive electrode active material layer dissipates as a result of carrying out the aforementioned lithium doping step and aging step, a portion of the lithium compound remains in the positive electrode active material layer. Although this lithium compound does not generate gas since it is does not react in an ordinary environment at room temperature, this lithium compound generates gas as a result of reacting under the aforementioned overcharging conditions and in high-temperature environments. Consequently, if the amount of lithium compound contained in $C_{y2}$ having a larger potential change is reduced, namely if $C_{x2}/C_{y2}$ is 1.02 or more, generation of gas in high-temperature environments can be inhibited. In addition, if $C_{x2}/C_{y2}$ is 2.00 or less, thermal runaway during overcharging can be inhibited. Furthermore, $C_{x2}$ and $C_{y2}$ are each preferably 0.1 to 30 and more preferably 0.5 to 20. If $C_{x2}$ and $C_{y2}$ are 0.1 or more, thermal runaway during overcharging can be inhibited. If $C_{x1}$ and $C_{y1}$ are 30 or less, energy density can be enhanced.

The diffused state of lithium carbonate contained in the positive electrode active material layer can be evaluated by micro-Raman spectroscopy, and in the fifth aspect of the present invention, when the area of carbonate ion mapping in images obtained by micro-Raman spectroscopy of the $C_x$ side is defined as $S_x$ % and the area of carbonate ion mapping in images obtained by micro-Raman spectroscopy of the $C_y$ side is defined as $S_y$ %, $S_x$ and $S_y$ are each preferably 1 to 40 and $S_x/S_y$ is preferably 1.00 to 2.00. If $S_x/S_y$ is 1.00 or more, thermal runaway during overcharging can be inhibited. If $S_x/S_y$ is 2.00 or less, generation of gas in high-temperature environments can be inhibited.

<Determination of Basis Weight of Positive Electrode Active Material Layer, Quantification of Lithium Compound and Determination of $C_{x1}$, $C_{y1}$, $C_{x2}$ and $C_{y2}$>

The methods used to measure basis weight of the positive electrode active material layer and the amount of lithium compound contained in the positive electrode active material layer are described below. A nonaqueous lithium power storage element adjusted to a voltage of 2.9 V is disassembled in an argon glovebox followed by removal of the electrode laminated body, and the positive electrode is cut away from the electrode laminated body and washed with an organic solvent. Although there are no particular limitations on the organic solvent provided it is capable of removing electrolytic solution decomposition products deposited on the surface of the positive electrode, the use of an organic solvent for which the solubility of lithium compounds is 2% or less inhibits elution of the lithium compound. A polar solvent such as methanol, ethanol, acetone or methyl acetate is preferably used for this organic solvent. Although there are no particular limitations on the measured area of the positive electrode, an area of 5 cm² to 200 cm² is preferable, while an area of 25 cm² to 150 cm² is more preferable, from the viewpoint of reducing measurement variation. Measurement reproducibility is ensured if the area is 5 cm² or more. The handleability of the sample is superior if the area is 200 cm² or less.

The method used to wash the positive electrode consists of adequately immersing the positive electrode for 3 days or longer in an ethanol solution equal to 50 to 100 times the weight of the positive electrode. During immersion, a cover is preferably placed over the container to prevent evaporation of the ethanol. After immersing for 3 days or more, the positive electrode is removed from the ethanol and vacuum-dried. Conditions for vacuum drying consist of a temperature of 100° C. to 200° C., pressure of 0 kPa to 10 kPa, time within the range of 5 hours to 20 hours, and vacuum drying until the residual amount of methanol in the positive electrode is 1% by weight or less. With a preliminarily prepared calibration curve the residual amount of ethanol can be quantified by measuring distilled water after washing with distilled water as subsequently described by GC/MS.

Following vacuum drying, the resulting positive electrode is cut in half, one half is designated as positive electrode $C_{x0}$, the remaining half is designated as positive electrode $C_{y0}$, and the areas thereof are respectively defined as $X_c$ (m²) and $Y_c$ (m²). The positive electrode active material layer on the $C_y$ side of the positive electrode $C_{x0}$ and the positive electrode active material layer on the $C_x$ side of positive electrode $C_{y0}$ are removed with a spatula or brush and the like, the weight of the positive electrode $C_{x0}$ is defined as $M_{0x}$ (g), and the weight of the positive electrode $C_{y0}$ is defined as $M_{0y}$ (g). Continuing, the positive electrode $C_{x0}$ and the positive electrode $C_{y0}$ are each adequately immersed for 3 days or longer in distilled water equal to 100 to 150 times the weight thereof. During immersion, a cover is preferably placed over the container to prevent the distilled water from evaporating, and the aqueous solution is preferably occasionally stirred to promote elution of the lithium compound. After immersing for 3 days or longer, the positive electrode $C_{x0}$ and the positive electrode $C_{y0}$ are removed from the distilled water and vacuum-dried in the same manner as during the aforementioned ethanol washing. The weights of the positive electrode $C_{x0}$ and the positive electrode $C_{y0}$ after vacuum drying are respectively defined as Mix (g) and $M_{1y}$ (g). Continuing, in order to measure the weight of the power collector of the resulting positive electrodes $C_{x0}$ and $C_{y0}$, the positive electrode active material remaining on the positive electrode $C_{x0}$ and the positive electrode $C_{y0}$ is removed with a spatula or brush and the like. When the weights of the resulting positive electrode power collectors are defined as $M_{2x}$ (g) and $M_{2y}$ (g), the basis weight $C_{x1}$ (g/m²) of the positive electrode active material layer of the positive electrode $C_{x0}$ and the basis weight $C_{y1}$ (g/m²) of the positive electrode active material layer of the positive electrode $C_{y0}$ can be determined with equation (4).

[Math. 4]

$$C_{x1}=(M_{1x}-M_{2x})/X_c, \text{ and}$$

$$C_{y1}=(M_{1y}-M_{2y})/Y_c \quad (4)$$

The amount of lithium compound $C_{x2}$ (g/m²) per unit area of positive electrode $C_{x0}$ and the amount of lithium compound $C_{y2}$ (g/m²) per unit area of positive electrode $C_{y0}$ can be determined with the following equation (5).

[Math. 5]

$$C_{x2}=(M_{0x}-M_{1x})/X_C, \text{ and}$$

$$C_{y2}=(M_{0y}-M_{1y})/Y_C \quad (5)$$

Furthermore, in the case a plurality of lithium compounds are contained in the positive electrode active material layer, in the case the positive electrode active material layer contains an oxide such as $M_2O$, a hydroxide such as MOH, a halide such as MF or MCl, oxalates such as those represented by $M_2(CO_2)_2$ or a carboxylate such as RCOOM (wherein, R represents H, an alkyl group or an aryl group and the like), wherein M represents one or more types of elements selected from Na, K, Rb and Cs in the aforementioned formulas, in addition to the lithium compound, and in the case the positive electrode active material layer contains an alkaline earth metal carbonate selected from $BeCO_3$, $MgCO_3$, $CaCO_3$, $SrCO_3$ and $BaCO_3$, or an alkaline earth metal oxide, an alkaline earth metal hydroxide, an alkaline earth metal halide, an alkaline earth metal oxalate or an alkaline earth metal carbonate, the total amount thereof is determined as the amount of the lithium compound.

<Determination of Basis Weight of Negative Electrode Active Material Layer and Determination of $A_{x1}$ and $A_{y1}$>

The method used to quantify the basis weight of the negative electrode active material layer is described below. The negative electrode is cut away from the electrode laminated body in an argon glovebox and washed with an organic solvent. Although there are no particular limitations on the organic solvent used for washing provided it is capable of removing electrolytic solution decomposition products deposited on the surface of the negative electrode and reacts with lithium ions present in the negative electrode, an alcohol such as methanol, ethanol or isopropanol or a mixed solvent thereof is used preferably.

Although there are no particular limitations on the measured area of the negative electrode, an area of 5 cm² to 200 cm² is preferable, while an area of 25 cm² to 150 cm² is more preferable, from the viewpoint of reducing measurement variation. Measurement reproducibility is ensured if the area is 5 cm² or more. Sampling handling ease is superior if the area is 200 cm² or less.

The method used to wash the negative electrode consists of adequately immersing the negative electrode for 3 days or longer in an ethanol solution equal to 50 to 100 times the weight of the negative electrode. During immersion, a cover is preferably placed over the container to prevent evaporation of the ethanol. After immersing for 3 days or longer, the negative electrode is removed from the ethanol and vacuum-dried. Conditions for vacuum drying consist of a temperature of 100° C. to 200° C., pressure of 0 kPa to 10 kPa, time within the range of 5 hours to 20 hours, and vacuum drying until the residual amount of methanol in the positive electrode is 1% by weight or less.

The residual amount of ethanol can be quantified based on a preliminarily prepared calibration curve obtained by measuring the organic solvent by GC/MS after immersing the negative electrode in an organic solvent such as dimethyl carbonate, diethyl carbonate or ethyl methyl carbonate after vacuum drying.

Following vacuum drying, the resulting negative electrode is cut in half, one half is designated as negative electrode $A_{x0}$, the remaining half is designated as negative electrode $A_{y0}$, and the areas thereof are respectively defined as $X_A$ (m$^2$) and $Y_A$ (m$^2$). The negative electrode active material layer on the $A_y$ side of the negative electrode $A_{x0}$ and the negative electrode active material layer on the $A_x$ side of negative electrode $A_{y0}$ are removed with a spatula or brush and the like, the weight of the negative electrode $A_{x0}$ is defined as $M_{0xA}$ (g), and the weight of the negative electrode $A_{y0}$ is defined as $M_{0yA}$ (g).

Continuing, in order to measure the weight of the power collector of the resulting negative electrodes $A_{x0}$ and $A_{y0}$, the negative electrode active material remaining on the negative electrode $A_{x0}$ and the negative electrode $A_{y0}$ is removed with a spatula or brush and the like. When the weights of the resulting negative electrode power collectors are defined as $M_{1xA}$ (g) and $M_{1yA}$ (g), the basis weight $A_{x1}$ (g/m$^2$) of the negative electrode active material layer of the negative electrode $A_{x0}$ and the basis weight $A_{y1}$ (g/m$^2$) of the negative electrode active material layer of the negative electrode $A_{y0}$ can be determined with equation (6).

[Math. 6]

$$A_{x1}=(M_{0xA}-M_{1xA})/X_A, \text{ and}$$

$$A_{y1}=(M_{0yA}-M_{1yA})/Y_A \quad (6)$$

<Inhibition of Lithium Compound in High-Temperature Environment and Deposits on Positive Electrode and Negative Electrode>

In the fifth aspect of the present invention, when the content of a compound represented by the aforementioned formulas (1) to (3) per unit weight on the $C_y$ side of the aforementioned positive electrode active material layer is defined as $C_{y3}$ (mol/g), $C_{y3}$ is preferably $1.60 \times 10^{-4}$ to $300 \times 10^{-4}$ and more preferably $5.0 \times 10^{-4}$ to $150 \times 10^{-4}$.

Although increases in resistance in high-load charging and discharging cycles can be inhibited by containing a lithium compound in the $C_y$ side, the aforementioned lithium compound conversely ends up gradually decomposing resulting in the generation of gas when exposed to a high-temperature, high-voltage environment. Consequently, decomposition of the lithium compound in a high-temperature, high-voltage environment can be inhibited by containing a compound represented by the aforementioned formulas (1) to (3) in the $C_y$ side. High-temperature durability is superior if $C_{y3}$ is $1.60 \times 10^{-4}$ or more. Output characteristics are superior if $C_{y3}$ is $300 \times 10^{-4}$ or less.

Moreover, in the fifth aspect of the present invention, when a compound represented by the aforementioned formulas (1) to (3) is contained in the $A_y$ side of the negative electrode active material layer opposing the aforementioned $C_y$ side and the content thereof is defined as $A_{y3}$ (mol/g), $C_{y3}/A_{y3}$ is preferably 0.2 to 20.0. If $C_{y3}/A_{y3}$ is 0.2 or more, decomposition of the lithium compound on the $C_y$ side can be inhibited and high-temperature durability is superior. If $C_{y3}/A_{y3}$ is 20 or less, output characteristics are superior.

Here, the content A of compounds (1) to (3) in the first to third aspects per unit weight of the positive electrode active material layer and the content B per unit weight of the aforementioned negative electrode active material layer respectively correspond to $C_{y3}$ and $A_{y3}$ of the fifth aspect.

[Evaluation of Characteristics of Nonaqueous Lithium-Type Power Storage Element]

<Separator Sampling>

The state of the separator surface can be confirmed by disassembling the completed nonaqueous lithium-type power storage element anaerobically, washing the sampled separator and analyzing the dried sample. The following indicates an example of a method for analyzing the separator.

The separator is preferably removed by disassembling the nonaqueous lithium-type power storage element in an argon glovebox followed by measuring the separator after having washed off electrolyte adhered to the separator surface. Since the solvent used to wash the separator is only required to wash off electrolyte adhered to the separator surface, a carbonate solvent such as dimethyl carbonate, ethyl methyl carbonate or diethyl carbonate can be used preferably. The washing method consists of, for example, immersing the separator for 10 minutes or more in diethyl carbonate solvent equal to 50 to 100 times the weight of the separator followed by replacing the solvent and again immersing the separator. Subsequently, the separator is removed from the diethyl carbonate and vacuum-dried. Conditions for vacuum drying can consist of a temperature of 0° C. to 200° C., pressure of 0 kPa to 20 kPa and time of 1 hour to 40 hours. The temperature during vacuum drying is preferably that to a degree that does not cause the shape of the separator to change.

<XPS Analysis of Separator Surface>

The relative element concentrations of fluorine and carbon on the separator surface can be measured by XPS analysis. An example of the measurement conditions consists of using a monochromatic AlKα X-ray beam having a diameter of 200 μm (15 kV, 3.3 mA) for the X-ray source, detecting all elements with a survey scan over a bonding energy range of 0 to 1100 eV, using a narrow scan over the range of bonding energy corresponding to each detected element to acquire the spectrum for each element, and calculating relative element concentration using the peak areas thereof. XPS measurement can be carried out on the separator surface without cleaning by sputtering.

Conditions for measuring with a narrow scan consist of a path energy of 46.95 eV and using neutralizing electrification in energy steps of 0.1 eV.

A peak having bonding energy within the range of 280 eV to 298 eV can be assigned to $C_1$s and a peak having bonding energy within the range of 680 eV to 692 eV can be assigned to F1s for the resulting XPS spectrum. The amount of each element present is determined from the peak area in the resulting spectrum to determine relative element concentration. In the case of overlapping peaks, the peaks may be separated by assuming a Gaussian function or Lorentz function.

When the amount of all elements present as obtained by XPS analysis is defined as $W_{all}$ (mol) and the amounts of carbon and fluorine present are respectively defined as $W_C$ (mol) and $W_F$ (mol), then the relative element concentration of carbon $X_C$ is calculated by $X_C = W_C/W_{all} \times 100$ (atomic %) and the relative element concentration of fluorine $X_F$ is calculated by $X_F = W_F/W_{all} \times 100$ (atomic %).

In the fourth aspect of the present invention, the value $X_F/X_C$ obtained by dividing the relative element concentration of fluorine by the relative element concentration of carbon is preferably $5.0 \times 10^{-3}$ to $200 \times 10^{-3}$ and more preferably $10 \times 10^{-3}$ to $100 \times 10^{-3}$. If $X_F/X_C$ is $5.0 \times 10^{-3}$ or more, the amount of fluorine-based particulate substance adhered to the separator is adequate, and by increasing compatibility between the electrolytic solution and separator, high capacitance and low resistance can be demonstrated by the nonaqueous lithium-type power storage element, thereby making this preferable. In addition, the adhered particulate substance prevents heat shrinkage of the separator and inhibits increases in resistance due to high-temperature storage, thereby making this preferable. If $X_F/X_C$ is 200× $10^{-3}$ or less, the fluorine-based particulate substance maintains low resistance of the nonaqueous lithium-type power storage element without intercalating micropores of the separator, thereby making this preferable.

Although the separator surface has two types of surfaces consisting of a surface that opposes the positive electrode and a surface that opposes the negative electrode, the value of $X_F/X_C$ preferably falls within the aforementioned ranges on at least one of these surfaces, and more preferably falls within the aforementioned ranges on the surface opposing the negative electrode.

<SEM Observation of Separator Surface>

By observing the surface of the separator by SEM after having been washed and dried according to the previously described methods, the shape, size and number density of the particulate substance adhered to the separator surface can be determined.

The particulate substance adhered to the separator surface can be observed from image data measured under conditions consisting of, for example, an observation magnification factor of 3000× to 30000×. SEM images can be measured under conditions consisting of, for example, an acceleration voltage of 1 kV, emission current of 10 μA, and using 1280×960 pixels for the number of measured pixels. In order to prevent electrification of the sample, the surface can be treated by a method such as vacuum deposition or sputtering of gold, platinum or osmium.

<Particulate Substance Number Density>

Number density of particulate substances having a particle diameter of 50 nm to 500 nm is calculated by visually counting the number of particulate substances in an SEM image observed using the method described above followed by dividing by the observed area.

SEM images observed for at least 5 locations are observed to calculate the number density of particulate substances, and the SEM image is used that contains the portion having the highest number density of particulate substances.

There are no particular limitations on the shape of the particulate substance, and may be of any shape such as spherical, elliptical, needle-like or polygonal shape.

Particle diameter of the particulate substance is calculated by a calculation method using the biaxial average diameter. Biaxial average diameter R can be calculated as the average value R of the long axis l of a single particle (length of a single particle in the direction of the long axis) and the short axis b of a single particle (length of a single particle in the direction of the short axis) according to $R=(l+b)/2$. In the case particles are observed to be overlapping in an SEM image, the particles are each considered to be separated single particles.

Number density of a particulate substance is calculated by counting only those particulate substances having the aforementioned particle diameter of 50 nm to 500 nm within the range of the SEM image containing the portion having the highest number density of particulate substances as previously described. Number density Dp of a particulate substance is calculated as the value $Dp=Np/S$ (number/μm$^2$) obtained by dividing the count Np within the range of the aforementioned SEM image by the range S of the aforementioned SEM image.

The number density Dp of a particulate substance is preferably 1.0 particle/μm$^2$ to 30.0 particles/μm$^2$ and more preferably 4.0 particles/μm$^2$ to 15.0 particles/μm$^2$. If the number density of the particulate substance is 1.0 particle/μm$^2$ or more, since the particulate substance present at the interface between the separator and positive electrode and/or negative electrode provides voids that allow a large amount of electrolytic solution to be retained, both high capacitance and low resistance are demonstrated by the nonaqueous lithium-type power storage element, and increases in resistance caused by high-temperature storage are inhibited, thereby making this preferable. If the number density of the particulate substance is 30.0 particles/μm$^2$ or less, the particulate substance inhibits intercalation of the separator micropores and low resistance can be maintained for the nonaqueous lithium-type power storage element, thereby making this preferable.

Although the separator surface has two types of surfaces consisting of the surface that opposes the positive electrode and the surface that opposes the negative electrode, the value of Dp preferably falls within 1.0 particle/μm$^2$ to 30.0 particles/μm$^2$ on at least one of these surfaces, and more preferably falls within 1.0 particle/μm$^2$ to 30.0 particles/μm$^2$ at least on the surface opposing the negative electrode.

[Electrostatic Capacitance]

In the present description, electrostatic capacitance F (F) refers to the value obtained according to the method indicated below.

First, a cell corresponding to the nonaqueous lithium-type power storage element is subjected to constant current charging up to 3.8 V at a current value of 20 C in a thermostatic chamber set to 25° C., followed by carrying out constant voltage charging for a total of 30 minutes by applying a constant voltage of 3.8 V. Subsequently, capacitance when constant current discharging was carried out down to 2.2 V at a constant current of 2 C was defined as Q. Here, electrostatic capacitance refers to the value calculated according to $F=Q/(3.8-2.2)$ using the resulting value for Q.

[Electrical Energy]

In the present description, electrical energy E (Wh) refers to the value obtained according to the method indicated below.

Electrical energy refers to the value calculated according to $F×(3.8^2-2.2^2)/2/3600$ using the electrostatic capacitance F (F) calculated according to the previously described method.

[Volume]

Although there are no particular limitations thereon, the volume of the nonaqueous lithium-type power storage element refers to the volume of the portion in which the region of the electrode laminated body or electrode wound body where the positive electrode active material layer and negative electrode active material layer are laminated is housed by the casing.

For example, in the case of an electrode laminated body or electrode wound body housed by a laminated film, although the region of the electrode laminated body or electrode wound body where the positive electrode active material layer and negative electrode active material layer are present is housed in a laminated film molded into the shape of cup, the volume (V11) of this nonaqueous lithium-type power storage element is calculated as $V11=l1×w1×t1$ from the external length l1 of the cup-shaped portion, the external width (w1) and the thickness (t1) of the nonaqueous lithium-type power storage element including the laminated film.

In the case of an electrode laminated body or electrode wound body housed in a rectangular metal can, the volume of the external dimensions of the can is simply used for the volume of the nonaqueous lithium-type power storage element. Namely, the volume (V22) of this nonaqueous lithium-type power storage element is calculated as $V22=l2×w2×t2$ from the external length l2 of the rectangular metal can, the external width (w2) and the external thickness (t2). In addition, in the case of an electrode wound body housed in a cylindrical metal can as well, the volume of the external dimensions of the can is simply used for the volume of the nonaqueous lithium-type power storage element. Namely, the volume (V33) of the nonaqueous lithium-type power storage element is calculated as V33=3.14×r×r×l3 from the outer radius r of the bottom side or top side of the cylindrical metal can and the external length (l3).

[Energy Density]

In the present description, energy density refers to the value obtained from the formula E/Vi (Wh/L) using electrical energy E and volume Vi (wherein, i=1, 2 or 3).

[Room-Temperature Internal Resistance]

In the present description, room temperature internal resistance Ra ($\Omega$) refers to the value obtained according to the method indicated below.

First, a cell corresponding to the nonaqueous lithium-type power storage element is subjected to constant current charging up to 3.8 V at a current value of 20 C in a thermostatic chamber set to 25° C., followed by carrying out constant voltage charging for a total of 30 minutes by applying a constant voltage of 3.8 V. Continuing, constant current discharging is carried out down to 2.2 V at a current value of 20 C to obtain a discharging curve (time vs. voltage). Room-temperature internal resistance is the value calculated from equations consisting of voltage drop $\Delta E=3.8-Eo$ and $Ra=\Delta E/(20\ C$ (current value A) when the voltage at a discharge time of 0 seconds, obtained by extrapolating by linear approximation from the voltages at discharge times of 2 seconds and 4 seconds in the discharging curve, is defined as Eo.

[Low-Temperature Internal Resistance]

In the present description, low-temperature internal resistance Rc refers to the value obtained according to the method indicated below.

First, a cell corresponding to the nonaqueous lithium-type power storage element is allowed to stand for 2 hours in a thermostatic chamber set to −30° C. Subsequently, while holding the temperature of the thermostatic chamber at −30° C., the cell is subjected to constant current charging up to 3.8 V at a current value of 1.0 C followed by carrying out constant voltage charging for a total of 2 hours by applying a constant voltage of 3.8 V. Continuing, constant current discharging is carried out down to 2.2 V at a current value of 10 C to obtain a discharging curve (time vs. voltage). Low-temperature internal resistance is the value calculated from equations consisting of voltage drop $\Delta E=3.8-Eo$ and $Rc=\Delta E/(10\ C$ (current value A) when the voltage at a discharge time of 0 seconds, obtained by extrapolating by linear approximation from the voltages at discharge times of 2 seconds and 4 seconds in the discharging curve, is defined as Eo.

[High-Temperature Storage Test]

In the present description, the amount of gas generated during a high-temperature storage test and the ratio of the increase in room-temperature internal resistance after a high-temperature storage test are measured according to the methods indicated below.

First, a cell corresponding to the nonaqueous lithium-type power storage element is subjected to constant current charging up to 4.0 V at a current value of 100 C in a thermostatic chamber set to 25° C., followed by carrying out constant voltage charging for 10 minutes by applying a constant voltage of 4.0 V. Subsequently, the cell is stored in an environment at 60° C., removed from the 60° C. environment every 2 weeks and then charged up to a cell voltage of 4.0 V using the aforementioned charging process followed by again storing the cell in an environment at 60° C. This process is repeated and cell volume Va prior to the start of storage and cell volume Vb after conducting the storage test for 2 months are measured according to the Archimedes method. Vb−Va is taken to be the amount of gas generated when the cell is stored for 2 months at a cell voltage of 4.0 V and ambient temperature of 60° C.

When the resistance value of the cell following the aforementioned high-temperature storage test obtained using the same measurement method as that used to measure room-temperature internal resistance as previously described is defined as post-high-temperature storage test room-temperature internal resistance Rb, the ratio of the increase in room-temperature internal resistance after the high-temperature storage test to the room-temperature internal resistance Ra prior to the start of the high-temperature storage test is determined according to Rb/Ra.

[Overcharging Test]

In the present description, the overcharging test is carried out measuring according to the method indicated below.

First, thermocouples are attached to the negative electrode terminal, positive electrode terminal and center of the casing of a cell corresponding to the nonaqueous lithium-type power storage element followed by subjecting the cell to constant current charging up to 4.0 V at a current value of 20 C in a thermostatic chamber set to 25° C., followed by carrying out constant voltage charging for 10 minutes by applying a constant voltage of 4.0 V. Subsequently, charging is continued until the cell voltage at a current value of 20 C reaches 8.0 V or until the charging capacity reaches twice the discharge capacity when discharge capacity from 4.0 V to 2.0 V is defined as Fa (namely, 2×Fa/3600 (Ah)). Voltage and temperature are preferably sampled at 1 second intervals or less during the overcharging test. Following completion of charging, the maximum attainable temperature of the negative electrode terminal and the status of the nonaqueous lithium power storage element are observed.

In the present description, combustion is defined as the state in which the nonaqueous lithium power storage element has burned out, rupture is defined as the state in which a portion or all of the casing of the nonaqueous lithium power storage element has been damaged causing a portion or all of the electrode laminated body to protrude from the casing, cleavage refers to the state in which a portion of the casing of the nonaqueous lithium power storage element has been damaged with the electrode laminated body remaining within the casing (although the nonaqueous electrolytic solution is permitted to flow to the outside from the damaged location of the casing), and no change is defined as the state in which there is no damage to the casing (although the casing may be swollen due to generation of gas).

The nonaqueous lithium-type power storage element in the first to fourth aspects of the present invention preferably simultaneously satisfies the following requirements when the initial room-temperature resistance is defined as Ra ($\Omega$), electrostatic capacitance is defined as F (F), electrical energy is defined as E (Wh) and volume of the power storage element is defined as V (L):

(a) the product Ra·F of Ra and F is 0.3 to 3.0, and
(b) E/V is 15 to 50.

With regard to requirement (a), Ra·F is preferably 3.0 or less, more preferably 2.6 or less and even more preferably 2.4 or less from the viewpoint of demonstrating adequate charging capacity and discharging capacity with respect to large current. If Ra·F is equal to or less than the aforementioned upper limit value, a nonaqueous lithium-type power storage element can be obtained that has superior input-output characteristics. Consequently, when a power storage system using the nonaqueous lithium-type power storage element is combined with a highly efficient engine and the like, the power storage system is able to adequately withstand high loads applied to the nonaqueous lithium-type power storage element, thereby making this preferable.

With regard to requirement (b), E/V is preferably 15 or more, more preferably 18 or more and even more preferably 20 or more from the viewpoint of demonstrating adequate charging capacity and discharging capacity. If E/V is equal to or greater than the aforementioned lower limit value, a power storage element can be obtained that has superior volumetric energy density. Consequently, in the case of using a power storage system using the nonaqueous lithium-type power storage element by combining with an automobile engine, for example, the power storage system can be installed in a limited confined space within the automobile, thereby making this preferable.

The nonaqueous lithium-type power storage element in the first to fourth aspects of the present invention preferably simultaneously satisfies the following requirements (c) and (d) when the initial room-temperature resistance is defined as Ra ($\Omega$), electrostatic capacitance is defined as F (F), internal resistance at 25° C. after storing for 2 months at a cell voltage of 4 V and ambient temperature of 60° C. is defined as Rb ($\Omega$), and internal resistance at an ambient temperature of −30° C. is defined as Rc:

(c): Rb/Ra is 0.3 to 3.0, and (d) the amount of gas generated when stored for 2 months at a cell voltage of 4 V and ambient temperature of 60° C. is $30 \times 10^{-3}$ cc/F or less at 25° C.

In addition, in the first to third aspects, the aforementioned requirements (c) and (d) as well as the following requirement (e) are more preferably simultaneously satisfied:

(e) Rc/Ra is 30 or less.

With regard to requirement (c), Rb/Ra is preferably 3.0 or less, more preferably 2.0 or less and even more preferably 1.5 or less from the viewpoint of demonstrating adequate charging capacity and discharging capacity with respect to large current in the case of being exposed to a high-temperature environment for a long period of time. If Ra/Rb is equal to or less than the aforementioned upper limit value, device service life is prolonged since superior output characteristics can be stably obtained over a long period of time.

With respect to requirement (d), the amount of gas generated when stored for 2 months at a cell voltage of 4.0 V and ambient temperature of 60° C. when measured at 25° C. is preferably $30 \times 10^{-3}$ cc/F or less, more preferably $20 \times 10^{-3}$ cc/F or less, and even more preferably $15 \times 10^{-3}$ cc/F or less from the viewpoint of preventing decreases in element characteristics caused by generated gas. If the amount of gas generated under the aforementioned conditions is equal to or less than the aforementioned upper limit value, there is no risk of swelling of the cell due to generation of gas even in the case of a device being exposed to high temperatures for a long period of time. Consequently, a power storage element can be obtained that has adequate stability and durability.

With respect to requirement (e), Rc/Ra is preferably 30 or less, more preferably 26 or less and even more preferably 22 or less from the viewpoint of demonstrating adequate charging capacity and discharging capacity even in a low-temperature environment of −30° C. If Rc/Ra is equal to or less than the aforementioned upper limit value, a power storage element can be obtained that has superior output characteristics in a low-temperature environment. Consequently, a power storage element can be obtained that is capable of providing adequate electrical power for driving a motor when starting the engine of an automobile or motorcycle and the like in a low-temperature environment.

EXAMPLES

Although the following provides a detailed explanation of the present invention using examples and comparative examples, the present invention is not limited thereto.

First Embodiment

The following provides an explanation of Examples 1 to 28 and Comparative Examples 1 to 16 as embodiments of the first embodiment of the present invention.

Example 1

<Crushing of Lithium Carbonate>

200 g of lithium carbonate having an average particle diameter of 53 μm were crushed for 9 minutes at a peripheral velocity of 10.0 μm/s with dry ice beads after cooling to −196° C. with liquid nitrogen using a crusher manufactured by Aimex Co., Ltd. (Model LNM liquid nitrogen bead mill). Determination of the charged lithium carbonate particle diameter by measuring the average particle diameter for lithium carbonate obtained by brittle fracturing while preventing thermal deformation at −196° C. yielded a value of 2.0 μm.

<Preparation of Positive Electrode Active Material>

[Preparation of Positive Electrode Active Material A]

A carbide was obtained by subjecting crushed coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/hr while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., crushing was carried out for 1 hour with a ball mill to obtain Activated Carbon A.

Measurement of average particle diameter of this Activated Carbon A using a laser diffraction-type particle size distribution measurement apparatus (SALD-2000) manufactured by Shimadzu Corp. yielded a value of 4.2 μm. In addition, pore size distribution was measured using a pore size distribution measurement apparatus (AUTOSORB-1 AS-1-MP) manufactured by Yuasa Ionics Co., Ltd. As a result, BET specific surface area was 2360 m²/g, mesopore volume (V1) was 0.52 cc/g, micropore volume (V2) was 0.88 cc/g, and V1/V2=0.59.

[Preparation of Positive Electrode Active Material B]

A carbide having an average particle diameter of 7 μm was obtained by carrying out carbonization treatment on a phenol resin for 2 hours at 600° C. in a firing furnace in a nitrogen atmosphere followed by crushing with a ball mill and classification. KOH was mixed with this carbide at a weight ratio of 1:5 followed by activating by heating for 1 hour at 800° C. in the firing furnace in a nitrogen atmosphere. Subsequently, after washing by stirring for 1 hour in dilute hydrochloric acid adjusted to 2 mol/L, the carbide was washed by boiling in distilled water until the pH stabilized between 5 and 6 and then dried to obtain Activated Carbon B.

Pore size distribution of this Activated Carbon B was measured using a pore size distribution measurement apparatus (AUTOSORB-1 AS-1-MP) manufactured by Yuasa Ionics Co., Ltd. As a result, BET specific surface area was 3627 m$^2$/g, mesopore volume (V1) was 1.50 cc/g, micropore volume (V2) was 2.28 cc/g, and V1/V2=0.66.

<Production of Positive Electrode Precursor A>

A positive electrode precursor was produced using the Activated Carbon A obtained in the manner described above for the positive electrode active material. 42.4 parts by weight of Activated Carbon A, 45.1 parts by weight of a lithium compound in the form of lithium carbonate having an average particle diameter of 2.0 μm, 3.0 parts by weight of Ketjen black (KB), 1.5 parts by weight of polyvinylpyrrolidone (PVP), 8.0 parts by weight of polyvinylidene fluoride (PVDF) and N-methylpyrrolidone (NMP) were mixed followed by dispersing under conditions of a peripheral velocity of 17 μm/s using the FILMIX® thin film rotating-type high-speed mixer manufactured by Primix Corp. to obtain a coating solution. The viscosity (ηb) and Ti value of the resulting coating solution were measured using the TVE-35H E-type viscometer manufactured by Toki Sangyo Co., Ltd. As a result, viscosity (ηb) was 2,700 mPa·s and the Ti value was 3.5. In addition, dispersity of the resulting coating solution was measured using a particle gauge manufactured by Yoshimitsu Seiki Co., Ltd. As a result, dispersity was 35 μm. The coating solution was coated onto one side or both sides of aluminum foil having a thickness of 15 μm under conditions of a coating speed of 1 μm/s using a die coater manufactured by Toray Engineering Co., Ltd followed by drying at a drying temperature of 100° C. to obtain a positive electrode precursor. The resulting positive electrode precursor was pressed under conditions of a pressure of 4 kN/cm and pressed surface temperature of 25° C. using a roll press. The film thickness of the positive electrode active material layer of the positive electrode precursor obtained as described above was determined by subtracting the thickness of the aluminum foil from the average value of thickness of the positive electrode precursor measured at ten arbitrary locations using the GS-551 Linear Gauge Sensor film thickness gauge manufactured by Ono Sokki Co., Ltd. As a result, film thickness of the positive electrode active material layer was 60 μm per side.

In the following descriptions, a single-sided positive electrode precursor and double-sided positive electrode precursor using Activated Carbon A are respectively referred to as Single-Sided Positive Electrode Precursor A and Double-Sided Positive Electrode Precursor A (collectively referred to as "Positive Electrode Precursor A"). A single-sided positive electrode precursor and double-sided positive electrode precursor using Activated Carbon B are respectively referred to as Single-Sided Positive Electrode Precursor B and Double-Sided Positive Electrode Precursor B (collectively referred to as "Positive Electrode Precursor B").

<Preparation of Negative Electrode Active Material>

[Preparation of Active Material A]

150 g of commercially available coconut shell activated carbon having an average particle diameter of 3.0 μm and BET specific surface area of 1,780 m$^2$/g were placed in a stainless steel mesh cage, the cage was placed on a stainless steel tray containing 270 g of coal-based pitch (softening point: 50° C.), and both the cage and tray were installed in an electric furnace (effective internal furnace dimensions: 300 mm×300 mm×300 mm) and subjected to a thermal reaction to obtain Active Material A. This heat treatment was carried out in a nitrogen atmosphere according to a method consisting of raising the temperature to 600° C. for 8 hours and holding at the same temperature for 4 hours. Continuing, after allowing to cool naturally to 60° C., the Composite Carbon Material A was removed from the furnace.

The resulting Composite Carbon Material A was measured for average particle diameter and BET specific surface area using the same methods as previously described. As a result, average particle diameter was 3.2 μm and BET specific surface area was 262 m$^2$/g. The weight ratio of the coal-based pitch-derived carbonaceous material to the activated carbon was 78%.

<Production of Negative Electrode A>

Next, a negative electrode was produced using the Composite Carbon Material A for the negative electrode active material.

85 parts by weight of Composite Carbon Material A, 10 parts by weight of acetylene black, 5 parts by weight of polyvinylidene fluoride (PVdF) and N-methylpyrrolidone (NMP) were mixed followed by dispersing under conditions of a peripheral velocity of 15 μm/s using the FILMIX® thin film spin system high-speed mixer manufactured by Primix Corp. to obtain a coating solution. The viscosity (ηb) and Ti value of the resulting coating solution were measured using the TVE-35H E-type viscometer manufactured by Toki Sangyo Co., Ltd. As a result, viscosity (ηb) was 2,789 mPa·s and the Ti value was 4.3. The aforementioned coating solution was coated under conditions of a coating speed of 1 μm/s onto both sides of electrolytic copper foil having a thickness of 10 μm and free of through holes using a die coater manufactured by Toray Engineering Co., Ltd. followed by drying at a drying temperature of 85° C. to obtain Negative Electrode A. The resulting Negative Electrode A was pressed under conditions of a pressure of 4 kN/cm and pressed surface temperature of 25° C. using a roll press. The film thickness of the negative electrode active material layer of the Negative Electrode A obtained as described above was determined by subtracting the thickness of the copper foil from the average value of thickness of the Negative Electrode A measured at ten arbitrary locations using the GS-551 Linear Gauge Sensor film thickness gauge manufactured by Ono Sokki Co., Ltd. As a result, film thickness of the negative electrode active material layer of Negative Electrode A was 40 μm per side.

[Preparation of Active Material B]

Active Material B (Composite Carbon Material B) was produced and evaluated in the same manner as preparation of Active Material A with the exception of using artificial graphite having an average particle diameter of 4.9 μm instead of Composite Carbon Material A for the base material, changing the amount of coal-based pitch used to 50 g, and further changing the heat treatment temperature to 1000° C. As a result, BET specific surface area of Composite Carbon Material B was 6.1 m$^2$/g. The weight ratio of the coal-based pitch-derived carbonaceous material to the artificial graphite was 2%.

<Production of Negative Electrode B>

A negative electrode was produced using the Composite Carbon Material B obtained in the manner described above for the negative electrode active material. 80 parts by weight of Composite Carbon Material B, 8 parts by weight of acetylene black, 12 parts by weight of polyvinylidene fluoride (PVdF) and N-methylpyrrolidone (NMP) were mixed followed by dispersing under conditions of a peripheral velocity of 15 μm/s using the FILMIX® thin film spin system high-speed mixer manufactured by Primix Corp. to obtain a coating solution. The viscosity (ηb) and Ti value of the resulting coating solution were measured using the TVE-35H E-type viscometer manufactured by Toki Sangyo Co., Ltd. As a result, viscosity (ηb) was 2,798 mPa·s and the Ti value was 2.7. The aforementioned coating solution was coated under conditions of a coating speed of 1 μm/s onto both sides of electrolytic copper foil having a thickness of 10 μm and free of through holes using a die coater manufactured by Toray Engineering Co., Ltd. followed by drying at a drying temperature of 85° C. to obtain a negative electrode. The resulting negative electrode was pressed under conditions of a pressure of 4 kN/cm and pressed surface temperature of 25° C. using a roll press. The film thickness of the negative electrode active material layer of the negative electrode obtained as described above was determined by subtracting the thickness of the copper foil from the average value of thickness of the negative electrode measured at ten arbitrary locations using the GS-551 Linear Gauge Sensor film thickness gauge manufactured by Ono Sokki Co., Ltd. As a result, film thickness of the positive electrode active material layer was 25 μm per side.

<Preparation of Electrolytic Solution>

A solution obtained by using an organic solvent in the form of a mixed solvent of ethylene carbonate (EC) and methyl ethyl carbonate (EMC) at a ratio (weight ratio) of 33:67 and dissolving electrolyte salts respectively consisting of $LiN(SO_2F)_2$ and $LiPF_6$ at a concentration ratio of 75:25 (molar ratio) and a total concentration of $LiN(SO_2F)_2$ and $LiPF_6$ of 1.2 mol/L, in the entire nonaqueous electrolytic solution was used as a nonaqueous electrolytic solution.

The concentrations of $LiN(SO_2F)_2$ and $LiPF_6$ in the prepared nonaqueous electrolytic solution were 0.9 mol/L and 0.3 mol/L, respectively.

<Assembly of Power Storage Element>

The resulting Double-Sided Negative Electrode A and Double-Sided Positive Electrode Precursor A were cut to a size of 10 cm×10 cm (100 cm²). A single-sided positive electrode precursor was used on the uppermost side and lowermost side, and microporous film separators having a thickness of 15 μm were laminated interposed between the negative electrode and positive electrode precursor using 21 sheets of the double-sided negative electrode and 20 sheets of the double-sided positive electrode precursor. Subsequently, the negative electrode and positive electrode precursor were respectively connected to a negative electrode terminal and positive electrode terminal by ultrasonic welding to obtain an electrode laminated body. This electrode laminated body was vacuum-dried for 60 hours at 80° C. and 50 Pa. This electrode laminated body was then inserted into a casing composed of a laminated film in a dry atmosphere having a dew point of −45° C. followed by heat sealing the casing of the electrode terminal portion and bottom portion on three sides at 180° C. and 1.0 MPa for 20 seconds. The nonaqueous electrolytic solution was injected followed by sealing the casing to assemble a nonaqueous lithium-type power storage element.

<Power Storage Element Solution Injection, Impregnation and Sealing Steps>

Approximately 80 g of the aforementioned nonaqueous electrolytic solution were injected under atmospheric pressure into the electrode laminated body housed in an aluminum laminated film in a dry air environment at a temperature of 25° C. and dew point of −40° C. or lower. Continuing, the aforementioned nonaqueous lithium-type power storage element was placed in a pressure reduction chamber and the pressure was reduced from normal pressure to −87 kPa followed by returning to atmospheric pressure and allowing to stand undisturbed for 5 minutes. Subsequently, a step consisting of reducing pressure from normal pressure to −87 kPa and then returning to atmospheric pressure was repeated four times followed by allowing to stand undisturbed for 15 minutes. Moreover, pressure was again reduced from normal pressure to −91 kPa followed by returning to normal pressure. The aforementioned step of reducing pressure followed by returning to normal pressure was repeated a total of seven times (while reducing pressure to −95 kPa, −96 kPa, −97 kPa, −81 kPa, −97 kPa, −97 kPa and −97 kPa each time). The nonaqueous electrolytic solution was impregnated in the electrode laminated body according to the aforementioned process.

Subsequently, the nonaqueous lithium-type power storage element was placed in a reduced-pressure sealing machine and sealed for 10 seconds at 180° C. and pressure of 0.1 MPa while reducing the pressure in the machine to −95 kPa to seal the aluminum laminated film.

<Lithium Doping Step>

After carrying out constant current charging on the resulting nonaqueous lithium-type power storage element until the voltage reached 4.6 V in an environment at 25° C. and current value of 0.7 A using a charging and discharging apparatus (TOSCAT-3100U) manufactured by Toyo System Co., Ltd., initial charging was then carried out according to a procedure consisting of continuing constant voltage charging at 4.5 V for 72 hours to dope the negative electrode with lithium.

<Aging Step>

After carrying out constant current discharging on the lithium-doped nonaqueous lithium-type power storage element at 0.7 A in an environment at 25° C. until the voltage reached 3.0 V, the voltage was adjusted to 3.0 V by carrying out constant current discharging at 3.0 V for 1 hour. Continuing, the nonaqueous lithium-type power storage element was stored for 48 hours in a thermostatic chamber at 60° C.

<Gas Venting Step>

A portion of the aluminum laminated film of the nonaqueous lithium-type power storage element was opened after aging in a dry air environment at a temperature of 25° C. and dew point of −40° C. Continuing, the aforementioned nonaqueous lithium-type power storage device was placed in a pressure reduction chamber, and after reducing pressure from atmospheric pressure to −80 kPa over the course of 3 minutes using a diaphragm pump (N816.3KT.45.18) manufactured by KNF Japan Co., Ltd., pressure was returned to atmospheric pressure over the course of 3 minutes, and this step was repeated a total of three times. Subsequently, the nonaqueous lithium-type power storage element was placed in a pressure reduction chamber and pressure was reduced to −90 kPa followed by sealing for 10 seconds at 200° C. and pressure of 0.1 MPa to seal the aluminum laminated film.

<Analysis of Positive Electrode Active Material Layer>

After adjusting the voltage of the completed nonaqueous lithium-type power storage element to 2.9 V, the power storage device was disassembled in an Ar glovebox installed in a room at 23° C. and controlled to a dew point of −90° C. and oxygen concentration of 1 ppm or less followed by removal of the positive electrode. After washing the removed positive electrode by immersing in dimethyl carbonate (DMC), the positive electrode was vacuum-dried in a side box while maintaining prevention of exposure to the atmosphere.

Following drying, the positive electrode was transferred from the side box to an Ar glovebox while maintaining prevention of exposure to the atmosphere followed by extracting by immersing in heavy water to obtain a positive electrode extract. Analysis of the extract was carried out by (1) IC and (2) 1H-NMR, and the amount of each compound deposited on the positive electrode active material layer per unit weight of the positive electrode active material layer (mol/g) was determined using the following equation from the resulting concentration A of each compound present in the positive electrode extract (mol/ml), the volume B of distilled water used for extraction (ml), and the weight C of the positive electrode active material layer used in extraction.

Amount present per unit weight $(mol/g) = A \times B \div C$  [Math. 7]

Furthermore, the weight of the positive electrode active material layer used in extraction was determined according to the method indicated below.

The positive electrode active material layer remaining after heavy water extraction was scraped from the power collector of the positive electrode, and the scraped positive electrode active material layer was rinsed with water and vacuum-dried. The positive electrode active material layer obtained following vacuum drying was washed with NMP or DMF. Continuing, the resulting positive electrode active material layer was again vacuum-dried and then weighed to investigate the weight of the positive electrode active material layer used in extraction.

The following indicates the method used to analyze the extract.

(1) $CO_3^{2-}$ derived from $LiCO_3Li$ was detected by IC measurement (negative mode) of the positive electrode extract and the concentration A of $CO_3^{2-}$ was determined using the absolute calibration curve method.

(2) The same positive electrode extract as that used in (1) was placed in a 3 mm NMR tube (PN-002 manufactured by Shigemi Inc.) and then inserted into a 5 mm NMR tube (N-5 manufactured by Nihon Seimitsu Kagaku Co., Ltd.) filled with deuterated chloroform containing 1,2,4,5-tetrafluorobenzene followed by carrying out $^1$H-NMR according to the double tube method. Integration values observed for each compound were determined by using the 7.1 ppm (m, 2H) signal of 1,2,4,5-tetrafluorobenzene as a standard.

In addition, deuterated chloroform containing a known concentration of dimethylsulfoxide was placed in a 3 mm NMR tube (PN-002 manufactured by Shigemi Inc.) and then inserted into a 5 mm NMR tube (N-5 manufactured by Nihon Seimitsu Kagaku Co., Ltd.) filled with deuterated chloroform containing the same 1,2,4,5-tetrafluorobenzene as described above followed by carrying out 1H-NMR according to the double tube method. The integration value of the 2.6 ppm (s, 6H) signal of dimethylsulfoxide was determined using the 7.1 ppm (m, 2H) signal of 1,2,4,5-tetrafluorobenzene as a standard in the same manner as described above. The concentration A of each compound in the positive electrode extract was then determined from the relationship between integration values and the concentration of the dimethylsulfoxide used.

The $^1$H-NMR spectra were assigned in the manner indicated below.

[$XOCH_2CH_2OX$]
$CH_2$ of $XOCH_2CH_2OX$: 3.7 ppm (s, 4H)
$CH_3OX$: 3.3 ppm (s, 3H)
$CH_3$ of $CH_3CH_2OX$: 1.2 ppm (t, 3H)
$CH_2O$ of $CH_3CH_2OX$: 3.7 ppm (q, 2H)

As indicated above, since the $CH_2$ signal (3.7 ppm) of $XOCH_2CH_2OX$ ends up overlapping with the $CH_2O$ signal (3.7 ppm) of $CH_3CH_2OX$, the amount of $XOCH_2CH_2OX$ is determined by subtracting the portion equivalent to $CH_2$ of $CH_3CH_2OX$ calculated from the $CH_3$ signal (1.2 ppm) of $CH_3CH_2OX$.

In the above description, X respectively represents $-(COO)_nLi$ or $-(COO)_nR^1$ (wherein, n represents 0 or 1 and $R^1$ represents an alkyl group having 1 to 4 carbon atoms or halogenated alkyl group having 1 to 4 carbon atoms).

Based on the concentration of each compound in the extract as determined by the analyses of the aforementioned (1) and (2), the volume of heavy water used in extraction, and the weight of the positive electrode active material layer used in extraction, $XOCH_2CH_2OX$ was present at $291.0 \times 10^{-4}$ mol/g and $LiCO_3Li$ was present at $125.0 \times 10^{-4}$ mol/g in the aforementioned positive electrode active material layer.

[$^7$Li-Solid State NMR Measurement]

$^7$Li-solid state NMR measurement of the positive electrode active material layer was carried out for the positive electrode of the nonaqueous lithium-type power storage element obtained in the manner described above.

First, after charging the nonaqueous lithium-type power storage element fabricated in the manner described above at a constant current up to 2.9 V and current of 2 C at an ambient temperature of 25° C. using a charging and discharging apparatus (ACD-01) manufactured by Aska Electronic Co., Ltd., constant current, constant voltage charging was carried out for 2 hours by applying a voltage of 2.9 V.

Next, the positive electrode active material layer was collected in an argon atmosphere. The nonaqueous lithium-type power storage device was disassembled in an argon atmosphere followed by removal of the positive electrode. Continuing, the resulting positive electrode was immersed in diethyl carbonate for 2 minutes or more to remove lithium salt and the like. Immersion in diethyl carbonate was carried out under the same conditions one more time followed by air-drying. Subsequently, the positive electrode active material layer was collected from the positive electrode and weighed.

$^7$Li-solid state NMR measurement was carried out using the resulting positive electrode active material layer as a sample. NMR measurement was carried out using the ECA700 manufactured by JEOL Resonance Inc. (having an $^7$Li-NMR resonance frequency of 272.1 MHz) as the measuring apparatus in a room temperature environment according to the single pulse method using a magic-angle spinning speed of 14.5 kHz and an irradiation pulse width of 45°. A 1 mol/L aqueous lithium chloride solution was used for the shift reference, and a separately measured shift location was set to 0 ppm for use as an external standard. The sample was not spun during measurement of the aqueous lithium chloride solution, and measurements were carried out using the single pulse method using a 45° pulse for the irradiation pulse width. During measurement, repetitive wait time was set to 3000 seconds to ensure an adequate repetitive wait time between measurements.

Determination of the amount of lithium in the aforementioned positive electrode active material layer according to the aforementioned method using the $^7$Li-solid state NMR spectrum of the positive electrode active material layer obtained according to the method described above yielded a value of $293.8 \times 10^{-4}$ mol/g.

[Determination of Energy Density]

Constant current charging was carried out on the power storage element obtained according to the aforementioned process up to 3.8 V at current value of 2 C using a charging and discharging apparatus (5 V, 360 A) manufactured by Fujitsu Telecom Networks Ltd. in a thermostatic chamber at 25° C., followed by carrying out constant voltage charging for 30 minutes by applying a constant voltage of 3.8 V. Subsequently, determination of energy density according to E/V=F×(3.8²−2.2²)/2/3600 by defining capacitance during constant current discharging down to 2.2 V at a current value of 2 C as Q and using electrostatic capacitance F (F) determined according to F=Q/(3.8−2.2) yielded a value of 46.2 Wh/L.

[Determination of Ra·F]

The power storage element obtained according to the aforementioned process was charged at a constant current up to 3.8 V at a current value of 20 C using a charging and discharging apparatus (5 V, 360 Å) manufactured by Fujitsu Telecom Networks Ltd. in a thermostatic chamber at 25° C., followed by carrying out constant voltage charging for 30 minutes by applying a constant voltage of 3.8 V and carrying out constant current discharging down to 2.2 V at a current value of 20 C to obtain a discharging curve (time vs. voltage). Room-temperature internal resistance Ra was determined according to voltage drop ΔE=3.8−Eo and Ra=ΔE/(20 C (current value A) when the voltage at a discharge time of 0 seconds, obtained by extrapolating by linear approximation from the voltage values at discharge times of 2 seconds and 4 seconds in the discharging curve, was defined as Eo.

The product Ra·F of electrostatic capacitance F and internal resistance Ra at 25° C. was 1.90 ΩF.

[Determination of Rc/Ra]

After allowing the power storage element obtained according to the aforementioned process to stand for 2 hours in a thermostatic chamber set to −30° C., the power storage element was charged at a constant current up to 3.8 V at a current value of 1.0 C using a charging and discharging apparatus (5 V, 360 Å) manufactured by Fujitsu Telecom Networks Ltd. while holding the thermostatic chamber at −30° C., followed by charging at a constant voltage for a total of 2 hours by applying a constant voltage of 3.8 V. Continuing, constant current discharging was carried out down to 2.2 V at a current value of 120 C to obtain a discharging curve (time vs. voltage) followed by determining low-temperature internal resistance Rc according to the aforementioned method used to determine internal resistance.

The ratio Rc/Ra of internal resistance Rc at −30° C. to internal resistance Ra at 25° C. was 23.1.

[Amount of Gas Generated after High-Temperature Storage Test]

The power storage element obtained according to the aforementioned process was charged at a constant current up to 4.0 V at a current value of 100 C using a charging and discharging apparatus (5 V, 360 Å) manufactured by Fujitsu Telecom Networks Ltd. in a thermostatic chamber set to 25° C., followed by carrying out constant voltage charging for 10 minutes by applying a constant voltage of 4.0 V. Subsequently, the cell was stored in an environment at 60° C. and removed from the 60° C. environment every 2 weeks followed by similarly charging the cell voltage up to 4.0 V using the same charging process and again storing the cell in a 60° C. environment. This process was repeated for 2 months after which the cell volume Va before the start of the storage test and cell volume Vb obtained 2 months after the storage test were measured according to the Archimedes method. The amount of gas generated as determined from Vb−Va was $6.5 \times 10^{-3}$ cc/F.

[Determination of Rb/Ra]

Room-temperature internal resistance Rb after the high-temperature storage test was determined for the power storage element after undergoing the aforementioned high-temperature storage test in the same manner as in the aforementioned section entitled "Determination of Ra·F". The ratio Rb/Ra, determined by dividing this value of Rb (Ω) by internal resistance Ra, prior to the high-temperature storage test determined in the aforementioned section entitled "Determination of Ra·F" was 2.20.

Examples 2 to 28 and Comparative Examples 1 to 12

Nonaqueous lithium-type power storage elements were fabricated in the same manner as Example 1 and subjected to various evaluations with the exception of changing the negative electrode, positive electrode precursor active material, average particle diameter of the positive electrode precursor active material, lithium compound, lithium compound average particle diameter and composition ratio of the positive electrode precursor to that respectively shown in Table 1. Evaluation results are shown in Table 2.

TABLE 1

| | | Positive electrode | | | | | | | | |
|---|---|---|---|---|---|---|---|---|---|---|
| | | Active material | | Lithium compound | | Positive electrode precursor composite ratio | | | | |
| | Negative electrode | Type | Particle diameter (μm) | Type | Particle diameter (μm) | Active material (wt %) | Lithium compound (wt %) | KB (wt %) | PVP (wt %) | PVDF (wt %) |
| Ex. 1 | A | A | 4.2 | Lithium carbonate | 2 | 42.4 | 45.1 | 3.0 | 1.5 | 8.0 |
| Ex. 2 | A | A | 4.2 | Lithium carbonate | 2 | 57.5 | 30.0 | 3.0 | 1.5 | 8.0 |
| Ex. 3 | A | A | 4.2 | Lithium carbonate | 2 | 72.5 | 15.0 | 3.0 | 1.5 | 8.0 |
| Ex. 4 | A | A | 4.2 | Lithium carbonate | 2 | 79.5 | 8.0 | 3.0 | 1.5 | 8.0 |
| Ex. 5 | A | A | 4.2 | Lithium carbonate | 2 | 85.5 | 2.0 | 3.0 | 1.5 | 8.0 |
| Ex. 6 | A | A | 4.2 | Lithium carbonate | 3.5 | 57.5 | 30.0 | 3.0 | 1.5 | 8.0 |
| Ex. 7 | A | A | 4.2 | Lithium carbonate | 3.5 | 57.5 | 30.0 | 3.0 | 1.5 | 8.0 |
| Ex. 8 | B | A | 4.2 | Lithium carbonate | 2 | 42.4 | 45.1 | 3.0 | 1.5 | 8.0 |

TABLE 1-continued

| | | Positive electrode | | | | | | | |
|---|---|---|---|---|---|---|---|---|---|
| | | Active material | | Lithium compound | | Positive electrode precursor composite ratio | | | |
| | Negative electrode | Type | Particle diameter (μm) | Type | Particle diameter (μm) | Active material (wt %) | Lithium compound (wt %) | KB (wt %) | PVP (wt %) | PVDF (wt %) |
| Ex. 9 | B | A | 4.2 | Lithium carbonate | 2 | 57.5 | 30.0 | 3.0 | 1.5 | 8.0 |
| Ex. 10 | B | A | 4.2 | Lithium carbonate | 2 | 72.5 | 15.0 | 3.0 | 1.5 | 8.0 |
| Ex. 11 | B | A | 4.2 | Lithium carbonate | 2 | 79.5 | 8.0 | 3.0 | 1.5 | 8.0 |
| Ex. 12 | B | A | 4.2 | Lithium carbonate | 2 | 85.5 | 2.0 | 3.0 | 1.5 | 8.0 |
| Ex. 13 | B | A | 4.2 | Lithium carbonate | 3.5 | 57.5 | 30.0 | 3.0 | 1.5 | 8.0 |
| Ex. 14 | B | A | 4.2 | Lithium oxide | 3.5 | 57.5 | 30.0 | 3.0 | 1.5 | 8.0 |
| Ex. 15 | A | B | 7 | Lithium carbonate | 2 | 40.4 | 45.1 | 3.0 | 1.5 | 10.0 |
| Ex. 16 | A | B | 7 | Lithium carbonate | 2 | 55.5 | 30.0 | 3.0 | 1.5 | 10.0 |
| Ex. 17 | A | B | 7 | Lithium carbonate | 2 | 72.5 | 15.0 | 3.0 | 1.5 | 8.0 |
| Ex. 18 | A | B | 7 | Lithium carbonate | 2 | 77.5 | 8.0 | 3.0 | 1.5 | 10.0 |
| Ex. 19 | A | B | 7 | Lithium carbonate | 2 | 85.5 | 2.0 | 3.0 | 1.5 | 8.0 |
| Ex. 20 | A | B | 7 | Lithium carbonate | 3.5 | 57.5 | 30.0 | 3.0 | 1.5 | 8.0 |
| Ex. 21 | A | B | 7 | Lithium oxide | 3.5 | 57.5 | 30.0 | 3.0 | 1.5 | 8.0 |
| Ex. 22 | B | B | 7 | Lithium carbonate | 2 | 40.4 | 45.1 | 3.0 | 1.5 | 10.0 |
| Ex. 23 | B | B | 7 | Lithium carbonate | 2 | 57.5 | 30.0 | 3.0 | 1.5 | 8.0 |
| Ex. 24 | B | B | 7 | Lithium carbonate | 2 | 72.5 | 15.0 | 3.0 | 1.5 | 8.0 |
| Ex. 25 | B | B | 7 | Lithium carbonate | 2 | 79.5 | 8.0 | 3.0 | 1.5 | 8.0 |
| Ex. 26 | B | B | 7 | Lithium carbonate | 2 | 85.5 | 2.0 | 3.0 | 1.5 | 8.0 |
| Ex. 27 | B | B | 7 | Lithium carbonate | 3.5 | 57.5 | 30.0 | 3.0 | 1.5 | 8.0 |
| Ex. 28 | B | B | 7 | Lithium oxide | 3.5 | 57.5 | 30.0 | 3.0 | 1.5 | 8.0 |
| Comp. Ex. 1 | A | A | 4.2 | Lithium carbonate | 2 | 34.5 | 53.0 | 3.0 | 1.5 | 8.0 |
| Comp. Ex. 2 | A | A | 4.2 | Lithium carbonate | 2 | 87.0 | 0.5 | 3.0 | 1.5 | 8.0 |
| Comp. Ex. 3 | A | A | 4.2 | Lithium carbonate | 6 | 57.5 | 30.0 | 3.0 | 1.5 | 8.0 |
| Comp. Ex. 4 | B | A | 4.2 | Lithium carbonate | 2 | 34.5 | 53.0 | 3.0 | 1.5 | 8.0 |
| Comp. Ex. 5 | B | A | 4.2 | Lithium carbonate | 2 | 87.0 | 0.5 | 3.0 | 1.5 | 8.0 |
| Comp. Ex. 6 | B | A | 4.2 | Lithium carbonate | 6 | 42.4 | 45.1 | 3.0 | 1.5 | 8.0 |
| Comp. Ex. 7 | A | B | 7 | Lithium carbonate | 2 | 34.5 | 53.0 | 3.0 | 1.5 | 8.0 |
| Comp. Ex. 8 | A | B | 7 | Lithium carbonate | 2 | 87.0 | 0.5 | 3.0 | 1.5 | 8.0 |
| Comp. Ex. 9 | A | B | 7 | Lithium carbonate | 8 | 42.4 | 45.1 | 3.0 | 1.5 | 8.0 |
| Comp. Ex. 10 | B | B | 7 | Lithium carbonate | 2 | 34.5 | 53.0 | 3.0 | 1.5 | 8.0 |
| Comp. Ex. 11 | B | B | 7 | Lithium carbonate | 2 | 87.0 | 0.5 | 3.0 | 1.5 | 8.0 |
| Comp. Ex. 12 | B | B | 7 | Lithium carbonate | 8 | 42.4 | 45.1 | 3.0 | 1.5 | 8.0 |

TABLE 2

| | Compounds in positive electrode active material layer | | Amount of | Evaluation results | | | | |
|---|---|---|---|---|---|---|---|---|
| | Total of | | Li in positive | Initial characteristics | | | 60° C. storage test | |
| | compounds of formulas (1)-(3) ($\times 10^{-4}$ mol/g) | Lithium Carbonate ($\times 10^{-4}$ mol/g) | electrode active material layer ($\times 10^{-4}$ mol/g) | Volumetric energy density E/V (Wh/L) | Initial constant Ra · F (ΩF) | Low-temp. resistance ratio Rc/Ra | Resistance increase ratio Rb/Ra | Amount of gas $\times 10^{-3}$ (cc/F) |
| Ex. 1 | 291.0 | 125.0 | 293.8 | 46.2 | 1.90 | 23.1 | 2.20 | 6.5 |
| Ex. 2 | 232.0 | 98.0 | 232.6 | 42.2 | 1.64 | 19.8 | 2.00 | 10.0 |
| Ex. 3 | 105.0 | 29.8 | 90.7 | 31.2 | 1.31 | 17.4 | 1.90 | 13.5 |
| Ex. 4 | 23.0 | 13.3 | 26.6 | 24.1 | 1.18 | 14.5 | 1.65 | 19.0 |
| Ex. 5 | 4.1 | 5.6 | 15.3 | 18.1 | 0.94 | 10.3 | 1.40 | 27.0 |
| Ex. 6 | 116.0 | 52.9 | 120.2 | 38.2 | 1.76 | 22.6 | 2.15 | 21.0 |
| Ex. 7 | 145.0 | 23.9 | 108.0 | 34.2 | 1.87 | 24.0 | 2.20 | 24.0 |
| Ex. 8 | 268.0 | 109.0 | 264.4 | 49.2 | 2.87 | 29.4 | 2.70 | 4.5 |
| Ex. 9 | 214 | 79 | 203.12 | 45.2 | 2.46 | 25.7 | 2.35 | 8 |
| Ex. 10 | 83.7 | 20.7 | 69.2 | 32.2 | 1.91 | 20.9 | 1.80 | 15.0 |
| Ex. 11 | 15.3 | 9.9 | 18.8 | 25.1 | 1.72 | 18.3 | 1.65 | 16.0 |
| Ex. 12 | 2.8 | 3.7 | 12.8 | 21.1 | 1.37 | 15.1 | 1.50 | 22.0 |
| Ex. 13 | 98.4 | 45.1 | 102.2 | 41.2 | 2.65 | 27.1 | 2.55 | 15.0 |
| Ex. 14 | 125.0 | 20.1 | 92.6 | 36.2 | 2.71 | 28.1 | 2.50 | 19.0 |
| Ex. 15 | 250.0 | 110.0 | 255.0 | 42.2 | 1.60 | 18.7 | 2.30 | 8.0 |
| Ex. 16 | 145.0 | 73.0 | 157.1 | 35.2 | 1.20 | 12.6 | 2.00 | 11.0 |
| Ex. 17 | 54.0 | 29.0 | 60.3 | 25.1 | 0.85 | 7.9 | 1.80 | 16.0 |
| Ex. 18 | 11.1 | 14.4 | 20.8 | 21.1 | 0.71 | 6.9 | 1.60 | 20.0 |
| Ex. 19 | 2.0 | 3.5 | 11.5 | 16.1 | 0.46 | 4.8 | 1.40 | 28.0 |
| Ex. 20 | 71.0 | 88.0 | 129.2 | 31.2 | 1.30 | 14.5 | 2.20 | 21.0 |
| Ex. 21 | 107.0 | 34.0 | 96.1 | 27.1 | 1.40 | 15.8 | 2.20 | 22.0 |
| Ex. 22 | 229.0 | 96.0 | 228.8 | 45.2 | 2.52 | 25.7 | 2.75 | 5.5 |
| Ex. 23 | 137.0 | 64.0 | 143.5 | 39.2 | 2.15 | 20.8 | 2.35 | 8.5 |
| Ex. 24 | 45.0 | 23.0 | 49.1 | 26.1 | 1.57 | 14.6 | 1.80 | 15.0 |
| Ex. 25 | 10.9 | 8.3 | 14.6 | 22.1 | 1.42 | 12.4 | 1.65 | 18.0 |
| Ex. 26 | 1.9 | 3.1 | 10.3 | 18.1 | 1.26 | 10.4 | 1.50 | 22.5 |
| Ex. 27 | 58.0 | 73.0 | 106.6 | 34.2 | 2.26 | 23.9 | 2.55 | 15.0 |
| Ex. 28 | 88.3 | 28.6 | 79.8 | 29.1 | 2.41 | 24.9 | 2.50 | 19.0 |
| Comp. Ex. 1 | 370.0 | 187.0 | 401.6 | 50.3 | 3.80 | 46.0 | 3.40 | 24.0 |
| Comp. Ex. 2 | 1.3 | 1.8 | 2.6 | 12.3 | 0.81 | 8.7 | 1.50 | 37.0 |
| Comp. Ex. 3 | 1.5 | 101.0 | 351.0 | 13.9 | 1.83 | 22.5 | 2.30 | 35.0 |
| Comp. Ex. 4 | 340.0 | 165.0 | 362.2 | 55.3 | 4.80 | 61.0 | 4.10 | 8.5 |
| Comp. Ex. 5 | 1.2 | 2.1 | 2.8 | 14.5 | 1.30 | 13.2 | 1.95 | 31.0 |
| Comp. Ex. 6 | 1.3 | 89.6 | 324.0 | 14.9 | 2.45 | 24.3 | 2.80 | 31.5 |
| Comp. Ex. 7 | 320.0 | 156.0 | 341.6 | 45.2 | 3.20 | 36.0 | 3.10 | 18.0 |
| Comp. Ex. 8 | 0.6 | 1.9 | 2.2 | 10.9 | 0.40 | 3.8 | 1.40 | 33.0 |
| Comp. Ex. 9 | 0.8 | 88.0 | 318.0 | 13.4 | 1.50 | 16.5 | 2.50 | 40.0 |
| Comp. Ex. 10 | 308.0 | 144.0 | 322.6 | 48.2 | 4.38 | 52.0 | 4.20 | 13.0 |
| Comp. Ex. 11 | 0.3 | 1.1 | 1.3 | 13.7 | 1.02 | 8.2 | 1.65 | 35.0 |
| Comp. Ex. 12 | 0.6 | 76.1 | 302.0 | 14.2 | 2.25 | 21.9 | 2.75 | 38.5 |

Comparative Example 13

<Production of Negative Electrode C>

Negative electrode C was produced using the same method as in the production of the aforementioned Negative Electrode A with the exception of using copper foil containing through holes and having a thickness of 15 μm for the negative electrode power collector. As a result, the film thickness per side of the negative electrode active material layer of Negative Electrode C was μm.

<Production of Negative Electrode D>

Negative electrode D was produced using the same method as in the production of the aforementioned Negative Electrode B with the exception of using copper foil containing through holes and having a thickness of 15 μm for the negative electrode power collector. As a result, the film thickness per side of the negative electrode active material layer of Negative Electrode D was 25 μm.

<Assembly of Power Storage Element>

Double-Sided Negative Electrode C and a double-side positive electrode precursor were cut to a size of 10 cm×10 cm (100 cm²). Lithium metal foil was attached to one side of the Double-Sided Negative Electrode C in an amount equivalent to 760 mAh/g per unit weight of Composite Porous Material A. A single-sided positive electrode precursor was used on the uppermost side and lowermost side, and microporous film separators having a thickness of 15 μm were laminated interposed between the negative electrode and positive electrode precursor using 21 sheets of the double-sided negative electrode that had undergone the aforementioned lithium foil attachment step and 20 sheets of the double-sided positive electrode precursor. Subsequently, the negative electrode and positive electrode precursor were respectively connected to a negative electrode terminal and positive electrode terminal by ultrasonic welding to obtain an electrode laminated body. This electrode laminated body was vacuum-dried for 60 hours at 80° C. and 50 Pa. This electrode laminated body was then inserted into a casing composed of a laminated film in a dry atmosphere having a dew point of −45° C. followed by heat sealing the casing of the electrode terminal portion and bottom portion on three sides at 180° C. and 1.0 MPa for 20 seconds. The nonaqueous electrolytic solution was injected followed by sealing the casing to assemble a nonaqueous lithium-type power storage element.

<Lithium Doping Step>

The negative electrode was doped with lithium by allowing the resulting nonaqueous lithium-type power storage element to stand for 21 hours in a thermostatic chamber set to 45° C.

<Aging Step>

After adjusting the cell voltage of the lithium-doped nonaqueous lithium-type power storage element to 3.0 V, the power storage element was stored for 24 hours in a thermostatic chamber set to 45° C. Continuing, a charging and discharging cycle, consisting of constant current charging and constant current discharging between a lower limit voltage of 2.0 V and upper limit voltage of 4.0 V at a charging current of 10 A and discharging current of 10 A using a charging and discharging apparatus manufactured by Aska Electronic Co., Ltd., was repeated twice.

A nonaqueous lithium-type power storage element was fabricated and various evaluations were carried out in the same manner as Example 1 with the exception of changing the power storage element assembly, lithium doping step and aging step to the methods described above.

The evaluation results are shown in Table 4.

Comparative Examples 14 to 16

Nonaqueous lithium-type power storage elements were fabricated and various evaluations were carried out in the same manner as Example 1 with the exception of respectively changing the negative electrode, positive electrode precursor active material, active material particle diameter, lithium compound, lithium compound particle diameter and composite ratio of the positive electrode precursor of the aforementioned Comparative Example 13 to that described in Table 3.

The evaluation results are shown in Table 4.

Second Embodiment

The following provides an explanation of Examples 29 to 56 and Comparative Examples 17 to 32 as embodiments of the second aspect of the present invention.

Examples 29 to 56 and Comparative Examples 17 to 28

<Lithium Doping Step>

After carrying out constant current charging on the resulting nonaqueous lithium-type power storage element until the voltage reached 4.5 V in an environment at 25° C. and current value of 0.5 A using a charging and discharging apparatus (TOSCAT-3100U) manufactured by Toyo System Co., Ltd., initial charging was then carried out according to a procedure consisting of continuing constant voltage charging at 4.5 V for 50 hours to dope the negative electrode with lithium.

<Aging Step>

After carrying out constant current discharging on the lithium-doped nonaqueous lithium-type power storage element at 0.5 A in an environment at 25° C. until the voltage reached 4.0 V, the voltage was adjusted to 3.0 V by carrying out constant current discharging at 4.0 V for 1 hour. Continuing, the nonaqueous lithium-type power storage element was stored for 48 hours in a thermostatic chamber at 60° C.

<Quantification of Lithium Fluoride>

After adjusting the voltage of the completed nonaqueous lithium-type power storage element to 2.9 V, a positive electrode extract was obtained in the same manner as Example 1. The following indicates the method used to analyze the extract.

TABLE 3

| | Negative electrode | Positive electrode | | | | Positive electrode precursor composite ratio | | | | |
| --- | --- | --- | --- | --- | --- | --- | --- | --- | --- | --- |
| | | Active material | | Lithium compound | | | | | | |
| | | Type | Particle diameter (µm) | Type | Particle diameter (µm) | Active material (wt %) | Lithium compound (wt %) | KB (wt %) | PVP (wt %) | PVDF (wt %) |
| Comp. Ex. 13 | C | A | 4.2 | Not present | | 87.5 | 0.0 | 3.0 | 1.5 | 8.0 |
| Comp. Ex. 14 | D | A | 4.2 | Not present | | 87.5 | 0.0 | 3.0 | 1.5 | 8.0 |
| Comp. Ex. 15 | C | B | 7 | Not present | | 87.5 | 0.0 | 3.0 | 1.5 | 8.0 |
| Comp. Ex. 16 | D | B | 7 | Not present | | 87.5 | 0.0 | 3.0 | 1.5 | 8.0 |

TABLE 4

| | Compounds in positive electrode active material layer | | Amount of Li in positive electrode active material layer ($\times 10^{-4}$ mol/g) | Evaluation results | | | | |
| --- | --- | --- | --- | --- | --- | --- | --- | --- |
| | | | | Initial characteristics | | | 60° C. storage test | |
| | Total of compounds of formulas (1)-(3) ($\times 10^{-4}$ mol/g) | Lithium Carbonate ($\times 10^{-4}$ mol/g) | | Volumetric energy density E/V (Wh/L) | Initial constant Ra · F (ΩF) | Low-temp. resistance ratio Rc/Ra | Resistance increase ratio Rb/Ra | gas × $10^{-3}$ (cc/F) |
| Comp. Ex. 13 | 1.0 | 2.1 | 2.7 | 8.5 | 0.90 | 9.5 | 1.55 | 41.0 |
| Comp. Ex. 14 | 0.5 | 0.8 | 1.1 | 10.9 | 1.25 | 13.4 | 1.80 | 34.0 |
| Comp. Ex. 15 | 0.7 | 1.5 | 1.9 | 6.5 | 0.43 | 4.5 | 1.40 | 45.0 |
| Comp. Ex. 16 | 0.3 | 0.5 | 0.7 | 8.1 | 1.12 | 11.8 | 1.65 | 39.0 |

(1) F⁻ derived from LiF was detected by IC measurement (negative mode) of the positive electrode extract and the concentration A of F⁻ was determined using the absolute calibration curve method.

(2) F⁻ derived from LiF can also be quantified by 19F-NMR.

The positive electrode extract was placed in a 3 mm NMR tube (PN-002 manufactured by Shigemi Inc.) and then inserted into a 5 mm NMR tube (N-5 manufactured by Nihon Seimitsu Kagaku Co., Ltd.) filled with deuterated chloroform containing 1,2,4,5-tetrafluorobenzene followed by carrying out $^{19}$F-NMR according to the double tube method. The integration value of F⁻ observed at −127 ppm was normalized by using the −142 ppm (4F) signal of 1,2,4,5-tetrafluorobenzene as a standard.

In addition, deuterated chloroform containing a known concentration of $C_6F_6$ was placed in a 3 mmφ NMR tube (PN-002 manufactured by Shigemi Inc.) and then inserted into a 5 mmφ NMR tube (N-5 manufactured by Nihon Seimitsu Kagaku Co., Ltd.) filled with deuterated chloroform containing the same 1,2,4,5-tetrafluorobenzene as described above followed by carrying out 19F⁻ NMR according to the double tube method. The integration value of the −161 ppm (6F) signal of $C_6F_6$ was determined using the −142 ppm (4F) signal of 1,2,4,5-tetrafluorobenzene as a standard in the same manner as described above. The concentration A of F⁻ in the positive electrode extract was then determined from the relationship between the concentration of $C_6F_6$ used and integration values.

The amount of lithium fluoride contained in the positive electrode active material layer was quantified based on the concentration of each compound in the extract, the volume of heavy water used in extraction, and the weight of the positive electrode active material used in extraction determined from the analyses of the aforementioned (1) and (2). The evaluation results are shown in Table 6.

Nonaqueous lithium-type power storage elements were fabricated and various evaluations were carried out in the same manner as Example 1 with the exception of using the aforementioned methods for the lithium doping step, aging step and lithium fluoride quantification, and changing the negative electrode, positive electrode precursor active material, average particle diameter of the positive electrode precursor active material, lithium compound, lithium compound average particle diameter and composite ratio of the positive electrode precursor to that respectively shown in Table 5.

Evaluation results are shown in Table 6.

TABLE 5

| | | Active material | | Lithium compound | | Positive electrode precursor composite ratio | | | | |
|---|---|---|---|---|---|---|---|---|---|---|
| | Negative electrode | Type | Particle diameter (μm) | Type | Particle diameter (μm) | Active material (wt %) | Lithium compound (wt %) | KB (wt %) | PVP (wt %) | PVDF (wt %) |
| Ex. 29 | A | A | 4.2 | Lithium carbonate | 2 | 42.4 | 45.1 | 3.0 | 1.5 | 8.0 |
| Ex. 30 | A | A | 4.2 | Lithium carbonate | 2 | 57.5 | 30.0 | 3.0 | 1.5 | 8.0 |
| Ex. 31 | A | A | 4.2 | Lithium carbonate | 2 | 72.5 | 15.0 | 3.0 | 1.5 | 8.0 |
| Ex. 32 | A | A | 4.2 | Lithium carbonate | 2 | 79.5 | 8.0 | 3.0 | 1.5 | 8.0 |
| Ex. 33 | A | A | 4.2 | Lithium carbonate | 2 | 85.5 | 2.0 | 3.0 | 1.5 | 8.0 |
| Ex. 34 | A | A | 4.2 | Lithium carbonate | 3.5 | 57.5 | 30.0 | 3.0 | 1.5 | 8.0 |
| Ex. 35 | A | A | 4.2 | Lithium oxide | 3.5 | 57.5 | 30.0 | 3.0 | 1.5 | 8.0 |
| Ex. 36 | B | A | 4.2 | Lithium carbonate | 2 | 42.4 | 45.1 | 3.0 | 1.5 | 8.0 |
| Ex. 37 | B | A | 4.2 | Lithium carbonate | 2 | 57.5 | 30.0 | 3.0 | 1.5 | 8.0 |
| Ex. 38 | B | A | 4.2 | Lithium carbonate | 2 | 72.5 | 15.0 | 3.0 | 1.5 | 8.0 |
| Ex. 39 | B | A | 4.2 | Lithium carbonate | 2 | 79.5 | 8.0 | 3.0 | 1.5 | 8.0 |
| Ex. 40 | B | A | 4.2 | Lithium carbonate | 2 | 85.5 | 2.0 | 3.0 | 1.5 | 8.0 |
| Ex. 41 | B | A | 4.2 | Lithium carbonate | 3.5 | 57.5 | 30.0 | 3.0 | 1.5 | 8.0 |
| Ex. 42 | B | A | 4.2 | Lithium oxide | 3.5 | 57.5 | 30.0 | 3.0 | 1.5 | 8.0 |
| Ex. 43 | A | B | 7 | Lithium carbonate | 2 | 40.4 | 45.1 | 3.0 | 1.5 | 10.0 |
| Ex. 44 | A | B | 7 | Lithium carbonate | 2 | 55.5 | 30.0 | 3.0 | 1.5 | 10.0 |
| Ex. 45 | A | B | 7 | Lithium carbonate | 2 | 72.5 | 15.0 | 3.0 | 1.5 | 8.0 |
| Ex. 46 | A | B | 7 | Lithium carbonate | 2 | 77.5 | 8.0 | 3.0 | 1.5 | 10.0 |
| Ex. 47 | A | B | 7 | Lithium carbonate | 2 | 85.5 | 2.0 | 3.0 | 1.5 | 8.0 |
| Ex. 48 | A | B | 7 | Lithium carbonate | 3.5 | 57.5 | 30.0 | 3.0 | 1.5 | 8.0 |
| Ex. 49 | A | B | 7 | Lithium oxide | 3.5 | 57.5 | 30.0 | 3.0 | 1.5 | 8.0 |
| Ex. 50 | B | B | 7 | Lithium carbonate | 2 | 40.4 | 45.1 | 3.0 | 1.5 | 10.0 |
| Ex. 51 | B | B | 7 | Lithium carbonate | 2 | 57.5 | 30.0 | 3.0 | 1.5 | 8.0 |
| Ex. 52 | B | B | 7 | Lithium carbonate | 2 | 72.5 | 15.0 | 3.0 | 1.5 | 8.0 |
| Ex. 53 | B | B | 7 | Lithium carbonate | 2 | 79.5 | 8.0 | 3.0 | 1.5 | 8.0 |
| Ex. 54 | B | B | 7 | Lithium carbonate | 2 | 85.5 | 2.0 | 3.0 | 1.5 | 8.0 |
| Ex. 55 | B | B | 7 | Lithium carbonate | 3.5 | 57.5 | 30.0 | 3.0 | 1.5 | 8.0 |
| Ex. 56 | B | B | 7 | Lithium oxide | 3.5 | 57.5 | 30.0 | 3.0 | 1.5 | 8.0 |
| Comp. Ex. 17 | A | A | 4.2 | Lithium carbonate | 2 | 34.5 | 53.0 | 3.0 | 1.5 | 8.0 |
| Comp. Ex. 18 | A | A | 4.2 | Lithium carbonate | 2 | 87.0 | 0.5 | 3.0 | 1.5 | 8.0 |
| Comp. Ex. 19 | A | A | 4.2 | Lithium carbonate | 6 | 57.5 | 30.0 | 3.0 | 1.5 | 8.0 |
| Comp. Ex. 20 | B | A | 4.2 | Lithium carbonate | 2 | 34.5 | 53.0 | 3.0 | 1.5 | 8.0 |
| Comp. Ex. 21 | B | A | 4.2 | Lithium carbonate | 2 | 87.0 | 0.5 | 3.0 | 1.5 | 8.0 |
| Comp. Ex. 22 | B | A | 4.2 | Lithium carbonate | 6 | 42.4 | 45.1 | 3.0 | 1.5 | 8.0 |
| Comp. Ex. 23 | A | B | 7 | Lithium carbonate | 2 | 34.5 | 53.0 | 3.0 | 1.5 | 8.0 |
| Comp. Ex. 24 | A | B | 7 | Lithium carbonate | 2 | 87.0 | 0.5 | 3.0 | 1.5 | 8.0 |
| Comp. Ex. 25 | A | B | 7 | Lithium carbonate | 8 | 42.4 | 45.1 | 3.0 | 1.5 | 8.0 |
| Comp. Ex. 26 | B | B | 7 | Lithium carbonate | 2 | 34.5 | 53.0 | 3.0 | 1.5 | 8.0 |
| Comp. Ex. 27 | B | B | 7 | Lithium carbonate | 2 | 87.0 | 0.5 | 3.0 | 1.5 | 8.0 |
| Comp. Ex. 28 | B | B | 7 | Lithium carbonate | 8 | 42.4 | 45.1 | 3.0 | 1.5 | 8.0 |

TABLE 6

| | Compounds in positive electrode active material layer | | Amount of Li in positive electrode active material layer ($\times 10^{-4}$ mol/g) | Evaluation results | | | | |
|---|---|---|---|---|---|---|---|---|
| | | | | Initial characteristics | | | 60° C. storage test | |
| | Total of compounds of formulas (1)-(3) ($\times 10^{-4}$ mol/g) | Lithium Carbonate ($\times 10^{-4}$ mol/g) | | Volumetric energy density E/V (Wh/L) | Initial constant $Ra \cdot F$ ($\Omega F$) | Low-temp. resistance ratio $Rc/Ra$ | Resistance increase ratio $Rb/Ra$ | Amount of gas $\times 10^{-3}$ (cc/F) |
| Ex. 29 | 194.0 | 123.8 | 290.8 | 46.9 | 1.96 | 23.8 | 2.18 | 6.4 |
| Ex. 30 | 154.7 | 97.0 | 230.2 | 42.8 | 1.69 | 20.4 | 1.98 | 9.8 |
| Ex. 31 | 70.0 | 29.5 | 89.8 | 31.6 | 1.35 | 17.9 | 1.88 | 13.2 |
| Ex. 32 | 15.3 | 13.2 | 26.4 | 24.5 | 1.22 | 14.9 | 1.63 | 18.6 |
| Ex. 33 | 1.8 | 5.5 | 15.1 | 18.4 | 0.97 | 10.6 | 1.39 | 26.5 |
| Ex. 34 | 77.3 | 52.4 | 119.0 | 38.8 | 1.81 | 23.3 | 2.13 | 20.6 |
| Ex. 35 | 96.7 | 23.7 | 106.9 | 34.7 | 1.93 | 24.7 | 2.18 | 23.5 |
| Ex. 36 | 178.7 | 106.8 | 259.2 | 49.8 | 2.98 | 29.9 | 2.65 | 4.4 |
| Ex. 37 | 142.7 | 77.42 | 199.1 | 46.4 | 2.56 | 26.7 | 2.30 | 7.8 |
| Ex. 38 | 55.8 | 20.3 | 67.9 | 33.0 | 1.99 | 21.7 | 1.76 | 14.6 |
| Ex. 39 | 10.2 | 9.7 | 18.4 | 25.8 | 1.79 | 19.0 | 1.62 | 15.5 |
| Ex. 40 | 1.3 | 3.6 | 12.5 | 21.6 | 1.42 | 15.7 | 1.47 | 21.3 |
| Ex. 41 | 65.6 | 44.2 | 100.1 | 42.2 | 2.76 | 28.2 | 2.50 | 14.6 |
| Ex. 42 | 83.3 | 19.7 | 90.7 | 37.1 | 2.82 | 29.2 | 2.45 | 18.4 |
| Ex. 43 | 166.7 | 108.9 | 252.5 | 42.8 | 1.65 | 19.3 | 2.28 | 7.8 |
| Ex. 44 | 96.7 | 72.3 | 155.5 | 35.7 | 1.24 | 13.0 | 1.98 | 10.8 |
| Ex. 45 | 36.0 | 28.7 | 59.7 | 25.5 | 0.88 | 8.1 | 1.78 | 15.7 |
| Ex. 46 | 7.4 | 14.3 | 20.6 | 21.4 | 0.73 | 7.1 | 1.58 | 19.6 |
| Ex. 47 | 0.9 | 3.5 | 11.4 | 16.3 | 0.47 | 4.9 | 1.39 | 27.4 |
| Ex. 48 | 47.3 | 87.1 | 127.9 | 31.6 | 1.34 | 14.9 | 2.18 | 20.6 |
| Ex. 49 | 71.3 | 33.7 | 95.1 | 27.5 | 1.44 | 16.3 | 2.18 | 21.6 |
| Ex. 50 | 152.7 | 94.1 | 224.2 | 46.4 | 2.62 | 26.8 | 2.70 | 5.3 |
| Ex. 51 | 91.3 | 62.7 | 140.6 | 40.2 | 2.24 | 21.6 | 2.30 | 8.2 |
| Ex. 52 | 30.0 | 22.5 | 48.1 | 26.8 | 1.63 | 15.2 | 1.76 | 14.6 |
| Ex. 53 | 7.3 | 8.1 | 14.3 | 22.7 | 1.48 | 12.9 | 1.62 | 17.5 |
| Ex. 54 | 0.5 | 3.0 | 10.1 | 18.5 | 1.31 | 10.9 | 1.47 | 21.8 |
| Ex. 55 | 38.7 | 71.5 | 104.5 | 35.0 | 2.35 | 24.8 | 2.50 | 14.6 |
| Ex. 56 | 58.9 | 28.0 | 78.2 | 29.9 | 2.51 | 25.9 | 2.45 | 18.4 |
| Comp. Ex. 17 | 246.7 | 183.3 | 401.6 | 51.0 | 3.91 | 47.4 | 3.37 | 23.5 |
| Comp. Ex. 18 | 0.2 | 1.8 | 2.6 | 12.4 | 0.83 | 9.0 | 1.49 | 36.3 |
| Comp. Ex. 19 | 0.1 | 99.0 | 351.0 | 14.1 | 1.88 | 23.2 | 2.28 | 34.3 |
| Comp. Ex. 20 | 226.7 | 160.1 | 358.5 | 56.7 | 4.99 | 63.4 | 4.02 | 8.2 |
| Comp. Ex. 21 | 0.08 | 2.0 | 2.8 | 14.8 | 1.35 | 13.7 | 1.91 | 30.1 |
| Comp. Ex. 22 | 0.05 | 86.9 | 320.7 | 14.9 | 2.55 | 25.3 | 2.74 | 30.6 |
| Comp. Ex. 23 | 213.3 | 152.9 | 341.6 | 45.9 | 3.30 | 37.1 | 3.07 | 17.6 |
| Comp. Ex. 24 | 0.01 | 1.9 | 2.2 | 11.0 | 0.41 | 3.9 | 1.39 | 32.3 |
| Comp. Ex. 25 | 0.02 | 86.2 | 318.0 | 13.6 | 1.55 | 17.0 | 2.48 | 39.2 |
| Comp. Ex. 26 | 205.3 | 139.7 | 319.3 | 49.4 | 4.56 | 54.1 | 4.12 | 12.6 |
| Comp. Ex. 27 | 0.02 | 1.1 | 1.3 | 14.0 | 1.06 | 8.5 | 1.62 | 34.0 |
| Comp. Ex. 28 | 0.03 | 73.8 | 303.8 | 14.5 | 2.34 | 22.8 | 2.70 | 37.3 |

Comparative Examples 29 to 32

Nonaqueous lithium-type power storage elements were fabricated and various evaluations were carried out in the same manner as Comparative Example 13 with the exception of changing the negative electrode, positive electrode precursor active material, active material particle diameter, lithium compound, lithium compound particle diameter and composite ratio of the positive electrode precursor to that respectively shown in Table 7.

Evaluation results are shown in Table 8.

TABLE 7

| | Positive electrode | | | | | | | | |
|---|---|---|---|---|---|---|---|---|---|
| | | Active material | | Lithium compound | | Positive electrode precursor composition ratio | | | |
| | Negative electrode | Type | Particle diameter (μm) | Type | Particle diameter (μm) | Active material (wt %) | Lithium compound (wt %) | KB (wt %) | PVP (wt %) | PVDF (wt %) |
| Comp. Ex. 29 | C | A | 4.2 | Not present | | 87.5 | 0.0 | 3.0 | 1.5 | 8.0 |
| Comp. Ex. 30 | D | A | 4.2 | Not present | | 87.5 | 0.0 | 3.0 | 1.5 | 8.0 |
| Comp. Ex. 31 | C | B | 7 | Not present | | 87.5 | 0.0 | 3.0 | 1.5 | 8.0 |
| Comp. Ex. 32 | D | B | 7 | Not present | | 87.5 | 0.0 | 3.0 | 1.5 | 8.0 |

TABLE 8

| | Compounds in positive electrode active material layer | | Amount of Li in positive electrode active material layer ($\times 10^{-4}$ mol/g) | Evaluation results | | | | |
|---|---|---|---|---|---|---|---|---|
| | | | | Initial characteristics | | | 60° C. storage test | |
| | Total of compounds of formulas (1)-(3) ($\times 10^{-4}$ mol/g) | Lithium Carbonate ($\times 10^{-4}$ mol/g) | | Volumetric energy density E/V (Wh/L) | Initial constant Ra · F (ΩF) | Low-temp. resistance ratio Rc/Ra | Resistance increase ratio Rb/Ra | Amount of gas $\times 10^{-3}$ (cc/F) |
| Comp. Ex. 29 | 0.0 | 2.1 | 2.7 | 8.5 | 0.90 | 9.5 | 1.55 | 41.0 |
| Comp. Ex. 30 | 0.0 | 0.8 | 1.1 | 10.8 | 1.25 | 13.4 | 1.80 | 34.0 |
| Comp. Ex. 31 | 0.0 | 1.5 | 1.9 | 6.5 | 0.43 | 4.5 | 1.40 | 45.0 |
| Comp. Ex. 32 | 0.0 | 0.5 | 0.7 | 8.1 | 1.12 | 11.8 | 1.65 | 39.0 |

Third Embodiment

The following provides an explanation of Examples 57 to 84 and Comparative Examples 33 to 44 as embodiments of the third aspect of the present invention.

Examples 57 to 84 and Comparative Examples 33 to 44

<Lithium Doping Step>
After carrying out constant current charging on the resulting nonaqueous lithium-type power storage element until the voltage reached 4.7 V in an environment at 45° C. and current value of 0.6 A using a charging and discharging apparatus (TOSCAT-3100U) manufactured by Toyo System Co., Ltd., initial charging was then carried out according to a procedure consisting of continuing constant voltage charging at 4.5 V for 30 hours to dope the negative electrode with lithium.

<Aging Step>
After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour. Continuing, the nonaqueous lithium-type power storage element was stored for 30 hours in a thermostatic chamber at 40° C.

<Analysis of Negative Electrode Active Material Layer>
The negative electrode active material layer was analyzed using the same method as that for analyzing the aforementioned positive electrode active material layer to quantify the amount of $XOCH_2CH_2OX$ contained in the negative electrode active material layer. The evaluation results are shown in Table 10.

Nonaqueous lithium-type power storage elements were fabricated and various evaluations were carried out in the same manner as Example 1 with the exception of using the aforementioned methods for the lithium doping step, aging step and analysis of the negative electrode active material layer, and changing the negative electrode, positive electrode precursor active material, average particle diameter of the positive electrode precursor active material, lithium compound, lithium compound average particle diameter and composite ratio of the positive electrode precursor to that respectively shown in Table 9.

Evaluation results are shown in Table 10.

TABLE 9

| | | Positive electrode | | | | | | | |
|---|---|---|---|---|---|---|---|---|---|
| | | Active material | | Lithium compound | | Positive electrode precursor composite ratio | | | |
| | Negative electrode | Type | Particle diameter (μm) | Type | Particle diameter (μm) | Active material (wt %) | Lithium compound (wt %) | KB (wt %) | PVP (wt %) | PVDF (wt %) |
| Ex. 57 | A | A | 4.2 | Lithium carbonate | 1.5 | 42.4 | 45.1 | 3.0 | 1.5 | 8.0 |
| Ex. 58 | A | A | 4.2 | Lithium carbonate | 1.5 | 57.5 | 30.0 | 3.0 | 1.5 | 8.0 |
| Ex. 59 | A | A | 4.2 | Lithium carbonate | 1.5 | 72.5 | 15.0 | 3.0 | 1.5 | 8.0 |
| Ex. 60 | A | A | 4.2 | Lithium carbonate | 1.5 | 79.5 | 8.0 | 3.0 | 1.5 | 8.0 |
| Ex. 61 | A | A | 4.2 | Lithium carbonate | 1.5 | 85.5 | 2.0 | 3.0 | 1.5 | 8.0 |
| Ex. 62 | A | A | 4.2 | Lithium carbonate | 3 | 57.5 | 30.0 | 3.0 | 1.5 | 8.0 |
| Ex. 63 | A | A | 4.2 | Lithium oxide | 3 | 57.5 | 30.0 | 3.0 | 1.5 | 8.0 |
| Ex. 64 | B | A | 4.2 | Lithium carbonate | 1.5 | 42.4 | 45.1 | 3.0 | 1.5 | 8.0 |
| Ex. 65 | B | A | 4.2 | Lithium carbonate | 1.5 | 57.5 | 30.0 | 3.0 | 1.5 | 8.0 |
| Ex. 66 | B | A | 4.2 | Lithium carbonate | 1.5 | 72.5 | 15.0 | 3.0 | 1.5 | 8.0 |
| Ex. 67 | B | A | 4.2 | Lithium carbonate | 1.5 | 79.5 | 8.0 | 3.0 | 1.5 | 8.0 |
| Ex. 68 | B | A | 4.2 | Lithium carbonate | 1.5 | 85.5 | 2.0 | 3.0 | 1.5 | 8.0 |

TABLE 9-continued

| | | Positive electrode | | | | | | | |
|---|---|---|---|---|---|---|---|---|---|
| | | Active material | | Lithium compound | | Positive electrode precursor composite ratio | | | |
| | Negative electrode | Type | Particle diameter (μm) | Type | Particle diameter (μm) | Active material (wt %) | Lithium compound (wt %) | KB (wt %) | PVP (wt %) | PVDF (wt %) |
|---|---|---|---|---|---|---|---|---|---|---|
| Ex. 69 | B | A | 4.2 | Lithium carbonate | 3 | 57.5 | 30.0 | 3.0 | 1.5 | 8.0 |
| Ex. 70 | B | A | 4.2 | Lithium oxide | 3 | 57.5 | 30.0 | 3.0 | 1.5 | 8.0 |
| Ex. 71 | A | B | 7 | Lithium carbonate | 1.5 | 40.4 | 45.1 | 3.0 | 1.5 | 8.0 |
| Ex. 72 | A | B | 7 | Lithium carbonate | 1.5 | 55.5 | 30.0 | 3.0 | 1.5 | 8.0 |
| Ex. 73 | A | B | 7 | Lithium carbonate | 1.5 | 72.5 | 15.0 | 3.0 | 1.5 | 8.0 |
| Ex. 74 | A | B | 7 | Lithium carbonate | 1.5 | 77.5 | 8.0 | 3.0 | 1.5 | 8.0 |
| Ex. 75 | A | B | 7 | Lithium carbonate | 1.5 | 85.5 | 2.0 | 3.0 | 1.5 | 8.0 |
| Ex. 76 | A | B | 7 | Lithium carbonate | 3 | 57.5 | 30.0 | 3.0 | 1.5 | 8.0 |
| Ex. 77 | A | B | 7 | Lithium oxide | 3 | 57.5 | 30.0 | 3.0 | 1.5 | 8.0 |
| Ex. 78 | B | B | 7 | Lithium carbonate | 1.5 | 40.4 | 45.1 | 3.0 | 1.5 | 8.0 |
| Ex. 79 | B | B | 7 | Lithium carbonate | 1.5 | 57.5 | 30.0 | 3.0 | 1.5 | 8.0 |
| Ex. 80 | B | B | 7 | Lithium carbonate | 1.5 | 72.5 | 15.0 | 3.0 | 1.5 | 8.0 |
| Ex. 81 | B | B | 7 | Lithium carbonate | 1.5 | 79.5 | 8.0 | 3.0 | 1.5 | 8.0 |
| Ex. 82 | B | B | 7 | Lithium carbonate | 1.5 | 85.5 | 2.0 | 3.0 | 1.5 | 8.0 |
| Ex. 83 | B | B | 7 | Lithium carbonate | 3 | 57.5 | 30.0 | 3.0 | 1.5 | 8.0 |
| Ex. 84 | B | B | 7 | Lithium oxide | 3 | 57.5 | 30.0 | 3.0 | 1.5 | 8.0 |
| Comp. Ex. 33 | A | A | 4.2 | Lithium carbonate | 1.5 | 34.5 | 53.0 | 3.0 | 1.5 | 8.0 |
| Comp. Ex. 34 | A | A | 4.2 | Lithium carbonate | 1.5 | 87.0 | 0.5 | 3.0 | 1.5 | 8.0 |
| Comp. Ex. 35 | A | A | 4.2 | Lithium carbonate | 6 | 57.5 | 30.0 | 3.0 | 1.5 | 8.0 |
| Comp. Ex. 36 | B | A | 4.2 | Lithium carbonate | 1.5 | 34.5 | 53.0 | 3.0 | 1.5 | 8.0 |
| Comp. Ex. 37 | B | A | 4.2 | Lithium carbonate | 1.5 | 87.0 | 0.5 | 3.0 | 1.5 | 8.0 |
| Comp. Ex. 38 | B | A | 4.2 | Lithium carbonate | 6 | 42.4 | 45.1 | 3.0 | 1.5 | 8.0 |
| Comp. Ex. 39 | A | B | 7 | Lithium carbonate | 1.5 | 34.5 | 53.0 | 3.0 | 1.5 | 8.0 |
| Comp. Ex. 40 | A | B | 7 | Lithium carbonate | 1.5 | 87.0 | 0.5 | 3.0 | 1.5 | 8.0 |
| Comp. Ex. 41 | A | B | 7 | Lithium carbonate | 8 | 42.4 | 45.1 | 3.0 | 1.5 | 8.0 |
| Comp. Ex. 42 | B | B | 7 | Lithium carbonate | 1.5 | 34.5 | 53.0 | 3.0 | 1.5 | 8.0 |
| Comp. Ex. 43 | B | B | 7 | Lithium carbonate | 1.5 | 87.0 | 0.5 | 3.0 | 1.5 | 8.0 |
| Comp. Ex. 44 | B | B | 7 | Lithium carbonate | 8 | 42.4 | 45.1 | 3.0 | 1.5 | 8.0 |

TABLE 10

| | Total of compounds of formulas (1)-(3) ($\times 10^{-4}$ mol/g) | | | Amount of Li in positive electrode active material layer ($\times 10^{-4}$ mol/g) | Initial characteristics | | | 60° C. storage test | |
|---|---|---|---|---|---|---|---|---|---|
| | Compounds in positive electrode active material layer A | Compounds in negative electrode active material layer B | Ratio A/B | | Volumetric energy density E/V (Wh/L) | Initial constant Ra · F ($\Omega$F) | Low-temp. resistance ratio Rc/Ra | Resistance increase ratio Rb/Ra | Amount of gas × $10^{-3}$ (cc/F) |
| Ex. 57 | 96.0 | 11.2 | 8.6 | 213.9 | 47.6 | 1.96 | 24.0 | 1.41 | 25.3 |
| Ex. 58 | 76.6 | 23.9 | 3.2 | 169.3 | 43.5 | 1.69 | 20.6 | 1.96 | 14.9 |
| Ex. 59 | 34.7 | 33.7 | 1.0 | 66.0 | 32.1 | 1.35 | 18.1 | 2.31 | 9.2 |
| Ex. 60 | 10.8 | 20.1 | 0.5 | 19.4 | 24.8 | 1.22 | 15.1 | 1.60 | 12.5 |
| Ex. 61 | 4.2 | 10.3 | 0.4 | 11.1 | 18.6 | 0.97 | 10.7 | 1.36 | 26.5 |
| Ex. 62 | 38.3 | 13.6 | 2.8 | 87.5 | 39.3 | 1.81 | 23.5 | 2.09 | 8.2 |
| Ex. 63 | 47.9 | 36.8 | 1.3 | 78.6 | 35.2 | 1.93 | 25.0 | 2.13 | 23.5 |
| Ex. 64 | 88.4 | 5.4 | 16.4 | 192.5 | 49.7 | 2.81 | 29.1 | 2.75 | 23.5 |
| Ex. 65 | 70.62 | 9.2 | 7.7 | 147.9 | 45.7 | 2.41 | 25.4 | 2.40 | 11.1 |
| Ex. 66 | 27.6 | 12.1 | 2.3 | 50.4 | 32.5 | 1.87 | 20.7 | 1.84 | 7.3 |
| Ex. 67 | 5.0 | 13.2 | 0.4 | 14.8 | 25.4 | 1.69 | 18.1 | 1.68 | 7.5 |
| Ex. 68 | 1.7 | 7.1 | 0.2 | 11.2 | 21.3 | 1.34 | 14.9 | 1.53 | 15.0 |
| Ex. 69 | 32.5 | 10.1 | 3.2 | 74.4 | 41.6 | 2.60 | 26.8 | 2.60 | 14.9 |
| Ex. 70 | 41.3 | 14.2 | 2.9 | 67.4 | 36.5 | 2.66 | 27.8 | 2.55 | 18.8 |
| Ex. 71 | 82.5 | 8.1 | 10.2 | 185.6 | 43.1 | 1.55 | 18.9 | 2.25 | 26.1 |
| Ex. 72 | 47.9 | 16.7 | 2.9 | 114.4 | 35.9 | 1.16 | 12.7 | 1.96 | 16.8 |
| Ex. 73 | 17.8 | 18.1 | 1.0 | 43.9 | 25.6 | 0.82 | 8.0 | 1.76 | 10.6 |
| Ex. 74 | 5.9 | 14.2 | 0.4 | 15.2 | 21.5 | 0.73 | 7.0 | 1.57 | 12.1 |
| Ex. 75 | 3.2 | 10.5 | 0.3 | 10.7 | 16.4 | 0.69 | 6.3 | 1.37 | 18.1 |
| Ex. 76 | 23.4 | 15.2 | 1.5 | 94.0 | 31.8 | 1.26 | 14.6 | 2.16 | 17.3 |
| Ex. 77 | 35.3 | 30.1 | 1.2 | 69.9 | 27.7 | 1.36 | 16.0 | 2.16 | 24.9 |
| Ex. 78 | 75.6 | 4.3 | 17.6 | 166.6 | 44.3 | 2.55 | 26.3 | 2.83 | 24.1 |
| Ex. 79 | 45.2 | 12.5 | 3.6 | 104.4 | 38.4 | 2.17 | 21.2 | 2.42 | 12.0 |
| Ex. 80 | 14.9 | 16.7 | 0.9 | 35.7 | 25.6 | 1.58 | 14.9 | 1.85 | 7.9 |
| Ex. 81 | 5.4 | 10.6 | 0.5 | 15.1 | 21.7 | 1.44 | 12.7 | 1.70 | 14.5 |
| Ex. 82 | 3.2 | 11.1 | 0.3 | 11.9 | 17.7 | 1.27 | 10.6 | 1.55 | 19.6 |
| Ex. 83 | 19.1 | 13.2 | 1.5 | 77.6 | 33.5 | 2.28 | 24.3 | 2.63 | 14.7 |
| Ex. 84 | 29.1 | 12.7 | 2.3 | 58.1 | 28.6 | 2.44 | 25.4 | 2.58 | 18.6 |
| Comp. Ex. 33 | 122.1 | 5.6 | 21.8 | 361.1 | 48.7 | 3.99 | 48.8 | 2.70 | 32.5 |
| Comp. Ex. 34 | 0.4 | 2.8 | 0.15 | 4.6 | 11.9 | 0.85 | 9.2 | 1.46 | 39.2 |
| Comp. Ex. 35 | 0.5 | 4.7 | 0.11 | 314.2 | 13.5 | 1.92 | 23.9 | 2.23 | 37.1 |
| Comp. Ex. 36 | 112.2 | 4.6 | 24.4 | 303.3 | 53.6 | 5.04 | 64.7 | 3.10 | 31.0 |
| Comp. Ex. 37 | 0.4 | 2.1 | 0.19 | 5.1 | 14.0 | 1.37 | 14.0 | 1.89 | 32.9 |
| Comp. Ex. 38 | 0.4 | 3.4 | 0.13 | 320.1 | 14.4 | 2.57 | 25.8 | 2.72 | 33.4 |
| Comp. Ex. 39 | 111.8 | 5.5 | 20.3 | 400.1 | 43.9 | 3.36 | 38.2 | 3.01 | 33.1 |
| Comp. Ex. 40 | 0.2 | 1.5 | 0.13 | 4.1 | 10.5 | 0.42 | 4.0 | 1.36 | 35.0 |
| Comp. Ex. 41 | 0.3 | 2.1 | 0.13 | 341.8 | 13.0 | 1.58 | 17.5 | 2.43 | 42.4 |
| Comp. Ex. 42 | 101.6 | 4.1 | 24.8 | 326.0 | 46.8 | 4.60 | 55.1 | 4.07 | 33.8 |
| Comp. Ex. 43 | 0.1 | 1.1 | 0.09 | 2.3 | 13.3 | 1.07 | 8.7 | 1.60 | 37.1 |
| Comp. Ex. 44 | 0.2 | 2.3 | 0.09 | 336.8 | 13.7 | 2.36 | 23.2 | 2.67 | 40.8 |

Example 85

<Assembly of Power Storage Element>

The aforementioned Double-Sided Negative Electrode A and Double-Sided Positive Electrode Precursor A were cut to a size of 10 cm×10 cm (100 cm²). A single-sided positive electrode precursor was used on the uppermost side and lowermost side, and microporous film separators having a thickness of 15 μm were laminated interposed between the negative electrode and positive electrode precursor using 21 sheets of the double-sided negative electrode and 20 sheets of the double-sided positive electrode precursor. Subsequently, the negative electrode and positive electrode precursor were respectively connected to a negative electrode terminal and positive electrode terminal by ultrasonic welding to obtain an electrode laminated body. This electrode laminated body was vacuum-dried for 60 hours at 80° C. and 50 Pa. This electrode laminated body was then inserted into a casing composed of a laminated film in a dry atmosphere having a dew point of −45° C. followed by heat sealing the casing of the electrode terminal portion and bottom portion on three sides at 180° C. and 1.0 MPa for 20 seconds. The nonaqueous electrolytic solution was injected followed by sealing the casing to assemble a nonaqueous lithium-type power storage element.

<Power Storage Element Solution Injection, Impregnation and Sealing Steps>

Approximately 80 g of the aforementioned nonaqueous electrolytic solution were injected under atmospheric pressure into the electrode laminated body housed in an aluminum laminated film in a dry air environment at a temperature of 25° C. and dew point of −40° C. or lower. Continuing, the aforementioned nonaqueous lithium-type power storage element was placed in a pressure reduction chamber and the pressure was reduced from normal pressure to −87 kPa followed by returning to atmospheric pressure and allowing to stand undisturbed for 5 minutes. Subsequently, a step consisting of reducing pressure from normal pressure to −87 kPa and then returning to atmospheric pressure was repeated four times followed by allowing to stand undisturbed for 15 minutes. Moreover, pressure was again reduced from normal pressure to −91 kPa followed by returning to normal pressure. The aforementioned step of reducing pressure followed by returning to normal pressure was repeated a total of seven times (while reducing pressure to −95 kPa, −96 kPa, −97 kPa, −81 kPa, −97 kPa, −97 kPa and −97 kPa each time). The nonaqueous electrolytic solution was impregnated in the electrode laminated body according to the aforementioned process.

Subsequently, the nonaqueous lithium-type power storage element was placed in a reduced-pressure sealing machine and sealed for 10 seconds at 180° C. and pressure of 0.1 MPa while reducing the pressure to −95 kPa to seal the aluminum laminated film.

<Lithium Doping Step>

After carrying out constant current charging on the resulting nonaqueous lithium-type power storage element until the voltage reached 4.6 V in an environment at 45° C. and current value of 0.6 A using a charging and discharging apparatus (TOSCAT-3100U) manufactured by Toyo System Co., Ltd., initial charging was then carried out according to a procedure consisting of continuing constant voltage charging at 4.4 V for 30 hours to dope the negative electrode with lithium.

<Aging Step>

After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour.

A nonaqueous lithium-type power storage element was fabricated and various evaluations were carried out in the same manner as Example 57 with the exception of using the aforementioned methods for assembly of the power storage element, the solution injection, impregnation and sealing step, lithium doping step and aging step.

The evaluation results are shown in Table 12.

Example 86

<Lithium Doping Step>

After carrying out constant current charging on the resulting nonaqueous lithium-type power storage element until the voltage reached 4.5 V in an environment at 45° C. and current value of 0.6 A using a charging and discharging apparatus (TOSCAT-3100U) manufactured by Toyo System Co., Ltd., initial charging was then carried out according to a procedure consisting of continuing constant voltage charging at 4.3 V for 30 hours to dope the negative electrode with lithium.

<Aging Step>

After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour. Continuing, the nonaqueous lithium-type power storage element was stored for 20 hours in a thermostatic chamber at 60° C.

A nonaqueous lithium-type power storage element was fabricated and various evaluations were carried out in the same manner as Example 57 with the exception of using the aforementioned methods for the lithium doping step and aging step.

The evaluation results are shown in Table 12.

Example 87

<Lithium Doping Step>

After carrying out constant current charging on the resulting nonaqueous lithium-type power storage element until the voltage reached 4.4 V in an environment at 45° C. and current value of 0.6 A using a charging and discharging apparatus (TOSCAT-3100U) manufactured by Toyo System Co., Ltd., initial charging was then carried out according to a procedure consisting of continuing constant voltage charging at 4.2 V for 30 hours to dope the negative electrode with lithium.

<Aging Step>

After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour. Continuing, the nonaqueous lithium-type power storage element was stored for 30 hours in a thermostatic chamber at 60° C.

A nonaqueous lithium-type power storage element was fabricated and various evaluations were carried out in the same manner as Example 57 with the exception of using the aforementioned methods for the lithium doping step and aging step.

The evaluation results are shown in Table 12.

Example 88

<Lithium Doping Step>

After carrying out constant current charging on the resulting nonaqueous lithium-type power storage element until the voltage reached 4.3 V in an environment at 45° C. and current value of 0.6 A using a charging and discharging apparatus (TOSCAT-3100U) manufactured by Toyo System Co., Ltd., initial charging was then carried out according to a procedure consisting of continuing constant voltage charging at 4.1 V for 30 hours to dope the negative electrode with lithium.

<Aging Step>

After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour. Continuing, the nonaqueous lithium-type power storage element was stored for 40 hours in a thermostatic chamber at 60° C.

A nonaqueous lithium-type power storage element was fabricated and various evaluations were carried out in the same manner as Example 57 with the exception of using the aforementioned methods for the lithium doping step and aging step.

The evaluation results are shown in Table 12.

Comparative Example 45

<Lithium Doping Step>

After carrying out constant current charging on the resulting nonaqueous lithium-type power storage element until the voltage reached 5.0 V in an environment at 25° C. and current value of 0.6 A using a charging and discharging apparatus (TOSCAT-3100U) manufactured by Toyo System Co., Ltd., initial charging was then carried out according to a procedure consisting of continuing constant voltage charging at 4.8 V for 30 hours to dope the negative electrode with lithium.

<Aging Step>

After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour. Continuing, the nonaqueous lithium-type power storage element was stored for 3 hours in a thermostatic chamber at 25° C.

A nonaqueous lithium-type power storage element was fabricated and various evaluations were carried out in the same manner as Example 57 with the exception of using the aforementioned methods for the lithium doping step and aging step.

The evaluation results are shown in Table 12.

Comparative Example 46

<Lithium Doping Step>

After carrying out constant current charging on the resulting nonaqueous lithium-type power storage element until the voltage reached 3.0 V in an environment at 25° C. and current value of 0.6 A using a charging and discharging apparatus (TOSCAT-3100U) manufactured by Toyo System Co., Ltd., initial charging was then carried out according to a procedure consisting of continuing constant voltage charging at 3.8 V for 30 hours to dope the negative electrode with lithium.

<Aging Step>

After carrying out constant current discharging on the lithium-doped nonaqueous lithium-type power storage element at 0.7 A in an environment at 25° C. until the voltage reached 2.0 V, the voltage was adjusted to 4.0 V by carrying out constant current discharging at 4.0 V for 1 hour. Continuing, the nonaqueous lithium-type power storage element was stored for 100 hours in a thermostatic chamber at 85° C.

A nonaqueous lithium-type power storage element was fabricated and various evaluations were carried out in the same manner as Example 57 with the exception of using the aforementioned methods for the lithium doping step and aging step.

The evaluation results are shown in Table 12.

Comparative Examples 47 to 50

<Lithium Doping Step>

Lithium doping was carried out on the negative electrode of the resulting nonaqueous lithium-type power storage element by allowing to stand for 21 hours in a thermostatic chamber set to 45° C.

<Aging Step>

After adjusting the cell voltage of the lithium-doped nonaqueous lithium-type power storage element to 3.0 V, the power storage element was stored for 24 hours in a thermostatic chamber set to 60° C. Continuing, a charging and discharging cycle, consisting of constant current charging and constant current discharging between a lower limit voltage of 2.0 V and upper limit voltage of 4.0 V using a charging current of 10 A and discharging current of 10 A and using a charging and discharging apparatus manufactured by Aska Electronic Co., Ltd., was repeated twice.

Nonaqueous lithium-type power storage elements were fabricated and various evaluations were carried out in the same manner as Comparative Example 13 with the exception of using the aforementioned methods for the lithium doping step and aging step, and changing the negative electrode, positive electrode precursor active material, average particle diameter of the positive electrode precursor active material, lithium compound, lithium compound average particle diameter and composite ratio of the positive electrode precursor to that respectively shown in Table 11.

Evaluation results are shown in Table 12.

TABLE 11

| | | Positive electrode | | | | | | | | |
|---|---|---|---|---|---|---|---|---|---|---|
| | | Active material | | Lithium compound | | Positive electrode precursor composite ratio | | | | |
| | Negative electrode | Type | Particle diameter (μm) | Type | Particle diameter (μm) | Active material (wt %) | Lithium compound (wt %) | KB (wt %) | PVP (wt %) | PVDF (wt %) |
| Ex. 85 | A | A | 4.2 | Lithium carbonate | 1.5 | 55.5 | 30.0 | 3.0 | 1.5 | 8.0 |
| Ex. 86 | A | A | 4.2 | Lithium carbonate | 1.5 | 57.5 | 30.0 | 3.0 | 1.5 | 8.0 |
| Ex. 87 | A | A | 4.2 | Lithium carbonate | 1.5 | 57.5 | 30.0 | 3.0 | 1.5 | 8.0 |
| Ex. 88 | A | A | 4.2 | Lithium carbonate | 1.5 | 57.5 | 30.0 | 3.0 | 1.5 | 8.0 |
| Comp. Ex. 45 | A | A | 4.2 | Lithium carbonate | 1.5 | 57.5 | 30.0 | 3.0 | 1.5 | 8.0 |
| Comp. Ex. 46 | A | A | 4.2 | Lithium carbonate | 1.5 | 57.5 | 30.0 | 3.0 | 1.5 | 8.0 |
| Comp. Ex. 47 | C | A | 4.2 | None | | 87.5 | 0.0 | 3.0 | 1.5 | 8.0 |
| Comp. Ex. 48 | D | A | 4.2 | None | | 87.5 | 0.0 | 3.0 | 1.5 | 8.0 |
| Comp. Ex. 49 | C | B | 7 | None | | 87.5 | 0.0 | 3.0 | 1.5 | 8.0 |
| Comp. Ex. 50 | D | B | 7 | None | | 87.5 | 0.0 | 3.0 | 1.5 | 8.0 |

TABLE 12

| | Total of compounds of formulas (1)-(3) ($\times 10^{-4}$ mol/g) | | | Amount of Li in positive electrode active material layer ($\times 10^{-4}$ mol/g) | Evaluated results | | | | |
|---|---|---|---|---|---|---|---|---|---|
| | | | | | Initial characteristics | | | 60° C. storage test | |
| | Compounds in positive electrode active material layer A | Compounds in negative electrode active material layer B | Ratio A/B | | Volumetric energy density E/V (Wh/L) | Initial constant Ra · F (ΩF) | Low-temp. resistance ratio Rc/Ra | Resistance increase ratio Rb/Ra | Amount of gas × $10^{-3}$ (cc/F) |
| Ex. 85 | 89.0 | 4.8 | 18.5 | 166.6 | 44.3 | 2.55 | 26.3 | 2.83 | 5.4 |
| Ex. 86 | 60.3 | 12.5 | 4.8 | 104.4 | 38.4 | 2.17 | 21.2 | 2.42 | 8.3 |

TABLE 12-continued

| | Total of compounds of formulas (1)-(3) ($\times 10^{-4}$ mol/g) | | | Amount of Li in positive electrode active material layer ($\times 10^{-4}$ mol/g) | Evaluated results | | | | |
|---|---|---|---|---|---|---|---|---|---|
| | | | | | Initial characteristics | | | 60° C. storage test | |
| | Compounds in positive electrode active material layer A | Compounds in negative electrode active material layer B | Ratio A/B | | Volumetric energy density E/V (Wh/L) | Initial constant Ra · F (ΩF) | Low-temp. resistance ratio Rc/Ra | Resistance increase ratio Rb/Ra | Amount of gas × $10^{-3}$ (cc/F) |
| Ex. 87 | 31.2 | 28.9 | 1.1 | 35.7 | 25.6 | 1.58 | 14.9 | 1.85 | 14.7 |
| Ex. 88 | 13.4 | 50.3 | 0.27 | 10.6 | 21.7 | 1.44 | 12.7 | 1.70 | 17.6 |
| Comp. Ex. 45 | 150.2 | 4.5 | 33.4 | 308.9 | 40.3 | 3.56 | 45.3 | 1.76 | 51.3 |
| Comp. Ex. 46 | 8.9 | 100.3 | 0.09 | 340.2 | 28.4 | 4.01 | 50.3 | 2.88 | 10.5 |
| Comp. Ex. 47 | 0.3 | 13.5 | 0.02 | 4.9 | 8.3 | 0.95 | 10.1 | 1.50 | 43.5 |
| Comp. Ex. 48 | 0.2 | 4.5 | 0.04 | 2.0 | 10.5 | 1.31 | 14.2 | 1.75 | 36.0 |
| Comp. Ex. 49 | 0.231 | 11.5 | 0.02 | 3.5 | 6.3 | 0.45 | 4.8 | 1.36 | 47.7 |
| Comp. Ex. 50 | 0.1 | 3.3 | 0.03 | 1.2 | 7.9 | 1.18 | 12.5 | 1.60 | 41.3 |

Fourth Embodiment

The following provides an explanation of Examples 89 to 129 and Comparative Examples 51 to 54 as embodiments of the fourth aspect of the present invention.

Example 89

[Preparation of Active Material C]

150 g of commercially available carbon nanoparticles having an average particle diameter of 5.2 μm, BET specific surface area of 859 m²/g and primary particle diameter of 20 nm were placed in a stainless steel mesh cage, the cage was placed on a stainless steel tray containing 150 g of coal-based pitch (softening point: 50° C.), and both the cage and tray were installed in an electric furnace (effective internal furnace dimensions: 300 mm×300 mm×300 mm). Both were then subjected to a thermal reaction by raising the temperature to 1000° C. over the course of 8 hours in a nitrogen atmosphere and holding at the same temperature for 4 hours to obtain Active Material C (Composite Carbon Material C). Continuing, after allowing to cool naturally to 60° C., the Composite Carbon Material C was removed from the furnace.

The resulting Composite Carbon Material C was measured for average particle diameter and BET specific surface area using the same methods as previously described. As a result, average particle diameter was 6.8 μm and BET specific surface area was 303 m²/g. The weight ratio of the coal-based pitch-derived carbonaceous material to the activated carbon was 32%.

<Production of Negative Electrode E>

Next, a negative electrode was produced using the Composite Carbon Material C for the negative electrode active material. 80 parts by weight of Composite Carbon Material C, 2 parts by weight of acetylene black, 18 parts by weight of polyvinylidene fluoride (PVdF) and N-methylpyrrolidone (NMP) were mixed followed by dispersing under conditions of a peripheral velocity of 15 μm/s using the FILMIX® thin film spin system high-speed mixer manufactured by Primix Corp. to obtain a coating solution. The viscosity (ηb) and Ti value of the resulting coating solution were measured using the TVE-35H E-type viscometer manufactured by Toki Sangyo Co., Ltd. As a result, viscosity (ηb) was 2,456 mPa·s and the Ti value was 3.6. The aforementioned coating solution was coated under conditions of a coating speed of 1 μm/s onto both sides of electrolytic copper foil having a thickness of 10 μm using a die coater manufactured by Toray Engineering Co., Ltd. followed by drying at a drying temperature of 85° C. to obtain Negative Electrode E. The resulting Negative Electrode E was pressed under conditions of a pressure of 4 kN/cm and pressed surface temperature of 25° C. using a roll press. The film thickness of the negative electrode active material layer of the Negative Electrode E obtained as described above was determined by subtracting the thickness of the copper foil from the average value of thickness of the Negative Electrode E measured at ten arbitrary locations using the GS-551 Linear Gauge Sensor film thickness gauge manufactured by Ono Sokki Co., Ltd. As a result, film thickness of the negative electrode active material layer of Negative Electrode E was 40 μm per side.

[Preparation of Active Material D]

150 g of commercially available artificial graphite having an average particle diameter of 4.8 μm and BET specific surface area of 3.1 m²/g were placed in a stainless steel mesh cage, the cage was placed on a stainless steel tray containing 15 g of coal-based pitch (softening point: 50° C.) and both the cage and tray were installed in an electric furnace (effective internal furnace dimensions: 300 mm×300 mm×300 mm). Both were then subjected to a thermal reaction by raising the temperature to 1000° C. over the course of 8 hours in a nitrogen atmosphere and holding at the same temperature for 4 hours to obtain Active Material D (Composite Carbon Material D). Continuing, after allowing to cool naturally to 60° C., the Composite Carbon Material D was removed from the furnace.

The resulting Composite Carbon Material D was measured for average particle diameter and BET specific surface area using the same methods as previously described. As a result, average particle diameter was 4.9 μm and BET specific surface area was 6.1 m²/g. The weight ratio of the coal-based pitch-derived carbonaceous material to the activated carbon was 2%.

<Production of Negative Electrode F>

Next, Negative Electrode F was produced using Active Material D (Composite Carbon Material D) for the negative electrode active material.

80 parts by weight of Composite Carbon Material D, 8 parts by weight of acetylene black, 12 parts by weight of polyvinylidene fluoride (PVdF) and N-methylpyrrolidone (NMP) were mixed followed by dispersing under conditions of a peripheral velocity of 15 μm/s using the FILMIX® thin film spin system high-speed mixer manufactured by Primix Corp. to obtain a coating solution. The viscosity (ηb) and Ti value of the resulting coating solution were measured using the TVE-35H E-type viscometer manufactured by Toki Sangyo Co., Ltd. As a result, viscosity (ηb) was 2,798 mPa·s and the Ti value was 2.7. The aforementioned coating solution was coated under conditions of a coating speed of 1 μm/s onto both sides of electrolytic copper foil having a thickness of 10 μm using a die coater manufactured by Toray Engineering Co., Ltd. followed by drying at a drying temperature of 85° C. to obtain Negative Electrode F. The resulting Negative Electrode F was pressed under conditions of a pressure of 4 kN/cm and pressed surface temperature of 25° C. using a roll press. The film thickness of the negative electrode active material layer of the Negative Electrode F obtained as described above was determined by subtracting the thickness of the copper foil from the average value of thickness of the Negative Electrode F measured at ten arbitrary locations using the GS-551 Linear Gauge Sensor film thickness gauge manufactured by Ono Sokki Co., Ltd. As a result, film thickness of the negative electrode active material layer of Negative Electrode F was 25 μm per side.

Example 89

<Preparation of Electrolytic Solution>

A nonaqueous electrolytic solution was obtained by using an organic solvent in the form of a mixed solvent of ethylene carbonate (EC) and methyl ethyl carbonate (EMC) at a ratio (weight ratio) of 33:67, and dissolving electrolyte salts respectively consisting of $LiN(SO_2F)_2$ and $LiPF_6$ at a concentration ratio of 75:25 (molar ratio), and a total concentration of $LiN(SO_2F)_2$ and $LiPF_6$ of 1.2 mol/L, in the resulting nonaqueous electrolytic solution.

The concentrations of $LiN(SO_2F)_2$ and $LiPF_6$ in the resulting nonaqueous electrolytic solution were 0.9 mol/L and 0.3 mol/L, respectively.

<Preparation of Nonaqueous Lithium-Type Power Storage Element>

[Assembly]

The Double-Sided Negative Electrode A obtained in the previously described step, the Double-Sided Positive Electrode Precursor A fabricated using the same method as that of the First Embodiment except for lithium carbonate having an average diameter of 2.31 μm, and a Single-Sided Positive Electrode Precursor A were cut to a size of 10 cm×10 cm (100 cm²). The Single-Sided Positive Electrode Precursor A was used on the uppermost side and lowermost side, and microporous film separators 1 having a thickness of 15 μm were laminated interposed between the negative electrode and positive electrode precursor using 21 sheets of the Double-Sided Negative Electrode A and 20 sheets of the Double-Sided Positive Electrode Precursor A. Subsequently, the negative electrode and positive electrode precursor were respectively connected to a negative electrode terminal and positive electrode terminal by ultrasonic welding to obtain an electrode laminated body. This electrode laminated body was vacuum-dried for 60 hours at 80° C. and 50 Pa. This electrode laminated body was then housed in a casing composed of a laminated film in a dry atmosphere having a dew point of −45° C. followed by heat sealing the casing of the electrode terminal portion and bottom portion on three sides at 180° C. and 1.0 MPa and for a sealing time of 20 seconds.

<Solution Injection, Impregnation and Sealing>

Approximately 80 g of the aforementioned nonaqueous electrolytic solution were injected under atmospheric pressure into the electrode laminated body housed in an aluminum laminated film in a dry air environment at a temperature of 25° C. and dew point of −40° C. or lower. Continuing, the aforementioned nonaqueous lithium-type power storage element was placed in a pressure reduction chamber and the pressure was reduced from normal pressure to −87 kPa followed by returning to atmospheric pressure and allowing to stand undisturbed for 5 minutes. A procedure consisting of reducing pressure from normal pressure to −87 kPa and then returning to atmospheric pressure was repeated four times followed by allowing to stand undisturbed for 15 minutes. After reducing pressure from normal pressure to −91 kPa, pressure was returned to atmospheric pressure. A procedure consisting of similarly reducing pressure and then returning to atmospheric pressure was repeated a total of seven times (while reducing pressure to −95 kPa, −96 kPa, −97 kPa, −81 kPa, −97 kPa, −97 kPa and −97 kPa each time). The nonaqueous electrolytic solution was impregnated in the electrode laminated body according to the aforementioned procedure.

The electrode laminated body impregnated with the nonaqueous electrolytic solution was placed in a reduced-pressure sealing machine and sealed for 10 seconds at 180° C. and pressure of 0.1 MPa while reducing the pressure to −95 kPa to seal the aluminum laminated film and obtain a nonaqueous lithium-type power storage element.

<Lithium Doping Step>

After carrying out constant current charging on the resulting nonaqueous lithium-type power storage element until the voltage reached 4.5 V in an environment at 25° C. and current value of 50 mA using a charging and discharging apparatus (TOSCAT-3100U) manufactured by Toyo System Co., Ltd., initial charging was then carried out according to a procedure consisting of continuing constant voltage charging at 4.5 V for 72 hours to dope the negative electrode with lithium.

<Aging Step>

After carrying out constant current discharging on the lithium-doped nonaqueous lithium-type power storage element at 1.0 A in an environment at 25° C. until the voltage reached 3.0 V, the voltage was adjusted to 3.0 V by carrying out constant current discharging at 3.0 V for 1 hour. The nonaqueous lithium-type power storage element was then stored for 60 hours in a thermostatic chamber at 60° C.

<Additional Charging>

Additional charging was carried out according to a procedure consisting of carrying out low current charging on the nonaqueous lithium-type power storage element after aging in an atmosphere at 45° C. and 1.0 A until the voltage reached 4.6 V followed by continuing constant voltage charging at 4.6 V for 3 hours.

<Gas Venting>

A portion of the aluminum laminated film of the nonaqueous lithium-type power storage element was opened after aging in a dry air environment at a temperature of 25° C. and dew point of −40° C. The aforementioned nonaqueous lithium-type power storage device was placed in a pressure reduction chamber, and after reducing pressure from atmospheric pressure to −80 kPa over the course of 3 minutes using a diaphragm pump (N816.3KT.45.18) manufactured by KNF Japan Co., Ltd., pressure was returned to atmospheric pressure over the course of 3 minutes, and this procedure was repeated a total of three times. Subsequently, the nonaqueous lithium-type power storage element was placed in a pressure reduction chamber and pressure was reduced to −90 kPa followed by sealing for 10 seconds at 200° C. and pressure of 0.1 MPa to seal the aluminum laminated film.

The nonaqueous lithium-type power storage element was completed according to the procedure described below.

<Measurement and Evaluation of Nonaqueous Lithium-Type Power Storage Element>

[Separator Sampling]

After adjusting the completed nonaqueous lithium-type power storage element to 2.9 V, the power storage device was disassembled in an Ar glovebox installed in a room at 23° C. and controlled to a dew point of −90° C. and oxygen concentration of 1 ppm or less followed by removal of the separator. After immersing the removed separator in methyl ethyl carbonate (MEC) in an amount equal to 100 times the weight of the separator for 10 minutes or more, the MEC was replaced followed by again immersing the separator therein. Subsequently, the separator was removed from the MEC and vacuum-dried in a side box for 2 hours at room temperature and pressure of 10 kPa.

[XPS Analysis of Separator Surface]

XPS analysis was carried out on the resulting separator in an anaerobic state by placing in an XPS apparatus manufactured by Ulvac-Phi, Inc. Relative element concentrations were determined by using a monochromatic AlKα X-ray beam (15 kV, 3.3 mA) having a diameter of 200 μmφ for the X-ray source, detecting all elements with a survey scan over a bonding energy range of 0 to 1100 eV, using a narrow scan over the range of bonding energy corresponding to each detected element to acquire the spectrum for each element, and calculating relative element concentration using the peak areas thereof. Conditions for measuring with a narrow scan consisted of a path energy of 46.95 eV and using neutralizing electrification in energy steps of 0.1 eV.

The value $X_F/X_C$, obtained by dividing the relative element concentration of fluorine by the relative element concentration of carbon, was 52.3 on the surface opposing the positive electrode and 27.2 on the surface opposing the negative electrode.

[Particles on Separator Surface]

The resulting separator was placed in an SEM apparatus manufactured by Hitachi High-Technologies Corp. followed by carrying out SEM observations. After carrying out observation pretreatment consisting of osmium plasma coating, the separator was measured at a magnification factor of 30,000×, acceleration voltage of 1 kV, emission current of 10 μA, and 1280×960 pixels for the number of measurement pixels.

When Dp=Np/S was calculated from the number of particulate substances Np (number) and area S of the SEM images (μm²) from the resulting SEM images, the number of particles on the surface opposing the positive electrode was 3.1 particles/μm² and the number of particles on the surface opposing the negative electrode was 7.3 particles/μm²

[Preparation of Positive Electrode Sample]

After adjusting the completed nonaqueous lithium-type power storage element to 2.9 V, the power storage device was disassembled in an Ar glovebox installed in a room at 23° C. and controlled to a dew point of −90° C. and oxygen concentration of 1 ppm or less followed by removal of the positive electrode. After washing the removed positive electrode by immersing in dimethyl carbonate (DMC), the positive electrode was vacuum-dried inside a side box while maintaining prevention of exposure to the atmosphere.

Following drying, the positive electrode was transferred from the side box to an Ar glovebox while maintaining prevention of exposure to the atmosphere followed by measuring the average particle diameter (μm) of the lithium compound and the weight (wt %) of the lithium compound contained in the positive electrode. The positive electrode having a positive electrode active material layer coated on both sides was cut out to a size of 10 cm×5 cm followed by immersing in 30 g of a diethyl carbonate solvent and washing for 10 minutes by occasionally moving the positive electrode with tweezers. Continuing, the positive electrode was removed and air-dried for 5 minutes in an argon glovebox followed by immersing the positive electrode in 30 g of freshly prepared diethyl carbonate solvent and washing for 10 minutes using the same method as described above. The positive electrode was removed from the argon glovebox and dried for 20 hours under conditions of a temperature of 25° C. and pressure of 1 kPa using a vacuum dryer (DP33 manufactured by Yamato Scientific Co., Ltd.) to obtain Positive Electrode Sample 1.

[SEM and EDX Measurement of Positive Electrode Surface]

A small piece measuring 1 cm×1 cm was cut out of the Positive Electrode Sample 1 followed by coating the surface with gold by sputtering in a vacuum at 10 Pa. Continuing, the surface of the positive electrode was measured by SEM and EDX while exposed to the atmosphere under the conditions indicated below.

(SEM-EDX Measurement Conditions)

Measurement apparatus: FE-SEM S-4700 Field-Emission Scanning Electron Microscope manufactured by Hitachi High-Technologies Corp.

Acceleration voltage: 10 kV

Emission current: 1 μA

Measurement magnification: 2000×

Electron beam incident angle: 90°

X-ray extraction angle: 30°

Dead time: 15%

Mapped elements: C, O, F

Number of measurement pixels: 256×256

Measurement time: 60 sec

Number of integrations: 50

Brightness was adjusted such that luminance and contrast were adjusted so that the brightness had no pixels that reached the maximum luminance and the average value of the brightness falls within the range of 40% to 60% of luminance.

[SEM and EDX Measurement of Positive Electrode Cross-Section]

A small piece measuring 1 cm×1 cm was cut out of the positive electrode sample followed by the preparation of a cross-section perpendicular to the planar direction of the Positive Electrode Sample 1 using the SM-09020CP manufactured by JEOL Ltd. under conditions consisting an acceleration voltage of 4 kV and beam diameter of 500 μm using argon gas. SEM and EDX measurements were carried out on the positive electrode cross-section according to the method described above.

Images obtained from the aforementioned measured images of the positive electrode cross-section obtained SEM and EDX were analyzed using image analysis software (ImageJ) to determine the average particle diameter $X_1$ of the lithium compound and the average particle diameter $Y_1$ of the positive electrode active material. Particles containing a bright portion equal to 50% or more of the area thereof when binarized based on the average value of brightness with respect to the resulting oxygen mapping were taken to constitute lithium compound particles X, other particles were taken to constitute positive electrode active material particles Y, area S was determined for all of the respective particles X and Y observed in cross-sectional SEM images, and particle diameter d was determined as calculated according to the following equation (1) (wherein n represents the ratio of circumference to diameter).

[Math. 8]

$$d=2\times(S/\pi)^{1/2} \quad (1)$$

Volume average particle diameter $X_0$ and $Y_0$ shown in the following Equation 2 were determined using the resulting particle diameter d.

[Math. 9]

$$X_0(Y_0)=\Sigma[4/3\pi\times(d/2)^3\times d]/\Sigma[4/3\pi\times(d/2)^3] \quad (2)$$

Five locations of the positive electrode cross-section were measured while changing the field, and the respective average values of $X_0$ and $Y_0$ in the form of average particle diameter $X_1$ and $Y_1$ were 1.59 μm and 4.32 μm, respectively.

[Quantification of Lithium Compound]

The positive electrode sample obtained in the manner described above was cut out to a size of 5 cm×5 cm (weight: 0.256 g) and immersed in 20 g of methanol followed by placing a cover on the container and allowing to stand undisturbed for 3 days in an environment at 25° C. Subsequently, the positive electrode was removed and vacuum-dried for 10 hours under conditions of 120° C. and 5 kPa. The weight $M_0$ of the positive electrode at this time was 0.254 g and the residual amount of diethyl carbonate as determined by measuring the methanol solution after washing by GC/MS by preparing a calibration curve was confirmed to be less than 1%. Continuing, the positive electrode was immersed in 25.00 g of distilled water and a cover was placed on the container followed by allowing to stand undisturbed for 3 days in an environment at 45° C. Subsequently, the electrode was removed and vacuum-dried for 12 hours under conditions of 150° C. and 3 kPa. The weight $M_1$ of the positive electrode at this time was 0.236 g and the residual amount of distilled water as determined by measuring the distilled water after washing by GC/MS by preparing a calibration curve was confirmed to be less than 1%. The positive electrode active material layer on the positive electrode power collector was removed with a spatula or brush and the like, and measurement of the weight $M_2$ of the positive electrode power collector yielded a value of 0.099 g. Quantification of the amount of lithium carbonate in the positive electrode in accordance with formula (3) yielded a value of 11.6% by weight.

Analysis of the positive electrode active material layer and each type of evaluation were carried out in the same manner as Example 1. The evaluation results are shown in Tables 14 and 15.

Examples 90 to 93

Nonaqueous lithium-type power storage elements were respectively fabricated and evaluated in the same manner as Example 89 with the exception of respectively changing the positive electrode precursor active material and negative electrode to be as shown in the following Table 13. Results of evaluating the resulting nonaqueous lithium-type power storage elements are shown in the following Tables 14 and 15.

Examples 94 to 129 and Comparative Examples 51 to 54

Nonaqueous lithium-type power storage elements were respectively fabricated and evaluated in the same manner as Example 89 with the exception of respectively changing the positive electrode precursor active material, negative electrode, additional charging temperature and time, and amount and average particle diameter of the lithium compound of the positive electrode precursor to be as shown in the following Table 13. Results of evaluating the resulting nonaqueous lithium-type power storage elements are shown in the following Tables 14 and 15.

Examples 130 and 131

Nonaqueous lithium-type power storage elements were respectively fabricated and evaluated in the same manner as Example 89 with the exception of respectively changing the positive electrode precursor active material, negative electrode, and type and average particle diameter of the lithium compound of the positive electrode precursor to be as shown in the following Table 13. Results of evaluating the resulting nonaqueous lithium-type power storage elements are shown in the following Tables 14 and 15.

TABLE 13

| | Lithium compound | Positive electrode precursor active material | Negative electrode | Additional charging Temp. (° C.) | Additional charging Time (hr) | Amount. of lithium compound added to positive electrode precursor (wt %) | Average particle diameter of lithium compound added to positive electrode precursor (μm) |
|---|---|---|---|---|---|---|---|
| Ex. 89 | Lithium carbonate | A | A | 45 | 3 | 28 | 2.31 |
| Ex. 90 | | | E | 45 | 3 | 28 | 2.31 |
| Ex. 91 | | | F | 45 | 3 | 28 | 2.31 |
| Ex. 92 | | B | E | 45 | 3 | 28 | 2.31 |
| Ex. 93 | | | F | 45 | 3 | 28 | 2.31 |
| Ex. 94 | Lithium carbonate | | | 0 | 0.7 | 28 | 2.31 |
| Ex. 95 | | | | 60 | 0.7 | 28 | 2.31 |
| Ex. 96 | | | | 45 | 1 | 28 | 2.31 |
| Ex. 97 | | | | 45 | 1.3 | 28 | 2.31 |
| Ex. 98 | | | | 45 | 1.6 | 28 | 2.31 |
| Ex. 99 | | | | 45 | 2 | 28 | 2.31 |
| Ex. 100 | | | | 45 | 5 | 28 | 2.31 |
| Ex. 101 | | | | 45 | 10 | 28 | 2.31 |
| Ex. 102 | | | | 45 | 13 | 28 | 2.31 |
| Ex. 103 | | | | 45 | 15 | 28 | 2.31 |
| Ex. 104 | | | | 45 | 20 | 28 | 2.31 |
| Ex. 105 | | | | 0 | 22 | 28 | 2.31 |
| Ex. 106 | | | | 60 | 22 | 28 | 2.31 |

TABLE 13-continued

| | Positive electrode Lithium compound | Positive electrode precursor active material | Negative electrode | Additional charging Temp. (° C.) | Additional charging Time (hr) | Amount. of lithium compound added to positive electrode precursor (wt %) | Average particle diameter of lithium compound added to positive electrode precursor (μm) |
|---|---|---|---|---|---|---|---|
| Ex. 107 | | | | 30 | 3 | 28 | 2.31 |
| Ex. 108 | | | | 35 | 3 | 28 | 2.31 |
| Ex. 109 | | | | 40 | 3 | 28 | 2.31 |
| Ex. 110 | | | | 50 | 3 | 28 | 2.31 |
| Ex. 111 | | | | 55 | 3 | 28 | 2.31 |
| Ex. 112 | | | | 60 | 3 | 28 | 2.31 |
| Ex. 114 | | | | 45 | 3 | 28.2 | 1.51 |
| Ex. 115 | | | | 45 | 3 | 28.9 | 1.92 |
| Ex. 116 | | | | 45 | 3 | 28.7 | 3.77 |
| Ex. 117 | | | | 45 | 3 | 29.2 | 5.92 |
| Ex. 118 | | | | 45 | 3 | 28.1 | 6.52 |
| Ex. 119 | | | | 45 | 3 | 28 | 7.87 |
| Ex. 120 | | | | 45 | 3 | 28.1 | 8.43 |
| Ex. 121 | | | | 45 | 3 | 27.8 | 12.3 |
| Ex. 122 | | | | 45 | 3 | 16.3 | 2.29 |
| Ex. 123 | | | | 45 | 3 | 17.8 | 2.25 |
| Ex. 124 | | | | 45 | 3 | 20.7 | 2.26 |
| Ex. 125 | | | | 45 | 3 | 42.1 | 2.43 |
| Ex. 126 | | | | 45 | 3 | 52.9 | 2.43 |
| Ex. 127 | | | | 45 | 3 | 60.1 | 2.45 |
| Ex. 128 | | | | 45 | 3 | 65.3 | 2.43 |
| Ex. 129 | | | | 45 | 3 | 66.9 | 2.43 |
| Comp. Ex. 51 | | | | 45 | 0.1 | 28 | 2.31 |
| Comp. Ex. 52 | | | | 45 | 35 | 28 | 2.31 |
| Comp. Ex. 53 | | | | 45 | 0.1 | 16.6 | 1.54 |
| Comp. Ex. 54 | | | | 45 | 30 | 66.4 | 12.5 |
| Ex. 130 | Lithium oxide | | | 45 | 3 | 28 | 2.49 |
| Ex. 131 | Lithium hydroxide | | | 45 | 3 | 28 | 2.42 |

TABLE 14

| | Lithium compound after lithium doping | | | Positive electrode side | | Negative electrode side | | Amount of compounds contained in |
|---|---|---|---|---|---|---|---|---|
| | Amount. (wt %) | Average. particle diameter X1 (μm) | Average particle diameter of positive electrode active material Y1 (μm) | XF/XC (×10$^{-3}$) | Particulate substance density (particles/μm$^2$) | XF/XC (×10$^{-3}$) | Particulate substance density (particles/μm$^2$) | positive electrode active material layer (×10$^{-4}$ mol/g) |
| Ex. 89 | 11.6 | 1.59 | 4.32 | 52.3 | 3.1 | 27.2 | 7.3 | 48.1 |
| Ex. 90 | 12.7 | 1.63 | 4.29 | 55.9 | 3.4 | 29.3 | 8.5 | 51.2 |
| Ex. 91 | 11.3 | 1.58 | 4.21 | 53.2 | 3.1 | 28.5 | 7.5 | 49.3 |
| Ex. 92 | 13.5 | 1.75 | 7.27 | 58.9 | 2.9 | 25.3 | 6.9 | 44.9 |
| Ex. 93 | 13.2 | 1.77 | 7.12 | 57.0 | 2.8 | 24.1 | 7.0 | 57.9 |
| Ex. 94 | 16.3 | 1.97 | 7.17 | 10.5 | 1.4 | 4.6 | 0.8 | 39.4 |
| Ex. 95 | 15.3 | 1.76 | 7.26 | 4.3 | 0.7 | 5.0 | 1.1 | 72.3 |
| Ex. 96 | 15.6 | 1.86 | 7.15 | 32.5 | 2.6 | 5.1 | 1.2 | 45.2 |
| Ex. 97 | 15.4 | 1.84 | 7.23 | 48.1 | 3.1 | 9.8 | 3.8 | 46.8 |
| Ex. 98 | 14.9 | 1.82 | 7.12 | 48.9 | 2.9 | 10.2 | 4.2 | 47.9 |
| Ex. 99 | 14.4 | 1.80 | 7.10 | 49.2 | 2.6 | 13.9 | 4.4 | 49.1 |
| Ex. 100 | 11.1 | 1.62 | 7.25 | 60.1 | 3.1 | 53.9 | 13.1 | 62.4 |
| Ex. 101 | 9.6 | 1.53 | 7.34 | 62.3 | 3.3 | 98.9 | 14.9 | 61.5 |
| Ex. 102 | 9.1 | 1.45 | 7.12 | 65.3 | 3.5 | 100.9 | 15.3 | 63.0 |
| Ex. 103 | 8.3 | 1.42 | 7.03 | 74.2 | 3.5 | 152.6 | 25.2 | 65.1 |
| Ex. 104 | 7.4 | 1.33 | 7.23 | 128.3 | 7.3 | 198.9 | 29.7 | 69.0 |
| Ex. 105 | 8.4 | 1.42 | 7.11 | 208.2 | 30.2 | 199.7 | 29.8 | 55.9 |
| Ex. 106 | 5.2 | 1.27 | 7.16 | 196.3 | 27.9 | 209.9 | 32.1 | 82.9 |
| Ex. 107 | 17.0 | 1.91 | 7.21 | 49.1 | 2.1 | 20.9 | 5.3 | 1.7 |
| Ex. 108 | 15.9 | 1.85 | 7.18 | 50.1 | 2.5 | 22.3 | 5.6 | 15.1 |
| Ex. 109 | 14.8 | 1.81 | 7.09 | 53.6 | 2.8 | 24.5 | 5.9 | 40.9 |
| Ex. 110 | 11.2 | 1.69 | 7.03 | 59.6 | 3.6 | 26.9 | 6.5 | 112.3 |
| Ex. 111 | 9.9 | 1.61 | 7.12 | 64.1 | 4.1 | 28.1 | 6.8 | 231.7 |
| Ex. 112 | 7.8 | 1.53 | 7.32 | 69.9 | 4.9 | 29.3 | 7.1 | 297.8 |
| Ex. 114 | 13.2 | 0.08 | 7.23 | 57.3 | 3.5 | 24.3 | 7.1 | 52.9 |
| Ex. 115 | 13.8 | 1.12 | 7.1 | 58.1 | 3.4 | 24.2 | 7.9 | 49.3 |
| Ex. 116 | 13.9 | 2.35 | 7.03 | 57.2 | 3.2 | 25.4 | 6.3 | 53.8 |
| Ex. 117 | 12.9 | 4.23 | 7.21 | 56.5 | 2.9 | 25.7 | 7.8 | 52.8 |

TABLE 14-continued

| | Lithium compound after lithium doping | | | Positive electrode side | | Negative electrode side | | Amount of compounds contained in |
|---|---|---|---|---|---|---|---|---|
| | Amount. (wt %) | Average. particle diameter X1 (μm) | Average particle diameter of positive electrode active material Y1 (μm) | XF/XC (×10$^{-3}$) | Particulate substance density (particles/μm$^2$) | XF/XC (×10$^{-3}$) | Particulate substance density (particles/μm$^2$) | positive electrode active material layer (×10$^{-4}$ mol/g) |
| Ex. 118 | 13.4 | 5.32 | 7.13 | 56.9 | 2.5 | 24.9 | 7.1 | 54.1 |
| Ex. 119 | 13.6 | 6.45 | 7.21 | 57.3 | 3.8 | 24.2 | 7.2 | 53.9 |
| Ex. 120 | 12.8 | 7.05 | 7.11 | 57.9 | 3.2 | 25.1 | 6.8 | 52.7 |
| Ex. 121 | 13.6 | 10.06 | 7.04 | 58.2 | 2.8 | 24.9 | 7.3 | 53.5 |
| Ex. 122 | 0.9 | 1.78 | 7.02 | 53.9 | 2.9 | 25.1 | 7.3 | 54.2 |
| Ex. 123 | 1.1 | 1.75 | 7.12 | 57.2 | 3.1 | 24.9 | 7.9 | 51.6 |
| Ex. 124 | 5.3 | 1.72 | 7.25 | 57.9 | 2.6 | 24.5 | 7.1 | 49.3 |
| Ex. 125 | 25.7 | 1.82 | 7.12 | 56.2 | 2.7 | 24.8 | 6.8 | 55.1 |
| Ex. 126 | 34.7 | 1.74 | 7.16 | 57.2 | 3.0 | 25.3 | 7.0 | 55.2 |
| Ex. 127 | 44.2 | 1.81 | 7.11 | 56.7 | 3.1 | 24.7 | 6.2 | 52.6 |
| Ex. 128 | 49.8 | 1.73 | 7.04 | 57.2 | 3.2 | 25.3 | 6.9 | 53.2 |
| Ex. 129 | 50.23 | 1.79 | 7.24 | 57.1 | 2.9 | 25.1 | 7.3 | 54.1 |
| Comp. Ex. 51 | 19.5 | 1.92 | 7.25 | 2.7 | 0.1 | 7.1 | 2.2 | 1.1 |
| Comp. Ex. 52 | 3.8 | 1.21 | 7.11 | 241.1 | 45.4 | 220.7 | 35.7 | 320.1 |
| Comp. Ex. 53 | 0.7 | 0.09 | 7.23 | 4.3 | 0.2 | 6.4 | 1.7 | 1.5 |
| Comp. Ex. 54 | 50.01 | 10.02 | 7.12 | 232.2 | 39.8 | 225.9 | 40.8 | 308.5 |
| Ex. 130 | 9.8 | 1.21 | 7.23 | 72.3 | 5.2 | 28.1 | 12.9 | 102.1 |
| Ex. 131 | 12.3 | 1.79 | 7.19 | 52.2 | 3.1 | 25.3 | 8.2 | 62.3 |

TABLE 15

| | Initial characteristics | | | 60° V storage test | |
|---|---|---|---|---|---|
| | Volumetric density E/V (Wh/L) | Initial constant Ra · F (ΩF) | Low-temp. resistance ratio Rc/Ra | Resistance increase ratio Rb/Ra | Amount of gas × 10$^{-3}$ (cc/F) |
| Ex. 89 | 21.7 | 1.96 | 20.93 | 2.29 | 5.1 |
| Ex. 90 | 19.0 | 1.04 | 7.09 | 2.50 | 5.0 |
| Ex. 91 | 23.0 | 2.09 | 12.90 | 2.13 | 4.0 |
| Ex. 92 | 21.0 | 0.85 | 6.90 | 3.33 | 5.7 |
| Ex. 93 | 29.4 | 1.68 | 23.10 | 1.76 | 1.9 |
| Ex. 94 | 22.7 | 2.56 | 29.22 | 2.64 | 26.9 |
| Ex. 95 | 23.7 | 2.37 | 27.84 | 2.36 | 22.0 |
| Ex. 96 | 24.6 | 2.24 | 27.78 | 2.35 | 18.3 |
| Ex. 97 | 24.8 | 2.25 | 27.20 | 2.30 | 10.9 |
| Ex. 98 | 29.3 | 2.02 | 23.34 | 1.63 | 2.2 |
| Ex. 99 | 28.5 | 1.54 | 22.09 | 1.98 | 2.1 |
| Ex. 100 | 29.3 | 1.69 | 24.97 | 1.84 | 2.1 |
| Ex. 101 | 29.4 | 1.82 | 25.44 | 1.64 | 2.1 |
| Ex. 102 | 25.6 | 2.18 | 27.84 | 2.50 | 11.7 |
| Ex. 103 | 25.4 | 2.18 | 28.70 | 2.29 | 14.1 |
| Ex. 104 | 25.4 | 2.27 | 28.07 | 2.45 | 19.2 |
| Ex. 105 | 23.5 | 2.35 | 28.40 | 2.47 | 22.9 |
| Ex. 106 | 22.1 | 2.52 | 29.96 | 2.61 | 27.5 |
| Ex. 107 | 29.4 | 2.00 | 25.77 | 2.40 | 2.1 |
| Ex. 108 | 29.1 | 1.88 | 24.81 | 1.65 | 2.1 |
| Ex. 109 | 29.3 | 1.74 | 25.14 | 1.79 | 1.9 |
| Ex. 110 | 29.1 | 1.76 | 23.20 | 1.76 | 2.0 |
| Ex. 111 | 29.0 | 1.92 | 24.60 | 1.69 | 2.1 |
| Ex. 112 | 29.5 | 2.04 | 25.88 | 1.71 | 2.2 |
| Ex. 114 | 25.4 | 1.91 | 26.93 | 2.39 | 3.4 |
| Ex. 115 | 29.6 | 1.86 | 23.60 | 1.70 | 1.9 |
| Ex. 116 | 29.3 | 1.76 | 23.49 | 1.59 | 1.9 |
| Ex. 117 | 29.3 | 1.76 | 24.03 | 1.68 | 1.9 |
| Ex. 118 | 29.2 | 1.84 | 24.42 | 1.70 | 2.0 |
| Ex. 119 | 29.4 | 1.87 | 25.11 | 1.68 | 2.1 |
| Ex. 120 | 29.1 | 1.91 | 24.98 | 1.71 | 2.2 |
| Ex. 121 | 25.5 | 1.96 | 26.29 | 2.70 | 3.4 |
| Ex. 122 | 25.1 | 1.95 | 25.82 | 2.54 | 3.3 |
| Ex. 123 | 29.4 | 1.87 | 24.61 | 1.68 | 1.9 |
| Ex. 124 | 29.1 | 1.81 | 23.22 | 1.71 | 2.0 |
| Ex. 125 | 29.8 | 1.77 | 23.74 | 1.60 | 2.0 |
| Ex. 126 | 29.2 | 1.77 | 23.97 | 1.67 | 1.9 |
| Ex. 127 | 29.2 | 1.84 | 24.09 | 1.70 | 2.2 |
| Ex. 128 | 29.6 | 1.91 | 24.60 | 1.74 | 2.2 |
| Ex. 129 | 25.0 | 1.91 | 25.08 | 2.79 | 3.2 |

TABLE 15-continued

|  | Initial characteristics | | | 60° V storage test | |
| --- | --- | --- | --- | --- | --- |
|  | Volumetric density E/V (Wh/L) | Initial constant Ra · F (ΩF) | Low-temp. resistance ratio Rc/Ra | Resistance increase ratio Rb/Ra | Amount of gas × $10^{-3}$ (cc/F) |
| Comp. Ex. 51 | 22.0 | 3.07 | 33.55 | 3.06 | 30.9 |
| Comp. Ex. 52 | 22.2 | 3.12 | 33.96 | 3.07 | 30.5 |
| Comp. Ex. 53 | 20.0 | 3.38 | 35.04 | 3.02 | 34.8 |
| Comp. Ex. 54 | 20.8 | 3.54 | 36.41 | 3.07 | 33.9 |
| Ex. 130 | 49.9 | 1.00 | 6.40 | 1.80 | 2.2 |
| Ex. 131 | 28.8 | 1.80 | 13.80 | 1.58 | 3.9 |

Fifth Embodiment

The following provides an explanation of Examples 132 to 164 and Comparative Examples 55 to 72 as embodiments of the fifth aspect of the present invention.

Example 132

<Production of Coating Solution 1C>

The positive electrode precursor was produced by using Activated Carbon B used in the aforementioned First Embodiment as the positive active material.

55.5 parts by weight of Activated Carbon B, 32.0 parts by weight of lithium carbonate having an average particle diameter of 2.0 μm, 3.0 parts by weight of Ketjen black, 1.5 parts by weight of polyvinylpyrrolidone (PVP), 8.0 parts by weight of polyvinylidene fluoride (PVDF) and N-methylpyrrolidone (NMP) were mixed followed by dispersing under conditions of a peripheral velocity of 17 μm/s using the FILMIX® thin film spin system high-speed mixer manufactured by Primix Corp. to obtain a coating solution. The viscosity (ηb) and Ti value of the resulting Coating Solution 1C were measured using the TVE-35H E-type viscometer manufactured by Toki Sangyo Co., Ltd. As a result, viscosity (ηb) was 2,370 mPa·s and the Ti value was 3.3. In addition, dispersity of the resulting Coating Solution 1C was measured using a particle gauge manufactured by Yoshimitsu Seiki Co., Ltd. As a result, dispersity was 31 μm.

The Coating Solution 1C was coated onto one side or both sides of aluminum foil having a thickness of 15 μm under conditions of a coating speed of 1 μm/s using a die coater manufactured by Toray Engineering Co., Ltd followed by drying at a drying temperature of 120° C. to obtain Positive Electrode Precursor 1 (single-sided) and Positive Electrode Precursor 1 (double-sided). A die discharge pressure of 55 kPa was used when applying the Coating Solution 1C to one side of the aluminum foil, and a die discharge pressure of 55 kPa was used for the upper die and a die discharge pressure of 60 kPa was used for the lower die when coating the Coating Solution 1C onto both sides of the aluminum foil. The resulting Positive Electrode Precursor 1 (single-sided) and Positive Electrode Precursor 1 (double-sided) were pressed under conditions of a pressure of 6 kN/cm and pressed surface temperature of 25° C. using a roll press.

The total thickness of the Positive Electrode Precursor 1 (double-sided) was measured at 10 arbitrary locations of the Positive Electrode Precursor 1C (double-sided) using the GS-551 Linear Gauge Sensor manufactured by Ono Sokki Co., Ltd. Subsequently, the positive electrode active material layer was removed from one side of the Positive Electrode Precursor C1 (double-sided) followed by measuring thickness again. Subsequently, the thickness of the aluminum foil was measured after completely removing the remaining positive electrode material layer on the positive electrode power collector. When the film thickness of the positive electrode active material layer of the Positive Electrode Precursor C1 (double-sided) was determined from the resulting measurement results, the thickness of the upper side of the positive electrode active material layer was 58 μm, the thickness of the lower side of the positive electrode active material layer was 61 μm, the upper side was designated as the $C_{y1}$ side of the positive electrode precursor, and the lower side was designated as the $C_{x1}$ side of the positive electrode precursor.

[Preparation of Active Material E]

BET specific surface area and pore size distribution of commercially available artificial graphite were measured according to the previously described method using a pore size distribution measurement apparatus (AUTOSORB-1 AS-1-MP) manufactured by Yuasa Ionics Co., Ltd. As a result, BET specific surface area was 3.1 m²/g and average particle diameter was 4.8 μm.

300 g of this artificial graphite were placed in a stainless steel mesh cage and the cage was placed on a stainless steel tray containing 30 g of coal-based pitch (softening point: 50° C.), and both the cage and tray were installed in an electric furnace (effective internal furnace dimensions: 300 mm×300 mm×300 mm). This was then subjected to a thermal reaction by raising the temperature to 1000° C. over the course of 12 hours in a nitrogen atmosphere and holding at the same temperature for 5 hours to obtain Active Material E (Composite Porous Carbon Material E). The resulting Composite Porous Carbon Material E was the allowed to cool naturally to 60° C. and then removed from the electric furnace.

The resulting Composite Porous Carbon Material E was measured for BET specific surface area and pore distribution using the same methods as previously described. As a result, BET specific surface area was 6.1 m²/g and average particle diameter was 4.9 μm. In addition, the weight ratio of the coal-based pitch-derived carbonaceous material to the activated carbon in the Composite Porous Carbon Material E was 2.0%.

<Production of Negative Electrode G1>

A negative electrode was produced using the Composite Porous Carbon Material E for the negative electrode active material.

84 parts by weight of Composite Porous Carbon Material E, 10 parts by weight of acetylene black, 6 parts by weight of polyvinylidene fluoride (PVdF) and N-methylpyrrolidone (NMP) were mixed followed by dispersing under conditions of a peripheral velocity of 17 μm/s using the FILMIX® thin film spin system high-speed mixer manufactured by Primix Corp. to obtain Coating Solution 1A. The viscosity (ηb) and Ti value of the resulting Coating Solution 1A were measured using the TVE-35H E-type viscometer manufactured by Toki Sangyo Co., Ltd. As a result, viscosity (ηb) was 2,520 mPa·s and the Ti value was 3.8.

The Coating Solution 1A was coated under conditions of a coating speed of 2 µm/s onto both sides of electrolytic copper foil having a thickness of 10 µm using a die coater manufactured by Toray Engineering Co., Ltd. followed by drying at a drying temperature of 120° C. to obtain Negative Electrode G1. A die discharge pressure of 45 kPa was used for the upper die and a die discharge pressure of 50 kPa was used for the lower die when coating the Coating Solution 1A onto both sides of the copper foil. The resulting Negative Electrode G1 was pressed under conditions of a pressure of 5 kN/cm and pressed surface temperature of 25° C. using a roll press.

The total thickness of the pressed Negative Electrode G1 was measured at 10 arbitrary locations of the Negative Electrode G1 using the GS-551 Linear Gauge Sensor manufactured by Ono Sokki Co., Ltd. Subsequently, the negative electrode active material layer was removed from one side of the Negative Electrode G1 followed by measuring thickness again. Subsequently, the thickness of the copper foil was measured after completely removing the remaining negative electrode material layer on the negative electrode power collector. When the film thickness of the negative electrode active material layer of Negative Electrode G1 was determined from the resulting measurement results, the thickness of the upper side of the negative electrode active material layer was 32 µm, the thickness of the lower side of the negative electrode active material layer was 35 µm, the upper side was designated as the $A_{y1}$ side of the negative electrode, and the lower side was designated as the $A_{x1}$ side of the negative electrode.

[Measurement of Capacitance per Negative Electrode Unit Weight]

A single sheet of the resulting Negative Electrode G1 was cut out to a size of 1.4 cm×2.0 cm (2.8 cm$^2$) followed by removing one of the negative electrode active material layers coated on both sides of the copper foil using a spatula or brush and the like for use as a working electrode. Lithium metal was respectively used for the counter electrode and reference electrode, and a nonaqueous solution, obtained by dissolving LiPF$_6$ at a concentration of 1.0 mol/L in a mixed solvent of ethylene carbonate (EC) and ethyl methyl carbonate (EMC) at a weight ratio of 1:1, was used for the electrolytic solution to prepare an electrochemical cell in an argon glovebox.

Initial charging capacity of the resulting electrochemical cell was measured using a charging and discharging apparatus (TOSCAT-3100U) manufactured by Toyo System Co., Ltd. according to the procedure indicated below.

After carrying out constant current charging on the electrochemical cell at a temperature of 25° C. and current value of 0.5 mA/cm$^2$ until the voltage reached 0.01 V, constant voltage charging was further carried out until the current value reached 0.01 mA/cm$^2$. Evaluation of the charging capacity during this constant current charging and constant voltage charging as initial charging capacity yielded a value of 0.74 mAh, and the capacity per unit area of the Negative Electrode G1 (doped amount of lithium ions) was 545 mAh/g.

<Preparation of Electrolytic Solution>

A Nonaqueous Electrolytic Solution 1 was obtained by using an organic solvent in the form of a mixed solvent of ethylene carbonate (EC) and methyl ethyl carbonate (EMC) at a ratio (weight ratio) of 33:67, and dissolving electrolyte salts respectively consisting of LiN(SO$_2$F)$_2$ and LiPF$_6$ at a concentration ratio of 75:25 (molar ratio), and a total concentration of LiN(SO$_2$F)$_2$ and LiPF$_6$ of 1.2 mol/L, in the entire electrolytic solution. The concentrations of LiN(SO$_2$F)$_2$ and LiPF$_6$ in Nonaqueous Electrolytic Solution 1 were 0.9 mol/L and 0.3 mol/L, respectively.

<Fabrication of Nonaqueous Lithium Power Storage Element>

Two sheets of Positive Electrode Precursor C1 (single-sided) and 19 sheets of Positive Electrode Precursor C1 (double-sided) were cut out from the resulting Positive Electrode Precursor C1 so that the size of the positive electrode active material layer measured 10.0 cm×10.0 cm (100 cm$^2$). Continuing, 20 sheets of Negative Electrode G1 were cut out so that the size of the negative electrode active material layer measured 10.1 cm×10.1 cm (102 cm$^2$). In addition, 40 sheets of a polyethylene separator (manufactured by ASAHI KASEI KABUSHIKI KAISHA, thickness: 10 µm) measuring 10.3 cm×10.3 cm (106 cm$^2$) were prepared. These were laminated in the order of the Positive Electrode Precursor C1 (single-sided), separator, Negative Electrode G1, separator and Positive Electrode Precursor C1 (double-sided) so that the outermost layer was the Positive Electrode Precursor C1 (single-sided), the positive electrode precursor side $C_{x1}$ and negative electrode side $A_{x1}$ were opposed with the separator interposed there between, and positive electrode precursor side $C_{y1}$ and negative electrode side $A_{y1}$ were opposed with the separator interposed there between to obtain an electrode laminated body. A positive electrode terminal and negative electrode terminal were ultrasonic-welded to the resulting electrode laminated body followed by placing in a container formed with an aluminum laminated film installed with a gas venting valve provided with a check valve and sealing by heat sealing on three sides including the electrode terminal portion.

Approximately 70 g of nonaqueous electrolytic solution were injected under atmospheric pressure into the electrode laminated body housed in an aluminum laminated film in a dry air environment at a temperature of 25° C. and dew point of −40° C. or lower. Continuing, this was placed in a pressure reduction chamber and the pressure was reduced from normal pressure to −87 kPa followed by returning to atmospheric pressure and allowing to stand undisturbed for 5 minutes. Subsequently, a step consisting of reducing pressure from atmospheric pressure to −87 kPa and then returning to atmospheric pressure was repeated four times followed by allowing to stand undisturbed for 15 minutes. Moreover, after reducing pressure from atmospheric pressure to −91 kPa, pressure was returned to atmospheric pressure. A step consisting of similarly reducing pressure and then returning to atmospheric pressure was repeated a total of seven times (while reducing pressure from atmospheric pressure to −95 kPa, −96 kPa, −97 kPa, −81 kPa, −97 kPa, −97 kPa and −97 kPa each time). Nonaqueous Electrolytic Solution 1 was impregnated in the electrode laminated body according to the aforementioned steps.

Subsequently, the electrode laminated body impregnated with the Nonaqueous Electrolytic Solution 1 was placed in a reduced-pressure sealing machine and sealed for 10 seconds at 180° C. and pressure of 0.1 MPa while reducing the pressure to −95 kPa to seal the aluminum laminated film.

<Lithium Doping Step>

The resulting electrode laminated body was placed in argon glovebox at a temperature of 25° C., dew point of −60° C. and oxygen concentration of 1 ppm. The aluminum laminated film was opened by making a cut in the surplus portion, and after carrying out constant current charging until the voltage reached 4.5 V at a current value of 100 mA using a power supply (P4LT18-0.2) manufactured by Matsusada Precision Inc., initial charging was then carried out according to a procedure consisting of continuing constant voltage charging at 4.5 V for 72 hours to dope the negative electrode with lithium. Following completion of lithium doping, the aluminum laminated film was sealed using a heat sealing machine (FA-300) manufactured by Fuji Impulse Co., Ltd.

<Aging Step>

After removing the lithium-doped electrode laminated body from the argon glovebox and carrying out constant current discharging at 100 mA in an environment at 25° C. until the voltage reached 3.8 V, the voltage was adjusted to 3.8 V by carrying out constant current discharging at 3.8 V for 1 hour. Continuing, the electrode laminated body was stored for 48 hours in a thermostatic chamber at 60° C.

<Gas Venting Step>

A portion of the aluminum laminated film of the electrode laminated body after aging was opened in a dry air environment at a temperature of 25° C. and dew point of −40° C. Continuing, the electrode laminated body was placed in a pressure reduction chamber, and after reducing pressure from atmospheric pressure to −80 kPa over the course of 3 minutes using a diaphragm pump (KNF Japan Co., Ltd., N816.3KT.45.18), pressure was returned to atmospheric pressure over the course of 3 minutes, and this step was repeated a total of three times. Subsequently, after placing the electrode laminated body in a reduced-pressure sealing machine and reducing the pressure to −90 kPa, the aluminum laminated film was sealed by sealing for 10 seconds at 200° C. and pressure of 0.1 MPa to fabricate nonaqueous lithium power storage elements. Three nonaqueous lithium power storage elements were fabricated according to the aforementioned process.

<Evaluation of Nonaqueous Lithium Power Storage Elements>

Measurement of electrostatic capacitance, measurement of internal resistance and a high-temperature storage test were carried out on one of the resulting nonaqueous lithium power storage elements in the same manner as Example 1. Evaluation results are shown in Table 17.

[Overcharging Test]

Thermocouples are attached to the negative electrode terminal, positive electrode terminal and center of the casing of one of the remaining nonaqueous lithium power storage elements obtained in the aforementioned step followed by subjecting to constant current charging up to 4.0 V at a current value of 20 C (16 Å) in an explosion-proof thermostatic chamber set to 25° C. using a power supply (ELZ-175) manufactured by Takasago Ltd., and then carrying out constant voltage charging for 10 minutes by applying a constant voltage of 4.0 V. Subsequently, charging was continued for 3 minutes at a current value of 20 C (16 Å) using a set voltage of 8.0 V. Voltage and temperature were sampled during the overvoltage test at 1 second intervals. The maximum attainable temperature of the negative electrode terminal portion during the overcharging test was 43° C. and the nonaqueous lithium power storage element was cleaved after the overcharging test.

[Determination of $C_{x1}$, $C_{y1}$, $C_{x2}$, $C_{y2}$, $A_{x1}$ and $A_{y1}$]

The resulting remaining nonaqueous lithium power storage element was adjusted to a voltage of 2.9 V and disassembled in an argon glovebox at a dew point temperature of −72° C. followed by the determination of $C_{x1}$, $C_{y1}$, $C_{x2}$, $C_{y2}$, $A_{x1}$ and $A_{y1}$ using equations (4), (5) and (6) in accordance with the previously described methods.

[Micro-Raman Spectroscopy]

A positive electrode was cut out to a size of 10 cm×10 cm from an electrode laminated body obtained by disassembling the aforementioned nonaqueous lithium power storage element. The resulting positive electrode was immersed in 30 g of diethyl carbonate solvent and washed for 10 minutes by occasionally moving the positive electrode with tweezers. Continuing, the positive electrode was removed and air-dried for 5 minutes in an argon glovebox followed by immersing the positive electrode in 30 g of freshly prepared diethyl carbonate solvent and washing for 10 minutes using the same method as described above. The washed positive electrode was removed from the argon glovebox and dried for 20 hours under conditions of a temperature of 25° C. and pressure of 1 kPa using a vacuum dryer (DP33 manufactured by Yamato Scientific Co., Ltd.) to obtain Positive Electrode Sample 1.

Two small pieces measuring 1 cm×1 cm were cut out from the resulting Positive Electrode Sample 1 while maintaining prevention of exposure to the atmosphere, and a sample obtained by removing the positive electrode active material layer on the $C_y$ side using a spatula or brush and the like was designated as Sample $S_x$, a sample obtained by removing the positive electrode active material layer on the $C_x$ side was designated as Sample $S_y$, and these samples were used as samples for micro-Raman spectroscopy.

(Measurement)

Carbonate ion mapping was carried out using the inVia Reflex micro-Raman spectroscopy system manufactured by Renishaw Plc. Light was focused at the location of the sample to attain power of about 0.7 W by setting the wavelength of the excitation light laser to 532 nm and using a 50× objective lens having a long working distance. A range extending 90 µm in the direction of thickness of the positive electrode cross-section and 30 µm in the direction perpendicular to the direction of thickness was scanned at 1 µm intervals, and a Raman spectrum was obtained for each measurement point. A straight baseline was drawn over a range of 1071 cm$^{-1}$ to 1104 cm$^{-1}$ for the peak attributable to carbonate ions observed at 1086 cm$^{-1}$ in the Raman spectrum, and the area appearing in the region on the positive side of the baseline and the area appearing in the region on the negative side of the baseline were respectively calculated as peak areas. The sign of the area appearing on the negative side of the baseline was given a negative value. An image of carbonate ions was obtained by depicting the peak area of the carbonate ions as a spatial distribution.

(Determination of Carbonate Ion Mapping Areas $S_x$ and $S_y$)

Carbonate ion mapping areas $S_x$ and $S_y$ were determined in the manner described below. A straight baseline was set at the locations of 1071 cm$^{-1}$ and 1104 cm$^{-1}$ in the Raman spectrum consisting of 2700 points obtained at each measurement location on the surface of Sample $S_x$, the area of the portion above the baseline was designated as positive, and the area of the portion below the baseline was designated as negative to prepare mapping data of area (a). Continuing, a histogram A was prepared by dividing the range from the maximum value to the minimum value of area (a) into 100 sections, and the portion farther to the negative side than the area value that gives the maximum frequency was fit according to the least-squares method using a Gaussian function to approximate the noise component with a Gaussian function B. The difference obtained by subtracting the fit Gaussian function B from the original histogram A was taken to constitute histogram C of the peak area of $CO_3^{2-}$ ions. Determination of the mapping frequency of $CO_3^{2-}$ ions from the cumulative frequency equal to or greater area (b) giving the maximum frequency yielded a value of 142. When carbonate ion mapping area $S_x$ was determined by dividing this mapping frequency by the overall frequency of 2700, $S_x$ was determined to be 5.3%. Calculation of carbonate ion mapping area $S_y$ of Sample $S_y$ in the same manner yielded a value of 4.2%.

[Determination of $C_{y3}$ and $A_{y3}$]

The remaining Positive Electrode Sample 1 was cut to a size of 10 cm×5 cm in an Ar glovebox while maintaining protection from exposure to the atmosphere, and the positive electrode active material layer on the $C_x$ side was removed using a spatula or brush and the like. The resulting Positive Electrode Sample 1 was washed for 10 minutes with 30 g of diethyl carbonate solvent and vacuum-dried in a side box while maintaining protection from exposure to the atmosphere. The dried positive electrode laminated body was transferred from the side box to an Ar glovebox while maintaining protection from the atmosphere, the positive electrode active material layer was analyzed in the same manner as Example 1, and the concentration $C_{y3}$ of $LiOCH_2CH_2OLi$ contained on the $C_y$ side was determined. Concentration $A_{y3}$ of $LiOCH_2CH_2OLi$ contained in the negative electrode active material layer opposing the $C_y$ side was also determined using the same method. The results are shown in Table 16.

Example 133

A nonaqueous lithium power storage element was fabricated using the same method as Example 132 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 134

A nonaqueous lithium power storage element was fabricated using the same method as Example 132 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Example 135

A nonaqueous lithium power storage element was fabricated using the same method as Example 132 with the exception of doping the negative electrode with lithium by carrying out constant current charging at a current value of 100 mA until voltage reached 4.6 V and then continuing constant voltage charging at 4.6 V for 72 hours during initial charging of the nonaqueous lithium power storage element of the lithium doping step.

Example 136

A nonaqueous lithium power storage element was fabricated using the same method as Example 135 with the exception of doping the negative electrode with lithium by carrying out constant current charging at a current value of 100 mA until voltage reached 4.6 V and then continuing constant voltage charging at 4.6 V for 36 hours during initial charging of the nonaqueous lithium power storage element of the lithium doping step.

Example 137

A nonaqueous lithium power storage element was fabricated using the same method as Example 135 with the exception of doping the negative electrode with lithium by carrying out constant current charging at a current value of 100 mA until voltage reached 4.6 V and then continuing constant voltage charging at 4.6 V for 12 hours during initial charging of the nonaqueous lithium power storage element of the lithium doping step.

Example 138

A nonaqueous lithium power storage element was fabricated using the same method as Example 132 with the exception of doping the negative electrode with lithium by carrying out constant current charging at a current value of 100 mA until voltage reached 4.3 V and then continuing constant voltage charging at 4.3 V for 72 hours during initial charging of the nonaqueous lithium power storage element of the lithium doping step.

Example 139

A nonaqueous lithium power storage element was fabricated using the same method as Example 138 with the exception of doping the negative electrode with lithium by carrying out constant current charging at a current value of 100 mA until voltage reached 4.3 V and then continuing constant voltage charging at 4.3 V for 36 hours during initial charging of the nonaqueous lithium power storage element of the lithium doping step.

Example 140

A nonaqueous lithium power storage element was fabricated using the same method as Example 138 with the exception of doping the negative electrode with lithium by carrying out constant current charging at a current value of 100 mA until voltage reached 4.3 V and then continuing constant voltage charging at 4.3 V for 12 hours during initial charging of the nonaqueous lithium power storage element of the lithium doping step.

Example 141

A nonaqueous lithium power storage element was fabricated using the same method as Example 132 with the exception of fabricating the Positive Electrode Precursor C2 (single-sided) using an upper die discharge pressure of 56.5 kPa when coating the positive electrode precursor (single-sided), and fabricating the Positive Electrode Precursor C2 (double-sided) using an upper die discharge pressure of 56.5 kPa and using a lower die discharge pressure of 58.5 kPa when coating the positive electrode precursor (double-sided).

Example 142

A nonaqueous lithium power storage element was fabricated using the same method as Example 141 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 143

A nonaqueous lithium power storage element was fabricated using the same method as Example 141 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Example 144

A nonaqueous lithium power storage element was fabricated using the same method as Example 132 with the exception of fabricating the Positive Electrode Precursor C3 (single-sided) using an upper die discharge pressure of 52.5 kPa when coating the positive electrode precursor (single-sided), and fabricating the Positive Electrode Precursor C3 (double-sided) using an upper die discharge pressure of 52.5 kPa and a lower die discharge pressure of 62.5 kPa when coating the positive electrode precursor (double-sided).

Example 145

A nonaqueous lithium power storage element was fabricated using the same method as Example 132 with the exception of fabricating the Positive Electrode Precursor C4 (single-sided) using an upper die discharge pressure of 50 kPa when coating the positive electrode precursor (single-sided), and fabricating the Positive Electrode Precursor C4 (double-sided) using an upper die discharge pressure of 50 kPa and a lower die discharge pressure of 65 kPa when coating the positive electrode precursor (double-sided).

Example 146

A nonaqueous lithium power storage element was fabricated using the same method as Example 145 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 147

A nonaqueous lithium power storage element was fabricated using the same method as Example 145 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Example 148

A nonaqueous lithium power storage element was fabricated using the same method as Example 132 with the exception of fabricating the Negative Electrode G2 using an upper die discharge pressure of 46.5 kPa and a lower die discharge pressure of 48.5 kPa when coating the negative electrode.

Example 149

A nonaqueous lithium power storage element was fabricated using the same method as Example 148 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 150

A nonaqueous lithium power storage element was fabricated using the same method as Example 148 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Example 151

A nonaqueous lithium power storage element was fabricated using the same method as Example 132 with the exception of fabricating the Negative Electrode G3 using an upper die discharge pressure of 40 kPa and a lower die discharge pressure of 55 kPa when coating the negative electrode.

Example 152

A nonaqueous lithium power storage element was fabricated using the same method as Example 151 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 153

A nonaqueous lithium power storage element was fabricated using the same method as Example 151 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Example 154

A nonaqueous lithium power storage element was fabricated in the same manner as Example 132 with the exception of using Positive Electrode Precursor C2 (single-sided), Positive Electrode Precursor C2 (double-sided) and Negative Electrode G2.

Example 155

A nonaqueous lithium power storage element was fabricated in the same manner as Example 132 with the exception of using Positive Electrode Precursor C4 (single-sided), Positive Electrode Precursor C4 (double-sided) and Negative Electrode G3.

Example 156

A nonaqueous lithium power storage element was fabricated using the same method as Example 155 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 157

A nonaqueous lithium power storage element was fabricated using the same method as Example 155 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Comparative Example 55

The Positive Electrode Precursor C5 (single-sided) was fabricated using an upper die discharge pressure of 57.5 kPa when coating the positive electrode precursor (single-sided), and the Positive Electrode Precursor C5 (double-sided) was fabricated using an upper die discharge pressure of 57.5 kPa and lower die discharge pressure of 57.5 kPa when coating the positive electrode precursor (double-sided). A nonaqueous lithium power storage element was fabricated in the same manner as Example 132 and subjected to various evaluations with the exception of doping the negative electrode with lithium by carrying out constant current charging at a current value of 100 mA until voltage reached 4.2 V and then continuing constant voltage charging at 4.2 V for 3 hours during initial charging of an electrode laminated body using these electrodes in the lithium doping step.

Comparative Example 56

The Negative Electrode G4 was fabricated using an upper die discharge pressure of 47.5 kPa and lower die discharge pressure of 47.5 kPa when coating the negative electrode. A nonaqueous lithium power storage element was fabricated in the same manner as Example 132 and subjected to various evaluations with the exception of doping the negative electrode with lithium by carrying out constant current charging at a current value of 100 mA until voltage reached 4.2 V and then continuing constant voltage charging at 4.2 V for 3 hours during initial charging of an electrode laminated body using this electrode in the lithium doping step.

Comparative Example 57

The Positive Electrode Precursor C6 (single-sided) was fabricated using an upper die discharge pressure of 45 kPa when coating the positive electrode precursor (single-sided), and the Positive Electrode Precursor C6 (double-sided) was fabricated using an upper die discharge pressure of 45 kPa and lower die discharge pressure of 70 kPa when coating the positive electrode precursor (double-sided). A nonaqueous lithium power storage element was fabricated in the same manner as Example 132 and subjected to various evaluations with the exception of doping the negative electrode with lithium by carrying out constant current charging at a current value of 100 mA until voltage reached 4.2 V and then continuing constant voltage charging at 4.2 V for 3 hours during initial charging of an electrode laminated body using these electrodes in the lithium doping step.

Comparative Example 58

The Negative Electrode G5 was fabricated using an upper die discharge pressure of 35 kPa and lower die discharge pressure of 60 kPa when coating the negative electrode. A nonaqueous lithium power storage element was fabricated in the same manner as Example 132 and subjected to various evaluations with the exception of doping the negative electrode with lithium by carrying out constant current charging at a current value of 100 mA until voltage reached 4.2 V and then continuing constant voltage charging at 4.2 V for 3 hours during initial charging of an electrode laminated body using this electrode in the lithium doping step.

Comparative Example 59

A nonaqueous lithium power storage element was fabricated using the same method as Example 132 and subjected to various evaluations with the exception of doping the negative electrode with lithium by carrying out constant current charging at a current value of 100 mA until voltage reached 4.2 V and then continuing constant voltage charging at 4.2 V for 3 hours during initial charging of an electrode laminated body using the Positive Electrode Precursor C6 (single-sided), Positive Electrode Precursor C6 (double-sided) and Negative Electrode G5 of the lithium doping step.

Comparative Example 60

A nonaqueous lithium power storage element was fabricated using the same method as Comparative Example 59 with the exception of doping the negative electrode with lithium by carrying out constant current charging at a current value of 100 mA until voltage reached 4.1 V and then continuing constant voltage charging at 4.1 V for 72 hours during initial charging of the nonaqueous lithium power storage element of the lithium doping step.

Comparative Example 61

A nonaqueous lithium power storage element was fabricated using the same method as Comparative Example 59 with the exception of doping the negative electrode with lithium by carrying out constant current charging at a current value of 100 mA until voltage reached 4.1 V and then continuing constant voltage charging at 4.1 V for 36 hours during initial charging of the nonaqueous lithium power storage element of the lithium doping step.

Comparative Example 62

A nonaqueous lithium power storage element was fabricated using the same method as Comparative Example 59 with the exception of doping the negative electrode with lithium by carrying out constant current charging at a current value of 100 mA until voltage reached 4.1 V and then continuing constant voltage charging at 4.1 V for 12 hours during initial charging of the nonaqueous lithium power storage element of the lithium doping step.

Comparative Example 63

A nonaqueous lithium power storage element was fabricated using the same method as Comparative Example 59 with the exception of doping the negative electrode with lithium by carrying out constant current charging at a current value of 100 mA until voltage reached 5.0 V and then continuing constant voltage charging at 5.0 V for 72 hours during initial charging of the nonaqueous lithium power storage element of the lithium doping step.

Comparative Example 64

A nonaqueous lithium power storage element was fabricated using the same method as Comparative Example 59 with the exception of doping the negative electrode with lithium by carrying out constant current charging at a current value of 100 mA until voltage reached 5.1 V and then continuing constant voltage charging at 5.1 V for 72 hours during initial charging of the nonaqueous lithium power storage element of the lithium doping step.

Comparative Example 65

A nonaqueous lithium power storage element was fabricated using the same method as Comparative Example 59 with the exception of doping the negative electrode with lithium by carrying out constant current charging at a current value of 100 mA until voltage reached 5.2 V and then continuing constant voltage charging at 5.2 V for 72 hours during initial charging of the nonaqueous lithium power storage element of the lithium doping step.

Comparative Example 66

A nonaqueous lithium power storage element was fabricated in the same manner as Example 132 and subjected to various evaluations with the exception of fabricating an electrode laminated body so that positive electrode precursor side $C_{x1}$ and negative electrode side $A_{y1}$ were opposed with the separator interposed there between and positive electrode precursor side $C_{y1}$ and negative electrode side $A_{x1}$ were opposed with a separator interposed there between, and doping the negative electrode with lithium by carrying out constant current charging at a current value of 100 mA until voltage reached 4.2 V and then continuing constant voltage charging at 4.2 V for 3 hours during initial charging of the lithium doping step.

Comparative Example 67

A nonaqueous lithium power storage element was fabricated using the same method as Comparative Example 66 and subjected to various evaluations with the exception of doping the negative electrode with lithium by carrying out constant current charging at a current value of 100 mA until voltage reached 4.2 V and then continuing constant voltage charging at 4.2 V for 3 hours during initial charging of an electrode laminated body using the Positive Electrode Precursor C4 (single-sided), Positive Electrode Precursor C4 (double-sided) and Negative Electrode G3 of the lithium doping step.

The evaluation results of Examples 132 to 157 and Comparative Examples 55 to 67 are shown in Tables 16 and 17.

TABLE 16

| | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ | $C_{x2}/C_{y2}$ | Micro-Raman spectroscopy | | | $C_{y3}$ (10⁻⁴ mol/g) | $A_{y3}$ (10⁻⁴ mol/g) | $C_{y3}/A_{y3}$ |
| --- | --- | --- | --- | --- | --- | --- | --- | --- | --- | --- | --- | --- | --- | --- | --- |
| | | | | | | | | | | $S_x$ (%) | $S_y$ (%) | $S_x/S_y$ | | | |
| Ex. 132 | 28.3 | 26.6 | 4.2 | 3.5 | 26.0 | 23.5 | 1.06 | 1.11 | 1.20 | 5.3 | 4.2 | 1.26 | 89.8 | 50.3 | 1.8 |
| Ex. 133 | 28.4 | 26.5 | 8.5 | 7.4 | 26.0 | 23.5 | 1.07 | 1.11 | 1.15 | 10.0 | 8.5 | 1.18 | 44.1 | 37.9 | 1.2 |
| Ex. 134 | 28.6 | 26.4 | 13.5 | 12.7 | 25.9 | 23.6 | 1.08 | 1.10 | 1.06 | 26.3 | 25.7 | 1.02 | 24.0 | 36.9 | 0.7 |
| Ex. 135 | 28.5 | 26.5 | 1.5 | 1.1 | 25.9 | 23.6 | 1.08 | 1.10 | 1.36 | 1.6 | 1.2 | 1.33 | 272.8 | 42.7 | 6.4 |
| Ex. 136 | 28.5 | 26.5 | 3.8 | 3.4 | 25.9 | 23.5 | 1.08 | 1.10 | 1.12 | 2.1 | 1.8 | 1.17 | 200.5 | 21.4 | 9.4 |
| Ex. 137 | 28.4 | 26.6 | 7.9 | 7.5 | 26.0 | 23.4 | 1.07 | 1.11 | 1.05 | 9.3 | 9.0 | 1.03 | 151.7 | 8.0 | 19.0 |
| Ex. 138 | 28.4 | 26.4 | 8.5 | 6.8 | 25.9 | 23.6 | 1.08 | 1.11 | 1.25 | 11.2 | 9.2 | 1.22 | 35.9 | 40.5 | 0.9 |
| Ex. 139 | 28.5 | 26.6 | 12.5 | 11.2 | 26.0 | 23.6 | 1.07 | 1.10 | 1.12 | 20.3 | 17.8 | 1.14 | 9.4 | 20.2 | 0.5 |
| Ex. 140 | 28.5 | 26.5 | 16.8 | 16.3 | 25.9 | 23.5 | 1.08 | 1.10 | 1.03 | 38.6 | 37.1 | 1.04 | 2.4 | 10.4 | 0.2 |
| Ex. 141 | 28.0 | 27.2 | 4.0 | 3.7 | 26.0 | 23.4 | 1.03 | 1.11 | 1.08 | 2.1 | 2.0 | 1.05 | 94.0 | 39.9 | 2.4 |
| Ex. 142 | 28.0 | 27.1 | 8.2 | 7.8 | 25.9 | 23.5 | 1.03 | 1.10 | 1.05 | 8.6 | 8.1 | 1.06 | 42.0 | 35.3 | 1.2 |
| Ex. 143 | 27.9 | 27.1 | 13.2 | 12.8 | 25.9 | 23.6 | 1.03 | 1.10 | 1.03 | 24.5 | 24.0 | 1.02 | 19.0 | 35.3 | 0.5 |
| Ex. 144 | 30.4 | 24.5 | 5.2 | 3.1 | 26.0 | 23.4 | 1.24 | 1.11 | 1.68 | 4.6 | 2.8 | 1.64 | 84.2 | 40.2 | 2.1 |
| Ex. 145 | 31.5 | 23.6 | 5.7 | 3.0 | 25.9 | 23.5 | 1.33 | 1.10 | 1.90 | 5.8 | 3.0 | 1.93 | 77.7 | 38.9 | 2.0 |
| Ex. 146 | 31.5 | 23.5 | 10.3 | 5.7 | 25.9 | 23.4 | 1.34 | 1.11 | 1.81 | 14.3 | 8.0 | 1.79 | 39.5 | 39.3 | 1.0 |
| Ex. 147 | 31.4 | 23.6 | 14.5 | 7.9 | 26.1 | 23.5 | 1.33 | 1.11 | 1.84 | 28.4 | 15.6 | 1.82 | 16.2 | 53.4 | 0.3 |
| Ex. 148 | 28.4 | 26.5 | 4.1 | 3.4 | 25.2 | 24.2 | 1.07 | 1.04 | 1.21 | 3.5 | 2.9 | 1.21 | 84.4 | 37.2 | 2.3 |
| Ex. 149 | 28.5 | 26.5 | 8.6 | 7.2 | 25.3 | 24.3 | 1.08 | 1.04 | 1.19 | 11.3 | 9.6 | 1.18 | 43.4 | 28.7 | 1.5 |
| Ex. 150 | 28.4 | 26.4 | 13.3 | 12.8 | 25.2 | 24.5 | 1.08 | 1.03 | 1.04 | 27.4 | 26.9 | 1.02 | 12.6 | 29.9 | 0.4 |
| Ex. 151 | 28.4 | 26.5 | 4.2 | 3.4 | 28.5 | 21.4 | 1.07 | 1.33 | 1.24 | 3.1 | 2.5 | 1.24 | 79.5 | 46.4 | 1.7 |
| Ex. 152 | 28.5 | 26.6 | 8.5 | 7.5 | 28.5 | 21.4 | 1.07 | 1.33 | 1.13 | 11.2 | 10.0 | 1.12 | 42.5 | 39.5 | 1.1 |
| Ex. 153 | 28.5 | 26.6 | 13.5 | 12.6 | 28.6 | 21.5 | 1.07 | 1.33 | 1.07 | 27.3 | 25.7 | 1.06 | 12.6 | 35.5 | 0.4 |
| Ex. 154 | 28.0 | 27.1 | 3.8 | 3.6 | 25.1 | 24.3 | 1.03 | 1.03 | 1.06 | 1.7 | 1.6 | 1.06 | 82.7 | 48.3 | 1.7 |
| Ex. 155 | 31.5 | 23.5 | 5.4 | 3.0 | 28.5 | 21.5 | 1.34 | 1.33 | 1.80 | 4.5 | 2.5 | 1.80 | 77.8 | 42.8 | 1.8 |
| Ex. 156 | 31.4 | 23.6 | 10.4 | 5.7 | 28.6 | 21.6 | 1.33 | 1.32 | 1.82 | 17.5 | 9.3 | 1.88 | 36.2 | 34.8 | 1.0 |
| Ex. 157 | 31.5 | 23.5 | 14.6 | 7.7 | 28.5 | 21.5 | 1.34 | 1.33 | 1.90 | 32.1 | 16.8 | 1.91 | 12.1 | 27.6 | 0.4 |
| Comp. Ex. 55 | 27.6 | 27.4 | 25.8 | 26.0 | 25.9 | 23.4 | 1.01 | 1.11 | 0.99 | 48.6 | 51.0 | 0.95 | 1.3 | 3.6 | 0.4 |
| Comp. Ex. 56 | 28.6 | 26.6 | 26.8 | 25.2 | 24.8 | 24.6 | 1.08 | 1.01 | 1.06 | 56.8 | 54.4 | 1.04 | 1.1 | 3.8 | 0.3 |
| Comp. Ex. 57 | 31.8 | 23.1 | 36.4 | 17.6 | 25.9 | 23.5 | 1.38 | 1.10 | 2.07 | 84.4 | 38.4 | 2.20 | 1.0 | 3.2 | 0.3 |

TABLE 16-continued

| | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ | $C_{x2}/C_{y2}$ | Micro-Raman spectroscopy | | | $C_{y3}$ (10⁻⁴ mol/g) | $A_{y3}$ (10⁻⁴ mol/g) | $C_{y3}/A_{y3}$ |
|---|---|---|---|---|---|---|---|---|---|---|---|---|---|---|---|
| | | | | | | | | | | $S_x$ (%) | $S_y$ (%) | $S_x/S_y$ | | | |
| Comp. Ex. 58 | 28.5 | 26.5 | 27.4 | 25.6 | 28.9 | 21.1 | 1.08 | 1.37 | 1.07 | 58.6 | 52.0 | 1.13 | 0.9 | 3.6 | 0.3 |
| Comp. Ex. 59 | 31.8 | 23.0 | 36.8 | 17.4 | 28.9 | 21.1 | 1.38 | 1.37 | 2.11 | 86.0 | 41.4 | 2.08 | 1.2 | 3.7 | 0.3 |
| Comp. Ex. 60 | 31.8 | 23.1 | 20.2 | 14.5 | 29.0 | 21.1 | 1.38 | 1.37 | 1.39 | 46.4 | 34.3 | 1.35 | 1.2 | 21.2 | 0.06 |
| Comp. Ex. 61 | 31.9 | 23.0 | 21.2 | 15.1 | 28.9 | 20.9 | 1.39 | 1.38 | 1.40 | 48.9 | 33.8 | 1.45 | 0.8 | 17.7 | 0.05 |
| Comp. Ex. 62 | 31.8 | 23.1 | 22.1 | 15.6 | 28.9 | 21.1 | 1.38 | 1.37 | 1.42 | 50.2 | 35.8 | 1.40 | 0.6 | 13.2 | 0.05 |
| Comp. Ex. 63 | 31.9 | 23.1 | 0.8 | 0.5 | 29.0 | 20.9 | 1.38 | 1.39 | 1.60 | 0.5 | 0.3 | 1.67 | 315.0 | 76.5 | 4.1 |
| Comp. Ex. 64 | 31.9 | 23.0 | 0.6 | 0.4 | 28.9 | 21.0 | 1.39 | 1.38 | 1.50 | 0.5 | 0.3 | 1.67 | 345.0 | 78.4 | 4.4 |
| Comp. Ex. 65 | 31.8 | 23.0 | 0.4 | 0.2 | 28.9 | 21.1 | 1.38 | 1.37 | 2.00 | 0.4 | 0.2 | 2.00 | 367.0 | 81.2 | 4.5 |
| Comp. Ex. 66 | 28.5 | 26.5 | 27.0 | 25.0 | 23.4 | 25.9 | 1.08 | 0.90 | 1.08 | 46.0 | 42.2 | 1.09 | 1.0 | 3.6 | 0.3 |
| Comp. Ex. 67 | 31.4 | 23.6 | 28.8 | 16.0 | 21.6 | 28.5 | 1.33 | 0.76 | 1.80 | 54.0 | 30.2 | 1.79 | 1.1 | 3.5 | 0.3 |

TABLE 17

| | Initial characteristics | | High-temperature storage test | Overcharging test | |
|---|---|---|---|---|---|
| | Fa (F) | Ra (mΩ) | B (10⁻³ cc/F) | Max. temperature (° C.) | Status |
| Ex. 132 | 1753 | 0.56 | 1.76 | 43 | Cleaved |
| Ex. 133 | 1720 | 0.55 | 2.12 | 40 | Cleaved |
| Ex. 134 | 1824 | 0.59 | 2.32 | 45 | Cleaved |
| Ex. 135 | 1731 | 0.56 | 1.56 | 43 | Cleaved |
| Ex. 136 | 1720 | 0.54 | 1.89 | 40 | Cleaved |
| Ex. 137 | 1797 | 0.58 | 2.32 | 44 | Cleaved |
| Ex. 138 | 1819 | 0.59 | 1.89 | 45 | Cleaved |
| Ex. 139 | 1670 | 0.54 | 2.32 | 40 | Cleaved |
| Ex. 140 | 1697 | 0.55 | 2.43 | 41 | Cleaved |
| Ex. 141 | 1848 | 0.57 | 2.54 | 44 | Cleaved |
| Ex. 142 | 1804 | 0.56 | 2.34 | 41 | Cleaved |
| Ex. 143 | 1865 | 0.58 | 2.65 | 43 | Cleaved |
| Ex. 144 | 1615 | 0.57 | 1.78 | 43 | Cleaved |
| Ex. 145 | 1573 | 0.55 | 2.12 | 41 | Cleaved |
| Ex. 146 | 1496 | 0.57 | 2.43 | 43 | Cleaved |
| Ex. 147 | 1535 | 0.55 | 2.43 | 43 | Cleaved |
| Ex. 148 | 1791 | 0.57 | 1.98 | 45 | Cleaved |
| Ex. 149 | 1802 | 0.58 | 2.43 | 40 | Cleaved |
| Ex. 150 | 1766 | 0.57 | 2.67 | 41 | Cleaved |
| Ex. 151 | 1738 | 0.56 | 2.00 | 44 | Cleaved |
| Ex. 152 | 1790 | 0.58 | 2.40 | 41 | Cleaved |
| Ex. 153 | 1773 | 0.57 | 2.79 | 43 | Cleaved |
| Ex. 154 | 1841 | 0.57 | 1.67 | 43 | Cleaved |
| Ex. 155 | 1526 | 0.55 | 1.90 | 41 | Cleaved |
| Ex. 156 | 1496 | 0.53 | 2.38 | 43 | Cleaved |
| Ex. 157 | 1451 | 0.56 | 2.76 | 43 | Cleaved |
| Comp. Ex. 55 | 1228 | 0.77 | 6.50 | 98 | Cleaved |
| Comp. Ex. 56 | 1220 | 0.75 | 4.34 | 85 | Ruptured |
| Comp. Ex. 57 | 808 | 0.68 | 4.13 | 85 | Cleaved |
| Comp. Ex. 58 | 1060 | 0.68 | 4.34 | 85 | Cleaved |
| Comp. Ex. 59 | 808 | 0.75 | 4.43 | 103 | Cleaved |
| Comp. Ex. 60 | 976 | 0.83 | 6.87 | 75 | Cleaved |
| Comp. Ex. 61 | 874 | 0.86 | 7.98 | 69 | Cleaved |
| Comp. Ex. 62 | 768 | 0.92 | 9.54 | 72 | Cleaved |
| Comp. Ex. 63 | 1177 | 0.93 | 4.56 | 74 | Cleaved |
| Comp. Ex. 64 | 1145 | 1.01 | 5.87 | 78 | Cleaved |
| Comp. Ex. 65 | 1081 | 1.13 | 7.98 | 72 | Cleaved |
| Comp. Ex. 66 | 1188 | 0.72 | 3.72 | 163 | Ruptured |
| Comp. Ex. 67 | 780 | 0.75 | 4.32 | 181 | Ruptured |

Example 158

Positive Electrode Precursor D1 (single-sided) and Positive Electrode Precursor D1 (double-sided) were fabricated using the same method as Example 132 with the exception of using Activated Carbon A used in the aforementioned first embodiment. At this time, the film thickness of the upper side of the positive electrode active material layer was 55 μm, the film thickness of the lower side of the positive electrode active material layer was 58 μm, the upper side was designated as positive electrode precursor side $C_{y2}$, and the lower side was designated as positive electrode precursor side $C_{x2}$.

[Preparation of Active Material F]

The BET specific surface area and pore size distribution of commercially available coconut shell activated carbon were measured according to the previously described methods using a pore size distribution measurement apparatus (AUTOSORB-1 AS-1-MP) manufactured by Yuasa Ionics Co., Ltd. As a result, BET specific surface area was 1,790 m²/g, mesopore volume ($V_1$) was 0.199 cc/g, micropore volume (V2) was 0.698 cc/g, $V_1/V_2$ was 0.29 and average pore diameter was 20.1 Å.

300 g of this coconut shell activated carbon were placed in a stainless steel mesh cage, the cage was placed on a stainless steel tray containing 540 g of coal-based pitch (softening point: 50° C.), and both the cage and tray were installed in an electric furnace (effective internal furnace dimensions: 300 mm×300 mm×300 mm). This was then subjected to a thermal reaction by raising the temperature to 600° C. for 8 hours in a nitrogen atmosphere and holding at the same temperature for 4 hours to obtain Composite Porous Carbon Material F. The resulting Composite Porous Carbon Material F was allowed to cool naturally to 60° C. and then removed from the electric furnace.

BET specific surface area and pore size distribution were measured for the resulting Composite Porous Carbon Material F using the previously described methods. As a result, BET specific surface area was 262 m²/g, mesopore volume (Vm1) was 0.186 cc/g, micropore volume (Vm2) was 0.082 cc/g and $V_{m1}/V_{m2}$ was 2.27. The weight ratio of coal pitch-derived carbonaceous material to activated carbon in the Composite Porous Carbon Material F was 78%.

<Production of Negative Electrode H1>

Negative Electrode H was fabricated using the same method as Example 1 with the exception of using the Composite Porous Carbon Material F. At this time, the film thickness of the upper side of the negative electrode active material layer was 30 μm, the film thickness of the lower side of the negative electrode active material layer was 33 μm, the upper side was designated as negative electrode side $A_{y2}$, and the lower side was designated as negative electrode side $A_{x2}$.

[Measurement of Capacitance Per Negative Electrode Weight]

A single sheet of the resulting Negative Electrode 6 was cut out to a size of 1.4 cm×2.0 cm (2.8 cm$^2$) followed by removing one of the negative electrode active material layers coated on both sides of the copper foil using a spatula or brush and the like for use as a working electrode. Lithium metal was respectively used for the counter electrode and reference electrode, and a nonaqueous solution, obtained by dissolving LiPF$_6$ at a concentration of 1.0 mol/L in a mixed solvent of ethylene carbonate (EC) and ethyl methyl carbonate (EMC) at a weight ratio of 1:1, was used for the electrolytic solution to prepare an electrochemical cell in an argon glovebox.

Initial charging capacity of the resulting electrochemical cell was measured using a charging and discharging apparatus (TOSCAT-3100U) manufactured by Toyo System Co., Ltd. according to the procedure indicated below.

After carrying out constant current charging on the electrochemical cell at a temperature of 25° C. and current value of 0.5 mA/cm$^2$ until the voltage reached 0.01 V, constant voltage charging was further carried out until the current value reached 0.01 mA/cm$^2$. Evaluation of the charging capacity during this constant current charging and constant voltage charging as initial charging capacity yielded a value of 1.6 mAh, and the capacity per unit area of the Negative Electrode 6 (doped amount of lithium ions) was 1460 mAh/g.

<Fabrication and Evaluation of Nonaqueous Lithium Power Storage Element>

A nonaqueous lithium power storage element was fabricated and evaluated using the same method as Example 132 with the exception of laminating the Positive Electrode Precursor D1 (single-sided), separator, Negative Electrode H1, separator and Positive Electrode Precursor D1 (double-sided) in that order using the Positive Electrode Precursor D1 (single-sided), Positive Electrode Precursor D1 (double-sided) and Negative Electrode H1 so that the positive electrode precursor side $C_{x2}$ opposed the negative electrode side $A_{x2}$ with a separator interposed and the positive electrode precursor side $C_{y2}$ opposed the negative electrode side $A_{y2}$ with a separator interposed there between.

Example 159

A nonaqueous lithium power storage element was fabricated using the same method as Example 158 with the exception of doping the negative electrode with lithium by carrying out constant current charging at a current value of 100 mA until voltage reached 4.5 V and then continuing constant voltage charging at 4.5 V for 36 hours during initial charging of the nonaqueous lithium power storage element of the lithium doping step.

Example 160

A nonaqueous lithium power storage element was fabricated using the same method as Example 158 with the exception of doping the negative electrode with lithium by carrying out constant current charging at a current value of 100 mA until voltage reached 4.5 V and then continuing constant voltage charging at 4.5 V for 12 hours during initial charging of the nonaqueous lithium power storage element of the lithium doping step.

Example 161

A nonaqueous lithium power storage element was fabricated using the same method as Example 158 with the exception of using lithium oxide instead of lithium carbonate.

Example 162

A nonaqueous lithium power storage element was fabricated using the same method as Example 158 with the exception of using lithium hydroxide instead of lithium carbonate.

Comparative Example 68

A nonaqueous lithium power storage element was fabricated in the same manner as Example 158 and subjected to various evaluations with the exception of fabricating an electrode laminated body so that positive electrode precursor side $C_{x2}$ and negative electrode side $A_{y2}$ were opposed with a separator interposed there between and positive electrode precursor side $C_{y1}$ and negative electrode side $A_{x1}$ were opposed with a separator interposed there between, and doping the negative electrode with lithium by carrying out constant current charging at a current value of 100 mA until voltage reached 4.2 V and then continuing constant voltage charging at 4.2 V for 3 hours during initial charging of the lithium doping step.

Comparative Example 69

A nonaqueous lithium power storage element was fabricated using the same method as Comparative Example 68 with the exception using lithium oxide instead of lithium carbonate.

Comparative Example 70

A nonaqueous lithium power storage element was fabricated using the same method as Comparative Example 68 with the exception using lithium hydroxide instead of lithium carbonate.

Example 163

The Positive Electrode Precursor C1 (double-sided) was cut to a size of 12.0 cm×210.0 cm (such that the size of the positive electrode active material layer was 10.0 cm×210.0 cm and the size of the non-coated portion of the positive electrode where the positive electrode active material layer was not coated on the positive electrode power collector was 2.0 cm×210.0 cm), the Negative Electrode G1 was cut to a size of 12.1 cm×220.0 cm (such that the size of the negative electrode active material layer was 10.1 cm×220.0 cm and the size of the non-coated portion of the negative electrode where the negative electrode active material layer was not coated on the negative electrode power collector was 2.0 cm×220.0 cm), and the cut out positive electrode precursor and negative electrode were wound with a polyethylene separator (manufactured by ASAHI KASEI KABUSHIKI KAISHA, thickness: 10 μm) interposed there between to fabricate an electrode laminated body. At this time, the electrode laminated body was wound into an elliptical shape such that the positive electrode precursor side $C_{x1}$ and the negative electrode side $A_{x1}$ were opposed with the separator interposed there between and the positive electrode precursor side $C_{y1}$ and the negative electrode side $A_{y1}$ were opposed with the separator interposed there between. The positive electrode terminal and negative electrode terminal were ultrasonic-welded to the resulting electrode laminated body followed by placing in a container formed with an aluminum laminated film and sealing three sides including the electrode terminal portion by heat sealing. Subsequently, a nonaqueous lithium power supply element was fabricated and evaluated using the same method as Example 132.

Example 164

The Positive Electrode Precursor D1 (double-sided) was cut to a size of 12.0 cm×210.0 cm (such that the size of the positive electrode active material layer was 10.0 cm×210.0 cm and the size of the non-coated portion of the positive electrode where the positive electrode active material layer was not coated on the positive electrode power collector was 2.0 cm×210.0 cm), the Negative Electrode H1 was cut to a size of 12.1 cm×220.0 cm (such that the size of the negative electrode active material layer was 10.1 cm×220.0 cm and the size of the non-coated portion of the negative electrode where the negative electrode active material layer was not coated on the negative electrode power collector was 2.0 cm×220.0 cm), and the cut out positive electrode precursor and negative electrode were wound with a polyethylene separator (manufactured by ASAHI KASEI KABUSHIKI KAISHA, thickness: 10 μm) interposed there between to fabricate an electrode laminated body. At this time, the electrode laminated body was wound into an elliptical shape such that the positive electrode precursor side $C_{x2}$ and negative electrode side $A_{x2}$ were opposed with the separator interposed there between and the positive electrode precursor side $C_{y2}$ and the negative electrode side $A_{y2}$ were opposed with the separator interposed there between. The positive electrode terminal and negative electrode terminal were ultrasonic-welded to the resulting electrode laminated body followed by placing in a container formed with an aluminum laminated film and sealing three sides including the electrode terminal portion by heat sealing. Subsequently, a nonaqueous lithium power supply element was fabricated and evaluated using the same method as Example 132.

Comparative Example 71

An electrode laminated body was wound into an elliptical shape such that positive electrode precursor side $C_{x1}$ and negative electrode side $A_{y1}$ were opposed with a separator interposed there between and positive electrode precursor side $C_{y1}$ and negative electrode side $A_{x1}$ were opposed with a separator interposed there between. A nonaqueous lithium power storage element was fabricated in the same manner as Example 163 and subjected to various evaluations with the exception of doping the negative electrode with lithium by carrying out constant current charging at a current value of 100 mA until voltage reached 4.1 V and then continuing constant voltage charging at 4.1 V for 3 hours during initial charging of the lithium doping step of the electrode laminated body.

Comparative Example 72

An electrode laminated body was wound into an elliptical shape such that positive electrode precursor side $C_{x2}$ and negative electrode side $A_{y2}$ were opposed with a separator interposed there between and positive electrode precursor side $C_{y2}$ and negative electrode side $A_{x2}$ were opposed with a separator interposed there between. A nonaqueous lithium power storage element was fabricated in the same manner as Example 164 and subjected to various evaluations with the exception of doping the negative electrode with lithium by carrying out constant current charging at a current value of 100 mA until voltage reached 4.1 V and then continuing constant voltage charging at 4.1 V for 3 hours during initial charging of the lithium doping step of the electrode laminated body.

The evaluation results of Examples 158 to 164 and Comparative Examples 68 to 72 are shown in Tables 18 and 19.

TABLE 18

| | Lithium compound | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ | $C_{x2}/C_{y2}$ | Micro-Raman spectroscopy | | | $C_{y3}$ (10⁻⁴ mol/g) | $A_{y3}$ (10⁻⁴ mol/g) | $C_{y3}/A_{y3}$ |
|---|---|---|---|---|---|---|---|---|---|---|---|---|---|---|---|---|
| | | | | | | | | | | | $S_x$ (%) | $S_y$ (%) | $S_x/S_y$ | | | |
| Ex. 158 | Li₂CO₃ | 30.5 | 28.6 | 5.2 | 4.1 | 28.0 | 25.5 | 1.07 | 1.10 | 1.27 | 7.2 | 6.5 | 1.11 | 75.6 | 105.0 | 0.72 |
| Ex. 159 | Li₂CO₃ | 30.5 | 28.6 | 9.6 | 7.8 | 27.9 | 25.5 | 1.07 | 1.09 | 1.23 | 15.6 | 9.4 | 1.66 | 46.5 | 101.0 | 0.46 |
| Ex. 160 | Li₂CO₃ | 30.4 | 28.7 | 14.0 | 13.1 | 28.0 | 25.4 | 1.06 | 1.10 | 1.07 | 30.0 | 22.4 | 1.34 | 25.6 | 97.4 | 0.26 |
| Ex. 161 | Li₂O | 30.5 | 28.7 | 5.5 | 4.1 | 28.0 | 25.6 | 1.06 | 1.09 | 1.34 | 7.6 | 4.5 | 1.69 | 88.7 | 101.0 | 0.88 |
| Ex. 162 | LiOH | 30.6 | 28.6 | 5.6 | 4.2 | 27.9 | 25.5 | 1.07 | 1.09 | 1.33 | 7.7 | 5.4 | 1.43 | 85.7 | 112.0 | 0.77 |
| Comp. Ex. 68 | Li₂CO₃ | 30.6 | 28.5 | 28.2 | 26.0 | 25.4 | 28.0 | 1.07 | 0.91 | 1.08 | 62.2 | 49.0 | 1.27 | 1.2 | 9.7 | 0.12 |
| Comp. Ex. 69 | Li₂O | 30.5 | 28.6 | 12.3 | 9.2 | 25.4 | 28.0 | 1.07 | 0.91 | 1.34 | 17.2 | 12.3 | 1.40 | 1.5 | 8.8 | 0.17 |
| Comp. Ex. 70 | LiOH | 30.5 | 28.5 | 11.9 | 9.2 | 25.5 | 27.9 | 1.07 | 0.91 | 1.29 | 16.7 | 12.1 | 1.38 | 1.5 | 9.1 | 0.16 |
| Ex. 163 | Li₂CO₃ | 30.4 | 28.5 | 4.6 | 3.5 | 26.0 | 23.5 | 1.07 | 1.11 | 1.31 | 6.7 | 4.5 | 1.49 | 85.0 | 80.4 | 1.06 |
| Ex. 164 | Li₂CO₃ | 30.5 | 28.7 | 5.2 | 4.1 | 27.9 | 25.5 | 1.06 | 1.09 | 1.27 | 7.8 | 5.7 | 1.37 | 83.4 | 110.0 | 0.76 |
| Comp. Ex. 71 | Li₂CO₃ | 30.5 | 28.6 | 10.6 | 8.3 | 23.4 | 26.0 | 1.07 | 0.90 | 1.28 | 15.0 | 11.5 | 1.30 | 1.4 | 5.8 | 0.24 |
| Comp. Ex. 72 | Li₂CO₃ | 30.6 | 28.5 | 12.0 | 9.7 | 25.5 | 28.0 | 1.07 | 0.91 | 1.24 | 17.7 | 12.9 | 1.37 | 1.4 | 6.9 | 0.20 |

TABLE 19

| | Initial characteristics | | High-temperature storage test | Overcharging test | |
|---|---|---|---|---|---|
| | | | | Max. | |
| | Fa (F) | Ra (mΩ) | B ($10^{-3}$ cc/F) | temp. (° C.) | Status |
| Ex. 158 | 1354 | 0.55 | 2.32 | 42 | Cleaved |
| Ex. 159 | 1334 | 0.56 | 2.68 | 42 | Cleaved |
| Ex. 160 | 1330 | 0.58 | 2.85 | 44 | Cleaved |
| Ex. 161 | 1365 | 0.59 | 2.40 | 46 | Cleaved |
| Ex. 162 | 1328 | 0.54 | 2.35 | 41 | Cleaved |
| Comp. Ex. 68 | 795 | 0.72 | 4.31 | 177 | Ruptured |
| Comp. Ex. 69 | 819 | 0.73 | 3.30 | 165 | Ruptured |
| Comp. Ex. 70 | 808 | 0.74 | 3.57 | 177 | Ruptured |
| Ex. 163 | 1768 | 0.56 | 1.89 | 40 | Cleaved |
| Ex. 164 | 1312 | 0.56 | 2.35 | 45 | Cleaved |
| Comp. Ex. 71 | 1063 | 0.77 | 3.17 | 182 | Ruptured |
| Comp. Ex. 72 | 750 | 0.81 | 3.92 | 175 | Ruptured |

Based on the evaluation results shown in Tables 16 to 19, in the case $C_{x1}/C_{y1}$ is within the configuration range of the present invention of 1.02 to 1.35 and $A_{x1}/A_{y1}$ is within the range of 1.02 to 1.35, rises in temperature are considered to have been able to be inhibited since the lithium compound contained in the positive electrode active material layer gradually decomposes and generates gas causing the casing to be cleaved under mild conditions during overcharging.

In addition, due to the presence of a compound represented by formulas (1) to (3) on the surface of the positive electrode, a reaction between the lithium compound in the positive electrode and nonaqueous electrolytic solution can be inhibited, and this is thought to make it possible to inhibit generation of gas in a high-temperature storage test.

INDUSTRIAL APPLICABILITY

The nonaqueous lithium power storage element of the present invention enables the production of a power storage module in which a plurality of nonaqueous lithium power storage elements are connected in series or in parallel. The nonaqueous lithium power storage element of the present invention and the aforementioned power storage module can be preferably used in power regeneration systems of the hybrid drive systems automobiles requiring high load charging and discharging cycle characteristics, power load smoothing systems in microgrids or natural power generation such as solar power generation or wind power generation, non-service interruption power source systems used in factory production equipment, non-contact power supply systems used for the purpose of smoothing voltage fluctuations and storing energy in microwave power transmission or electric field resonance, and energy harvesting systems used for the purpose of utilizing electrical power generated by vibration power generation and the like.

The nonaqueous lithium power storage element of the present invention maximally demonstrates the effects of the present invention when applied as a lithium ion capacitor or lithium ion secondary battery, thereby making it preferable as such.

REFERENCE SIGNS LIST

1 Positive electrode active material layer side $C_x$
2 Positive electrode active material layer side $C_y$
3 Positive electrode power collector
4 Negative electrode active material layer side $A_x$
5 Negative electrode active material layer side $A_y$
6 Negative electrode power collector
7 Separator
8 Electrode laminated body
9 Casing

What is claimed is:

1. A method for producing a nonaqueous lithium-type power storage element, the method comprising:

providing a nonaqueous lithium-type power storage element with a positive electrode, a negative electrode, a separator and a nonaqueous electrolytic solution containing lithium ions;

aging step in which the nonaqueous lithium-type power storage element is maintained at a temperature of 40° C. or more to decompose the nonaqueous electrolytic solution, wherein the step of providing a nonaqueous lithium-type power storage element comprises:

providing a positive electrode precursor having a positive electrode power collector and a positive electrode active material layer provided on one side or both sides of the positive electrode power collector, wherein the positive electrode active material layer contains a positive electrode active material, and alithium compound other than the positive electrode active material, providing a negative electrode having a negative electrode power collector and a negative electrode active material layer provided on one side or both sides of the negative electrode power collector, wherein the negative electrode active material layer contains a negative electrode active material comprising a carbon material capable of intercalating and releasing lithium ions, laminating the positive electrode precursor and the negative electrode with a separator interposed therebetween to obtain an electrode laminated body, or winding the positive electrode precursor and the negative electrode with a separator interposed therebetween to obtain an electrode wound body, housing the electrode laminated body or electrode wound body in a casing, injecting a nonaqueous electrolytic solution into the casing, and sealing the casing, and pre-doping the negative electrode active material layer with the lithium ions by decomposing the lithium compound by applying a voltage between the positive electrode precursor and the negative electrode to decompose the lithium compound in the positive electrode precursor and release the lithium ions followed by reducing the lithium ions at the negative electrode, wherein the negative electrode in the nonaqueous lithium-type power storage element has a negative electrode power collector and a negative electrode active material layer containing a negative electrode active material provided on one side or both sides of the negative electrode power collector, and the negative electrode active material contains a carbon material capable of intercalating and releasing lithium ions, wherein the positive electrode in the nonaqueous lithium-type power storage element has a positive electrode power collector and a positive electrode active material layer containing a positive electrode active material provided on one side or both sides of the positive electrode power collector, and the positive electrode active material contains activated carbon, wherein the positive electrode active material layer in the nonaqueous lithium-type power storage element contains $1.60\times10^{-4}$ mol/g to $300\times10^{-4}$ mol/g of one or more types of compounds selected from compounds represented by the following formulas (1) to (3) per unit weight of the positive electrode active material layer:

[Chem. 1]

$$LiX^1—OR^1O—X^2Li \qquad (1)$$

(wherein, $R^1$ represents an alkylene group having 1 to 4 carbon atoms or a halogenated alkylene group having 1 to 4 carbon atoms, and $X^1$ and $X^2$ respectively and independently represent $—(COO)_n$ (wherein, n represents 0 or 1)),

[Chem. 2]

$$LiX^1—OR^1O—X^2R^2 \qquad (2)$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $—(COO)_n$ (wherein, n represents 0 or 1)), and

[Chem. 3]

$$R^2X^1—OR^1O—X^2R^3 \qquad (3)$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $—(COO)_n$ (wherein, n represents 0 or 1)), and
wherein the positive electrode active material layer in the nonaqueous lithium-type power storage element contains a lithium compound other than the active material, and an amount of lithium in the active material layer is calculated from the area of a peak appearing at −40 ppm to 40 ppm in a $^7$Li-solid state NMR spectrum, and the amount of lithium is $10.0\times10^{-4}$ mol/g to $300\times10^{-4}$ mol/g.

2. The method according to claim 1, wherein the aging step is carried out at a temperature of 40° C. to 60° C.

3. The method according to claim 1, wherein the voltage of the nonaqueous lithium-type power storage element during the aging step is adjusted from 3.0 V to 4.0 V.

4. The method according to claim 1, wherein the positive electrode active material layer in the nonaqueous lithium-type power storage element contains $0.30\times10^{-4}$ mol/g to $200\times10^{-4}$ mol/g of lithium fluoride per unit weight of the positive electrode active material layer.

5. The method according to claim 1, wherein $0.20 \leq A/B \leq 20.0$ when the content of the compound selected from compounds represented by the formulas (1) to (3) per unit weight of the positive electrode active material layer is defined as A and the content of the compound per unit weight of the negative electrode active material layer is defined as B.

6. The method according to claim 1, wherein the surface of the separator has a fluorine-based particulate substance,
wherein the value obtained by dividing the percentage of fluorine atoms (atomic %) by the percentage of carbon atoms (atomic %), which is calculated from the relative element concentration of atoms obtained by XPS (X-ray photoelectron spectroscopy) measurement, on the surface of the separator in the nonaqueous lithium-type power storage element is $5.0\times10^{-3}$ to $200\times10^{-3}$, and
wherein a particulate substance having a particle diameter of 50 nm to 500 nm is present at 1.0 particle/μm² to 30.0 particles/μm² on the separator surface during SEM observation of the separator surface.

7. The method according to claim 6, wherein the value obtained by dividing the percentage of fluorine atoms (atomic %) by the percentage of carbon atoms (atomic %), which is calculated from the relative element concentration of atoms obtained by XPS (X-ray photoelectron spectroscopy) measurement, on the surface of the separator on the side opposing the negative electrode in the nonaqueous lithium-type power storage element is $10\times10^{-3}$ to $100\times10^{-3}$, and
wherein a particulate substance having a particle diameter of 50 nm to 500 nm is present at 4.0 particles/μm² to 15.0 particles/μm² on the separator surface during SEM observation of the surface of the separator on the side opposing the negative electrode.

8. The method according to claim 1, wherein the positive electrode contains a lithium compound, the lithium compound is one or more types of compounds selected from lithium carbonate, lithium oxide, lithium hydroxide, lithium chloride, lithium bromide, lithium iodide, lithium nitride, lithium oxalate and lithium acetate, 0.1 μm≤$X_1$≤10.0 μm when the average particle diameter of the lithium compound is defined as $X_1$, 2.0 μm≤$Y_1$≤20.0 μm when the average particle diameter of the positive electrode active material is defined as $Y_1$, $X_1$<$Y_1$, and the amount of lithium compound contained in the positive electrode is 1% by weight to 50% by weight.

9. The method according to claim 1, wherein the positive electrode active material layer in the nonaqueous lithium-type power storage element further contains $2.70\times10^{-4}$ mol/g to $130\times10^{-4}$ mol/g of a compound represented by the following formula (4) per unit weight of the positive electrode active material layer.

[Chem. 4]

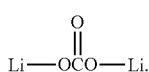

(4)

10. The method according to claim 1, wherein the positive electrode power collector and the negative electrode power collector are nonporous metal foils.

11. The method according to claim 1, wherein the nonaqueous electrolytic solution in the nonaqueous lithium-type power storage element contains at least one type of organic solvent selected from the group consisting of ethylene carbonate, propylene carbonate, butylene carbonate, vinylene carbonate and fluoroethylene carbonate.

12. The method according to claim 1, wherein the nonaqueous electrolytic solution in the nonaqueous lithium-type power storage element contains at least one type of $LiPF_6$ or $LiBF_4$.

13. The method according to claim 1, wherein the concentration of $LiN(SO_2F)_2$ in the nonaqueous electrolytic solution in the nonaqueous lithium-type power storage element is 0.3 mol/L to 1.5 mol/L based on the total amount of the nonaqueous electrolytic solution.

14. The method according to claim 1, wherein the positive electrode active material in the nonaqueous lithium-type power storage element contained in the positive electrode active material layer is activated carbon that satisfies the expressions $0.3 < V1 \leq 0.8$ and $0.5 \leq V2 \leq 1.0$ when mesopore volume derived from pores having a diameter of 20 Å to 500 Å as calculated by the BJH method is defined as V1 (cc/g) and micropore volume derived from pores having a diameter of less than 20 Å as calculated according to the MP method is defined as V2 (cc/g), and demonstrates a specific surface area as measured b the BET method of 1.500 $m^2$/g to 3,000 $m^2$/g.

15. The method according to claim 1, wherein the positive electrode active material contained in the positive electrode active material layer in the nonaqueous lithium-type power storage element is activated carbon in which the mesopore volume V1 (cc/g) derived from pores having a diameter of 20 Å to 500 Å as calculated by the BJH method satisfies the expression $0.8 < V1 \leq 2.5$ and the micropore volume V2 (cc/g) derived from pores having a diameter of less than 20 Å as calculated according to the MP method satisfies the expression $0.8 < V2 \leq 3.0$, and demonstrates a specific surface area as measured by the BET method of 2,300 $m^2$/g to 4,000 $m^2$/g.

16. The method according to claim 1, wherein the negative electrode in the nonaqueous lithium-type power storage element contains a negative electrode active material, and the doped amount of lithium ions of the negative electrode active material is 530 mAh/g to 2,500 mAh/g per unit weight.

17. The method according to claim 1, wherein the BET specific surface area of the negative electrode active material in the nonaqueous lithium-type power storage element is 100 $m^2$/g to 1,500 $m^2$/g.

18. The method according to claim 1, wherein the negative electrode in the nonaqueous lithium-type power storage element contains a negative electrode active material, and the doped amount of lithium ions of the negative electrode active material is 50 mAh/g to 700 mAh/g per unit weight.

19. The method according to claim 1, wherein the BET specific surface area of the negative electrode active material in the nonaqueous lithium-type power storage element is 1 $m^2$/g to 50 $m^2$/g.

20. The method according to claim 1, wherein the average particle diameter of the negative electrode active material in the nonaqueous lithium-type power storage element is 1 μm to 10 μm.

21. The method according to claim 1, wherein the nonaqueous lithium-type power storage element simultaneously satisfies the following requirements (a) and (b) when the initial internal resistance at a cell voltage of 4 V is defined as Ra (Ω), electrostatic capacitance is defined as F (F), electrical energy is defined as E (Wh) and the volume of the casing that houses an electrode laminated body is defined as V (L):
 (a) the product Ra·F of Ra and F is 0.3 to 3.0; and
 (b) E/V is 15 to 50.

22. The method according to claim 1, wherein the nonaqueous lithium-type power storage element simultaneously satisfies the following requirements (c) and (d) when internal resistance at 25° C. at a cell voltage of 4 V after storing for 2 months at an ambient temperature of 60° C. is further defined as Rb (Ω):
 (c) Rb/Ra is 0.3 to 3.0, and
 (d) the amount of gas generated at 25° C. at a cell voltage of 4 V after storing for 2 months at an ambient temperature of 60° C. is $30 \times 10^{-3}$ cc/F or less.

23. The method according to claim 21, wherein the nonaqueous lithium-type power storage element simultaneously satisfies all of the following requirements (c) to (e) when initial internal resistance at a cell voltage of 4 V is defined as Ra (Ω), internal resistance at 25° C. at a cell voltage of 4 V after storing for 2 months at an ambient temperature of 60° C. is defined as Rb (Ω), and internal resistance at an ambient temperature of −30° C. is defined as Rc (Ω):
 (c) Rb/Ra is 0.3 to 3.0,
 (d) the amount of gas generated at 25° C. at a cell voltage of 4 V after storing for 2 months at an ambient temperature of 60° C. is $30 \times 10^{-3}$ cc/F or less, and
 (e) Rc/Ra is 30 or less.

24. The method according to claim 4, wherein the positive electrode active material layer in the nonaqueous lithium-type power storage element contains $2.70 \times 10^{-4}$ mol/g to $130 \times 10^{-4}$ mol/g of a compound represented by the following formula (4) per unit weight of the positive electrode active material layer.

[Chem. 4]

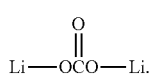

(4)

25. The method according to claim 4, wherein the positive electrode power collector and the negative electrode power collector are nonporous metal foils.

26. The method according to claim 5, wherein the positive electrode power collector and the negative electrode power collector are nonporous metal foils.

27. The method according to claim 5, wherein the positive electrode contains at least one lithium compound other than the active material, and the active material is coated onto both sides of a nonporous positive electrode power collector of the positive electrode,
 wherein a negative electrode active material capable of intercalating and releasing lithium ions is coated onto both sides of a nonporous negative electrode power collector of the negative electrode,
 wherein $C_{x1}/C_{y1}$ is 1.02 to 1.35 when the basis weight of the positive electrode active material layer on one side ($C_x$ side) of the positive electrode is defined as $C_{x1}$ (g/$m^2$) and the basis weight of the positive electrode active material layer on the other side ($C_y$ side) is defined as $C_{y1}$ (g/$m^2$), and
 wherein $A_{x1}/A_{y1}$ is 1.02 to 1.35 when the basis weight of the negative electrode active material layer on one side of the electrode opposing the $C_y$ side ($A_y$ side) is defined as $A_{y1}$ (g/$m^2$) and the basis weight of the negative electrode active material layer on the other side ($A_x$ side) is defined as $A_{x1}$ (g/$m^2$).

28. A method for producing a nonaqueous lithium-type power storage element, the method comprising:

providing a nonaqueous lithium-type power storage element with a positive electrode, a negative electrode, a separator and a nonaqueous electrolytic solution containing lithium ions, aging step in which the nonaqueous lithium-type power storage element is maintained at a temperature of 40° C. or more to decompose the nonaqueous electrolytic solution, wherein the step of providing a nonaqueous lithium-type power storage element comprises:

providing a positive electrode precursor having a positive electrode power collector and a positive electrode active material layer provided on one side or both sides of the positive electrode power collector, wherein the positive electrode active material layer contains a positive electrode active material, and a lithium compound other than the positive electrode active material, providing a negative electrode having a negative electrode power collector and a negative electrode active material layer provided on one side or both sides of the negative electrode power collector, wherein the negative electrode active material layer contains a negative electrode active material comprising a carbon material capable of intercalating and releasing lithium ions, laminating the positive electrode precursor and the negative electrode with a separator interposed therebetween to obtain an electrode laminated body, or winding the positive electrode precursor and the negative electrode with a separator interposed therebetween to obtain an electrode wound body, housing the electrode laminated body or electrode wound body in a casing, injecting a nonaqueous electrolytic solution into the casing, and sealing the casing, and pre-doping the negative electrode active material layer with the lithium ions by decomposing the lithium compound by applying a voltage between the positive electrode precursor and the negative electrode to decompose the lithium compound in the positive electrode precursor and release the lithium ions followed by reducing the lithium ions at the negative electrode, wherein the negative electrode in the nonaqueous lithium-type power storage element has a negative electrode power collector and a negative electrode active material layer containing a negative electrode active material provided on one side or both sides of the negative electrode power collector, and the negative electrode active material contains a carbon material capable of intercalating and releasing lithium ions, wherein the positive electrode in the nonaqueous lithium-type power storage element has a positive electrode power collector and a positive electrode active material layer containing a positive electrode active material provided on one side or both sides of the positive electrode power collector, and the positive electrode active material contains activated carbon, wherein the positive electrode active material layer in the nonaqueous lithium-type power storage element contains $1.60 \times 10^{-4}$ mol/g to $300 \times 10^{-4}$ mol/g of one or more types of compounds selected from compounds represented by the following formulas (1) to (3) per unit weight of the positive electrode active material layer:

[Chem. 1]

$$\text{LiX}^1\text{—OR}^1\text{O—X}^2\text{Li} \tag{1}$$

(wherein, $R^1$ represents an alkylene group having 1 to 4 carbon atoms or a halogenated alkylene group having 1 to 4 carbon atoms, and $X^1$ and $X^2$ respectively and independently represent —(COO)$_n$ (wherein, n represents 0 or 1)),

[Chem. 2]

$$\text{LiX}^1\text{—OR}^1\text{O—X}^2\text{R}^2 \tag{2}$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent —(COO)$_n$ (wherein, n represents 0 or 1)), and

[Chem. 3]

$$R^2X^1\text{—OR}^1\text{O—X}^2R^3 \tag{3}$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent —(COO)$_n$ (wherein, n represents 0 or 1)), and wherein the positive electrode contains a lithium compound, the lithium compound is one or more types of compounds selected from lithium carbonate, lithium oxide, lithium hydroxide, lithium chloride, lithium bromide, lithium iodide, lithium nitride, lithium oxalate and lithium acetate, $0.1 \ \mu m \leq X_1 \leq 10.0 \ \mu m$ when the average particle diameter of the lithium compound is defined as $X_1$, $2.0 \ \mu m \leq Y_1 \leq 20.0 \ \mu m$ when the average particle diameter of the positive electrode active material is defined as $Y_1$, $X_1 < Y_1$, and the amount of lithium compound contained in the positive electrode is 1% by weight to 50% by weight.

29. A method for producing a nonaqueous lithium-type power storage element, the method comprising:

providing a nonaqueous lithium-type power storage element with a positive electrode, a negative electrode, a separator and a nonaqueous electrolytic solution containing lithium ions;

aging step in which the nonaqueous lithium-type power storage element is maintained at a temperature of 40° C. or more to decompose the nonaqueous electrolytic solution, wherein the step of providing a nonaqueous lithium-type power storage element comprises:

providing a positive electrode precursor having a positive electrode power collector and a positive electrode active material layer provided on one side or both sides of the positive electrode power collector, wherein the positive electrode active material layer contains a positive electrode active material, and a lithium compound other than the positive electrode active material, providing a negative electrode having a negative electrode power collector and a negative electrode active material layer provided on one side or both sides of the negative electrode power collector, wherein the negative electrode active material layer contains a negative electrode active material comprising a carbon material capable of intercalating and releasing lithium ions, laminating the positive electrode precursor and the negative electrode with a separator interposed therebetween to obtain an electrode laminated body, or winding the positive electrode precursor and the negative electrode with a separator interposed therebetween to obtain an electrode wound body, housing the electrode laminated body or electrode wound body in a casing, injecting a nonaqueous electrolytic solution into the casing, and sealing the casing, and pre-doping the negative electrode active material layer with the lithium ions by decomposing the lithium compound by applying a voltage between the positive electrode precursor and the negative electrode to decompose the lithium compound in the positive electrode precursor and release the lithium ions followed by reducing the lithium ions at the negative electrode, wherein the negative electrode in the nonaqueous lithium-type power storage element has a negative electrode power collector and a negative electrode active material layer containing a negative electrode active material provided on one side or both sides of the negative electrode power collector, and the negative electrode active material contains a carbon material capable of intercalating and releasing lithium ions, wherein the positive electrode in the nonaqueous lithium-type power storage element has a positive electrode power collector and a positive electrode active material layer containing a positive electrode active material provided on one side or both sides of the positive electrode power collector, and the positive electrode active material contains activated carbon, wherein the positive electrode active material layer in the nonaqueous lithium-type power storage element contains $1.60 \times 10^{-4}$ mol/g to $300 \times 10^{-4}$ mol/g of one or more types of compounds selected from compounds represented by the following formulas (1) to (3) per unit weight of the positive electrode active material layer:

[Chem. 1]

$$LiX^1—OR^1O—X^2Li \quad (1)$$

(wherein, $R^1$ represents an alkylene group having 1 to 4 carbon atoms or a halogenated alkylene group having 1 to 4 carbon atoms, and $X^1$ and $X^2$ respectively and independently represent $—(COO)_n$ (wherein, n represents 0 or 1)),

[Chem. 2]

$$LiX^1—OR^1O—X^2R^2 \quad (2)$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $—(COO)_n$ (wherein, n represents 0 or 1)), and

[Chem. 3]

$$R^2X^1—OR^1O—X^2R^3 \quad (3)$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $—(COO)_n$ (wherein, n represents 0 or 1)), and wherein the positive electrode active material in the nonaqueous lithium-type power storage element contained in the positive electrode active material layer is activated carbon that satisfies the expressions $0.3 < V1 \leq 0.8$ and $0.5 \leq V2 \leq 1.0$ when mesopore volume derived from pores having a diameter of 20 Å to 500 Å as calculated by the BJH method is defined as V1 (cc/g) and micropore volume derived from pores having a diameter of less than 20 Å as calculated according to the MP method is defined as V2 (cc/g), and demonstrates a specific surface area as measured by the BET method of 1,500 m²/g to 3,000 m²/g.

30. A method for producing a nonaqueous lithium-type power storage element, the method comprising:

providing a nonaqueous lithium-type power storage element with a positive electrode, a negative electrode, a separator and a nonaqueous electrolytic solution containing lithium ions;

aging step in which the nonaqueous lithium-type power storage element is maintained at a temperature of 40° C. or more to decompose the nonaqueous electrolytic solution, wherein the step of providing a nonaqueous lithium-type power storage element comprises:

providing a positive electrode precursor having a positive electrode power collector and a positive electrode active material layer provided on one side or both sides of the positive electrode power collector, wherein the positive electrode active material layer contains a positive electrode active material, and a lithium compound other than the positive electrode active material, providing a negative electrode having a negative electrode power collector and a negative electrode active material layer provided on one side or both sides of the negative electrode power collector, wherein the negative electrode active material layer contains a negative electrode active material comprising a carbon material capable of intercalating and releasing lithium ions, laminating the positive electrode precursor and the negative electrode with a separator interposed therebetween to obtain an electrode laminated body, or winding the positive electrode precursor and the negative electrode with a separator interposed therebetween to obtain an electrode wound body, housing the electrode laminated body or electrode wound body in a casing, injecting a nonaqueous electrolytic solution into the casing, and sealing the casing, and pre-doping the negative electrode active material layer with the lithium ions by decomposing the lithium compound by applying a voltage between the positive electrode precursor and the negative electrode to decompose the lithium compound in the positive electrode precursor and release the lithium ions followed by reducing the lithium ions at the negative electrode, wherein the negative electrode in the nonaqueous lithium-type power storage element has a negative electrode power collector and a negative electrode active material layer containing a negative electrode active material provided on one side or both sides of the negative electrode power collector, and the negative electrode active material contains a carbon material capable of intercalating and releasing lithium ions, wherein the positive electrode in the nonaqueous lithium-type power storage element has a positive electrode power collector and a positive electrode active material layer containing a positive electrode active material provided on one side or both sides of the positive electrode power collector, and the positive electrode active material contains activated carbon, wherein the positive electrode active material layer in the nonaqueous lithium-type power storage element contains $1.60 \times 10^{-4}$ mol/g to $300 \times 10^{-4}$ mol/g of one or more types of compounds selected from compounds represented by the following formulas (1) to (3) per unit weight of the positive electrode active material layer:

[Chem. 1]

$$LiX^1\text{—}OR^1O\text{—}X^2Li \qquad (1)$$

(wherein, $R^1$ represents an alkylene group having 1 to 4 carbon atoms or a halogenated alkylene group having 1 to 4 carbon atoms, and $X^1$ and $X^2$ respectively and independently represent $\text{—}(COO)_n$ (wherein, n represents 0 or 1)),

[Chem. 2]

$$LiX^1\text{—}OR^1O\text{—}X^2R^2 \qquad (2)$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $\text{—}(COO)_n$ (wherein, n represents 0 or 1)), and

[Chem. 3]

$$R^2X^1\text{—}OR^1O\text{—}X^2R^3 \qquad (3)$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $\text{—}(COO)_n$ (wherein, n represents 0 or 1)), and wherein the positive electrode active material contained in the positive electrode active material layer in the nonaqueous lithium-type power storage element is activated carbon in which the mesopore volume V1 (cc/g) derived from pores having a diameter of 20 Å to 500 Å as calculated by the BJH method satisfies the expression $0.8<V1\le2.5$ and the micropore volume V2 (cc/g) derived from pores having a diameter of less than 20 Å as calculated according to the MP method satisfies the expression $0.8<V2\le3.0$, and demonstrates a specific surface area as measured by the BET method of 2,300 m²/g to 4,000 m²/g.

31. A method for producing a nonaqueous lithium-type power storage element, the method comprising:

providing a nonaqueous lithium-type power storage element with a positive electrode, a negative electrode, a separator and a nonaqueous electrolytic solution containing lithium ions;

aging step in which the nonaqueous lithium-type power storage element is maintained at a temperature of 40° C. or more to decompose the nonaqueous electrolytic solution, wherein the step of providing a nonaqueous lithium-type power storage element comprises:

providing a positive electrode precursor having a positive electrode power collector and a positive electrode active material layer provided on one side or both sides of the positive electrode power collector, wherein the positive electrode active material layer contains a positive electrode active material, and a lithium compound other than the positive electrode active material, providing a negative electrode having a negative electrode power collector and a negative electrode active material layer provided on one side or both sides of the negative electrode power collector, wherein the negative electrode active material layer contains a negative electrode active material comprising a carbon material capable of intercalating and releasing lithium ions, laminating the positive electrode precursor and the negative electrode with a separator interposed therebetween to obtain an electrode laminated body, or winding the positive electrode precursor and the negative electrode with a separator interposed therebetween to obtain an electrode wound body, housing the electrode laminated body or electrode wound body in a casing, injecting a nonaqueous electrolytic solution into the casing, and sealing the casing, and pre-doping the negative electrode active material layer with the lithium ions by decomposing the lithium compound by applying a voltage between the positive electrode precursor and the negative electrode to decompose the lithium compound in the positive electrode precursor and release the lithium ions followed by reducing the lithium ions at the negative electrode, wherein the negative electrode in the nonaqueous lithium-type power storage element has a negative electrode power collector and a negative electrode active material layer containing a negative electrode active material provided on one side or both sides of the negative electrode power collector, and the negative electrode active material contains a carbon material capable of intercalating and releasing lithium ions, wherein the positive electrode in the nonaqueous lithium-type power storage element has a positive electrode power collector and a positive electrode active material layer containing a positive electrode active material provided on one side or both sides of the positive electrode power collector, and the positive electrode active material contains activated carbon, wherein the positive electrode active material layer in the nonaqueous lithium-type power storage element contains $1.60 \times 10^{-4}$ mol/g to $300 \times 10^{-4}$ mol/g of one or more types of compounds selected from compounds represented by the following formulas (1) to (3) per unit weight of the positive electrode active material layer:

[Chem. 1]

$$LiX^1—OR^1O—X^2Li \qquad (1)$$

(wherein, $R^1$ represents an alkylene group having 1 to 4 carbon atoms or a halogenated alkylene group having 1 to 4 carbon atoms, and $X^1$ and $X^2$ respectively and independently represent $—(COO)_n$ (wherein, n represents 0 or 1)),

[Chem. 2]

$$LiX^1—OR^1O—X^2R^2 \qquad (2)$$

(wherein, $R^1$ represents an alkylene group having 1 to 4 carbon atoms or a halogenated alkylene group having 1 to 4 carbon atoms, $R^2$ represents a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $—(COO)_n$ (wherein, n represents 0 or 1)), and

[Chem. 3]

$$R^2X^1—OR^1O—X^2R^3 \qquad (3)$$

(wherein, $R^1$ represents an alkylene group having 1 to 4 carbon atoms or a halogenated alkylene group having 1 to 4 carbon atoms, $R^2$ and $R^3$ respectively and independently represent a group selected from the group consisting of a hydrogen atom, an alkyl group having 1 to 10 carbon atoms, a mono- or polyhydroxyalkyl group having 1 to 10 carbon atoms, an alkenyl group having 2 to 10 carbon atoms, a mono- or polyhydroxyalkenyl group having 2 to 10 carbon atoms, a cycloalkyl group having 3 to 6 carbon atoms and an aryl group, and $X^1$ and $X^2$ respectively and independently represent $—(COO)_n$ (wherein, n represents 0 or 1)), wherein $0.20 \leq A/B \leq 20.0$ when the content of the compound selected from compounds represented by the formulas (1) to (3) per unit weight of the positive electrode active material layer is defined as A and the content of the compound per unit weight of the negative electrode active material layer is defined as B, wherein the positive electrode contains at least one lithium compound other than the active material, and the active material is coated onto both sides of a nonporous positive electrode power collector of the positive electrode, wherein a negative electrode active material capable of intercalating and releasing lithium ions is coated onto both sides of a nonporous negative electrode power collector of the negative electrode, wherein $C_{x1}/C_{y1}$ is 1.02 to 1.35 when the basis weight of the positive electrode active material layer on one side (C side) of the positive electrode is defined as $C_{x1}$ (g/m²) and the basis weight of the positive electrode active material layer on the other side ($C_y$ side) is defined as $C_{y1}$ (g/m²), and wherein $A_{x1}/A_{y1}$ is 1.02 to 1.35 when the basis weight of the negative electrode active material layer on one side of the electrode opposing the $C_y$ side ($A_y$ side) is defined as $A_{y1}$ (g/m²) and the basis weight of the negative electrode active material layer on the other side ($A_x$ side) is defined as $A_{x1}$ (g/m²).

* * * * *